(12) United States Patent
Abe et al.

(10) Patent No.: US 8,843,967 B2
(45) Date of Patent: Sep. 23, 2014

(54) PROGRAM ADDITIONAL DATA PROCESSING DEVICE, SERVER APPARATUS, PROGRAM INFORMATION DISPLAY METHOD, AND RECORDED MEDIUM

(75) Inventors: Keiko Abe, Kanagawa (JP); Noboru Yanagita, Kanagawa (JP); Takumi Yoshida, Kanagawa (JP); Norifumi Zushi, Tokyo (JP)

(73) Assignee: Sony Corporation, Tokyo (JP)

( * ) Notice: Subject to any disclaimer, the term of this patent is extended or adjusted under 35 U.S.C. 154(b) by 2092 days.

(21) Appl. No.: 10/169,815

(22) PCT Filed: Nov. 12, 2001

(86) PCT No.: PCT/JP01/09881
§ 371 (c)(1),
(2), (4) Date: Oct. 24, 2002

(87) PCT Pub. No.: WO02/39731
PCT Pub. Date: May 16, 2002

(65) Prior Publication Data
US 2005/0039111 A1    Feb. 17, 2005

(30) Foreign Application Priority Data

Nov. 10, 2000   (JP) ................................. 2000-344511

(51) Int. Cl.
| | | |
|---|---|---|
| *H04N 5/445* | (2011.01) | |
| *H04N 21/254* | (2011.01) | |
| *H04H 60/49* | (2008.01) | |
| *H04H 20/93* | (2008.01) | |
| *H04N 21/462* | (2011.01) | |
| *H04N 21/478* | (2011.01) | |
| *G06Q 30/02* | (2012.01) | |
| *H04N 21/84* | (2011.01) | |
| *H04H 60/48* | (2008.01) | |
| *H04N 21/8352* | (2011.01) | |
| *H04H 60/63* | (2008.01) | |
| *H04H 60/31* | (2008.01) | |
| *H04N 21/858* | (2011.01) | |
| *H04N 7/173* | (2011.01) | |
| *H04H 60/73* | (2008.01) | |
| *H04N 7/08* | (2006.01) | |

(52) U.S. Cl.
CPC ........... *H04H 20/93* (2013.01); *H04N 21/2542* (2013.01); *H04H 60/49* (2013.01); *H04N 21/4622* (2013.01); *H04N 21/47815* (2013.01); *G06Q 30/02* (2013.01); *H04N 5/44543* (2013.01); *H04N 21/84* (2013.01); *H04H 60/48* (2013.01); *H04N 21/8352* (2013.01); *H04H 60/63* (2013.01); *H04H 60/31* (2013.01); *H04N 21/8586* (2013.01); *H04N 7/17318* (2013.01); *H04H 60/73* (2013.01); *H04N 7/08* (2013.01)
USPC .............................................. 725/60; 725/40

(58) Field of Classification Search
USPC .............................. 725/22, 26, 60, 40; 705/26
See application file for complete search history.

(56) References Cited

U.S. PATENT DOCUMENTS 5,818,935 A    10/1998 Maa
5,897,623 A *  4/1999 Fein et al. .................... 705/26.8
(Continued)

FOREIGN PATENT DOCUMENTS

JP    8 37507    2/1996
JP    9 83467    3/1997
(Continued)

*Primary Examiner* — Nasser Goodarzi
*Assistant Examiner* — Michael Hong
(74) *Attorney, Agent, or Firm* — Frommer Lawrence & Haug LLP; William S. Frommer

(57) ABSTRACT

A program ancillary data processing apparatus is provided which includes a program ancillary data extraction unit for extracting program ancillary data pertinent to commodities or services appearing in each scene, from picture program data, and a display control unit for displaying, on a display picture, the information relevant to the commodities or services appearing in each scene, and the sum total of the number of times of scene-based access events by the audience to a database supervising the detailed information relevant to the commodities or services, based on the preset layout information.

8 Claims, 61 Drawing Sheets

(56) References Cited

U.S. PATENT DOCUMENTS

| | | | |
|---|---|---|---|
| 5,905,973 A | 5/1999 | Yonezawa et al. | |
| 5,929,849 A | 7/1999 | Kikinis | |
| 6,282,713 B1 * | 8/2001 | Kitsukawa et al. | 725/36 |
| 6,317,722 B1 * | 11/2001 | Jacobi et al. | 705/14 |
| 6,483,983 B1 * | 11/2002 | Takahashi et al. | 386/46 |
| 6,625,812 B2 * | 9/2003 | Abrams et al. | 725/105 |
| 6,963,850 B1 * | 11/2005 | Bezos et al. | 705/7.29 |
| 7,000,242 B1 * | 2/2006 | Haber | 725/43 |
| 7,979,881 B1 * | 7/2011 | Wong et al. | 725/51 |
| 2002/0002513 A1 * | 1/2002 | Chiasson | 705/27 |
| 2002/0010654 A1 * | 1/2002 | Yonezawa et al. | 705/27 |

FOREIGN PATENT DOCUMENTS

| | | | | |
|---|---|---|---|---|
| JP | 9 171504 | 6/1997 | | |
| JP | 10 42218 | 2/1998 | | |
| JP | 10-105599 | 4/1998 | | |
| JP | 10 243361 | 9/1998 | | |
| JP | 11-7453 | 1/1999 | | |
| JP | 11-69249 | 3/1999 | | |
| JP | 2000-350976 | 3/1999 | | |
| JP | 11-225294 | 8/1999 | | |
| JP | 11 275536 | 10/1999 | | |
| JP | 2000-69383 | 3/2000 | | |
| JP | 2000 148847 | 5/2000 | | |
| JP | 2000 250976 | 9/2000 | | |
| JP | 2000 253376 | 9/2000 | | |
| JP | 2002 26846 | 1/2002 | | |
| WO | WO 97 23997 | 7/1997 | | |
| WO | WO 00/38428 | * 6/2000 | | H04N 7/173 |
| WO | WO 00 38428 | 6/2000 | | |
| WO | WO 00 62223 | 10/2000 | | |

* cited by examiner

FIG.10

REPLY RESULT CONFIRMATION FORM (31)

- 31A — NAME OF RESPONDER: ○○ENTERPRISE
- 31B — NAME OF REQUESTER: AIU BROADCAST
- 31C — PROJECT NAME: ABCD
- 31D — COMMODITIES, SERVICES THAT CAN BE OFFERED UNDER SPONSORSHIP
- 31E — DESIRED CONDITION FOR SPONSORSHIP 1
- 31F — DESIRED CONDITION FOR SPONSORSHIP 2
- 31G — DESIRED CONDITION FOR SPONSORSHIP 3
- 31H — AMOUNT REQUESTED: 0 YEN
- 31I (form area)
- 31J — CONFIRMED

| | | | |
|---|---|---|---|
| 21B | MANAGEMENT ID | 21Q | POSSIBLE SITE OF FURNISHING OF SERVICES, COMMODITIES |
| 21C | DATE OF REGISTRATION | 21R | DIVISION OF SERVICED HANDLED |
| 21D | DATE OF UPDATE | 21S | NAME OF SERVICES HANDLED |
| 21E | NAME OF REGISTERER | : | : |
| 21F | BUSINESS SORT | 21A | DESIRED CONDITIONS FOR DISTRIBUTION |
| 21G | SITE OF BUSINESS | 21T | CONDITIONS UNDER WHICH SPONSORSHIP REQUEST IS AGREED |
| 21H | CORRESPONDENCE (TEL NUMBER) | : | : |
| 21I | CORRESPONDENCE (MAIL ADDRESS) | | |
| 21J | CORRESPONDENCE (URL) | | |
| 21K | CORRESPONDENCE (GPS INFORMATION) | | |
| 21L | CORRESPONDENCE (MAIL NUMBER) | | |
| 21M | SITE OF OFFER OF COMMODITIES, SERVICES | | |
| 21N | DIVISION OF COMMODITIES HANDLED | | |
| 21O | NAME OF COMMODITIES HANDLED | | |
| 21P | PRODUCER NAME | | |
| : | : | | |

REQUEST CONTENTS FORM — 36

- 36A BROADCAST STATION: AIU BROADCAST — 36J
- 36B TV PROGRAM NAME: TV PROGRAM ABCD
- 36C AIRING TIME ZONE: AIRED ON 2000/1/3/21:00-22:00
- 36D PROGRAM CONTENTS: WHAT IS EXPECTED TO BE IN VOGUE
- 36E TARGET: BACHELOR
- 36F DESIRED CONDITION FOR SPONSORSHIP 1: COLLECTED IN 2000/10
- 36G DESIRED CONDITION FOR SPONSORSHIP 2:
- 36H DESIRED CONDITION FOR SPONSORSHIP 3:
- 36I DESIRED AMOUNT: 0 YEN — 36K

AGREE TO SPONSORSHIP — 36L: [YES] [NO]

FIG. 18

GENERIC ITEM REGISTRATION FORM — 40

- 40A: NAME OF REGISTERER
- 40B: ENTERPRISE
- 40C: SITE OF BUSINESS
- 40D: CORRESPONDENCE (TEL NUMBER)
- 40E: CORRESPONDENCE (MAIL ADDRESS)
- 40F: CORRESPONDENCE (URL)
- 40G: GPS INFORMATION
- 40H: SITE OF OFFER
- 40I: COMMODITIES, SERVICES
- 40J: PRODUCER NAME
- 40K: (input fields)
- 40L: TRANSMISSION (A) [PROGRAM[CINEMA, DRAMA OR VARIETY]
 —APPAREL, MAKE, HAIRSTYLE OF PERFORMERS
 —FURNITURE USED IN STADIUM SET
 —VEHICLE SUCH AS CAR, MOTORCYCLE, BICYCLE
 —TRAVEL SERVICE BY RAILWAY, AIRCRAFT OR SHIP
 —LOCATION (HOT SPRING, SIGHT-SEEING, HOTEL, RESTAURANT, HIGH-CLASS RESTAURANT, HOTEL, WEDDING HALL, CHURCH)

(B) [SPORTS PROGRAM]
 —SPORTS STADIUM (STADIUM, ARENA, GYM)
 —LOGO, COMMODITY, SERVICE OF AD PLACARD (TOWER)
 —LOGO OR MARK PRINTED ON UNIFORM
 —GOODS USED BY PLAYERS (WEAR, BUT, GLOVE, BALL OR SHOES)

(C) [MUSIC AND IMAGE]
 —THEME SONG
 —SOUND TRACK
 —BGM
 —PLAYERS, PERFORMERS
 —MUSIC INSTRUMENTS
 —MATERIAL USED FOR CREATION AND EDITING
 —PICTURE FILE CITED (MOVING AND STILL IMAGES)
 —IMAGE SPEECH EDIT DATA (EFFECT AND MIXING DATA)

FIG.21

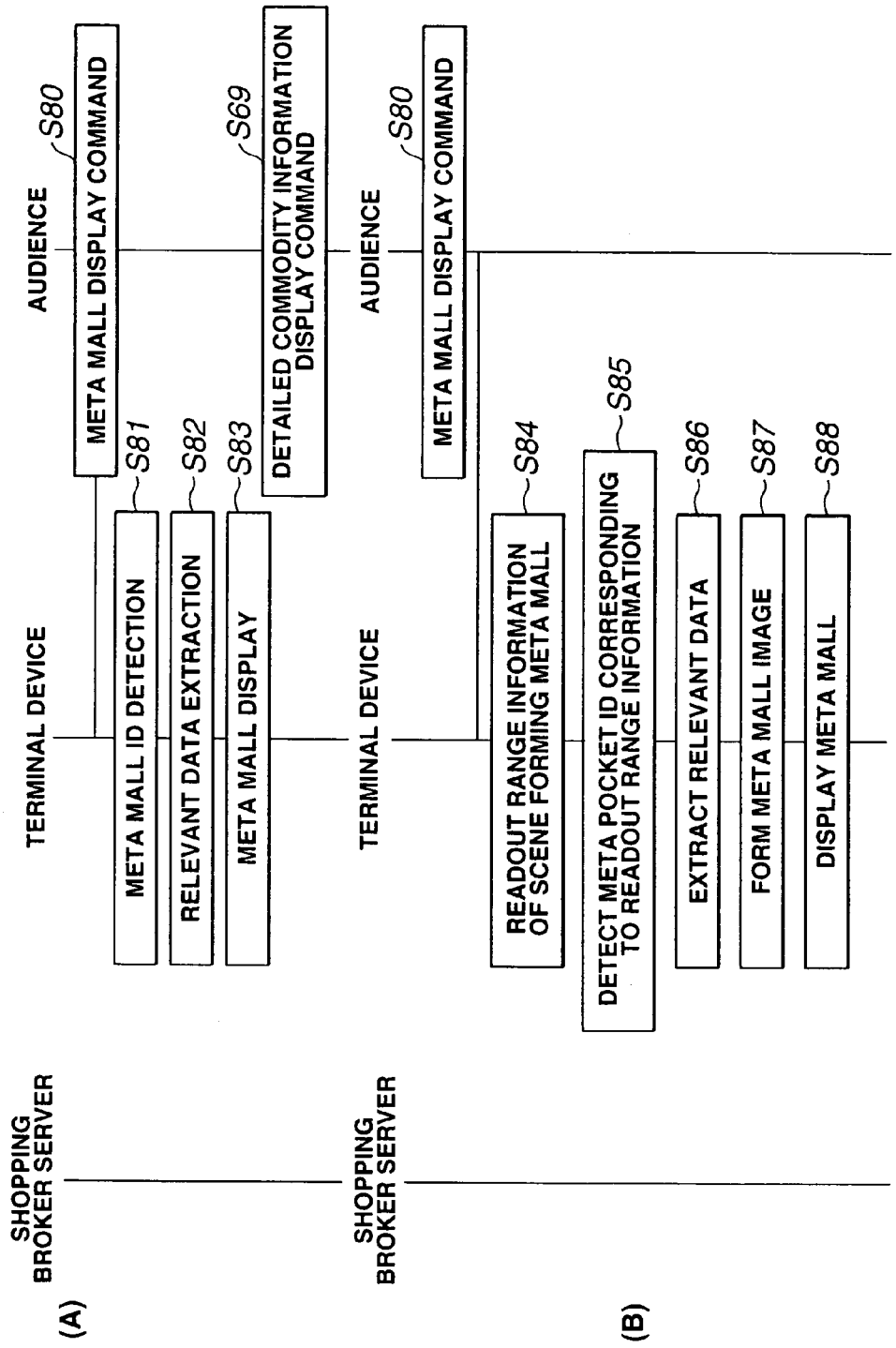

PROGRAM ADDITIONAL DATA PROCESSING DEVICE, SERVER APPARATUS, PROGRAM INFORMATION DISPLAY METHOD, AND RECORDED MEDIUM

TECHNICAL FIELD

This invention relates to a program ancillary data processing device in a digital picture program receiving reproducing system, a server device, a program information displaying method and a recording medium.

BACKGROUND ART

In certain programs aimed to sell goods (so-called television shopping), the viewer's will to purchase goods can be communicated to a server through a telephone network or the like up link. In this sort of the program, services can be rendered by embedding the ancillary information necessary in purchasing the commodities, inclusive of the telephone number for connection to the server in making an offer for purchase, in a gap of the analog broadcast waves. However, with the currently operating broadcast system, it is not possible to supply a sufficient amount of the information to the viewer because of constraint in e.g., the signaling system. However, in the digital broadcast system, as used in the next-generation broadcast system, in which an appreciably large quantity of the information can be transmitted, there is a good prospect for realization of variegated services employing the program ancillary data. For example, there is a good prospect for realization not only of an interpolating service of checking for a singer's profile as the song program on air is viewed, but also of a bidirectional service of placing an order for commodities presented on a display picture as a picture program on air is viewed.

However, even if the amount of the information acquired is increased, but the access to the required information is not facilitated, it is not possible to render attractive services for the viewer.

DISCLOSURE OF THE INVENTION

In view of the above problems, the present invention is aimed to provide a program ancillary data processing device, a server device, a program information displaying method and a recording medium in a digital picture program receiving and reproducing system, in which the access by the viewer to the information is facilitated. For solving the above problem, the following means are proposed. Meanwhile, a receiving reproducing system for digital picture programs may be constructed which gives rise to variegated user friendliness depending on the combinations used. Of course, an on-line shopping system can be constructed by interconnection to the external database over a network. Meanwhile, the undermentioned respective means do not have to be mounted in the territory of the same nation at the time of the network system construction. As for recording mediums, by optionally combining the undermentioned means, such a recording medium may be realized which gives rise to variegated user friendliness depending on the combinations used.

The functional units, forming the undermentioned means, may be implemented as hardware or as software.

As first means, the present invention proposes a program ancillary data processing apparatus including a program ancillary data extraction unit for extracting program ancillary data relevant to commodities or services appearing in each scene, from picture program data, and a display control unit for displaying, on a display picture, the information relevant to the commodities or services appearing in each scene, and the sum total of the number of times of scene-based access events by the audience to a database, which supervises the detailed information relevant to the commodities or services, based on the preset layout information.

With use of this program ancillary data processing device, in which the degree of interest the audience at large feels in commodities or services appearing in a picture program can be checked on the scene basis, with the number of times of browsing of the detailed information and the number of offers for purchase, as indices, it can be readily confirmed whether the commodities or services contained in a scene are popular ones. In particular, the device can be used effectively for browsing program ancillary data for many scenes.

The 'program ancillary data' may encompass not only data received over a transmission path, but also data reproduced from a recording medium. Meanwhile, the recording medium may be the picture program received, reproduced and recorded by the user, in addition to the recording medium offered to the market as it has the picture program data pre-recorded thereon. If the picture program data has been received over a transmission route, the receiving device for picture program data may be provided in the same casing as that for a program ancillary data processing device, or may be provided as a separate device in a separate housing. In case the picture program data is available over the transmission route, the latest value of the number of times of access events can be demonstrated substantially in real-time.

As for the transmission route, it does not matter whether the transmission route is a wired path, such as copper wire or optical fiber, or a radio route, such as short wave, ultra-short wave, micro-wave or infrared light. As for the transmission system, it does not matter whether the system is a broadcast system or an interactive transmission (distribution).

If the picture program data is reproduced from a recording medium, the reproducing system for reproducing picture program data may be provided in the same casing as that for the program ancillary data processing device, or provided as a separate device provided in a separate casing. When the picture program data is reproduced from the recording medium, there is a time difference between the time of recording the number of times of access events displayed and the time of reproducing the number of times of access events displayed, so that the latest value cannot be furnished in real-time. However, the number of times of access events displayed can be used as a more or less reliable measure.

Meanwhile, if the correct information is to be demonstrated in case of using the system of reproducing the information from a recording medium, it may be contemplated to access the database supervising the picture program data in question, over a separate communication network, to receive the latest number of times of access events.

As the recording medium, a CD-ROM, a medium of the magnetic recording system, such as magnetic tape, floppy disc, hard disc or magnetic card, an optical recording type medium, such as write-once CD, DVD or an optical card, a magneto-optical recording type medium, such as DVD, MD or MO, or a semiconductor memory, such as non-volatile memory or RAM, may be used.

The 'scene' may be a spot, shot, a frame or a field. The 'information relevant to commodities or services' may, for example, be a brand name, a category name of a commodity, name of a commodity or service, name of a producer, name of a supplier of commodities or services, contact site, such as URL, an e-mail number or a telephone number, or charges.

The information may, of course, be a combination of part of these information, without encompassing all of the above information.

The 'detailed information relevant to the commodities or services' may include, for example, the name of the furnishing business operator, a selling business operator, a possible site of purchase or furnishment, time period, reserve, furnishing time period, terms of delivery, remuneration, conditions of payment, commodities, body color sorts or service image information, and detailed legends. The information may, of course, be a combination of part of these information, without encompassing all of the above information.

Meanwhile, if the GPS information is included in the above information, it may be associated with a map database so as to be used in grasping, at the outset, the site of possible purchase on a display picture. Of course, one can arrive at a destination, without getting lost, by delivering the position information to a car-laden GPS receiver via e.g., a recording medium.

The superintendent of the 'database', which supervises these detailed information, may be a producer or a distributor of a recording medium or a business undertaker, operating as an intermediary for purchasing commodities or services, in addition to the producer, broadcaster or distributor of picture programs. The 'database' is not simply the information supplier, but may also be a supplier for an on-line shopping function. At any rate, it is sufficient if the 'database' has in store the information which allows to grasp the correlation of the information in store with respect to the commodities or services appearing as an imaged object in a picture program by computerized data processing.

The 'number of times of access events by the audience' may be the information relevant to the summation of the number of times of access events which failed to led to purchase and the number of times of access events which led to purchase, or the information relevant to one of these two numbers of times of access events.

The 'results of the summation of scene-based access events' encompass not only a case in which the number of times of access events is counted in a counter designed for counting the number of times of access events, based on the information received by the program ancillary data processing device, using the number of times of access events to the individual commodities or services, but also a case in which the number of times of access events is already counted in a sending or recording side of the program ancillary data and received as program ancillary data. Which of these systems is adopted depends on the transmission format or on the recording format. The information may also be acquired separately over a communication network.

The 'layout information' may be included as part of the picture program data, for example, as the tag information of the picture description language, or may be saved apart from the picture program data by the program ancillary data producing device, for example, as the template information. Meanwhile, this 'layout information' may or may not include the information for correlation with an index picture for a corresponding scene. If the correlation information is included, an index picture for a corresponding scene may be demonstrated as necessary.

The terminal operating as this 'program ancillary data processing device' may include computer terminals, such as notebook or desktop personal computers, PDA, portable telephone sets, game machines, set top boxes, PC card, domestic electrical utensils, VTR, television receivers, car navigation systems, wrist watches having the information processing functions, distribution terminals for music or games, financial terminals (ATM) etc, in addition to dedicated terminals for processing the program ancillary data. The same applies for the program ancillary data processing devices that follow.

As second means, the present invention proposes a program ancillary data processing apparatus including a program ancillary data extraction unit for extracting program ancillary data relevant to commodities or services appearing in each scene, from picture program data, and a display control unit for displaying the information relevant to the commodities or services appearing in each scene, and the sum total of the number of times of commodity-based or service-based access events by the audience to a database, supervising the detailed information relevant to the commodities or services, on a display picture, based on the preset layout information.

This second means is similar to the first means except that the results of summation of the number of times of accessing events by the audience on the commodity or service basis are demonstrated on the display control unit. Thus, with use of this program ancillary data processing device, the degree of interest of the audience at large feels in commodities or services appearing in a picture program can be checked on the scene basis, with the number of times of browsing of the detailed information and the number of offers for purchase as indices, so that it can be readily confirmed whether the commodities or services contained in a scene are popular ones. For example, this means is convenient in case limitations are imposed on the possible number of offers for purchase or of items that can be purchased.

The 'results of summation on the commodity or service basis' are usually calculated on the sending side or recording side of picture program data. These information not only may be read out from the program ancillary data but also may be acquired over a separate communication network. Meanwhile, the explanation on other terms common to the above-described means is the same as that for these means.

In the above explanation, the function for implementing the first means and the function for implementing the second means are mounted separately. These functions may, however, be loaded on one device. That is, the function of displaying the results of summation on the scene basis and that of displaying the results of summation on the commodity or service basis may be loaded on one and the same device.

As third means, the present invention proposes a program ancillary data processing device of the first or second means wherein the results of summation of the number of times of scene-based access events, the summation of the number of times of commodity-based access events and the summation of the service-based access events from the audience to the database, which supervises the detailed information on the commodities or services, are acquired as program ancillary data of the picture program data.

This program ancillary data processing device, in which the targeted information on the number of times of access events is acquired from the program ancillary data received or reproduced with the picture program, is convenient as a device not carrying communication means. It should be noted that, if the device includes communication means, the time until display of the relevant information can be shortened by acquiring the information on the number of times of access events from the so received or reproduced program ancillary data.

Meanwhile, the explanation on other terms common to the above-described means is the same as that for these means.

As fourth means, the present invention proposes a program ancillary data processing device of the first or second means wherein the results of the scene-based summation, commodity-based summation or the service-based summation of the numbers of times of access events by the audience to the database supervising the detailed information pertinent to the commodities or services are acquired, apart from the picture program data, from the database which is connected to the device over a communication network and which supervises the detailed information on the commodities or services.

This program ancillary data processing device, in which the information on the number of times of access events can be acquired over a communication network, apart from the picture program data, is able to furnish the latest number of times of the access events at all times to the audience, not only for the case in which the contents of the program ancillary data are confirmed simultaneously with the progress in the display of the picture program but also for the case in which the picture program data transiently stored is reproduced or in which the picture program data distributed as the recording medium is reproduced.

It does not matter whether the 'communication network' is a wired path or a radio path. Meanwhile, the explanation on other terms common to the above-described means is the same as that for these means.

As fifth means, the present invention proposes a program ancillary data processing device including a program ancillary data extraction unit for extracting, from picture program data, program ancillary data relevant to commodities or services appearing in each scene, and a display control unit for displaying the information relevant to the commodities or services appearing in each scene, on a display picture, along with an index picture of a corresponding scene, based on the preset layout information.

With use of this program ancillary data processing device, the audience is able to confirm the contents of each scene forming the picture program, in particular the contents of the commodities or services provided by the program ancillary data, as he or she compares them with the display on the index picture.

Meanwhile, if the program ancillary data is displayed at the same time as the picture program is displayed, similar objectives may be achieved from the display of the picture program. However, since the index picture is usually displayed as a still picture, in distinction from the picture program, the information required may advantageously be confirmed at a slow pace.

Of course, if only the contents of the program ancillary data are to be displayed, apart from the display of the picture program, the contents of a scene may be confirmed from the index picture, even if the user relies on his or her memory, so that the user is able to view only the picture program itself, while he or she may confirm the contents of the program ancillary data at a slow pace after the end of the picture program. This means releasing the audience from the viewing time constraint.

As the 'index picture', a typical frame picture of a corresponding scene in general is used. The index picture may, for example, be a leading frame of a relevant scene, a frame which allows for easy recognition of commodities or services, such as a frame decided on by a producer or by the audience, or a trailing frame of the relevant scene. Meanwhile, the index picture is desirably a picture taken out or generated from the picture program, for confirming the contents of the scene, and may also be a computer picture or an icon that allows for discrimination of effect sounds (theme songs, inserted songs and BGM). In the case of the effect sounds, a frame picture of a scene employing the effect sounds or an image picture of the music sound may similarly be used.

Although the index picture is a still picture, as a principle, the index picture may also be provided with a moving picture reproducing function in order that the audience is able to be readily reminded of the contents of the relevant scene. The moving picture reproducing function does not have to be the full picture size reproducing function, such that the reproducing function of a simplified picture having a reduced picture size or having the number of pixels reduced on decimation suffices. The reproducing speed may be such as permits variable speed reproduction. The index picture may be provided with the music sound reproducing function. This reproducing function does not have to be music sound reproduction throughout the entire scene such that reproduction of the music sound of the representative portion may be sufficient. The reproduction may also be variable speed reproduction.

If the display function of the index picture in the present means and the function of displaying the number of times of access events, explained in connection with the above-described means, are combined together, compound effects may be derived. Meanwhile, the explanation on other terms common to the above-described means is the same as that for these means.

As the sixth means, the present invention provides the fifth means wherein the index picture is given as program ancillary data for the picture program data.

With use of this program ancillary data processing device, in which the index picture does not have to be prepared in the device itself, the processing resources necessary for carrying out the processing can be allocated to other processing operations. In such case, there are provided on the audience side an index picture extraction unit and a storage unit for storing the extracted index picture.

In particular, if the considerable processing capability is required in the preparation of an index picture, or if significant instabilities in the processing capability are predicted to be produced in a receiving terminal or in a reproducing terminal, it is desirable to prepare an index picture at the outset and to have the so prepared index picture included in the program ancillary data.

Meanwhile, the explanation on other terms common to the above-described means is the same as that for these means.

As seventh means, the present invention proposes the fifth means wherein the index picture is created on the audience side from picture data of picture program data.

With use of this program ancillary data processing device, in which the index picture is prepared within the device itself, it is only sufficient if the index picture as required in case of necessity is prepared, while it is possible to evade the risk of an abundant recording area being consumed by the index picture of the major portion of program ancillary data that does not have to be confirmed. Since the index picture does not have to be included in the picture program data in such case, the amount of data transmitted or recorded can be reduced, thus reducing the amount of data transmitted or recorded. In this case, an index picture former is provided on the audience side.

It is noted that the program ancillary data processing device may be adapted to prepare an index picture only when the program ancillary data includes the information on the commodities or services, in which case the decision unit for discriminating the presence/absence of the information in question is provided on the audience side and the permission to prepare an index picture is given the index picture forming unit only when there exists the information on the commodities or services. Alternatively, the index picture may be prepared irrespective of the presence or absence of the relevant information.

For specifying a picture used as an index picture, the information set at the outset in the device itself may be used, in which case the information is set on the recording medium having stored the position information. Alternatively, the picture may be specified by program ancillary data, in which case there is provided a position specifying information read-out unit.

Meanwhile, the explanation on other terms common to the above-described means is the same as that for these means.

As eighth means, the present invention proposes the seventh means where the index picture has been produced from a scene optionally selected by the viewer.

With use of this program ancillary data processing device, not the index picture in which commodities or services relevant to program ancillary data appear in an averaged out manner, but a picture which permits facilitated recognition of the commodities or services the audience intends to confirm can be selected as an index picture, so that the picture selected may be convenient for the viewer.

It should be noted that an input accepting unit for a scene position as selected by the viewer, sometimes including the position information for the relevant scene, a recording unit for recording the input position information and an index picture former are provided on the viewer side.

Meanwhile, the explanation on other terms common to the above-described means is the same as that for these means.

As ninth means, the present invention proposes a program ancillary data processing device including a program ancillary data extraction unit for extracting program ancillary data relevant to commodities or services appearing in each scene, from picture program data, and a display control unit for displaying the information relevant to plural scenes, as extracted, based on the layout information for list type display.

With use of this program ancillary data processing device, in which access to the information relevant to plural scenes can be made on one picture, it is possible to evade the laborious operation of confirming the contents from one scene to another. Moreover, since the information of plural scenes can be compared to one another on the same picture, the targeted information can be accessed more readily.

The file for list type display, such as a list file, may or may not be contained at the outset in the 'program ancillary data'. In the former case, it is sufficient if the file designed for list type display is read out and displayed, whereas, in the latter case, it is sufficient if the file for list type display is formed on the basis of the information for each scene. A list file former is provided on the viewer side.

It should be noted that the range of plural scenes displayed in a list form may be afforded as a part of the program ancillary data, or determined under the commands of the program ancillary data processing device, that is under the commands by the viewer.

In the latter case, an automatic list range decision unit may be provided with the function of setting plural scenes, lying ahead and at back of a scene the viewer has requested to be displayed in a list form, as a display range. Alternatively, the automatic list range decision unit may be provided with plural scenes previous to the scene the viewer requested to be displayed in a list form (past scenes already displayed) or plural scenes subsequent to the scene the viewer requested to be displayed in a list form (scenes not yet displayed). Meanwhile, the automatic list range decision unit may be provided with a function which, when the viewer has specifically indicated the range (the start position and the end position), sets the so specified range as the display range.

In general, the range of plural scenes may be the whole program, encompassing the entire scenes, or several scenes, such as two or three scenes. This range may be given as program ancillary data or automatically determined under the command given by the program ancillary data processing device. These ranges may or may not be overlapped with one another.

On the other hand, the 'layout information' may be included as part of the picture program data, or saved in the program ancillary data processing device independently of the picture program data. Meanwhile, this 'layout information' may or may not include the information of correlating the relevant scene with its index picture.

Meanwhile, the explanation on other terms common to the above-described means, such as 'program ancillary data processing device', is the same as that for these means.

As tenth means, the present invention proposes the ninth means wherein the display control unit has the function of displaying the information relevant to commodities or services appearing in each scene, along with an index picture of a corresponding scene, on a display picture.

With use of this program ancillary data processing device, the viewer is able to confirm the contents of the respective scenes making up a picture program, in particular the contents of commodities or services given by the program ancillary data, based on the display on the index picture. Thus, anyone (from children to aged people) may easily find out the scene of interest from the plural scenes displayed in a list form. Moreover, ease in use for the viewer is improved appreciably because he or she is able to confirm the contents of the commodities or services appearing in the so specified scene as he or she compares the contents with those shown in the associated scene. Meanwhile, the advantage derived from the use of the index picture is the same as that in the above means. The site in which to create an index picture is also as explained in connection with the above means.

It is noted that the explanation on other terms common to the above-described means is the same as that for these means.

As the eleventh means, the present invention proposes the ninth means wherein scenes of the picture program to be processed are extracted in groups composed of a preset number of scenes, in the order in which they are displayed, based on the layout information, for presentation as plural scenes for the viewer in a list form.

With use of this program ancillary data processing device, the scenes displayed in the list form are necessarily contiguous to one another, so that anyone (from children to aged people) may easily access the target scene. Meanwhile, the 'preset number' may be included in the program ancillary data, or may be set or changed on the viewer side. In the latter case, a recording unit is provided on the viewer side for recording the number of scenes usable at the time of display in the list form.

The expression 'in groups composed of a preset number of scenes, in the order in which they are displayed' does not mean that the presentation of partially common scenes between a scene included in given results of extraction and a scene included in the next or previous results of extraction is to be excluded.

It is noted that the explanation on other terms common to the above-described means is the same as that for these means.

As twelfth means, the present invention provides the ninth means wherein scenes of the picture program to be processed are optionally commanded for selection by the viewer and extracted in groups composed of a preset number of scenes, based on the layout information, for presentation as plural scenes for the viewer in a list form.

With use of the program ancillary data processing device, only the scenes are displayed which have been selected by the viewer with an intention of confirming them. This enables the viewer to access the necessary scene easily in a short time. Meanwhile, if the volume of the information correlated with the respective scenes is increased, ease in accessing the scene desired to be confirmed may be lost, even although convenience for the user is increased. Thus, with use of the device, it is possible to render services convenient to use for anyone (from children to the aged). In the present device, a recording unit for recording the number of scenes at the time of display in a list form is provided on the viewer side.

It is noted that the explanation on other terms common to the above-described means is the same as that for these means.

Meanwhile, if the ninth to twelfth means are combined with the function of displaying the number of times of access events, there may be provided a confirmation picture of the program ancillary data which is more convenient to use for the viewer. If, in displaying plural scenes in a list form, an index picture is afforded to each scene, and the number of times of scene-based access events or that of the commodity- or service-based access events is displayed, the scene targeted or the scene in which the detailed information is desired to be confirmed can be determined easily.

In each of the first to twelfth means, explanation has been made on the premises that the program ancillary data pertinent to the commodities or services appearing in each scene are supplied through picture program data. Alternatively, these data may also be acquired from an external database over a communication route, as indicated in thirteenth means.

As the thirteenth means, the present invention proposes a program ancillary data processing apparatus including an extraneous data presence/absence detection unit for extracting, from picture program data, data indicating whether or not the information relevant to commodities or services appearing in each scene is available through an external database, and for detecting the presence/absence of the extraneous data based on the so extracted data, a downloading unit for downloading, when an access request to extraneous data is made by an operating input by the viewer, a list file provided from the outset for presenting the information relevant to plural scenes to the viewer in a list form, from an external database, and a display control unit for opening the downloaded list file for displaying the information relevant to the plural scenes involved in the list file on a display picture in a list form, based on the preset layout information. The list file is an information file provided from the outset for a relevant picture program, With the present program ancillary data processing device, a picture similar to that of the ninth means may be provided to the viewer if the information relevant to commodities or services appearing in each scene is not included in the program ancillary data, but there is contained data indicating whether or not the information relevant to commodities or services appearing in each scene is available through an external database, and the data indicates availability of the information from the external database. That is, access to the information relevant to plural scenes can be made in one picture to dispense with the labor in performing similar operations from scene to scene. Moreover, access to the target information can be facilitated because the information for plural scenes can be contrasted to one another on the same picture.

Meanwhile, this service configuration has high affinity with chargeable services. That is, services can be rendered only to users desirous to have more detailed information furnished to them. In addition, since only a small amount of the supplementary information to program ancillary data suffices, this service configuration can co-exist with services at large.

The 'external database' may be enumerated by a producer or a distributor of the recording medium, business undertakers acting as intermediary for purchasing the commodities or services, in addition to producers, broadcasters and distributors of the picture program. This database may also furnish the on-line shopping function, without being limited to simply furnishing the information relevant to commodities or services.

The 'data indicating availability' may, for example, be data represented by a flag or plural bits for specified addresses. The 'list file' indicates a set of program ancillary data for each of the plural scenes belonging to the scene range in question.

Meanwhile, the plural scenes making up the 'list file' may be provided at the outset by the database superintendent or may be decided on responsive to the viewer's selection. In this case, the range selected by the viewer is notified to the database over a communication route. These scenes may also be those extracted at a rate of a preset number in the order in which these scenes appear in the picture program.

The 'preset layout information' may be supplied from the database along with the list file, or saved at the outset in the program ancillary data processing device. The layout information saved in the program ancillary data processing device may be previously supplied from the database, or saved as from the time of shipment of the program ancillary data processing device.

The layout information may or may not include the information correlating the information with the index picture for the corresponding scene. The 'correlating information' may be the recording addresses, file numbers and so forth.

The terminal operating as this 'program ancillary data processing device' may include computer terminals, such as notebook or desktop personal computers, portable information terminals (PDAs), portable telephone sets, game machines, set top boxes, PC cards, domestic electrical utensils, VTR, television receivers, car navigation systems, wrist watches having the information processing functions, or remote controllers, in addition to the dedicated devices for processing program ancillary data.

Meanwhile, the explanation on other terms common to the above-described means is the same as that for these means.

As the fourteenth means, the present invention proposes a program ancillary data processing device including a downloading unit for communication with another terminal device for downloading the information which is relevant to commodities or services appearing in each scene, and which is program ancillary data of a picture program in question, from a recording medium supervised by another terminal device, and a display control unit for demonstrating, on a display picture, the information relevant to commodities or services appearing in each scene, responsive to an operating input by an operator.

With use of this program ancillary data processing device, program ancillary data received or reproduced by another terminal device and stored on a recording medium may be separately taken out for re-use. For example, program ancillary data received and stored in a TV receiver having the storage function may be downloaded to confirm its contents. In particular, the program ancillary data processing device may be used for such application in which program ancillary data stored in a standstill terminal device is transferred by a user to a portable program ancillary data processing device for confirming the stored information when the user is out, or in which the user makes on-line shopping based on the so confirmed information.

It is of course possible with a portable program ancillary data processing device to directly receive or reproduce program ancillary data or to download the program ancillary data directly from an external database. However, in view of the currently available device in which the communication speed with radio waves, felt to be a mainstream in the portable device, is insufficient, or limitations are imposed on the recording capacity, the demand from the user is thought to be high. Although this technical task will be solved in future, it is meritorious to selectively capture only data required by the viewer, in consideration of the labor involved in reaching the target data from among the voluminous data.

The terminal operating as this 'program ancillary data processing device' may include computer terminals, such as notebook or desktop personal computers, portable information terminals (PDAs), portable telephone sets, game machines, set top boxes, PC cards, domestic electrical utensils, VTR, television receivers, remote controllers, car navigation system and wrist watches having the information processing functions, in addition to the dedicated devices for processing program ancillary data. However, if the application in this means is taken into consideration, a standstill type device is thought to be customary.

As for the 'recording medium', it may not only be enclosed in another device, but also mounted externally on such other device, provided that the recording medium is supervised by such other device. The recording medium may be a CD-ROM, a medium of the magnetic recording system, such as magnetic tape, floppy disc, hard disc or magnetic card, an optical recording type medium, such as write-once CD, DVD or optical cards, a magneto-optical recording type medium, such as DVD, MD or MO, or a semiconductor memory, such as non-volatile memory or RAM.

Meanwhile, the 'information relevant to commodities or services appearing in each scene' may include the sum total of the number of scene-based access events from the viewer to the database, which supervises detailed information concerning the commodities or services in question. The 'information relevant to commodities or services appearing in each scene' may also include the sum total of the number of commodity-based or scene-based access events from the viewer to the database which supervises detailed information concerning the commodities or services in question. In this case, these information may be acquired from other terminal devices or directly downloaded from the database which supervises the information. The 'information relevant to commodities or services appearing in each scene' may include index pictures associated with respective scenes.

The 'program ancillary data processing device' for downloading data from another terminal may include computer terminals, such as notebook or desktop personal computers, portable information terminals (PDAs), portable telephone sets, game machines, set top boxes, PC cards, domestic electrical utensils, VTR, television receivers, remote controllers, car navigation systems and wrist watches having the information processing functions, in addition to the dedicated devices for processing program ancillary data. However, if the application in this means is taken into consideration, a standstill type device is thought to be customary. Although it is desirable that the 'program ancillary data processing device' has a display device enclosed therein, it is sufficient if the contents are displayed on the display device even if the display device is not enclosed.

Meanwhile, the explanation on other terms common to the above-described means is the same as that for these means.

As the fifteenth means, the present invention proposes the fourteenth means wherein the display control unit has the function of presenting the information relevant to plural scenes to the viewer in a list form based on the preset layout information.

With use of this program ancillary data processing device, in which the information relevant to plural scenes can be confirmed at a time on the display picture, there is no necessity of performing the operation of demonstrating the information of another scene even when the information concerning a given scene does not include the target information. As a result, the retrieval is more effective than in the case of accessing each scene separately. Meanwhile, the list-form picture may be downloaded from another terminal device, or produced in the program ancillary data processing device.

The number of times of scene-based access events or that of commodity- or service-based access events may be demonstrated for each of the scenes displayed in a list form. Similarly, the index picture may be demonstrated in association with each scene. In this case, these information can be directly downloaded from an external database.

Meanwhile, the function of the fifteenth means may be provided by itself, instead of as a combination with the fourteenth means.

It is noted that the explanation on other terms common to the above-described means is the same as that for these means.

As the sixteenth means, the present invention provides a program ancillary data processing apparatus for displaying the information relevant to commodities or services appearing in each scene, on a display picture, based on program ancillary data extracted from picture program data, in which the apparatus includes a display control unit for displaying an index picture of a scene, in an imaged object of which are included commodities or services selected with a will for purchasing, in a correlated fashion in a basket picture in which the contents of the commodities or services selected can be confirmed prior to final decision of transaction.

With use of this program ancillary data processing device, when the commodities or services scheduled to be purchased on a basket display picture are re-confirmed, it is possible to make a re-check of the commodities or services on an index picture. As a result, the labor of exiting the index picture to move to the other picture only for the purpose of confirming the contents of the commodities or services may be dispensed with. In particular, when the commodities being confirmed on the basket picture affect several scenes, it is unnecessary to return to each scene. This gives a confirmation picture convenient to use readily by anyone.

Meanwhile, the number of times of scene-based access events or the number of times of commodity- or service-based access events can be displayed on the basket picture. If this function is combined with the above function, the commodities or services can be checked for popularity among other users without the necessity of moving from one picture to another picture.

Although the case of displaying the index picture on the basket picture has been explained in connection with the present means, it may be contemplated to display only the number of times of scene-based access events or only the number of times of commodity- or service-based access events on the basket picture.

Meanwhile, the basket information may be managed by the viewer terminal or by the terminal of the server acting as an intermediary for the sponsorship transaction. When the basket information is managed by the terminal on the viewer side, the information concerning the commodities or services the viewer has had the intention to purchase is transmitted to the server side at a stage when the will for purchase is re-confirmed.

Meanwhile, the present program ancillary data processing device can be used irrespective of whether the device is of portable type or of a standstill type. That is, the device may be a computer terminal, such as notebook or desktop personal computer, a portable information terminal (PDA), a portable telephone set, a game machine, a set top box, a PC card, domestic electrical utensils, VTR, a television receiver, a car navigation system, a wrist watch having the information processing functions, or a remote controller, in addition to the devices dedicated to the processing of program ancillary data.

It is noted that the explanation on other terms common to the above-described means is the same as that for these means.

As the seventeenth means, the present invention proposes a server device including an access information acquisition unit for acquiring the information pertinent to the access state from the viewer to a database supervising the detailed information pertinent to commodities or services appearing as an imaged object in a picture program, in accordance with a request from the viewer connected to the acquisition unit over a communication network, and a communication functional unit for notifying the latest value of the number of times of scene-based access, as acquired by the access information acquisition unit, and as requested by the viewer.

With use of this server device, it is possible to render services using the information concerning the access state from the viewer to the detailed information pertinent to commodities or services even when such information is not included in the picture program data received or reproduced by the viewer. Since the information supplied here is the number of times of scene-based access events, the viewer is able to judge whether or not popular commodities or services are contained in the scene in question. This information also proves beneficial to the business undertaker who furnished the commodities or services to the program or brokerage business operator acting as intermediary for the sponsorship transaction between the viewer and the business undertaker.

Meanwhile, the 'database supervising the detailed information' not only may be a producer, a broadcaster or a distributor of the picture program but also may be a producer or a distributor of a recording medium or a business undertaker acting as an intermediary for purchasing the commodities or services. Meanwhile, the database superintendent may be the same as or different from the server device superintendent. Of course, the database may be provided in the server device itself, or may be connected to the server device over a network.

The 'information pertinent to the access state' may be the information corresponding to the sum of the number of simple accesses to the detailed information pertinent to commodities or services which failed to lead to purchase and the number of times of access events which led to purchase. Alternatively, it may be the information pertinent to only one of the above two numbers of times of access events.

The 'viewer' may be limited to the specified viewer who has concluded service contracts, whether chargeable or non-chargeable, with the superintendent of the server device, or to the entire viewers that can be connected to the server device over a communication network.

The 'server device' simply has the meaning that the device operates as a server device with respect to the viewer terminal, and may be a computer terminal (notebook or desktop computer), a portable information terminal (PDA), a portable telephone set, a game machine, a set top box, a PC card, a car navigation system, a wrist-watch having the information processing function, and so forth, in addition to a dedicated server device.

It is noted that the explanation on other terms common to the above-described means is the same as that for these means.

As the eighteenth means, the present invention proposes a server including an access information acquisition unit for acquiring the information pertinent to the access state from the viewer to a database, which supervises the detailed information pertinent to commodities or services appearing as an imaged object in a picture program, in accordance with a request from the viewer connected to the acquisition unit over a communication network, and a communication functional unit for notifying the latest value of the number of times of commodity-based or scene-based access, as acquired by the access information acquisition unit, and as requested by the viewer.

The difference between this server device and the server device of the seventeenth means is that the information furnished is the latest value of the number of times of commodity- or service-based access events in each scene.

Thus, with this means, the latest value of the access states from the viewer to the detailed information pertinent to commodities or services appearing as an imaged object in the picture program can be incidentally supplied on request from the viewer. Meanwhile, since the information furnished here is the number of commodity- or service-based access events for commodities or services appearing as an imaged object in each scene, the viewer is able to judge easily which is the commodity or service now in vogue. This information also proves beneficial to the business undertaker who furnished the commodities or services to the program or brokerage business operator acting as intermediary for the sponsorship transaction between the viewer and the business undertaker.

Meanwhile, the explanation on other terms common to the above-described means is the same as that for these means.

It should be noted that, if the seventeenth means is combined with the eighteenth means, such a server device may be realized which is able to furnish the latest value of the number of times of scene-based access events and the latest value of the commodity- or service-based access events of the scene in question simultaneously.

As nineteenth means, the present invention proposes a server device including an information furnishing unit for accessing a database supervising the detailed information relevant to commodities or services appearing as an imaged object in a picture program, responsive to a request from the viewer connected to the information furnishing unit over a communication network, for furnishing a list file provided for presenting the information relevant to plural scenes in a list form to the viewer. The list file is an information file provided for the relevant picture program.

With use of this server device, if an information file in question is not included in the picture program data received or reproduced by the viewer, it is possible to enjoy services employing such file.

For each of the 'database', 'viewer' and 'server device', what has been said of the database in the seventeenth or eighteenth means holds.

Meanwhile, the 'list file' may already exist in the database, or may be prepared by the server device based on the information supervised in the database. The range of the plural scenes making up the 'list file' may be decided on responsive to the setting by the superintendent of the database or the server device or an optimum value of the range may be provided responsive to the viewer's demand. Of course, the range can be automatically set based on a predetermined setting rule (rule similar to that for the aforementioned program ancillary data processing device). Meanwhile, the ranges of the plural scenes making up the list file may or may not be overlapped with one another.

Meanwhile, the 'list file' usually includes or is paired with the layout information. However, the layout information may not be furnished from the server device, in which case the display on the viewer side is based on the layout information provided on the viewer side.

It is noted that the explanation on other terms common to the above-described means is the same as that for these means.

Of course, the server device of the present nineteenth means may be combined with the function of furnishing the number of times of access events in the seventeenth or eighteenth means. When the seventeenth means and the nineteenth means are to be combined together, the number of times of access events from one scene of the list file to another must be able to be furnished along with the list file. When the eighteenth means and the nineteenth means are to be combined together, the number of times of access events from one commodity or service for each scene of the list file to another must be able to be furnished along with the list file. Of course, the seventeenth means can be combined with the eighteenth means.

As the twentieth means, the present invention proposes the nineteenth means wherein the information furnishing unit has the function of furnishing an index picture associated with a scene in question for each scene forming the list file.

With use of this server device, such a list file, each scene of which includes an index picture, can be provided. Since the index picture is attached to each of the scenes making up the list file, the operation of scene retrieval by the viewer is facilitated.

Meanwhile, the 'index picture' may not only be provided on the side database but on the side server device.

It is noted that the explanation on other terms common to the above-described means is the same as that for these means.

As the twenty-first means, the present invention provides a picture information displaying method for displaying, on a display picture, the information pertinent to commodities or services appearing in each scene of a picture program, responsive to a request from the viewer, in which the method includes a processing step of reading out the results of summation of the number of times of scene-based access events of the viewer to a database, which supervises the detailed information relevant to commodities or services appearing in a scene to be displayed, and a processing step of displaying the read-out results in association with the scene in question.

With use of the program information displaying method, the viewer is able to judge readily whether or not popular commodities or services are included in a scene on the display picture, in which the viewer is interested, without regard to the route of acquisition of the information on the number of times of access events. In particular, the method is useful if, in browsing the information on the commodities or services appearing in imaged objects in many scenes, a decision is to be given as to for which scene the information to be browsed.

Meanwhile, the route of acquisition of 'the information pertinent to commodities or services appearing in each scene' or the 'number of times of access events' may be the route of reception thereof, simultaneously with the picture program data, route of reproduction thereof, simultaneously with the picture program data, route of reception of the program ancillary data by itself, route of reproduction of the program ancillary data by itself, or the route of receiving the information from e.g., a database over a communication path. This display function may be executed not only on a display picture used for confirming the contents of the program ancillary data but also on a basket picture or on a display picture for the detailed information of commodities or services.

The terminal used for executing the method may be a computer terminal (notebook or desktop computer), PDA, a portable telephone set, a game machine, a set top box, a PC card, a car navigation system, a wrist-watch having the information processing function, and so forth, in addition to a dedicated server device. The respective steps of the above method do not have to be executed on the same device but may be executed on different devices. The same may be said for the methods that follow.

Meanwhile, the explanation on other terms common to the above-described means is the same as that for these means.

As the twenty-second means, the present invention proposes a picture information displaying method for displaying, on a display picture, the information pertinent to commodities or services appearing in each scene of a picture program, responsive to a request from the viewer, in which the method includes a processing step of reading out the results of summation of the number of times of commodity-based or service-based access events by the viewer to a database, which supervises the detailed information relevant to the commodities or services appearing in a scene to be displayed, and a processing step of displaying the read-out results in association with each information relevant to the commodities or services appearing in a scene in question.

With use of this program information displaying method, the viewer is able to judge readily whether or not the specified commodities or services appearing in a picture program are in vogue among other viewers, irrespective of the routes of acquisition of the information on the number of times of access events.

Meanwhile, the route of acquisition of 'the information pertinent to commodities or services appearing in each scene' or the 'number of times of access events' may be the route of reception thereof simultaneously with the picture program data, route of reproduction thereof simultaneously with the picture program data, route of reception of the program ancillary data by itself, route of reproduction of the program ancillary data by itself, or the route of receiving the information from e.g., a database over a communication path. This display function may be executed not only on a display picture used for confirming the contents of the program ancillary data but also on a basket picture or on a display picture adapted for demonstrating the detailed information of commodities or services.

Meanwhile, the explanation on other terms common to the above-described means is the same as that for these means. Of course, the step of displaying the number of times of access events on the commodity- or service-basis in the twenty-second means may be combined with the step of displaying the number of times of scene-based access events of the twenty-first means.

As the twenty-third means, the present invention proposes a picture information displaying method for displaying, on a display picture, the information pertinent to commodities or services appearing in each scene of a picture program, responsive to a request from the viewer, in which the method includes a processing step of reading out an index picture of a scene to be displayed, and a processing step of displaying the index picture, as read out, in conjunction with the information relevant to commodities or services appearing in the scene in question.

With use of this program information displaying method, the viewer is able to judge readily which commodities or services appear in each scene, irrespective of the routes of acquisition of the information on the number of times of access events. In case of confirming the information pertinent to commodities or services, the contents can be confirmed readily by displaying an index picture, given in general as a still picture.

Meanwhile, the route of acquisition of 'the information pertinent to commodities or services appearing in each scene' or the 'index picture' may be the route of acquisition of the information etc prepared in the device for executing the method, such as the route of reception thereof simultaneously with the picture program data, route of reproduction thereof simultaneously with the picture program data, route of reception of the program ancillary data by itself, route of reproduction of the program ancillary data by itself, or the route of having the information furnished from e.g., a database over a communication path. This display function may be executed not only on a display picture used for confirming the contents of the program ancillary data but also on a basket picture or on a display picture for the detailed information of commodities or services.

Meanwhile, the explanation on other terms common to the above-described means is the same as that for these means. Of course, if the above means is combined with the twenty-first or twenty-second means, such a display picture is obtained which is more convenient to use for the user.

As the twenty-fourth means, the present invention proposes a program information displaying method for displaying on a display picture the information relevant to commodities or services appearing in each scene of a picture program, responsive to the viewer's request, in which the method includes a processing step of reading out the information relevant to the commodities or services appearing in each scene, for displaying the information relevant to plural scenes in a list form, and a processing step of deploying the information, as read out, based on the preset layout information, for presentation in a list form on a display picture.

With use of the program information displaying method, in which the information relevant to plural scenes can be confirmed at a time on the display picture, it is unnecessary to perform the operation of displaying the information of another scene on the display picture even if the target information is not contained in the information pertinent to a given scene. This enables efficient retrieval as compared to the case of individually accessing each picture. It should be noted that the list form picture may be a picture downloaded from another terminal device, or prepared in a terminal which executes the display method.

For each scene displayed in a list form, the number of times of scene-based access events or that of commodity- or service-based access events may be displayed. In this case, the above information may be directly downloaded from an external database.

Meanwhile, the explanation on other terms common to the above-described means is the same as that for these means.

As the twenty-fifth means, the present invention proposes the twenty-fourth means where an index picture is displayed in each of the plural scenes in association therewith.

With use of this program information displaying method, the target scene may be selected as the contents of each scene are confirmed with an index picture, thereby improving the operating efficiency. When the information pertinent to commodities or services is to be confirmed, its contents can be visually recognized on an index picture.

Meanwhile, the explanation on other terms common to the above-described means is the same as that for these means.

As the twenty-sixth means, the present invention proposes a computer-readable recording medium having a program recorded thereon, the program being usable for a computer to implement a program ancillary data extraction function of extracting from picture program data program ancillary data relevant to commodities or services appearing in each scene, and a display control function of displaying, on a display picture, the information relevant to the commodities or services appearing in each scene, and the sum total of the number of times of scene-based access events by the viewer to a database supervising the detailed information relevant to the commodities or services, based on the preset layout information.

With use of this recording medium, any suitable pre-existing terminal can be used as a program ancillary data processing device, on simply installing the program recorded on the recording medium on a pre-existing terminal, even if there is no device dedicated to program ancillary data.

The 'pre-existing terminal' may be a computer terminal (notebook or desktop computer), a portable information terminal (PDA), a portable telephone set, a game machine, a car navigation system, a wrist-watch having the information processing function, and so forth. The recording medium may be a CD-ROM, a medium of the magnetic recording system, such as magnetic tape, floppy disc, hard disc or magnetic card, an optical recording type medium, such as write-once CD, DVD or an optical card, a magneto-optical recording type medium, such as DVD, MD or MO, or a semiconductor memory, such as non-volatile memory or RAM. The same may be said of terminals or recording mediums in respective means that follow.

Meanwhile, the explanation on other terms common to the above-described means is the same as that for these means. Although the program is assumed to be distributed by a recording medium, it may also be distributed over a network (transmission medium).

As the twenty-seventh means, the present invention proposes a computer-readable recording medium having a program recorded thereon, the program being usable for a computer to implement a program ancillary data extraction function of extracting, from picture program data, program ancillary data relevant to commodities or services appearing in each scene, and a display control function of displaying, on a display picture, the information relevant to the commodities or services appearing in each scene, and the sum total of the number of times of commodity-based or service-based access events by the viewer to a database supervising the detailed information relevant to the commodities or services, based on the preset layout information.

With use of this recording medium, any suitable pre-existing terminal can be used as a program ancillary data processing device, on simply installing the program recorded on the recording medium on the terminal, even if there is no device dedicated to program ancillary data.

Meanwhile, the explanation on other terms common to the above-described means, such as 'pre-existing terminal' or 'recording medium' is the same as that for these means.

As the twenty-eighth means, the present invention proposes a computer-readable recording medium having a program recorded thereon, the program being usable for a computer to implement a program ancillary data extraction function of extracting from picture program data program ancillary data relevant to commodities or services appearing in each scene, and a display control function of displaying, on a display picture, the information relevant to the commodities or services appearing in each scene, based on the layout information adapted for presenting the information pertinent to plural scenes in a list form to the viewer.

With use of this recording medium, any suitable pre-existing terminal can be used as a program ancillary data processing device, on simply installing the program recorded on the recording medium on the terminal, even if there is no device dedicated to program ancillary data.

Meanwhile, the explanation on other terms common to the above-described means, such as 'pre-existing terminal' or 'recording medium' is the same as that for these means.

As the twenty-ninth means, the present invention provides a computer-readable recording medium having a program recorded thereon, in which the program is usable for a computer to implement an extraneous data presence/absence detection function of extracting, from picture program data, data indicating whether or not the information relevant to commodities or services appearing in each scene is available through an external database, to detect the presence/absence of the extraneous data based on the so extracted data, a downloading function of downloading, when an access request to extraneous data is made by an operating input by the viewer, a list file which is an information file provided from the outset for a relevant picture program for presenting the information relevant to plural scenes to the viewer in a list form, from an external database, and a display control function of opening the downloaded list file to display the information relevant to the plural scenes involved in the list file on a display picture in a list form, based on the preset layout information.

With use of this recording medium, any suitable pre-existing terminal can be used as a program ancillary data processing device, on simply installing the program recorded on the recording medium on the terminal, even if there is no device dedicated to program ancillary data.

Meanwhile, the explanation on other terms common to the above-described means, such as 'pre-existing terminal' or 'recording medium' is the same as that for these means.

As the thirtieth means, the present invention proposes a computer-readable recording medium having a program recorded thereon, the program being usable for a computer to implement a downloading function of downloading the information relevant to commodities or services appearing in each scene from a recording medium supervised by another terminal device, by communication with another terminal device, and a display control function of demonstrating the information relevant to commodities or services appearing in each scene, on a display picture, responsive to an operating input by an operator. The information relevant to commodities or services is program ancillary data of a picture program in question.

With use of this recording medium, any suitable pre-existing terminal can be used as a program ancillary data processing device, on simply installing the program recorded on the recording medium installed on the terminal, even if there is no device dedicated to program ancillary data.

Meanwhile, the explanation on other terms common to the above-described means, such as 'pre-existing terminal' or 'recording medium' is the same as that for these means.

As the thirty-first means, the present invention proposes a computer-readable recording medium having recorded thereon a program usable for a computer to implement a display control function of displaying an index picture of a scene, in an imaged object of which are included commodities or services selected with a will for purchasing, in a correlated fashion in a basket picture in which the will for purchasing can be confirmed prior to final transmission to the server side.

With use of this recording medium, any suitable pre-existing terminal can be used as a program ancillary data processing device, on simply installing the program, recorded on the recording medium, on the terminal, even if there is no device dedicated to program ancillary data.

Meanwhile, the explanation on other terms common to the above-described means, such as 'pre-existing terminal' or 'recording medium' is the same as that for these means.

As the thirty-second means, the present invention proposes a computer-readable recording medium having recorded thereon a program usable for a computer to implement an access information acquiring function of acquiring, responsive to a request from the viewer connected to the computer over a communication network, the information pertinent to access states from the viewer to a database supervising the detailed information pertinent to commodities or services appearing as an imaged object in a picture program, and a communication function for notifying the latest value of the number of times of scene-based access events as acquired by the access information acquiring function and as requested by the viewer.

With use of this recording medium, any suitable pre-existing terminal can be used as a program ancillary data processing device, on simply having the program recorded on the recording medium installed on the terminal, even if there is no device dedicated to program ancillary data.

Meanwhile, the explanation on other terms common to the above-described means, such as 'pre-existing terminal' or 'recording medium' is the same as that for these means.

As the thirty-third means, the present invention proposes a computer-readable recording medium having recorded thereon a program usable for a computer to implement an access information acquiring function of acquiring, responsive to a request from the viewer connected to the computer over a communication network, the information pertinent to access states from the viewer to a database supervising the detailed information pertinent to commodities or services appearing as an imaged object in a picture program, and a communication function for notifying the latest value of the number of times of community-based or service-based access events as acquired by the access information acquiring function and as requested by the viewer.

With use of this recording medium, any suitable pre-existing terminal can be used as a program ancillary data processing device, on simply having the program recorded on the recording medium installed on the terminal, even if there is no device dedicated to program ancillary data.

Meanwhile, the explanation on other terms common to the above-described means, such as 'pre-existing terminal' or 'recording medium' is the same as that for these means.

As the thirty-fourth means, the present invention proposes a computer-readable recording medium having recorded thereon a program usable for a computer to implement an information furnishing function of accessing a database supervising the detailed information pertinent to commodities or services appearing as an imaged object in a picture program, responsive to a request from the viewer connected to the computer over a communication network, for presenting a list file provided from the outset for presenting the information relevant to plural scenes to the viewer in a list form. The list file is an information file provided from the outset for a relevant picture program.

With use of this recording medium, any suitable pre-existing terminal can be used as a program ancillary data processing device, on simply having the program recorded on the recording medium installed on the terminal, even if there is no device dedicated to program ancillary data.

Meanwhile, the explanation on other terms common to the above-described means, such as 'pre-existing terminal' or 'recording medium' is the same as that for these means.

BRIEF DESCRIPTION OF THE DRAWINGS

FIG. 10 shows an embodiment of a display picture of a form of response result confirmation.

FIG. 13 shows an illustrative structure of data of a membership database.

FIG. 16 shows an embodiment of a display picture of a form of confirmation of request content.

FIG. 18 shows an embodiment of a display picture of a generic item registration form.

FIG. 21 shows a specified embodiment of commodity and service data in agreement with the content of a video program.

FIG. 61 is a flowchart showing an example of a processing sequence in displaying a meta-mall.

BEST MODE FOR CARRYING OUT THE INVENTION

Figure 1:
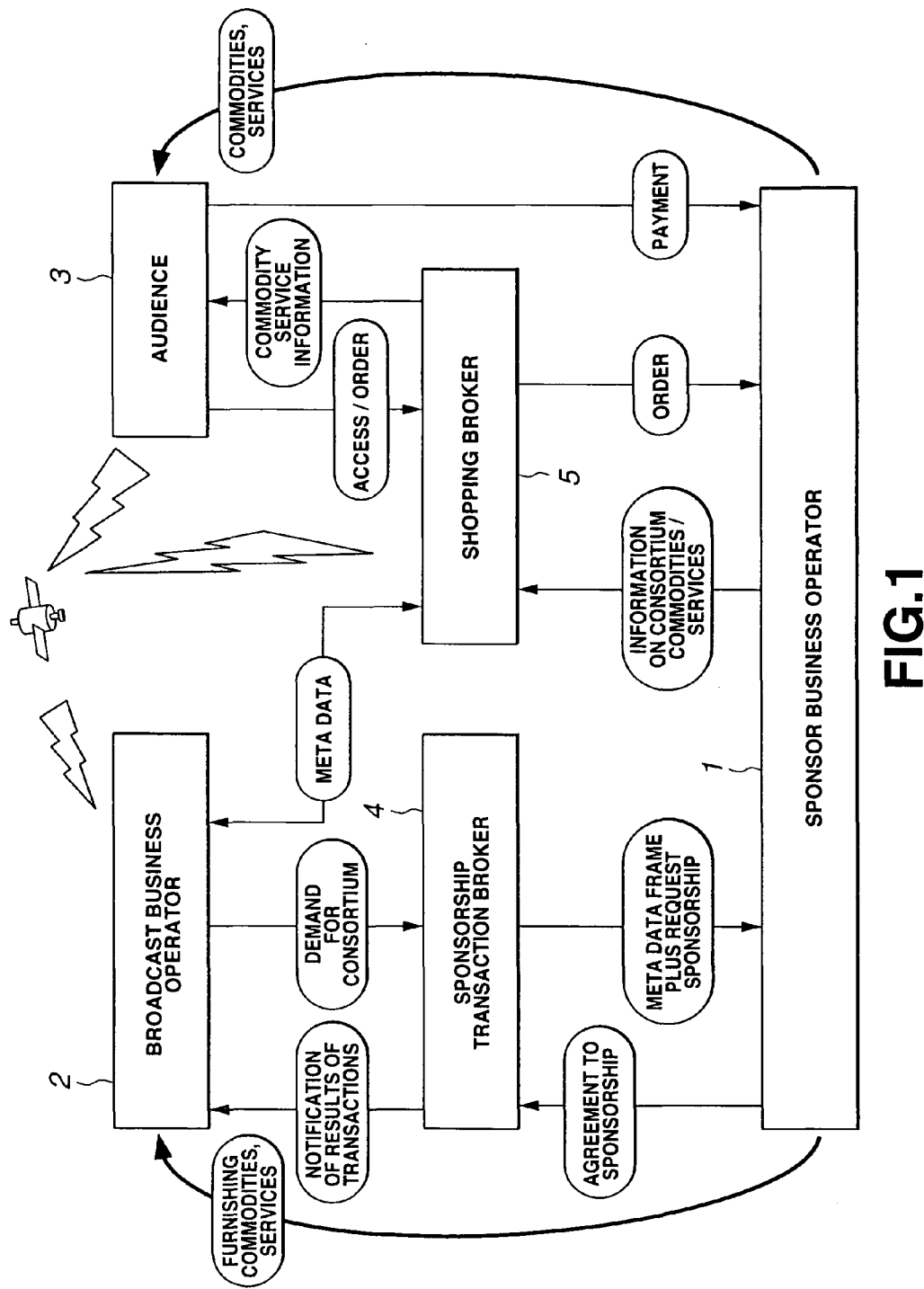
FIG. 1 shows a conceptual structure of an entire digital broadcast system.

Referring to the drawings, certain present embodiments of the present invention will be explained in detail.

(A) Overall System Envisioned in the Present Specification (A-1) Example of Conceptual Structure First, an example of a conceptual structure of the entire system, as envisioned in the present specification, is explained. The entire system includes, as a basic structure, a stage of sponsorship tie up to a project (stage of receiving the accepting a project), a stage of employing goods or services furnished to execute the project, including creation and distribution, and a stage of coupling the results of execution to on-line shopping.

In the ensuing explanation, it is assumed that the 'project' is the creation of a digital broadcast program. FIG. 1 shows an illustrative conceptual structure of the digital broadcast system. Of course, FIG. 1 shows an illustration, such that variegated forms may be conceived for the digital broadcasting system.

The digital broadcasting system, shown in FIG. 1, is roughly made up of three partial systems. One of these systems is a sponsorship transaction support system for on-line realization of a transaction pertinent to a sponsorship request of goods and services to a digital broadcast program. Another of the systems is a subsidiary information data creating system for preparing program ancillary data, which correlates the information pertinent to the commodities and services offered by the sponsor business operators to each scene of the picture program, while the remaining one is the program ancillary data processing system for receiving or reproducing the program ancillary data correlated to each scene to realize on-line shopping.

In the case of FIG. 1, the sponsorship transaction support system is made up by a sponsor business operator 1, a broadcast business operator 2 and by a sponsorship transaction brokerage business operator 4. The subsidiary information data creating system is made up by the broadcast business operator 2 and by a shopping brokerage business operator 5. The program ancillary data processing system is made up by the audience 3, the shopping brokerage business operator 5 and by the sponsor business operator 1.

It should be noted that the presence of brokerage business operators in each partial system is not mandatory, that is, if there is no interposing brokerage business operator, the functions necessary for a transaction are executed by one or more of the sponsor business operator 1, broadcast business operator 2 and the audience 3.

Although the sponsorship transaction brokerage business operator 4 and the shopping brokerage business operator 5 are routinely managed by different undertakers, there may, of course, be managed by the same undertaker.

(a) Sponsorship Transaction Support System

In the case of the sponsorship transaction support system, shown in FIG. 1, an entity making a request for sponsorship for creation of a video program is the broadcast business operator 2, while the undertaker ready to accept the request is the sponsor business operator 1. It is the sponsorship transaction brokerage business operator 4 that acts as intermediary for the sponsorship transaction.

The sponsorship transaction routinely is executed as follows: A broadcast business operator first issues a request for sponsorship to the brokerage business operator. Of course, this request for sponsorship is made on-line. The brokerage business operator forwards a request for sponsorship, accepted from the broadcast business operator, to sponsor business operators registered in a database (registered members).

Variegated methods may be thought of as the forwarding method. Examples of these methods include sending the request unconditionally to all registered members, and sending the request selectively based on the content of the request for sponsorship. The latter method may be classified into a method of taking into account the conditions as set by the broadcast business operator, as a client, a method of taking into account the conditions as set by the broker acting as intermediary for sponsorship request, a method of taking into account the conditions as set by the sponsor business operator, as a request receiving party, and a method comprised of optional combinations of these respective methods.

This forwarding is accompanied by a metadata frame (right for making insertions in the data ancillary to the program). That is, the forwarding is accompanied by the right to get the information pertinent to furnished goods or services included in metadata (data ancillary to the program) which is the ancillary information to program data (generally video and acoustic data and occasionally the video data or acoustic data) if the member who has received the request agrees to the sponsorship.

The sponsor business operator, who has received and is willing to agree to the request, notifies the brokerage business operator of such effect. The brokerage business operator checks whether or not the content of the agreement conforms to items of request. When the content of the agreement conforms to the items of request, for example, when the request destination is only one business operator and only one business operator has agreed to the sponsor, or when the quantity of the goods to be furnished is in meeting with the quantity as stated in the request, the brokerage business operator notifies the broadcast business operator of the content of the finalized transaction.

When the content of the acceptance is not quantitatively up to the items of sponsorship, for example, when the number of the business operators who agreed to the sponsorship exceed a scheduled number or when the number of goods that can be furnished by the agreeing plural business operators exceeds a scheduled number, the brokerage business operator specifies the quantity for the benefit of the broadcast business operator, or adjusts the number of goods furnished by the agreeing business operators, and notifies the broadcast business operator of the content of the finally determined transaction. If necessary, the exchange of communication may take place several times between the brokerage business operator and the sponsor business operator(s).

Meanwhile, if the agreed content is not quantitatively up to the items of sponsorship, for example, if the conditions in the agreed content are not up to the desired conditions geographically or temporally, the brokerage business operator notifies the sponsor business operator of the effect of failure in the conclusion of the transaction. Meanwhile, if the sponsorship transaction is not concluded, the brokerage business operator notifies the broadcast business operator of the failure in the conclusion of the sponsorship transaction, from one subject-matter of the transaction to another, that is from one commodity or service to another.

The foregoing is the general flow of the sponsorship transaction. Meanwhile, if an operator with high possibility of success in the conclusion of the sponsorship transaction has become apparent prior to transmission of the sponsorship request by the brokerage business operator, it may be contemplated to inform only the parties concerned of the existence of the competing counterparty. This may be realized by pre-registration on the database by no other than the operator willing to agree to the sponsorship of the conditions under which the operator may agree to the sponsorship. In such case, the brokerage business operator proceeds to match the content of the sponsorship request received from the client and the information of advance registration in the database to finally decide on the parties of contract.

(b) Subsidiary Information Data Creating System

In the case of the subsidiary information data creating system, shown in FIG. 1, it is the broadcast business operator 2 who creates and distributes a video program, while it is the shopping brokerage business operator 5 who creates program ancillary data to be associated with respective scenes of the picture program. Meanwhile, it may be an occurrence that the sponsorship transaction brokerage business operator 4 acing as intermediary for sponsorship transactions becomes an entity in creating the program ancillary data, or the broadcast business operator 1 for itself becomes an entity in creating the program ancillary data.

Meanwhile, the broadcast business operator may encompass a company specialized in creating an image program. Today, the broadcast business operator may even be consumers in consideration of the development in the communication technology and cost reduction in variegated equipment.

The creation and distribution of picture programs at large may be achieved as follows: First, in creating, that is the imaging, storage or the editing etc. of the picture program, the broadcast business operator, usually made up by a creating company and a distributing company, prepares and records program ancillary data (metadata) relevant to each scene of a picture program. The program ancillary data (metadata) here is termed key data at large or management data. These are data necessary for e.g., data management. The program ancillary data is also used for retrieving data from variegated stored information. For example, the metadata may be exemplified by the code information, such as UMID (Unique Material Identifier), capable of uniquely identifying the image material on a global extent, such as on the station-wide, keiretu-wide, or nation-wide basis, scene numbers, performers, positions, sites, such as GPS information and by program names.

It is however desirable to be able to use the code information that can be identified uniquely on the global basis.

Moreover, data of commodities and services for the respective scenes are also recorded. By and large, these information are not necessarily limited to sponsor goods. However, since the data on the commodities and services are also utilized in the present specification for on-line shopping, it is necessary that only the data relevant to the sponsorship (subject-matter of sponsorship) are recorded or that distinction may be made between the goods or services as the subject-matter of the sponsorship and those which are not the subject-matter of the sponsorship.

In the case of FIG. 1, only the minimum information recorded in the course of imaging, such as the names of the sponsor business operators or the generic names of commodities and services, for example, spectacles, retail, etc., are given the broadcast business operator who finally creates the program ancillary data (metadata). Of course, the broadcast business operator may create data up to precise details, or no data concerning the commodities or services may be recorded, depending on the type of the system under construction.

The brokerage business operator collects further detailed information concerning the commodities or services, notified by the broadcast business operator, from the sponsor business operators, or from the database, which may be supervised by the sponsorship transaction brokerage business operator or by each sponsor business operator. The broadcast business operator then creates a picture to be furnished to the audience, using the description language, that is BML (broadcast markup language) or XML (extensible markup language), including the layout information (layout information in a picture), to send the so created image information as program ancillary data to the broadcast business operator.

Of course, there may be an occasion wherein such program ancillary data is sent to the broadcast business operator in which the layout information (template image indicating the pasting position for the tag and the information providing for the method for representation) and the information concerning the commodities or services as collected represent different data.

That is, the program ancillary data (metadata) may be classified into one comprised of the layout information and the data of the commodities or services, unified together, that is data finished to such an extent that the data can directly be viewed or heard on expansion in accordance with the description language, and one in which the layout information is distinct from the data on commodities or services, that is data in which, in data presentation to the user, the data on commodities or services are pasted to the layout information.

Moreover, the brokerage business operator creates the index information, usable for representing the respective scenes associated with the program ancillary data in a simplified fashion, as necessary, and sends the so created index information to the broadcast business operator.

In any of these cases, the brokerage business operator adds the code information, specifying the respective scenes, to the program ancillary data. Based on this code information, the broadcast business operator is able to reliably correlate the images of the associated scenes with the program ancillary data.

On acquisition of the program ancillary data from the brokerage business operator, the broadcast business operator correlates the program data and the program ancillary data with each other, based on the code information, and transmits the resulting data as broadcast waves in an ultimately output form. Although FIG. 1 shows the case of satellite broadcast, the broadcast may be by ground waves or waves transmitted over a cable, such as power line, telephone line, optical cable etc. The output form may, of course, be communication in place of broadcast. The data may also be recorded on a package medium for distribution as a package medium.

(c) Digital Picture Program Receipt/Reproducing System

In the case of the digital picture program receiving/reproducing system, shown in FIG. 1, it is the audience 3 that receives or reproduces the picture program, while it is the shopping brokerage business operator 5 that accepts the offer of the detailed commodity information responsive to the request from the audience, or accepts the order. On the other hand, it is the sponsor business operator 5 that furnishes the commodities or services based on the buy-sell agreement concluded with the audience.

There may, of course, be a system devoid of an interposing shopping brokerage business operator. There may also be an occasion where no information concerning the commodities or services is received from the brokerage business operator in case the information on the commodities or services given as program ancillary data (metadata) suffices.

The viewing of the picture programs at large and the on-line shopping occur as follows: If, in viewing the picture program, the audience comes across goods or services he or she is interested in, he or she operates for demonstrating the program ancillary data, usually by acting on a remote controller. When there is any program ancillary data associated with the scene, the information is displayed on part or all of the display picture.

Usually, a display image representing the information concerning the commodities or services is represented. In the present specification, this information is referred to as meta-pockets or meta-mall. The meta-pocket is used in the meaning of a display picture for the information concerning the commodities or services appearing in a particular scene or the program ancillary data associated with the information, while the meta-mall is used in the meaning of a display picture which allows for overview of meta-pockets for plural scenes on a sole picture or in the meaning of the program ancillary data associated with the information.

These display pictures may be demonstrated simultaneously with the display of a picture program, as the main program, or independently of the picture program display, such as on termination of the broadcast or reproduction of the picture program.

As for the content of the display picture, solely the information concerning the sole commodities or services represented on the display picture may be displayed, or the totality of the information concerning the plural commodities or services represented on the sole picture may be displayed. Although it is assumed in FIG. 1 that the commodities or services to be demonstrated are supplied by the sponsor business operator, the commodities or services supplied may also be non-sponsorship commodities or services (commodities or services which are not the subject-matter of the sponsorship). The commodities or services demonstrated may not be sponsorship commodities or services (commodities or services which are the subject-matter of the sponsorship) but may be the commodities or services of the program purveyors.

The display content may also be variable, as may be seen from the specified examples as later explained. It is assumed that the audience has requested the display of the information which is more detailed than the information currently displayed on the display picture. When the request is input by a specified actuation by the audience, the information distribution is requested to a brokerage business operator from a terminal fitted with a communication function and which forms a viewing system along with a display device, routinely a television receiver or a set top box. The uplink transmission path, over which the request is transmitted, may be exemplified by the telephone network, packet network or the Internet. The transmission medium may, of course, be cabled or wireless.

On receipt of the request from the audience, the brokerage business operator reads out the information as requested from the database to transmit the so read-out information. This information may include the information indicating the degree of interest on the part of the audience, such as number of times of access events, in the scene in question, and the commodities or services appearing in the scene. It is among the advantages of providing the brokerage business operator to be able to supply this sort of the information.

If subsequently the audience is desirous to purchase the commodity he or she is interested in, he or she sends order data, as the expression of such intention, over the uplink transmission path to complete the buy-sell agreement with the sponsor business operator. Before finally transmitting order data, the state of the order may be confirmed by a basket picture, as in the case of the currently operating Internet shopping. This basket picture, also termed a cart picture, enables the subject-matter purchased to be re-confirmed before actually sending the intention of buying the goods to the sponsor business operator.

When the intention of the audience in buying a commodity is notified to the sponsor business operator, shipment of the commodity and payment are performed subsequently as in the routine commercial transactions. If the information on the picture program or the scene which acted as incentive for acquiring the information on the commodity or in placing an order is included in the communication the audience has with the brokerage business operator or with the sponsor business operator, in a manner not shown in FIG. 1, such included information may be used as a reference material at the time of scheming a new picture program or at the time of accepting the sponsorship.

(d) Flow of Program Ancillary Data

Figure 2:
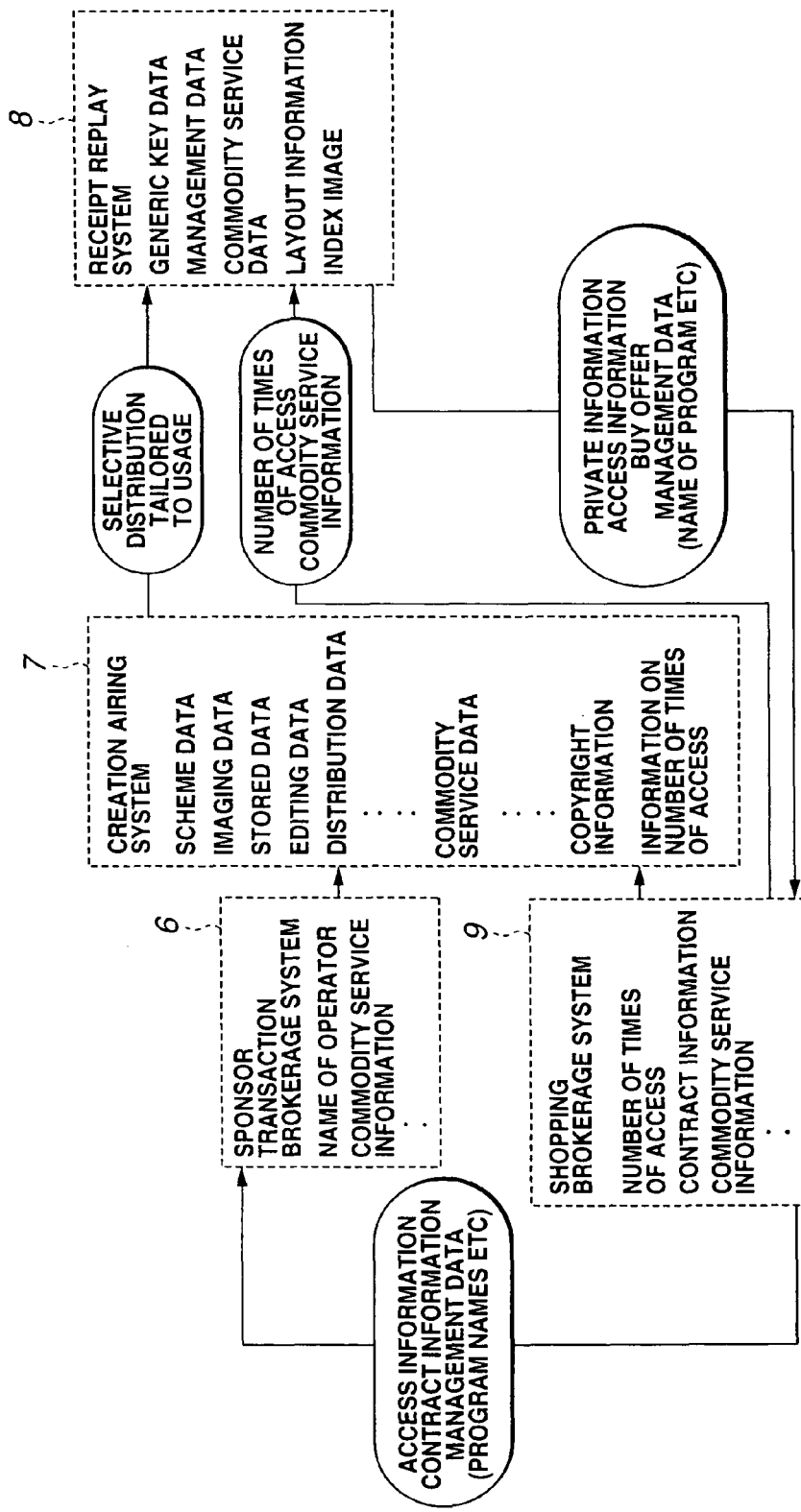
FIG. 2 shows a conceptual structure of a digital broadcast system in the perspective of circulation of data ancillary to a program.

FIG. 2 shows an illustrative conceptual structure of the digital broadcast system as viewed from the flow of the program ancillary data. In FIG. 2, the digital broadcast system is roughly classified into four partial systems, namely a sponsorship transaction brokerage system 6, a creation broadcast system 7, a reception reproduction system 8 and a shopping brokerage system 9, with the types of handling of the program ancillary data as ad-hoc reference or index. In FIG. 2, the sponsor business operator belongs mainly to the sponsorship transaction brokerage system and the audience belongs to the reception reproduction system.

The feedback information (access information, agreement conclusion information or management data), as collected from the audience who viewed a picture program, is sent from the shopping brokerage system 9 to the sponsorship transaction brokerage system 6. As the access information, there may, for example, be the information as to from which scene of which picture program and for which commodities or services the access was made, or the information as to the sex or the age group of the audience. The information as to the conclusion of agreements may be the number of concluded buy-sell agreements or the content of the agreements. The management data may be the program names, broadcast date and time and program frames.

In the sponsorship transaction brokerage system 6, the above information is used as the reference materials for scheming new picture programs or for future sponsorship in order to execute a sponsorship transaction for a new picture program. The information finally determined in this transaction, for example, the names of the establishments as participants in the sponsorship or the information on the commodities or services as the subject-matter of the sponsorship, is sent to the creation broadcast system 7.

The creation and broadcasting system 7 supervises the variegated data produced in the course of creation of picture programs, such as scheming data, imaging data, storage data, editing data and distribution data, correlated with the information supplied from the sponsorship transaction brokerage system 6 or from the shopping brokerage system.

The scheming data may be enumerated by, for example, the tenor of program creation, target, scheming staff members etc. The imaging data may be enumerated by, for example, the date and time, site or weather at the time of imaging, staff members, sponsor goods or services used in each scene, and imaging equipment. The storage data may, for example, be the identification number and address of a recording medium. The editing data may, for example, be the editing scene, special effects used, editing staff members etc. The distribution data may, for example, be the date and time of distribution, territory, copyright information, information on the distributor and the information on the right to use.

From the shopping brokerage system 9, the information on the number of times of access events, the information on the concluded agreements and the information on the commodities or services are supplied. When the shopping brokerage business operator is responsible for supplying the program ancillary data (metadata), as in the system shown in FIG. 1, the so prepared program ancillary data is also supplied.

These information are correlated with one another through the information specifying the respective scenes of the respective programs, such as UMID. So, the readout or editing may take place freely independently of the storage sites of the variegated information. Meanwhile, the information selected depending on the application is ultimately distributed from the creation broadcast system 7 to the reception reproduction system 8.

The reception reproduction system 8 acquires at least the generic key data and management data, as program ancillary data supplied from the creation and broadcasting system 7. The data on the commodities or services may be distributed along with the program data from the creation and broadcasting system 7 or from the shopping brokerage system 9 as necessary.

On the other hand, the reception reproduction system 8 exploits the index picture or the number of times of access events, as necessary, to display the data pertinent to commodities or services on the display picture. The index image may be generated internally or obtained from the creation and broadcasting system or the reception reproduction system, whilst the number of times of access events may be obtained from the creation and broadcasting system 7 or from the shopping brokerage system.

Meanwhile, the layout information for generating the display picture for the information concerning the commodities or services is routinely furnished from the creation and broadcasting system or the shopping brokerage system. It is of course possible to provide these information in an audience side terminal.

When the audience requests the detailed information as to the commodities or services, the reception reproduction system 8 sends the personal information, access information or the management data etc. to the shopping brokerage system 9. Similarly, when offering to buy the commodities or services appearing on a scene of the picture program, the reception reproduction system 8 sends the buying offering information, personal information, such as name, address, mail number, sex, age etc., access information, for example, the information on the address which holds the information and management data etc. to the shopping brokerage system 9.

This accumulates the program ancillary data relevant to the furnishment of the information or the purchase of the commodities or services in association with the data ancillary to the picture program in the shopping brokerage system 9. These information prove beneficial information in carrying out commercial transactions by the shopping brokerage system 9, while also proving beneficial reference information for the next ensuing sponsorship transactions which may be executed on the sponsorship transaction brokerage system 6 as described above.

(A-2) Illustrative Structure

Figure 3:
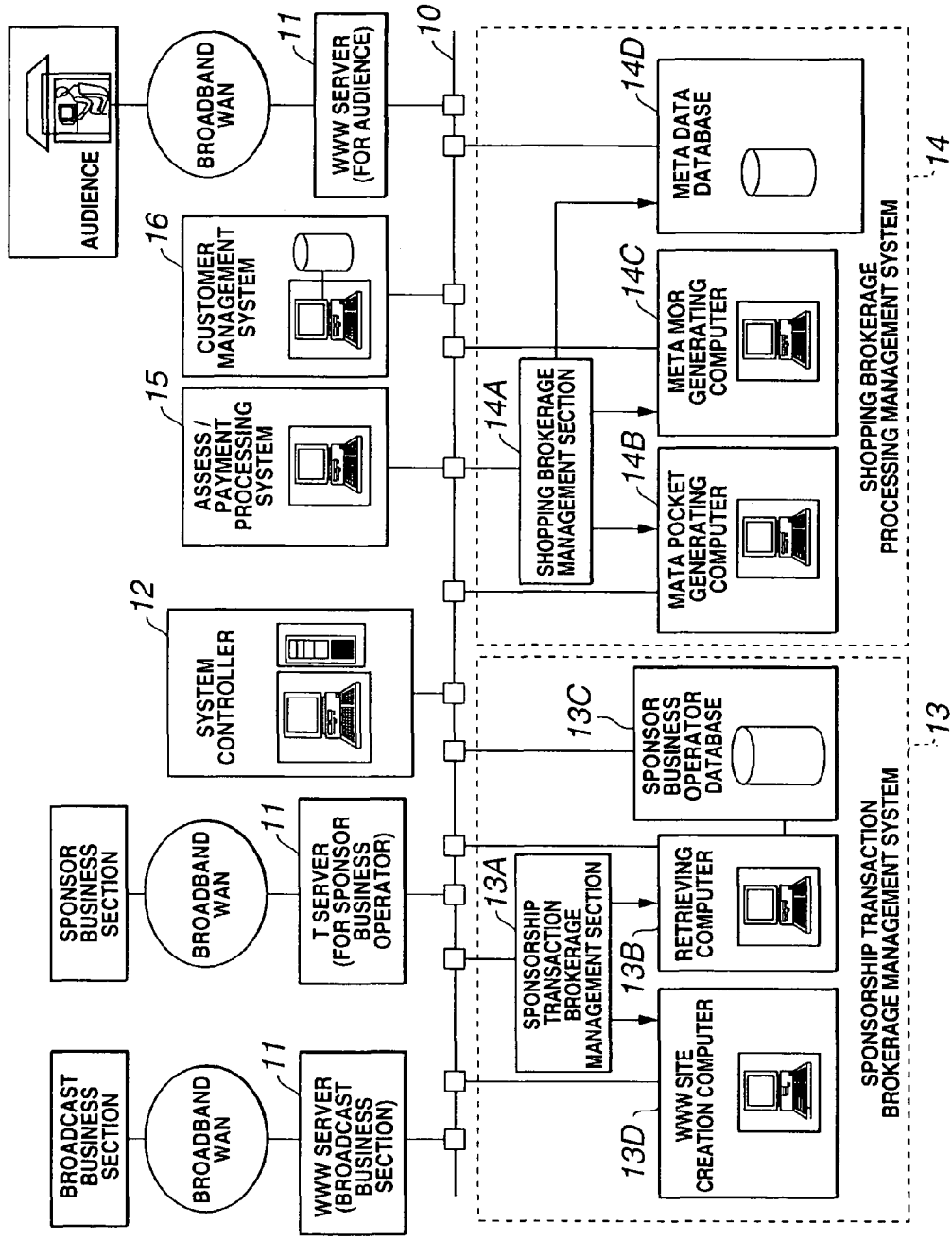
FIG. 3 shows an illustrative structure of a digital broadcasting system.

FIG. 3 shows an illustrative structure of the digital broadcast system. FIG. 3 shows an illustrative structure in case all terminals making up the system are interconnected over a network 10. Meanwhile, FIG. 3 shows an example in which the sponsorship transaction brokerage business operator and the shopping brokerage business operator are the same or in which different undertakers or operators form a virtual LAN (Local Area Network).

In this case, the brokerage business operator, broadcast business operator, sponsor business operator and the audience are interconnected over the broadband WAN (Wide Area network). The connection of the LAN with the broadband WAN uses a WWW (World Wide Web) server 11 operating as a gateway. The broadcast business operator, sponsor business operator and the audience use their respective dedicated WWW servers 11.

The structure of LAN, supervised and managed by the brokerage business operator, is now explained. This LAN is made up by a system controller 12, controlling the variegated systems installed on the network 10, a sponsorship transaction brokerage processing management system 13, a shopping brokerage processing management system 14, an assessment/settlement processing system 15 and a customer management system 16.

The sponsorship transaction brokerage processing management system 13 is made up of a supervising section 13A, a retrieval processing computer 13B, a sponsor operator database 13C, and a WWW site creation computer 13D, as main components. In actuality, the supervising section 13A of the sponsorship transaction brokerage processing management system is made up by a computer. Meanwhile, the computer is made up by a CPU, a storage unit (RAM, ROM etc), a peripheral device(s) and an input/output device, interconnected over a bus. The functions executed by the respective computers are routinely implemented as an application program (software).

The retrieval processing computer 13B retrieves the sponsor operator database 13C to retrieve the sponsor operators who are in meeting with the sponsorship request from the broadcast business operator (the party who requests the sponsor) or to decide on the destination of distributing the sponsorship request. The WWW site creation computer 13D is used to prepare a display picture for the broadcast business operator as the party who requests the sponsorship to input a sponsorship request or to confirm the results of response to the sponsorship request. In the sponsor operator database 13C are stored the generic items necessary in deciding on the destination of distribution of the sponsorship request and the conditions under which the sponsorship request may be accepted, as registration items.

The shopping brokerage processing management system 14 has, as its main components, a supervising section 14A, a meta-pocket forming computer 14B, a meta-mall forming computer 14C and a metadata database 14D. The supervising section 14A of the shopping brokerage processing management system is also made up by a computer. The computer structure is as described above. The functions executed on the respective computers are also as described above.

The meta-pocket forming computer 14B is used for generating the meta-pocket (display for the information pertinent to the commodities or services appearing in specific scenes or program ancillary data associated with the information). The meta-pocket generated may be accorded to the broadcasting station or suitably distributed in compliance with the audience' requests. The scene information or the commodity information necessary for meta-pocket generation are routinely acquired from the broadcast business operator or from the sponsor business operator. Alternatively, it may be acquired from the sponsor operator database 13C.

The meta-mall forming computer 14C is used for generating the meta-malls (display image which allows for overview on one display picture of the meta-pockets concerning plural scenes, or the program ancillary data associated with the information). The so generated meta-mall may be accorded to the broadcasting station or suitably distributed in compliance with the audience' requests. The scene information or the commodity information similarly necessary for meta-pocket generation are routinely acquired from the broadcast business operator or from the sponsor business operator. Alternatively, it may be acquired from the sponsor operator database 13C.

The metadata database 14D is used for storing the generated meta-pockets or meta-malls.

The assessment/settlement processing system 15 is a computer system for executing the assessment or settlement processing pertinent to the utilization of the on-line shopping or service exploitation, such as information browsing or downloading chargeable data. The customer management system 16 is used for storing the information of the customer (audience) handled by the assessment/settlement processing system 15 and for retrieving the information as necessary.

With the above-described structure of the system for the brokerage business operators, it is possible to realize a digital broadcast system which makes it possible to cross-link the scheming stage of the video program (acquisition of sponsor operators) and the stage of utilization by the audience of the program ancillary data (metadata).

The foregoing is the explanation of the conceptual structure and an illustrative structure in case of application of the overall system as envisioned in the present specification to the digital broadcast system. The specified illustrative structure of respective partial systems making up the overall system, as envisioned in the present specification, is now explained in detail.

(B) Sponsorship Transaction Support System

As typical of the sponsorship transaction support system for on-line realization of the sponsorship transaction between a party making a request for sponsorship to a project and registered members, there are a system constructed by two parties, namely a party making the request and the sponsor business operator, and a system constructed by three parties, namely a party making the request, a brokerage business operator and the sponsor business operator.

The former system is realized mainly by exchange via E-mail and exchange through a WWW (World Wide Web) picture supervised by the party making the request. The latter system is realized mainly by exchange with the E-mail interposed by the brokerage business operator and exchange through a WWW (World Wide Web) picture supervised by the brokerage business operator.

Meanwhile, the number of the brokerage business operator need not be singular such that an undertaker or operator operating as a wicket of transaction may be distinct from an undertaker or operator responsible for maintenance and supervision of the transaction information. It is sufficient in such case if functional elements making up the brokerage server as later explained are provided in a distributed fashion in the terminals of different undertakers or operators.

(B-1) Terminal on the Party Making a Request for Sponsorship

In case of constructing a sponsorship transaction support system, the terminal of the party making a request for sponsorship needs to be provided with a function of creating the sponsorship request and transmitting the so created sponsorship request to the sponsor business operator and a function of receiving a response from the sponsor business operator to check for its content. In actuality, these functions are mostly realized on one terminal. However, the respective function are explained severally for clarifying the technological elements required for executing the respective functions.

(a) Input Device for Sponsorship Request Conditions (a-1) Terminal Structure

Figure 4:
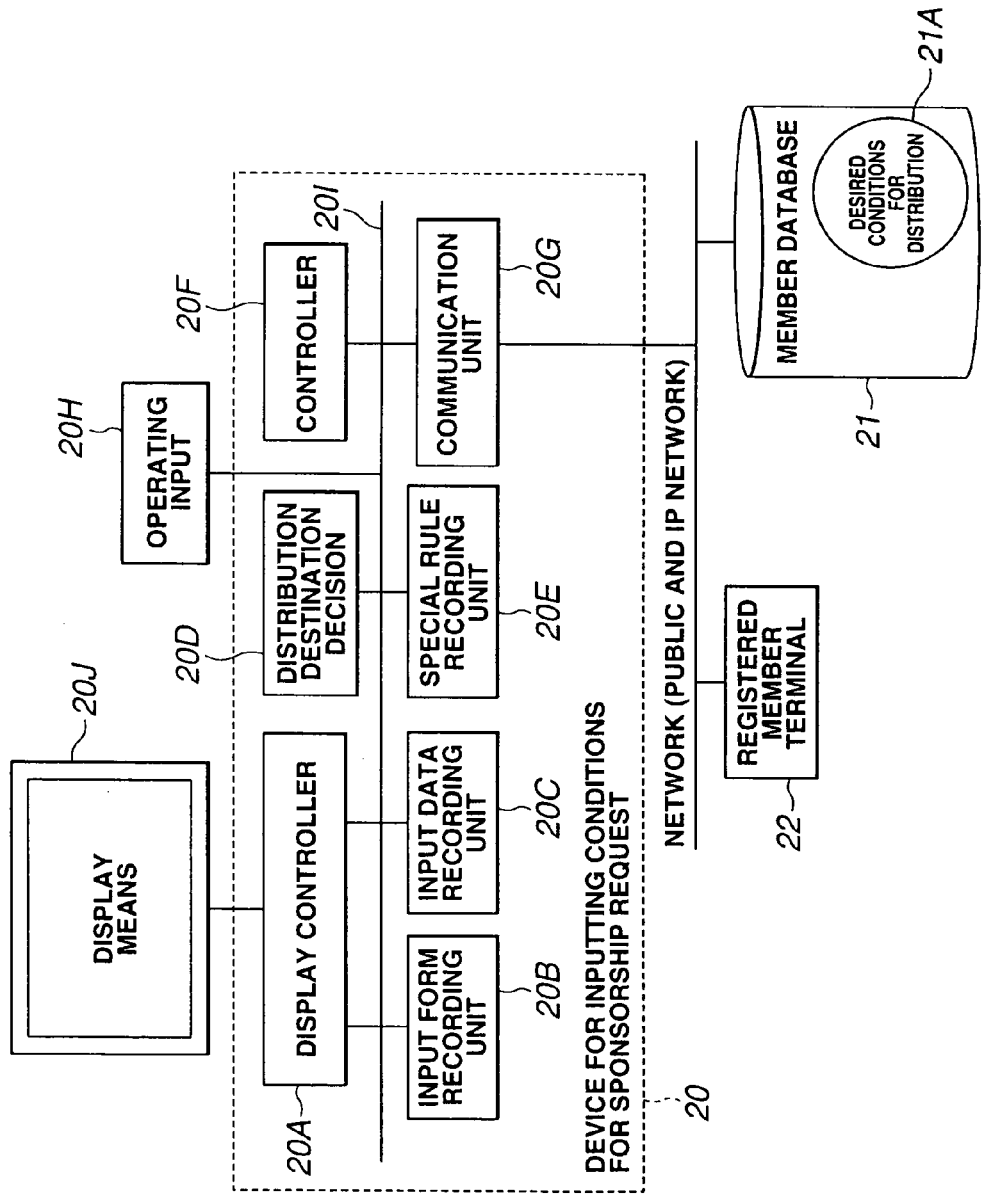
FIG. 4 is a functional block diagram showing an embodiment of a sponsorship request condition inputting device (first embodiment).
Figure 5:
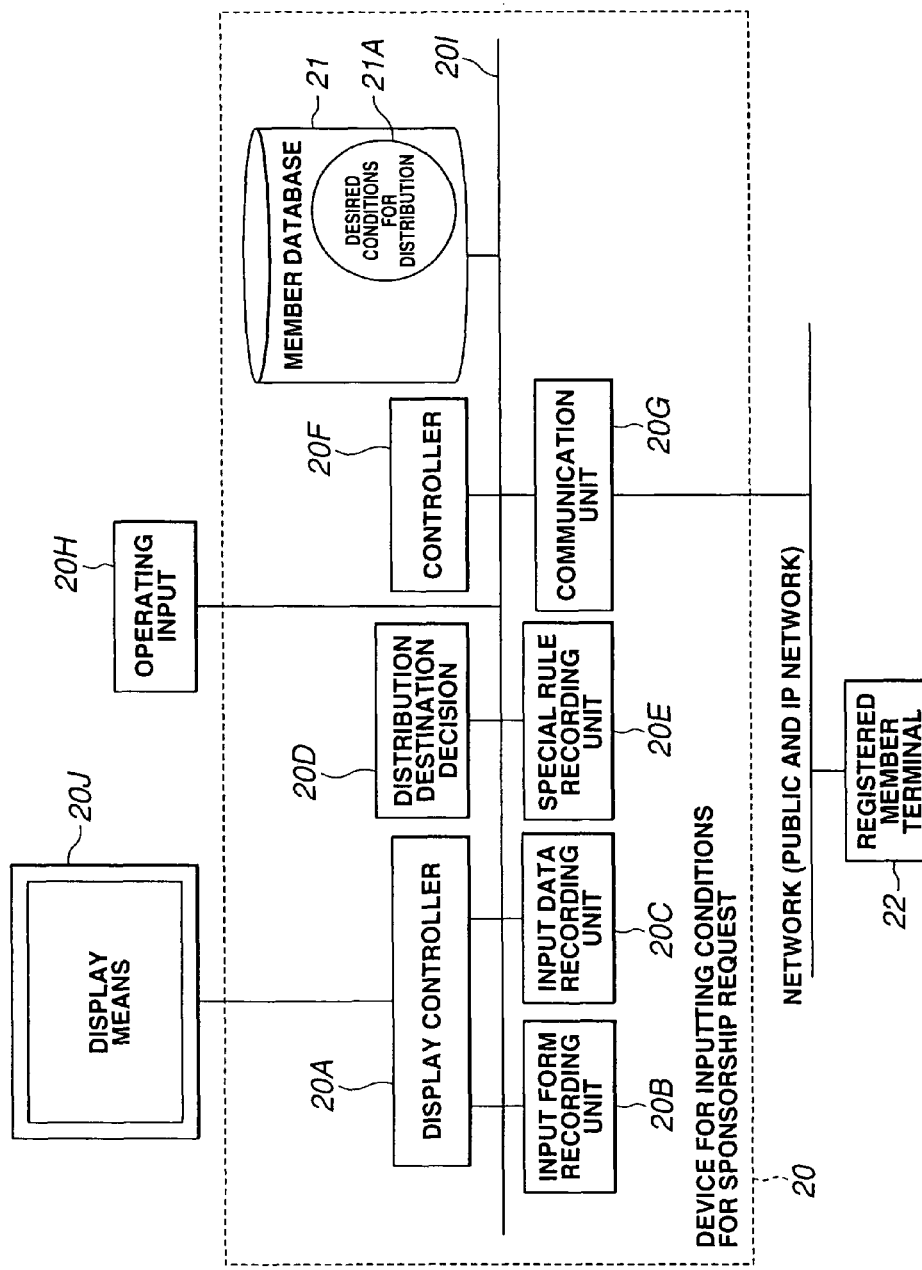
FIG. 5 is a functional block diagram showing an embodiment of a sponsorship request condition inputting device (second embodiment).

FIGS. 4 and 5 show an embodiment of a sponsorship request condition inputting device having the function of inputting the sponsorship request conditions. FIG. 4 shows the case where the sponsorship transaction support system is made up of three parties, namely the party making a request for sponsorship, the brokerage business operator and the registered members. On the other hand, FIG. 5 shows the case where the sponsorship transaction support system is made up of two parties, that is the party making a request for sponsorship and the registered members.

Reference is first made to FIG. 4 showing a device for inputting the sponsorship request conditions 20 made up by a display controller 20A, an input form recording unit 20B, an input data recording unit 20C, a distribution destination specifying unit 20D, a specifying rule recording unit 20E, a controller 20F, a communication unit 20G, an operating input unit 20H, a bus 20I and display means 20J.

In FIG. 4, the operating input unit 20H and the display means 20J are mounted outside of the main body unit of the device 20. Alternatively, the operating input unit and the display unit may be provided as one with the main body unit of the device, as in the case of the notebook personal computer, PDA or the portable telephone set. Although the recording unit and the communication unit are shown enclosed in the main body unit of the device, these may be mounted outside the main body unit. The structure of each functional unit is hereinafter explained.

The display controller 20A reproduces picture data, received or reproduced, in a signal or data form suited to the display means 20J. The output signal may, for example, be a video output (NTSC video, composite video or S-video) or an RGB output. The display controller 20A also has the data decoding function, such as MPEG (Moving Picture Experts Group), depending on the particular purposes of use.

The input form recording unit 20B is a recording or storage medium for recording an input form for sponsorship transaction. Of course, the recording medium is not to be used exclusively for storage of an input form but may also be used for recording or storage of other sorts of the information. These mediums may be exemplified by, for example, a CD-ROM, mediums of the magnetic recording system, such as tape, floppy disc, hard disc or magnetic card, an optical recording type medium, such as write-once CD, DVD or optical card, magneto-optical recording type medium, such as DVD, MD or MO, and semiconductor memory, such as non-volatile memory or RAM.

The input form for recording will be explained in detail subsequently. The input form may be pre-fixed on the medium or duplicated from other recording mediums. Alternatively, the input form may be downloaded through communication networks, such as Internet. The input form is expanded on a video RAM provided in the display controller 20A.

The input data recording unit 20C is a recording medium or a storage medium for recording the data input through the operating input unit 20H for communication purposes.

The input form recording unit 20B and the input data recording unit 20C may be provided within the inside of the display controller 20A. The input form recording unit 20B, input data recording unit 20C and the specifying rule recording unit 20E may also be mounted outside the casing of the device for inputting the sponsorship request conditions 20, without being mounted within the casing.

The distribution destination specifying unit 20D and the specifying rule recording unit 20E are not provided for notifying all of the members registered in the membership database of the sponsorship request unconditionally, but are provided for executing the processing of notifying only the registered members having to do in some way or directly with the sponsorship request in question. There may, however, be occasions where the notification be ultimately made to all members.

Although the specified functions are provided in FIG. 4 on the terminals of the sponsorship requesting party, they may also be provided at the terminals of the brokerage business operator (brokerage server). It is also possible to provide only one of the functions in the terminal of the sponsorship requesting party and to provide the other function in the terminal (brokerage server) of the brokerage business operator. In sum, the above-mentioned functions may be provided in any side terminal if the distribution destination specifying unit 20D is able to read out the specifying rule recorded in the specifying rule recording unit 20E to decide on the destination of distribution.

In the device for inputting the sponsorship request conditions 20 having the above-mentioned structure, it may be presumed that the distribution of the sponsorship request to the specified registered member is routinely performed by the device for inputting the sponsorship request conditions itself. Alternatively, data stating the destination of distribution may be attached to the sponsorship request and transmitted to the brokerage business operator or to the communication business operator to cause the brokerage business operator or the communication business operator to send the data in multi-destination delivery.

The distribution destination specifying unit 20D is the information processing means for implementing the function of specifying the registered member(s) having to do in some way or directly with the sponsorship request based on the specifying rule stated in the specifying rule recording unit 20E, as mentioned previously. On reading out the input data from the input data recording unit 20C, the distribution destination specifying unit 20D executes the membership information having to do specifically with the input data. The retrieval processing may be executed by the distribution destination specifying unit 20D directly controlling a membership database 21. Alternatively, the distribution destination specifying unit 20D may input only the necessary information to the membership database 21 to receive only the retrieved results obtained in the membership database 21.

Although FIG. 4 shows that the membership database 21 contains desired conditions for distribution 21A, previously registered by the registered members, it is probable that the membership database 21 lacks in such desired conditions for distribution 21A. Meanwhile, if there exist the desired conditions for distribution 21A, the decision as to the area of the distribution is seasoned with the desire of the registered members to whom the sponsorship request is distributed. The membership database 21 is premised on the presence of the brokerage business operator performing the management.

By deciding on the area of distribution, based on such specific rules, it is possible to save the labor of the party making the sponsorship request in specifying and inputting the counterparties and inputting the so specified counterparties. The operating efficiency may be improved because a suitable area becomes the destination of distribution of the sponsorship on simply filling in the input form. Of course, the distribution to all members may be made positively by stating the totality of the registered members as the destination of distribution in the input item. Conversely, only specified group(s) may be stated in the input item as the area of distribution.

Since the decision of the area of distribution which is based on the specified rule depends on the content of registration of the membership database, the sponsorship request may be issued to registered members who have not had the opportunities for transactions. This has the effect of enlarging the business chances.

The specifying rule may encompass logical sum conditions, logical product conditions and other complex logical conditions for part or all of the input items. Meanwhile, the specific rules may take into account the tendency of past distribution or past agreements, more specifically, data as to whether or not the agreements reached conclusion or the number of the concluded agreements. The number of access events from the consumers to the commodities or services furnished as the result of the sponsorship event and the number of the concluded agreements may also be taken into account. If these numbers being more than a preset value are taken into the conditions of the logical expressions, it becomes possible to select those which met highly favorble results in the past sponsorship events.

The specifying rule recording unit 20E is a recording medium for recording a specifying rule. The recording medium may be a variety of rewritable recording mediums, in addition to the read-only memories, such as CD-ROM. As aforesaid, the specifying rule recording unit 20E may be provided at the terminal of the sponsorship requesting party, or on the terminal of the brokerage business operator.

The specifying rule recorded on the specifying rule recording unit 20E may be formed or edited on the side sponsorship requesting party. In such case, the intention of the sponsorship requesting party may be reflected in the area of distribution of the sponsorship requests. Meanwhile, if the specifying rule is registered, the area of the distribution may be the same range at all times. Depending on the content of the sponsorship request, the sponsorship requests may, of course, be distributed to a more desirable area by forming or editing the specifying rule in agreement with such content.

The specifying rule recorded on the specifying rule recording unit 20E may also be formed or edited on the side brokerage business operator. In such case, the intention of the brokerage business operator may be reflected in the area of distribution of the sponsorship request. Since in general the information on the state of response to the past distribution area and on the tendency to agreement conclusion is stored at the brokerage business operator, it may be expected to optimize the area of distribution. Depending on the content of the sponsorship request, the sponsorship requests may again be distributed to a more desirable area by forming or editing the specifying rule in agreement with such content.

In any of the above cases, plural sorts of the specific rules, having different logical conditions or reference items may be provided so that the specific rules to be applied may be switched based on the content of the sponsorship requests, such as sorts of the projects for sponsorship or the targeted customer layers.

Of course, the specific rules may include not only those initially set by undertakers manufacturing or selling sponsorship request condition inputting device but also those initially set by a software creating company furnishing an application program which permits a computer to execute specified conditions as set for the destination of distribution.

In distinction from the case of unconditionally distributing the sponsorship request to all registered members, without regard to the specific rules used, the area of distribution can be narrowed, in a manner favorable to the sponsorship requesting party, to the business operator ready to consent to the sponsor, and to the business operator which manages the network. For example, the area of distribution may be limited to such scope of distribution from which sponsorship may be expected, in a manner favorable for the party who has made the sponsorship request and who is not desirous to distribute the sponsorship request to counterparties irrelevant to the content of the sponsorship request. That is, the party who has made the sponsorship request and who is not desirous to distribute the sponsorship request to counterparties irrelevant to the content of the sponsorship request is able to limit the area of distribution to such a scope for which the sponsorship may be promising. The registered members unwilling to consent to the sponsorship are also able with advantage to evade the receipt of a large number of the sponsorship requests the consent to which is against the intention of the registered members. The undertaker responsible for network management may also be exempted from the risk of the data flow through the network increasing to more than a necessary extent thus evading the excessive equipment cost.

The controller 20F controls various components making up the device for inputting the sponsorship request conditions 20, while executing signal processing operations. In general, the controller is in a micro-computer configuration. Usually, the functions of the controller 20F are governed by the operation system program and by the application program.

The communication unit 20G is means for communication with outside over a network. For the communication unit 20G, a communication equipment conforming to the network is used. The network may be wired or wireless. For example, the network may be a telephone network, an IP network, a dedicated line system, or an ATM network. The communication system may be of the line connection type or of the packet connection type. The network may be of an anlog or digital style. The communication unit 20G may be mounted externally, instead of being enclosed in the device, as shown in FIG. 4. It is through this communication unit 20G that the sponsorship request is transmitted. The communication unit 20G may also be used for communication with the membership database 21, as necessary.

The operating input unit 20H is used for inputting the content of the sponsorship request or imparting various commands to the device for inputting the sponsorship request conditions 20. The operating input unit 20H may be exemplified by a keyboard, a mouse, a pointing device, such as pad, pen or pointer, a dial, including one having a click function, a pressing button key etc. The bus 20I is a data inputting/outputting bus and may be exemplified by an ISA bus, an EISA bus and a PCI bus.

The displaying means 20J is used for displaying the information, such as sponsorship request conditions. FIG. 4 shows a case where a device enclosed in a casing different from one for the device for inputting the sponsorship request conditions 20, for example, a display unit of a monitor device or a TV receiver, is connected as the display means. As aforesaid, the displaying means 20J and the device for inputting the sponsorship request conditions 20 may be provided in the same casing.

Meanwhile, the connection system in case of providing the respective components making up the device for inputting the sponsorship request conditions 20 outside of the main body unit of the device may be wireless, such as with Bluetooth, in place of wired connection.

The device for inputting the sponsorship request conditions 20 shown in FIG. 4 may be exemplified by computer terminals, such as notebook or desktop personal computers, PDA, portable telephone sets, game machines, set top boxes, PC cards, domestic electrical utensils, VTR, television receivers, car navigation systems, wrist watches having the information processing functions, distribution terminals for music or games, financial terminals (ATM) etc., in addition to the so-called dedicated terminals.

The structure of the membership database 21 or the terminal for registered members 22, connected to the device for inputting the sponsorship request conditions 20 over the telephone network or a data network, will be explained in detail subsequently. Meanwhile, the information registered in the membership database 21, inclusive of the desired conditions for distribution 21A, will be explained later in connection with the explanation of the sponsorship transaction brokerage server.

Reference is now made to FIG. 5 showing a device for inputting the sponsorship request conditions 20, which is different from the device shown in FIG. 4 in that the membership database 21 is provided on the side sponsor business operator. Although the membership database 21 is provided in the casing of the device for inputting the sponsorship request conditions 20, it is not mandatory that the membership database 21 be enclosed in this manner such that it may also be connected externally of the casing. The difference of the configuration of FIG. 5 from that of FIG. 4 is that the management entity of the membership database 21 is the sponsorship requesting party.

Although the registration of the information concerning the sponsor business operator is usually made by the sponsorship requesting party, it is also possible for a sponsor business operator willing to agree to the sponsorship request to make individual registration over the network. The same applies for a case where the sponsor business operator has a desired condition for distribution with respect to the distributed sponsorship request. As in the case of FIG. 4, the information registered in the membership database 21 will be explained in detail later in connection with the explanation on the brokerage server.

(a-2) Input Form Picture

Figure 6:
FIG. 6 shows an embodiment of a display picture for a sponsorship request condition inputting form.

FIG. 6 shows an example of a sponsorship request condition inputting form. Such a favorable effect may be expected that, by simply entering the information in the inputting form, it is possible to create a written request (request data) having the necessary minimum name information. In the current state of network development of today, this sort of the sponsorship request may possibly be made not only in the sponsorship transaction between undertakers or operators, but also between operators and individuals and between individuals. So, the necessity is keenly felt for this sort of the interfacing technology.

An inputting form 25 of FIG. 6 has, as its input terms, a project name 25A, time and date of execution 25B, project content 25C, a target 25D, desired conditions for sponsorship 25E to 25G, desired amount 25H and input columns 25I for each input item. A transmission button 25J is also indicated on the display picture.

Among the items to be entered in the input item 'project', there are, for example, creation of picture programs, including television programs, motion picture programs, in turn including those played in a theater, and other programs, creation of radio programs, ads, business schemes, creation of games, various events, including exhibitions, sports, contests, territorial PRs and festivals, various funds and various organizations. Of course, one or more of these items is entered in creating the sponsorship request.

As items to be entered in the 'date and time of execution', the date and time of project execution and broadcast time zones are entered. As items to be entered in 'content of input items', the project name, such as program name, name of a supervisor, objective, such as purport or theme of the project, date and time, that is date and time of execution or airing, site, such as site of execution or airing area, are input. As items to be entered in 'target (target layer)', territory, age groups, sex, revenue, property etc. are entered. As items to be entered in 'desired conditions for sponsorship', commodities or services, quantity, date and time (date and time of execution or use), site (site of use of delivery), amount, conditions of use, conditions of distribution of the sponsorship request (fields of business, specified groups, specified persons, specified territories, inclusive of GPS information) and so forth, are entered. As items to be entered in [desired amount], prices for furnishment of the commodities or services, desired in the sponsor, are entered. Alternatively, this item can be entered as part of the desired conditions for sponsorship.

Since these input items represent the crucial information in the registered member(s) judging whether or not the sponsorship request is to be agreed to, it is desirable to use the information optimized in conformity to the aim in view. In making an entry with a keyboard in the respective input columns 25I for respective input items, selective entry may be made from respective input item examples displayed in the respective input items.

Meanwhile, when a transmission button 25J is pressed (clicked) after the entry in the totality of items or the basic information, the information recorded in the input data recording unit 20C is distributed to the destination of distribution decided on by the distribution destination specifying unit 20D. The technique of deciding on the destination of distribution is as described above.

(a-3) Data of Sponsorship Request Conditions

Figure 7:
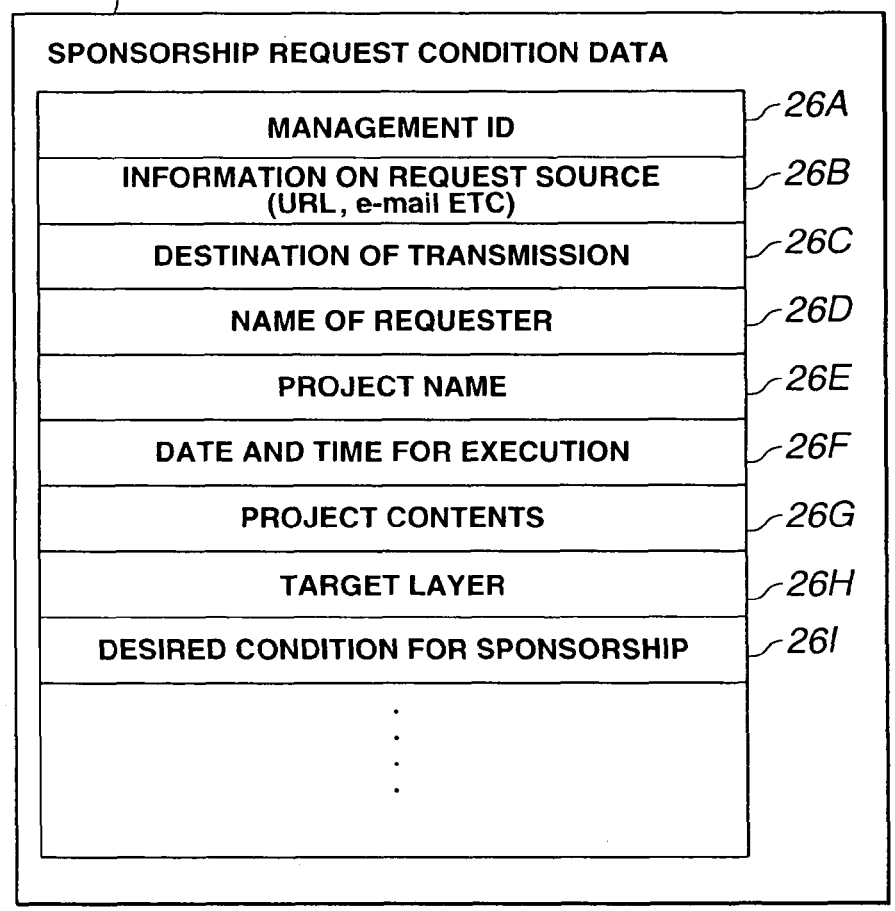
FIG. 7 shows an illustrative structure of sponsorship request condition data.

FIG. 7 shows a typical structure of data of sponsorship request conditions 26 transmitted from the device for inputting the sponsorship request conditions 20 to the terminal for registered members 22.

The data of sponsorship request conditions 26 is made up of the management ID information 26A, the client information 26B, transmission destination information 26C, client name information 26D, a project name 26E, date and time of execution 26F, project content 26G, target layer information 26H, desired conditions for sponsorship 26I and other information.

The management ID information 26A is the identification information for the sponsorship client or the broadcast business operator to oversee the sponsorship request. The client information 26B is the information for specifying the origin of transmission of the sponsorship request on the network, as typified by URL, E-mail address or telephone number. The transmission destination information 26C, which is the information for specifying the destination of transmission of the sponsorship request on the network, holds the information similar to the client information 26B. Meanwhile, the information registered in the membership database 21 and which is pertinent to the registered members determined as the destination of distribution by the distribution destination specifying unit 20D, is used as the transmission destination information 26C.

The information registered as the sponsorship client is written in the client name information 26D. Alternatively, the information can be entered in the inputting form of FIG. 6. For the project name 26E, date and time of execution 26F and the project content 26G, the items entered in the inputting form 25 are duplicated and used. For the target layer information 26H, desired conditions for sponsorship 26I, the items entered in the inputting form 25 are duplicated and used. It is noted that the desired conditions for sponsorship 26I may be associated with each of the desired conditions for sponsorship, entered with the inputting form 25, or plural desired conditions for sponsorship may be grouped in one.

(a-4) Processing Operations in Making Sponsorship Request

Figure 8:
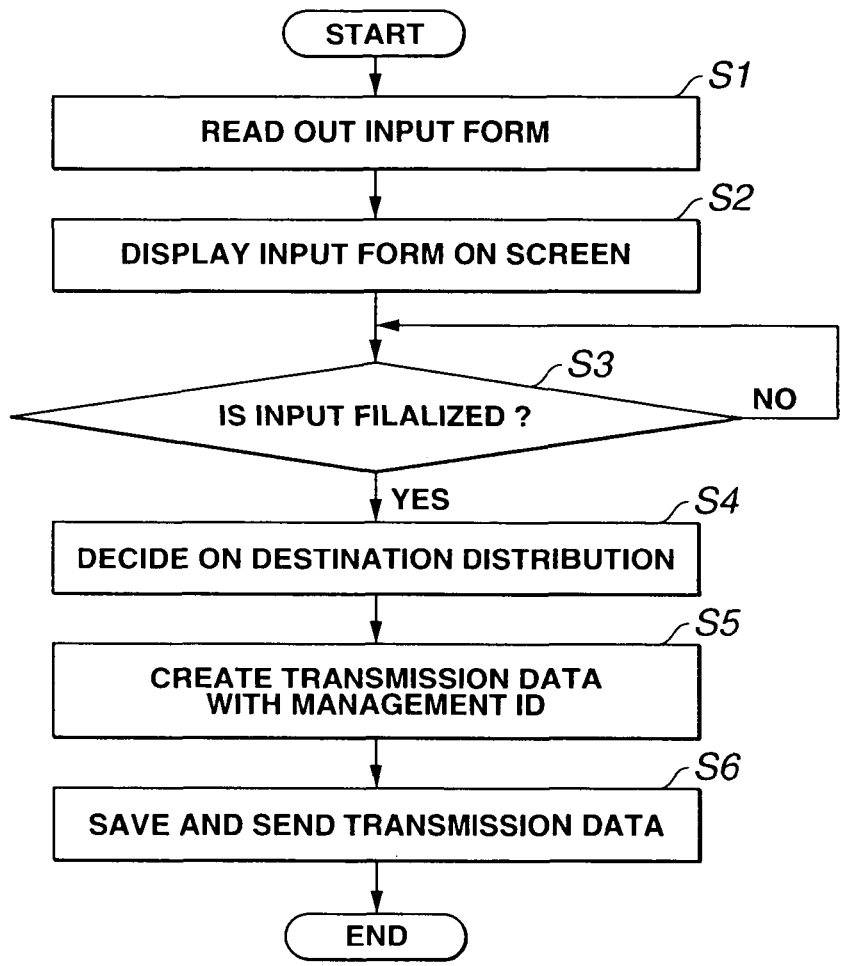
FIG. 8 is a flowchart showing an embodiment of a processing sequence in inputting the sponsorship request condition.

FIG. 8 shows an inputting processing sequence of sponsorship request in the device for inputting the sponsorship request conditions 20. When the execution of the application program for executing the function in question is commanded, the controller 20F causes the inputting form to be read out from the input form recording unit 20B (step S1). The application program is stored in a recording medium or a storage medium, not shown. The controller 20F expands the so read-out inputting form on the display controller 20A to output the input form in a preset signal format (data format) on the display means 20J. As a result, the inputting form is determined by the display-means 20J on the display picture (step S2).

The sponsor client, including an operator, checks the input items displayed, and sequentially inputs the project name, in need of sponsor, date and time of execution, sponsorship conditions, including the information on the commodities or services desired to be requested. During this time interval, the controller 20F gives a decision as to whether or not the inputting of the necessary minimum information has come to a close (step S3). Specifically, the controller verifies whether or not the transmission button 25J has been depressed to make the decision. That is, when the transmission button 25J has been depressed, the controller verifies that the inputting has become final. That is, an affirmative result is obtained as being the result of decision. If conversely the transmission button 25*j* has not been depressed, the controller verifies that the inputting has not become final. That is, a negative result is obtained as being the result of decision.

Alternatively, the decision may be effectuated only when the the transmission button 25J has been depressed. That is, it is verified whether or not the necessary minimum information has been input, with the actuation of the transmission button 25J as a trigger, and an affirmative result or a negative result may be produced when the necessary item has been entered or when there is any non-entered item, respectively.

When the affirmative result is obtained, the controller 20F affords the information pertinent to sponsorship request to the distribution destination specifying unit 20D to execute the processing of identifying the destination of distribution of the sponsorship request (step S4). When the destination of distribution is decided on by this processing, the controller 20F appends the management ID information to the information input using the inputting form to prepare transmission data (step S5). Subsequently, the controller 20F stores the transmission data prepared and distributes the data through the communication unit 20G. By this processing, the sponsorship request is distributed to a reasonable area of the sponsor business operators (registered members) ready to furnish the commodities or services.

(b) Response Result Receiving Device (b-1) Terminal Structure

Figure 9:
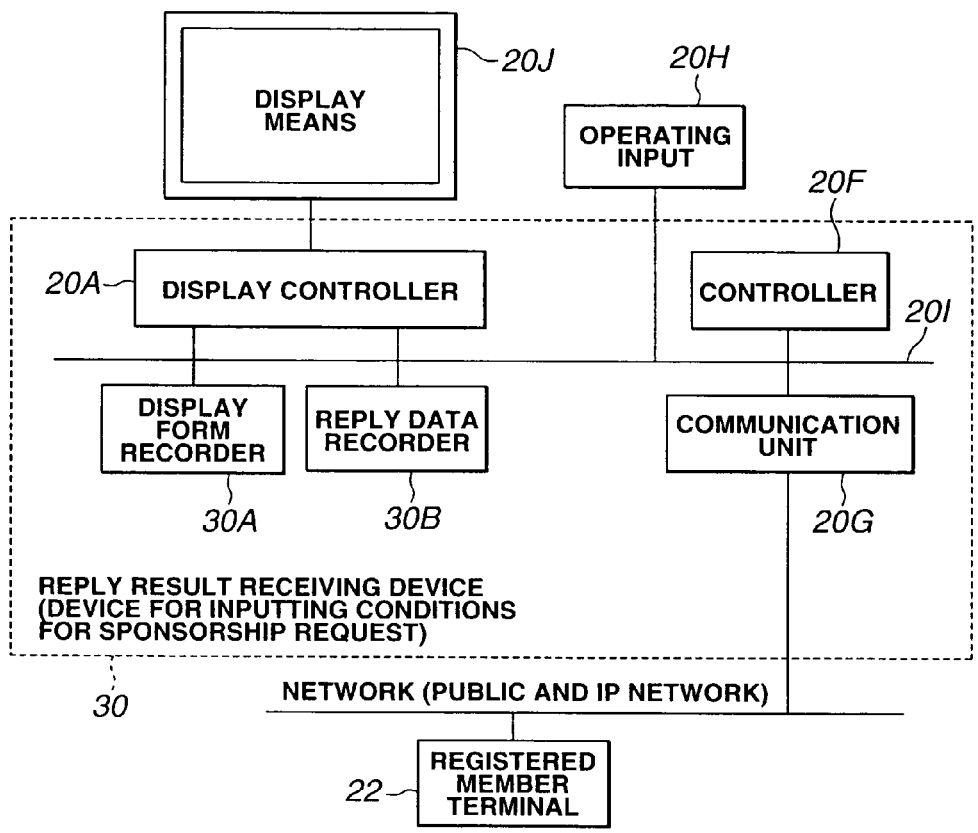
FIG. 9 is a functional block diagram showing an embodiment of a response result receiving device.

FIG. 9 shows an embodiment of a response result receiving device having the function of confirming the response data notified by the registered member conforming to the sponsorship request. Meanwhile, the response result receiving device is routinely implemented on the same terminal as that of the sponsorship request condition inputting device. So, the parts or components common to those shown in FIGS. 4 and 5 are depicted by the same reference numerals. FIG. 9 shows the case where the cross-sectional view support system is mainly made up by three parties, namely a sponsor client, a brokerage business operator and registered members.

The response result receiving device 30 includes a display controller 20A, a display form recording unit 30A, a response data recording unit 30B, a controller 20F, a communication unit 20G, an operating input unit 20H, a bus 20I and display means 20J. Although the display means 20J and the operating input unit 20H are provided outside the casing in FIG. 9, these may be provided within the casing, as the main body unit, as in the case of the device for inputting the sponsorship request conditions 20. Similarly, the various recording or communication units, provided in FIG. 9 within the casing, as the main body unit of the device, may be provided outside the casing.

The display form recording unit 30A is a recording medium or storage medium in which to record the display form of the response results. It is noted that the medium may also be used for recording or storage of other information, there being no necessity of using the medium solely for the display form of the response results. The medium may be exemplified by a CD-ROM, a magnetic recording medium, such as tape, floppy disc, hard disc or a magnetic card, an optical recording medium, such as write-once CD, DVD or optical card, a magneto-optical recording medium, such as DVD, MD or MO, a semiconductor memory, such as non-volatile memory or RAM.

The response form recorded will be explained later in detail. The response form may be pre-fixed on the medium, duplicated from other recording mediums or downloaded over communication network, such as Internet. The response form may be expanded on a video RAM provided in e.g., the display controller 20A.

The response data recording unit 30B is a recording or storage medium for recording data input through the operating input unit 20H for management purposes. Although a RAM is usually employed as this medium, any sort of the recording medium may be used provided that input data can be written therein. There is no necessity for the response data recording unit 30B to be used exclusively for recording input data. For example, the response data recording unit 30B may be realized with the medium which is physically the same as the display form recording unit 30A, using a recording area distinct from that for the display form recording unit. Meanwhile, the display form recording unit 30A and the response data recording unit 30B may be provided within the inside of the display controller 20A.

Meanwhile, in FIG. 9, the membership database 21 is not provided on the side sponsor client because it is here assumed that the sponsorship transaction support system is made up mainly by three parties. If the sponsorship transaction support system is made up mainly by two parties, the membership database 21 is provided on the side sponsorship client. In this case, the sponsorship request conditions etc. are recorded in the final form in the membership database 21 along with the management ID information for sponsorship request.

(b-2) Response Result Confirmation Form Picture

FIG. 10 shows an example of a response result confirmation form picture. Since the necessary minimum items in checking the response results to the sponsorship request are indicated in the response result confirmation form picture, the response results can be executed easily. Moreover, since the display items of the response results are demonstrated in the confirmation form, the response content can be managed readily. That is, for the client receiving many response content, it may be easier to compare the results of the response content or to grasp the content. In particular, since the sponsorship request may be expected to be made not only in the sponsorship transaction between different operators, but also between the operator and the consumer and between the individuals, the necessity for the above-mentioned interfacing technology is being felt keenly.

The confirmation form 31 of FIG. 10 has, as its display items, the names of responders 31A, the name of the client 31B, project name 31C, commodities or services that can be offered for sponsorship 31D, sponsorship conditions 31E to 31G, requested amount 31H and display columns 31I for the respective display items. There is also displayed a confirmed state indicating button 31J.

The client name 31B and the project name 31C are the information mainly used by the client in confirming the sponsorship request. The names of responders 31A and the commodities or services that can be offered for sponsorship 31D are useful in confirming the operator who has accepted the sponsorship request and to what the response has been made. In the sponsorship conditions 31E to 31G, the same information as that at the time of sponsorship request is usually displayed. Should any change be produced in this information, the display color is desirably changed by employing a corresponding function in combination. Meanwhile, when this function is to be implemented, it is sufficient if the sponsorship condition as held is compared to the sponsorship condition as received as to possible coincidence to send the result of decision to the display controller 20A or to the controller 20F.

In the amount requested 31H, the price requested by the business operator agreeing to the sponsor is displayed. Meanwhile, if this item only can be input by the registered members, condition comparison may be made easily in case plural responses are made to the same sponsorship request. When the sponsorship transaction is to be validated for the content of the above display item, it suffices to depress the confirmed state indicating button 31J.

(b-3) Response Result Data

Figure 11:
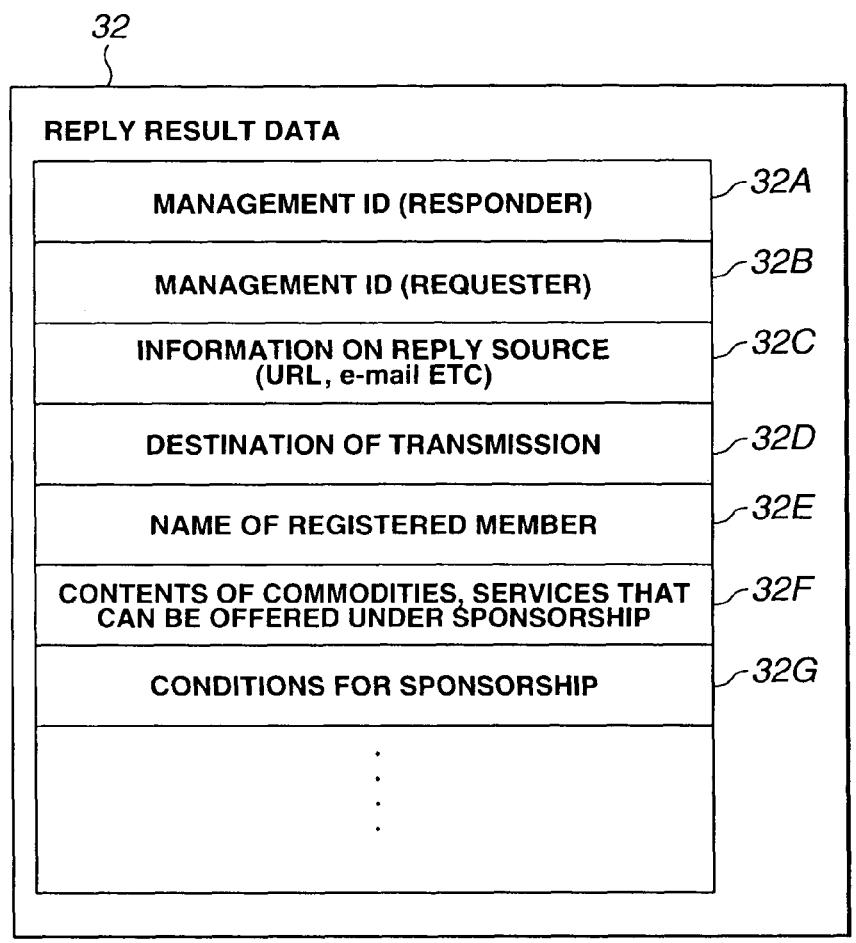
FIG. 11 shows an illustrative structure of response result data.

FIG. 11 shows an illustrative structure of response result data 32 transmitted from the terminal for registered members 22 to the response result receiving device 30.

The response result data 32 is made up by the management ID information (responder side) 32A, the management ID information (client side) 32B, a response source information 32C, a transmission destination information 32D, the name of the registered members 32E, content of commodities or services that can be offered for sponsorship 32F, sponsorship condition information 32G and other information.

The management ID information (responder side) 32A, appended by the registered member accepting the sponsorship request, is the identification information used not only by the registered member but also by the brokerage business operator or by the client receiving the response result for supervising the response result data. On the other hand, the management ID information (client side) 32B is the identification information used by e.g., the client receiving the response results in supervising the sponsorship request.

The response source information 32C, specifying the transmission source of the response result on the network, may be exemplified by URL, E-mail address or the telephone number. The transmission destination information 32D specifies the destination of transmission of the sponsorship request on the network. The information of the same sort as the response source information 32C is held in the transmission destination information. Meanwhile, the information stated in the data of the sponsorship request conditions 26 is used as the transmission destination information 32D.

In the name of the registered members 32E, the names of the registered members accepting the sponsorship request are entered. This information facilitates identification of the business operator accepting the sponsorship request. By recording the information as separate items, data re-arraying or extraction can be carried out readily. An entry into the content of commodities or services that can be offered for sponsorship 32F is made to permit the facilitated confirmation of the commodities or services with which the business operator transmitting the response result data agreed to the sponsor. The information corresponding to the desired conditions for sponsorship 26I is duplicated and entered in the sponsorship condition information 32G. It is noted that, if the registered member accepting the sponsorship request has made separate correction of the sponsorship conditions, the as-corrected information is recorded. In this case, the information indicating the fact of the correction made is desirably stored in combination.

(b-4) Processing Operations on Receipt of the Response Results

On confirming the receipt of the response result data, the controller 20F commands the execution of the application program for executing the function in question to cause the display form to be read out from the display form recording unit 30A. In this case, the application program is again stored in the recording or storage medium, not shown. On receipt of the response result data, the controller 20F causes the received response result data to be recorded in the response data recording unit 30B.

The controller 20F causes the response result data and the display form to be read out and routed to the display controller 20A to expand the information so read out in a display RAM provided in the display controller 20A. In case of non-coincidence of the read-in response result data with the item of the display form, the controller 20F specifies a site in which to embed the response result data. The information expanded on the display controller 20A is output to the display means 20J in a preset signal format (data format). As a result, the content of the response result data 32 is displayed as an overview on the display picture. If there are plural response result data 32, these may be displayed sequentially or simultaneously on one display picture.

When the content of the response result data are confirmed and the business operator who is to validate the sponsorship transaction is determined, the confirmed state indicating button 31J is operated on the display picture for the response result data received from the business operator. When a button for validating the sponsorship transaction is provided separately from the confirmed state indicating button 31J, the former is pressed. At any case, if the operation is finally determined by button actuation, the finally determined information is recorded on a recording medium, not shown, or in the response data recording unit 30B, whilst the fact of validation is registered in the membership database 21.

The fact of validation of the transaction is notified, either directly or indirectly, to the registered member for whom the sponsorship transaction has become valid. Preferably, the fact of non-validation of the sponsorship transaction is notified to the registered member(s) for whom the sponsorship transaction has not become valid.

Figure 12:
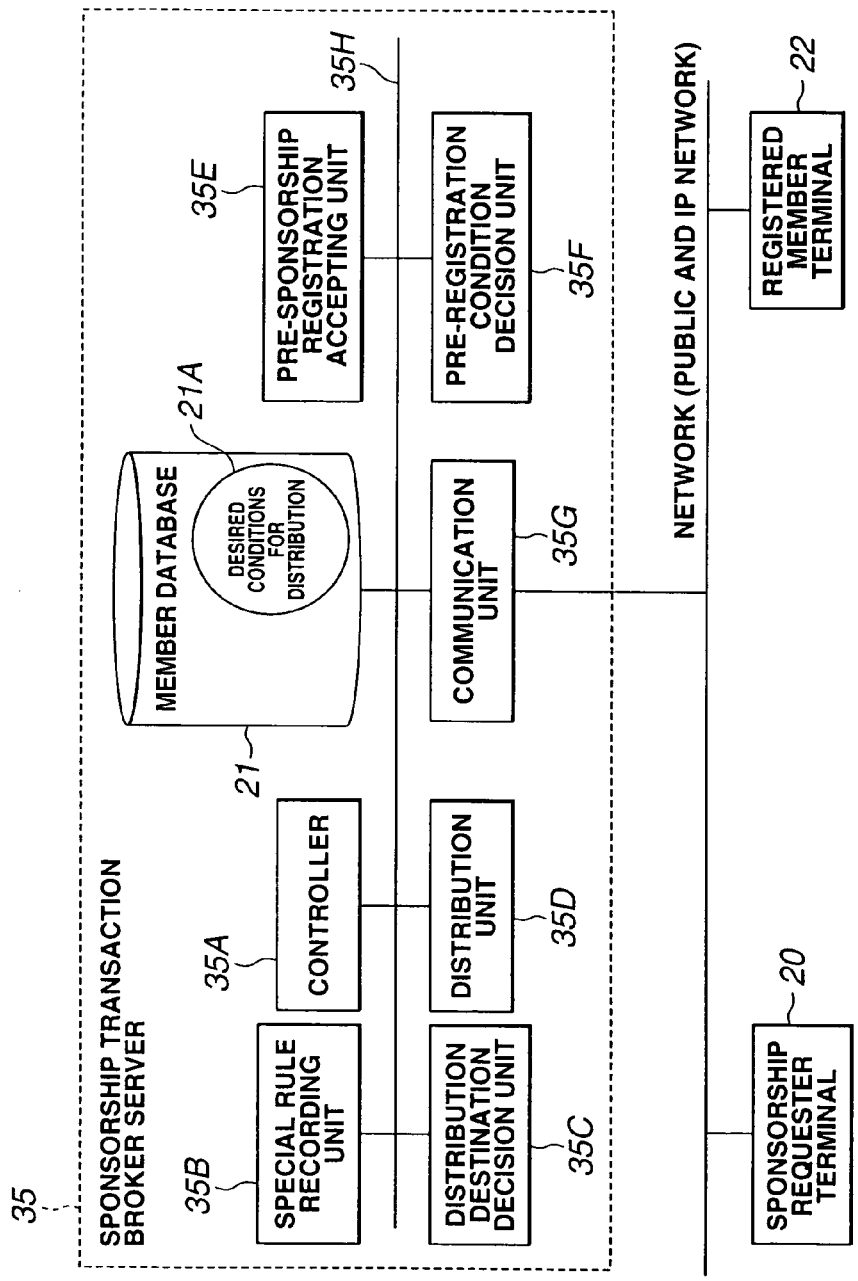
FIG. 12 is a functional block diagram showing an embodiment of a sponsorship transaction brokerage server.

(B-2) Terminal of the Sponsorship Transaction Brokerage Business Operator (a-1) Terminal Structure FIG. 12 illustrates an embodiment of a brokerage transaction brokerage server acting as a broker for sponsorship transaction. Meanwhile, the brokerage transaction brokerage server is used in case the sponsorship transaction support system is constructed by three parties, namely the sponsor client, brokerage business operator and registered members.

It is noted that the membership database 21 in FIG. 12 is the same as the membership database 21 used in the explanation on the device for inputting the sponsorship request conditions 20. In the case of FIG. 12, the membership database 21 is provided within the casing of a sponsorship transaction brokerage server 35. However, it is naturally not mandatory to provide the membership database in the same casing as that of the main body unit. For example, the membership database may be provided on the network. It is sufficient if a sole system is virtually constructed over a network. The same holds for other functional units. The network may be wireless, instead of being a cable network.

The sponsorship transaction brokerage server 35, shown in FIG. 12, is made up by a controller 35A, a specifying rule recording unit 35B, a distribution destination specifying unit 35C, a distributing section 35D, a sponsor pre-registration accepting unit 35E, a pre-registration condition decision unit 35F, a communication unit 35G and a bus 35H. Meanwhile, this construction is used when the brokerage business operator decides on the destination of distribution of the sponsorship request. If the decision on the destination of distribution of the sponsorship request is to be made at the client terminal, the sponsorship transaction brokerage server is made up by the controller 35A, membership database 21 and the communication unit 35G. The construction of various components is hereinafter explained.

The controller 35A represents means for controlling various components making up the sponsorship transaction brokerage server 35. In general, the controller is of the microcomputer configuration. The functions of the controller 35A are usually prescribed by the operation system program and by the application program. In the present embodiment, the sponsorship transaction brokerage server 35 also executes the processing of registering the responses to the sponsorship request sent from the registered members in the membership database 21 and the processing of accepting the sponsor client.

Meanwhile, a dedicated processor for executing the functions, that is, a response result data receiver for receiving the response to the sponsorship request, a response result data registration unit for registering the response result data in the membership database 21 and a response result data transmitter for sending the response result data to a destination of transmission entered in the data, may be used. It is to be noted that these functions are implemented as the functions of the controller 35A. Additionally, the server also performs the processing operation of registering the information on the finally determined sponsorship transaction in the membership database 21.

The specifying rule recording unit 35B is equivalent to the specifying rule recording unit 20E of the device for inputting the sponsorship request conditions 20 (FIG. 4). On the other hand, the distribution destination specifying unit 35C is equivalent to the distribution destination specifying unit 20D of the device for inputting the sponsorship request conditions 20 (FIG. 4). Consequently, the foregoing explanation on the specifying rule recording unit 20E and the distribution destination specifying unit 20D is valid for the specifying rule recording unit 35B and the distribution destination specifying unit 35C, respectively.

The specifying rule recorded in the specifying rule recording unit 35B is assumed to be that created or edited by the brokerage business operator. In this case, the intention of the brokerage business operator can be reflected in the area of distribution of the sponsorship request. By and large, the information concerning the state of response and the tendency to agreement conclusion for the past area of distribution is stored in the brokerage business operator, and hence the area of distribution may be expected to be optimized. It is noted that the specifying rule may be that created or edited on the part of the sponsorship client, in which case the client's intention may be reflected in the area of distribution of the sponsorship request.

The distribution destination specifying unit 35C retrieves the membership database 21 based on the specifying rule recorded in the specifying rule recording unit 35B to implement the function of identifying the registered member having to do in some way or directly with the sponsorship request. In this case, the membership database 21 may be retrieved by the distribution destination specifying unit 35C directly controlling the membership database 21, or by sending only the necessary information to the membership database 21 to receive only the retrieved results.

Meanwhile, in the case of FIG. 12, the pre-registration condition decision unit 35F is present in the sponsorship transaction brokerage server 35, such that the decision processing needs to be executed prior to the processing of specifying the destination of distribution. So, the operation on receipt of the sponsorship request partially differs from the foregoing explanation. The operation on receipt of the sponsorship request will be explained subsequently.

The sponsor pre-registration accepting unit 35E and the pre-registration condition decision unit 35F represent means operating so that, when the intention of the business operator requesting the sponsor is in keeping with that of the responding business operator, the transaction with the two business operators is preferred to transactions between other business operators. By the way, the processing of specifying the destination of distribution based on the specifying rule represents means for optimizing the area of distribution of the sponsorship request. The sponsor pre-registration accepting unit 35E and the pre-registration condition decision unit 35F may be provided in the device for inputting the sponsorship request conditions 20.

The sponsor pre-registration accepting unit 35E represents means for pre-registering, in the membership database 21, the conditions desired when the registered member willing to accept the sponsorship request accepts the sponsorship request. By and large, the content of the registration need not be identical with but may be completely equated to the sponsorship request conditions input by the device for inputting the sponsorship request conditions 20. The information for registration will be explained subsequently.

The pre-registration condition decision unit 35F is information processing means for implementing the function of verifying or retrieving, on receipt of the sponsorship request, and prior to decision on the destination of distribution of the sponsorship request, whether or not there is any registered member who has registered the condition satisfying the sponsorship request in question. The pre-registration condition decision unit 35F is configured for retrieving the membership database 21 based on the sponsorship request received through the communication unit 35G to verify the possible presence of the pre-registration information which accords with the conditions of the sponsorship request.

The decision here is basically the coincidence detection. As for sponsorship conditions that can be expressed quantitatively, for example, the amount requested or quantity, the pre-registration information in meeting with the sponsorship request conditions is deemed to be present in case the conditions are more favorable to the client than the sponsorship condition, for example, in case the amount requested is lower than the amount stated in the sponsorship request, or in case the quantity is larger than that stated in the sponsorship request. If the number of the requirements of the sponsorship request received is larger than that of the sponsorship condition registered, a decision is given that the sponsorship request conditions are met when the requirements of the sponsorship request are met as concerns the registered requirements.

When there is any registered member meeting the sponsorship request, the pre-registration condition decision unit 35F notifies both the registered member in question and the sponsorship client that there are the counterparties who are in meeting with the two without executing the processing of identifying the destination of distribution. In this case, the conditions requested by the counterparties are notified. If the number of the registered member satisfying the sponsorship request is singular, it is theoretically possible to assume that the transaction has been concluded at this time point. However, since this is the result of mechanical detection of coincidence, the sponsorship transaction is desirably concluded subject to agreement between the two parties advised of the fact of the coincidence detection. Conversely, when there is no registered member satisfying the sponsorship request, the pre-registration condition decision unit 35F operates for sending the received sponsorship request to the distribution destination specifying unit 35C.

Similarly to the control unit 20G in the device for inputting the sponsorship request conditions 20, the communication unit 35G represents means for communication with outside over the network. So, a communication equipment conforming to the network is used as the communication unit 35G. The types of the networks usable are as described above. The communication unit 35G may be mounted externally, instead of being enclosed, as shown in FIG. 12. The sponsorship request and the response from the registered member etc. are transmitted over this communication unit 35G. The communication unit may also be used for communication with the membership database 21, as necessary.

The bus 35H is a data input/output bus, and may be exemplified by, for example, an ISA bus, a EISA bus and a PCI bus. Although the operating input unit or the display means are not shown in FIG. 12, there are provided components equivalent to the operating input unit 20H and the display means 20J of FIG. 4.

The membership database 21 and the desired conditions for distribution 21A will be explained separately later in detail. Meanwhile, the sponsorship transaction brokerage server 35, shown in FIG. 12, may be exemplified by computer terminals, such as notebook or desktop personal computers, PDA, portable telephone sets, game machines, set top boxes, PC cards, domestic electrical utensils, VTR, television receivers, car navigation systems, wrist watches having the information processing functions, distribution terminals for music or games, financial terminals (ATM) etc., in addition to the so-called dedicated terminals.

(a-2) Membership Database

FIG. 13 shows an illustrative data structure of the membership database 21. The membership database 21 is made up of storage means, comprised of a large capacity recording or storage medium, a communication unit for having communication with outside, and a controller supervising the entire system, such as a computer system comprised of a microprocessor, RAM, ROM, and an input/output unit. The large-capacity recording medium may be exemplified by a magnetic disc, such as a hard disc, a magneto-optical disc, such as MO, an optical disc, such as DVD and a semiconductor memory.

The membership database 21 is made up of desired conditions for distribution 21A, management information 21B to 21L, goods-related information 21M to 21R, service-related information 21Q to 21S, conditions under which the sponsorship request 21T is responded to, and other information. There may be a system in which the desired conditions for distribution 21A are not registered. In a system adapted for registering the desired conditions for distribution 21A, it is up to discretion of the sponsor business operator whether or not the information in question is to be registered.

In the following explanation, such a system is presupposed which registers the desired conditions for distribution 21A. The desired conditions for distribution 21A represent the information corresponding to the content of the sponsorship request distributed and which are pre-registered by the registered members (sponsor business operators) as the recipients of the sponsorship request. For example, the information on the commodities or services that can be offered for sponsorship, the information specifying the sponsorship client, time (time of furnishment or execution etc.) or place (place of furnishment or execution, place of residence of the counter-party etc.) is registered.

The desired conditions for distribution 21A operate as the requirements for further narrowing the area of distribution as specified by the general registration information (such as management information, goods-related information or the service-related information) rather than as specified sponsor accepting requirements pertinent to the individual commodities or services as under the conditions 21T under which the sponsorship request is accepted. Meanwhile, the general registration information is pre-registered by the registered members or by the brokerage business operator.

The management information may be exemplified by the management ID information 21B, registration date information 21C, updating date information 21D, registrant name information 21E, business sort information 21F, place of residence information 21G, telephone number 21H as the contact site information, mail address information 21I, URL information 21J, GPS information 21K, mail number information 21L etc.

The management ID information 21B is the information for specifying a sequence of the information. The registration date information 21C and the updating date information 21D represent the data management information. The registrant name information 21E is the name of the registered member as an entity of the sponsorship transaction. The business sort information 21F is the recorded information concerning the main business sorts of the registered members. This information operates as an index in specifying the area of distribution of the sponsorship request. In general, it is the registered member that makes this registration. However, the brokerage business operator sometimes makes this registration. The place of residence information 21G generally records the information concerning the place of residence of the main office and branch offices to which belong staff members in charge of the processing of the sponsorship transaction. This information also operates as an index in specifying the area of distribution of the sponsorship request.

The telephone number 21H is the information used by the brokerage business operator and the sponsorship request in making a telephone call. The mail address 21I is used as the address information for making sponsorship request or the relevant communication over the network. The URL information 21J is the information for the registered member to access the information laid open by the registered members. The GPS information 21K is used for displaying the information pertinent to the place of residence or the site of furnishment on an electronic map. This information may also be used as an index in specifying the area of distribution of the sponsorship request. The information may be registered as a site of destination in the car navigation system to visit the counterparty. The mail number 21L is also effective as the information used for narrowing the site of residence etc.

The goods-related information and the service-related information are individually registered for what the registered member is willing to supply or the goods handled by the registered member. That is, when there are plural goods or services to be registered, a number of sets of the information corresponding to the number of the commodities or services in question are recorded. As the goods-related information, the information on the site of furnishment of the commodities or services 21M, the information on the classification of the commodities handled 21N, the information on the names of the commodities handled 21O or the information on the names of producers 21P etc. are recorded. As the service related information, the information on the site of furnishment 21Q, the information on the code of services handled 21R and the information 21S on the names of services handled, are recorded.

As the site information for furnishing the commodities or services, the information associated with individual commodities or services is recorded. The information on the classification of the commodities handled 21N or the information on the code of services handled 21R represents the information beneficial to processing on the computer and is desirably appended on the basis of a unified standard, such as JIS. As the information on the code of services handled 21R and the information 21S on the names of services handled, the trademarks used by the registered members furnishing the commodities or services, for example, are recorded. However, the generic appellation of the commodities or services may also be used. The name of the producer 21R is the information on the producer. Although the information associated with services is not registered, the name of the party directly furnishing services is recorded in case the registered member is the party acting as intermediary for the services.

The conditions under which the sponsorship request is accepted 21T represent the information for the registered member to register specified conditions in case the registered member accepts the sponsorship request relevant to specified commodities or services. This information is the information registered by the sponsor pre-registration accepting unit 35E and referenced by the pre-registration condition decision unit 35F who has received the sponsorship transaction. As aforesaid, the conditions under which the sponsorship request is accepted 21T are usually registered for items similar to the input items of the sponsorship request.

(a-3) Processing Operation

The content of the brokerage operations executed by the sponsorship transaction brokerage server is hereinafter explained for respective cases. In the following explanation, the sponsorship transaction brokerage server 35 is assumed to have the structure shown in FIG. 12.

(1) On Pre-Registration of the Sponsorship Conditions

On receipt from the terminal for registered members 22 of a notice having the conditions under which to accept the sponsorship request as data content, the controller 35A sends the notice to the sponsor pre-registration accepting unit 35E. The sponsor pre-registration accepting unit 35E retrieves the membership database 21, with the information of the registered member who issued the notice as the clue to add the conditions under which to accept the sponsorship request 21T as the registration information of the relevant registered member. This addition of the information is carried out for each individual commodity and service. The information may also be individually deleted on notification from the registered member. By employing the information, the registered member is able to set the condition adapted to the market status. It is however up to the registered member whether the information is to be used for short-term transaction purposes or for long-term purposes.

(2) On Receipt of Sponsorship Request

Figure 14:
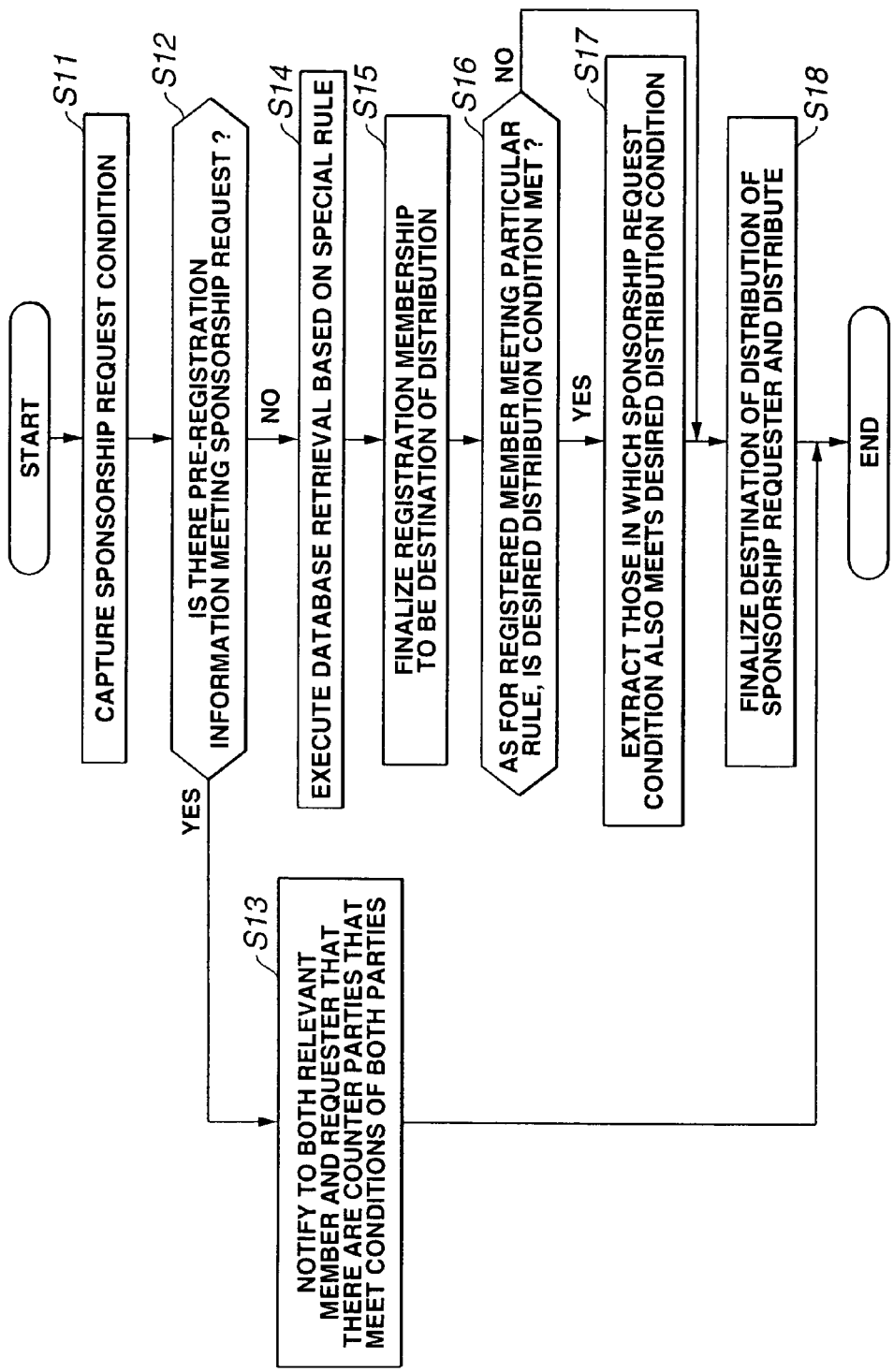
FIG. 14 is a flowchart showing a typical processing sequence on receipt of a sponsorship request.

FIG. 14 shows the processing sequence executed in case the sponsorship transaction brokerage server 35 receives the sponsorship transaction. On ascertaining the receipt of the sponsorship request from the sponsorship client, the controller 35A captures the sponsorship request conditions of the sponsorship request in a storage area, such as RAM, not shown, while notifying the receipt of the sponsorship request to the pre-registration condition decision unit 35F (step S11).

The pre-registration condition decision unit 35F verifies whether or not there are those conditions in meeting with the content of the sponsorship request among the conditions 21T which are registered in the membership database 21 and under which the sponsorship request is accepted (step S12). If there is one or more pre-registered information that is in meeting with the sponsorship request, the affirmative results are obtained, so that the processing transfers to step S13. If there is no pre-registered information that is in meeting with the sponsorship request, a negative result is obtained, so that processing transfers to step S14. It is noted that the negative result is obtained in case the conditions which are in meeting with the sponsorship request 21T are registered for none of the registered members.

When the processing has transferred to step S13, the pre-registration condition decision unit 35F notifies to both the registered member who has pre-registered the conditions which are in meeting with the sponsorship request and the client who issued the sponsorship request that the counter-parties are present who are able to meet the conditions of the opposite side parties. This notice is made through the communication unit 35G. The processing operations in case the sponsorship transaction is finally determined for the notification will be explained subsequently.

When the processing transfers to step S14, the processing operation is transferred from the pre-registration condition decision unit 35F to the distribution destination specifying unit 35C. The processing operations in the distribution destination specifying unit 35C, now explained, similarly apply in case the function is provided at a terminal of the sponsorship client. The distribution destination specifying unit 35C reads out the specifying rule used for specifying the destination of distribution from the specifying rule recording unit 35B to retrieve the membership database 21 based on the so read-out specifying rule. The distribution destination specifying unit 35C then executes retrieval on the generic registration information (management information, goods-related information and service-related information) from among the information registered in the membership database 21.

So, the distribution destination specifying unit 35C finally determines the registered members to whom the sponsorship request is to be distributed (step S16). Usually, the registered members in meeting with the specifying rule are extracted as the destination of distribution of the sponsorship request. If there is no registered member in meeting with the specifying rule, the totality of the registered members registered in the membership database-21 are finally determined as the destination of distribution of the sponsorship request.

The distribution destination specifying unit 35C verifies whether or not the desired conditions for distribution 21A have been registered for the registered members finally determined as the destination of distribution (step S16). When the affirmative result is obtained, that is when there exist the desired conditions for distribution 21A, the distribution destination specifying unit 35C verifies whether or not the sponsorship request also meets the desired conditions for distribution 21A registered by the respective registered members. The distribution destination specifying unit extracts only the members in meeting with the desired conditions for distribution 21A (step S17). If conversely the negative result is obtained, that is if there are no desired conditions for distribution 21A, the distribution destination specifying unit 35C skips the step S17. That is, since there is no reason for not distributing the sponsorship request to the registered member(s) who satisfy the above condition, the registered member(s) is finally determined at this stage to be comprised within the area of distribution.

When the ultimate area of distribution is finally determined, the distribution destination specifying unit 35C distributes the sponsorship request to the finally determined registered member(s) (step S18). At this time, the distribution destination specifying unit 35C notifies the presence of the information using the mail address information 21I registered in the membership database 21. It is noted that, if the fax number is registered, call may be made by fax. The above completes the processing of distributing the sponsorship request.

(3) On Receipt of the Response Result Data

On receipt of a notice having as data content the reply result for sponsorship request from the registered member who has received the sponsorship request, the controller 35A causes the content of the notice to be registered in the membership database 21. It is noted that there are two responses, namely the response agreeing to the sponsorship and the response not agreeing to the sponsorship. This registered information may be used in specifying the destination of distribution for subsequent sponsorship requests. For example, if the response results to similar sponsorship request indicate non-agreement to the sponsorship, the registered member(s) who made the response may be omitted from the group of the succeeding destination of distribution.

Since it may be probable that the previous sponsorship was only fortuitously not agreed to, such omission is desirably made only in such case where there is annexed the information to the effect that distribution of the sponsorship request of the same sort is not henceforth desired by the registered members, in order to make much of the goodwill on the part of the registered members.

The controller 35A selectively sends the affirmative response results to the client. The controller 35A at this time transmits data based on the information on the destination of transmission annexed to the response result data 32 or the liaison site information of the sponsorship request as specified from the management ID information. It is noted that, at this time point, plural response result data 32 are transmitted to the sponsorship request.

(4) On Receipt of the Notification of Registered Results

On receipt from one or both of the terminal of the sponsorship request 20 and the terminal for registered members 22, indicating the conclusion of the finally determined sponsorship transaction, as data content, the controller 35A registers the content of the notification in the membership database 21.

This registration information is used for specifying the area of distribution of the next and following sponsorship transactions or as the management information for the project as the object of sponsor. For example, when the subject-matter of the sponsorship is the creation of the picture program, the registered information may be furnished as data ancillary to the program to the program producer. Since the data can be extracted, the utilization efficiency of the information in question may be improved. That is, such a wasteful incidence may be evaded in which data of the same content as viewed from the entire system is input a number of times at different time points or places.

Thus, the membership database 21 not only is valuable for sponsorship transaction but also serves as a beneficial information source in business transactions and for various projects. Meanwhile, if the data readout from the membership database 21 is chargeable, it is possible to collect the fee needed in the inputting or management.

Meanwhile, as the data fetching method from the membership database 21, transmission paths, wired or wireless, may be used, or a recording medium may be used. The recording medium may be enumerated by, for example, magnetic recording type medium, such as tapes, floppy discs, hard discs or magnetic cards, optical recording mediums, such as write-once CD, DVD or optical cards, mediums of the magneto-optical disc type, such as DVD, MD or MO, and semiconductor memories.

(B-3) Registered Member's Terminal

In the case of constructing the sponsorship transaction support system, the functions directly relevant to the sponsorship transaction, such as the functions of receiving the sponsorship request and transmitting the response of the registered members to the received sponsorship request, and the function for registration necessary for receiving the distributed sponsorship request, are required of the terminal of the registered member. In actuality, these functions are implemented in a majority of cases in one terminal. The following explanation is, however, made individually for clarifying the technological elements necessary for executing respective functions.

(a) Device for Receiving the Sponsorship Request (a-1) Terminal Structure

Figure 15:
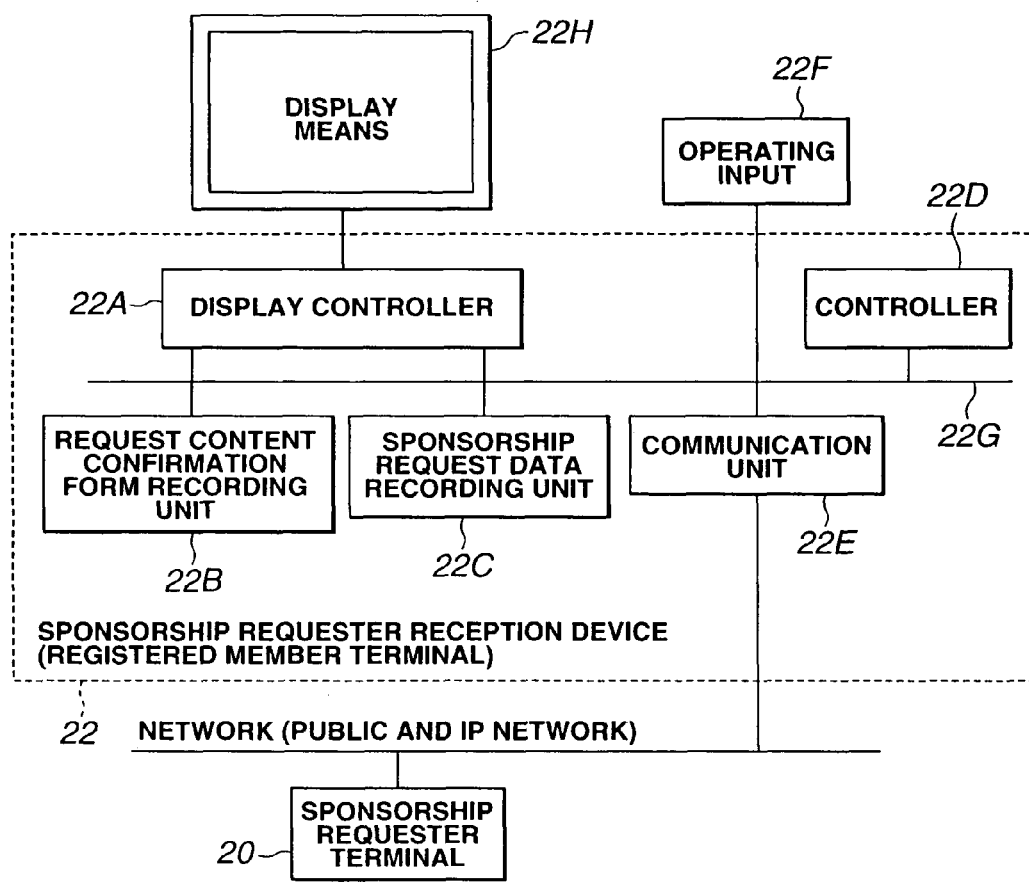
FIG. 15 is a functional block diagram showing an embodiment of a sponsorship request receiving device.

FIG. 15 illustrates an embodiment of a sponsorship request receiving device 22 having the function of receiving the sponsorship request and the function of accepting the request. The sponsorship request receiving device 22 includes a display controller 22A, a request content confirmation form recording unit 22B, a sponsorship request recording unit 22C, a controller 22D, a communication unit 22E, an operating inputting unit 22F, a bus 22G and display means 22H.

In FIG. 15, the display means 22H and the operating inputting unit 22F are shown connected outside the main body unit of the device. However, the operating inputting unit and the display means may also be connected as one to the main body unit of the device, as in the case of a notebook personal computer, a PDA and a portable telephone set. Although the recording unit and the communication unit are shown enclosed in the main body unit, these may also be connected to outside the main body unit. In the case of the external connection, connection may be wired or wireless. The structures of the respective functional units are hereinafter explained.

Similarly to the display controller 20A, the display controller 22A is means for reproducing and outputting the received or reproduced video data in a signal format (data format) complying with the display means 22H. As for the signal format and the decoding functions of the display controller 22A, what has been said of the display controller 20A applies.

The request content confirmation form recording unit 22B is a recording or storage medium for recording the confirmation form used for displaying the content of the sponsorship request. However, the medium may be used simultaneously for recording or storing other information without being used exclusively as an inputting form for sponsorship transaction. The medium may, for example, be a CD-ROM, a magnetic recording type medium, such as tape, floppy disc, hard disc or a magnetic card, an optical recording medium, such as write-once CD, DVD or optical card, magneto-optical recording type medium, such as DVD, MD or MO, and semiconductor memory, such as non-volatile memory or RAM.

The inputting form recorded will be explained later in detail. The inputting form may be pre-fixed on the medium, duplicated from other recording mediums or downloaded over a communication network, such as Internet. The inputting form may be expanded on a video RAM provided in e.g., the display controller 20A.

The sponsorship request recording unit 22C is a recording or storage medium for recording the sponsorship request condition data 26 received from the communication unit 22E. Meanwhile, the sponsorship request condition data and other information exchanged in connection with the sponsorship transaction may be data composed only of data shown in FIG. 7, data stating the layout information (style sheet), as is the HTML (Hypertext Markup Language) file, or the XML (Extensible markup Language) file, in which the layout information (style sheet) is isolated from data.

The controller 22D is means for controlling various components making up the sponsorship request receiving device 22 and for executing signal processing, and is generally of the micro-computer configuration. The functions of the controller 22F are usually prescribed by the operation system program and by the application program.

Similarly to the communication unit 20G of FIG. 4, the communication unit 22E is means for having communication with outside over a network. The network to be used is as described above with reference to FIG. 4. The operating inputting unit 22F is similar to the operating inputting unit 20H of FIG. 4, while the display means 22H is similar to the display means 20J of FIG. 4.

The sponsorship request receiving device 22 may be formed by computer terminals, such as notebook or desktop personal computers, PDA, portable telephone sets, game machines, set top boxes, PC cards, domestic electrical utensils, VTR, television receivers, car navigation systems, wrist watches having the information processing functions, distribution terminals for music or games, financial terminals (ATM) etc., in addition to the so-called dedicated terminals.

(a-2) Confirmation Form Picture

FIG. 16 shows an example of a sponsor content confirmation form. If this confirmation form is used, the necessary minimum items in verifying whether or not the sponsorship transaction is to be made may be presented in accordance with preset rule, so that the sponsor content can be confirmed and managed extremely readily. In particular, if the registered member receives a large quantity of sponsorship requests, it becomes possible to standardize the judgment. Moreover, as a result of the standardized items of confirmation, there may be provided a system convenient to use not only in sponsorship transaction among different operators, but also in sponsorship transaction between operators and individuals and between individuals without regard to the age groups or sex of the users.

A confirmation form 36 shown in FIG. 16 includes, as display items, a client 36A, a project name 36B, date and time of execution 36C, project content 36D, a target 36E, desired sponsorship conditions 36F to 36H, desired amounts 36I and detailed information columns 36I corresponding to the display items. In the display picture, there are indicated a button 36K operated when the sponsorship request is accepted, that is not agreed to, and a button 36L operated when the sponsorship request is not accepted, that is not agreed to.

In the columns 36I of the detailed information associated with respective display items, the corresponding information in the sponsorship request condition data 26 received as the sponsorship request is duplicated and displayed. For example, in the case of FIG. 16, it may be seen that the client is [A-I-U Broadcasting Company], with the project name being [Television Program ABCD]. It may also be seen that the date and time of execution is [aired as from 2001, Jan. 3, 21:00 until 22:00], with the project name being [what is likely to be in vogue] and the target being [bachelor]. In the case of FIG. 16, the material collecting time is 2000 November, with the desired amount being 0 yen (free of charge).

When such sponsorship request is agreed to, the sponsor business operator, inclusive of its staff members, acts on (clicks) the button 36K. At this time, the response result data 32 shown in FIG. 11 is transmitted from the sponsorship request receiving device 22 to the brokerage business operator or to the sponsorship client. If the sponsorship request is not agreed to, the sponsor business operator acts on the button 32L. At this time, response result data, comprised of data stating non-agreement to the sponsorship request, is transmitted from the sponsorship request receiving device 22 to the brokerage business operator or to the sponsorship client.

If the number of the display items of the request content confirmation form 36 is lesser than that of the sponsorship request condition data received, the tenor to the effect that some of the information is not displayed is demonstrated on the display picture so that all information can be confirmed through other routes.

(a-3) Processing Operations

When the sponsorship request condition data 26 is received, the controller 22D displays the information contained in the data on the display picture based on the request content confirmation form 36 stored in the request content confirmation form recording unit 22B. Meanwhile, if the request content confirmation form 36 is included in the sponsorship request condition data 26, the information is displayed using the confirmation form. The request content confirmation form 36 may be inseparably unified to the sponsorship request condition data 26, or may be contained therein separately and independently.

If the staff members of the business operator confirm the content of the sponsorship request on the display picture and feel that the sponsorship request may be agreed to, the staff members input the effect of agreeing to the sponsor through e.g., an icon indicated on the display picture. The intention to agree to the sponsor is returned from the controller 22D to the network. If otherwise, the staff members input that effect through e.g., an icon indicated on the display picture. This intention of not agreeing to the sponsor is returned from the controller 22D to the network.

(b) Registration Information Inputting Device (b-1) Terminal Structure

Figure 17:
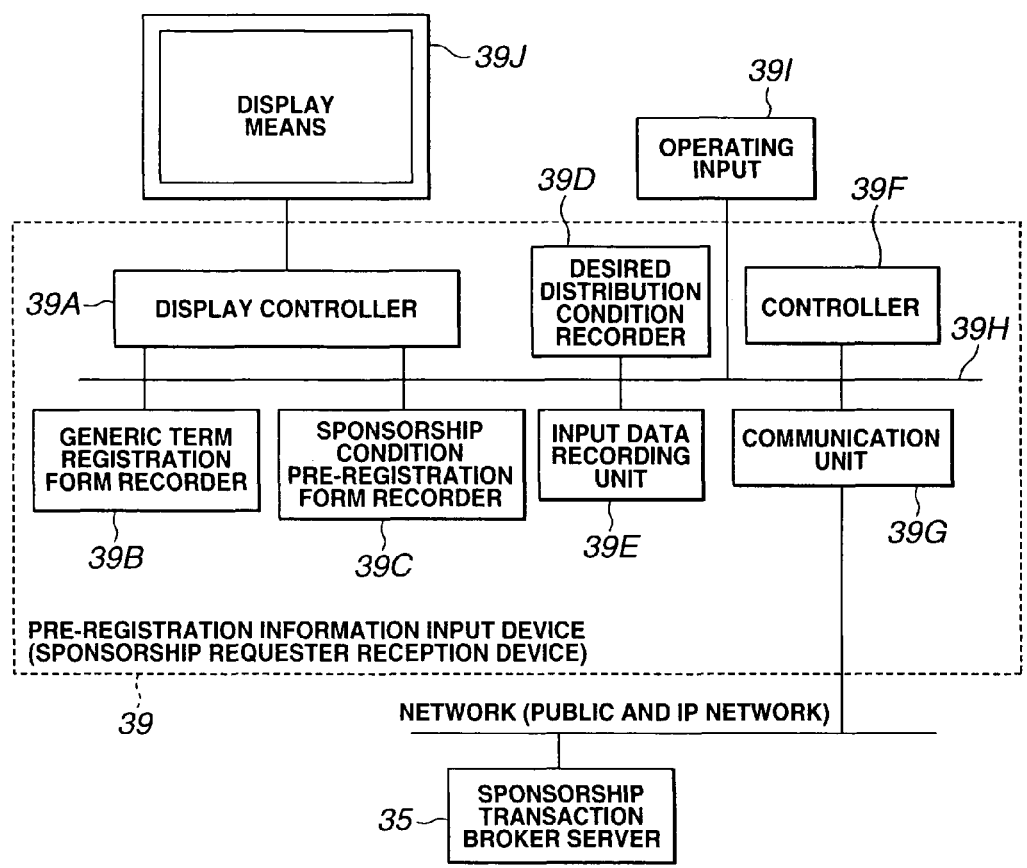
FIG. 17 is a functional block diagram showing an embodiment of an advance registration information inputting device.

Referring to FIG. 17, am embodiment of a pre-registration information inputting device 39, having the functions of registration necessary to receive the sponsorship request distributed, is now explained. The pre-registration information inputting device 39 includes a display controller 39A, a general item registration form recording unit 39B, a sponsorship condition pre-registration form recording unit 39C, a desired distribution condition recording unit 39D, an input data recording unit 39E, a controller 39F, a communication unit 39G, a bus 39H, an operating input unit 39I and display means 39J.

In the case of FIG. 17, the display means 39J and the operating input unit 39I are shown externally connected to the main body unit of the device. However, the operating input unit and the display means may be unified to the main body unit, as in the case of the notebook personal computer, a PDA or a portable telephone set. Additionally, the recording and communication units, shown enclosed in the main body unit, may be connected externally of the main body unit. In the case of the external connection, connection may be wired or wireless. The structures of the respective functional units are hereinafter explained.

Similarly to the above-described other display controllers, the display controller 39A is means for reproducing and outputting the received or reproduced video data in a signal format (data format) complying with the display means 22H. The same applies for the signal format and the decoding functions of the display controller 39A.

The general item registration form recording unit 39B is a recording or storage medium for recording the registration form relevant to general registration information recorded on the membership database 21, such as management information, goods-related information or service-related information. However, the medium may be used simultaneously for recording or storing other information without being used exclusively as registration form. The medium may, for example, be a CD-ROM, a magnetic recording type medium, such as tape, floppy disc, hard disc or a magnetic card, an optical recording medium, such as write-once CD, DVD or optical cards, magneto-optical recording type medium, such as DVD, MD or MO, and a semiconductor memory, such as non-volatile memory or RAM.

The registration form recorded will be explained later in detail. The registration form may be pre-fixed on the medium, duplicated from other recording mediums or downloaded over a communication network, such as Internet. The registration form may be expanded on a video RAM provided in e.g., the display controller 39A.

The sponsorship condition pre-registration form recording unit 39C is a recording or storage medium for recording a registration form used for pre-registering the condition for sponsor business operators to agree to the sponsorship in the membership database 21. This medium may again be used simultaneously for recording or storing other information without being used exclusively as registration form. Specified examples of the medium are similar to those of the general item registration form recording unit 39B.

The registration form recorded will be explained later in detail. The registration form may be pre-fixed on the medium, duplicated from other recording mediums or downloaded over communication network, such as Internet. The registration form may be expanded on a video RAM provided in e.g., the display controller 39A.

The desired distribution condition recording unit 39D is a recording or storage medium for recording the requirements for further narrowing the area of distribution specified by the information on the general registration. This medium may again be used simultaneously for recording or storing other information without being used exclusively for recording the desired conditions for distribution. Specified examples of the medium are similar to those of the general item registration form recording unit 39B.

Although the registration form recording unit for the desired conditions for distribution is not shown in FIG. 17, it is possible to use the registration form for inputting the desired conditions. In such case, it suffices if a registration form similar to the sponsorship request condition pre-registration form is used. Meanwhile, the desired conditions for distribution are registered by the sponsor business operator, inclusive of its staff members, using the operating input unit 39I.

The input data recording unit 39E is a recording or storage medium for recording data input through the operating input unit 39I. For this medium, what has been said for the above-mentioned mediums applies. That is, this medium may again be used simultaneously for recording or storing other information without being used exclusively for recording the input data. Specified examples of the medium are similar to those of the general item registration form recording unit 39B.

The controller 39F is means for executing the control or signal processing of respective parts making up the pre-registration information inputting device 39 and is generally of the micro-computer configuration. The functions of the controller 35A are usually prescribed by the operation system program and by the application program.

The communication unit 39G is means for communication with outside over a network. So, communication equipment that is in keeping with the network is used. The network to be used is as described above. The bus 39H is a data input/output bus and may, for example, be an ISA bus, an EISA bus, a PCI bus etc.

The operating input unit 39I is used for inputting the items of registration or imparting various commands to the pre-registration information inputting device 39. The operating input unit 39I may be exemplified by a keyboard, a mouse, a pointing device, such as pad, pen or pointer, a dial key, a pressing button key etc. The display means 39J is a device used for displaying the sponsorship request conditions or other information. FIG. 17 shows a case where there is connected in circuit a display unit for a television receiver or a monitor device.

The pre-registration information inputting device 39, shown in FIG. 17, may be formed by computer terminals, such as notebook or desktop personal computers, PDA, portable telephone sets, game machines, set top boxes, PC cards, domestic electrical utensils, VTR, television receivers, car navigation systems, wrist watches having the information processing functions, distribution terminals for music or games, financial terminals (ATM) etc., in addition to the so-called dedicated terminals.

(b-2) General Item Registration Form Picture

FIG. 18 shows an example of a general item registration form picture. The rudimentary information to be equipped in the membership database 21 may be written simply on writing the information in the registration form. In the current state of network development, in which the sponsorship request may be expected to be made not only in the sponsorship transaction between different operators, but also between the operator and the consumer and between the individuals, the necessity for an associated interfacing technology is being felt keenly.

The registration form 40 of FIG. 18 includes, as its input items, a registrant name 40A, business sorts 40B, place of residence 40C, contact site (telephone) 40D, contact site (mail address) 40E, contact site (URL) 40F, the GPS information 40G, place of furnishment 40H, name of commodities or services 40I, producer name 40J, and input columns 40K corresponding to respective input items. Meanwhile, the transmission button 40L is also displayed on the picture.

These items are recorded in the aforementioned membership database 21 (FIG. 13). The divisions of the commodities or services or the mail number may also be used as input items. Meanwhile, if a keyboard is used as inputting means, examples of input entries represented in respective input items may be selectively entered to respective input columns 40K associated with respective input items. If the transmission button 40L is actuated (clicked), the information recorded in the input data recording unit 39E is sent to a terminal which supervises the membership database 21.

(b-3) Sponsorship Condition Registration Form Picture

Figure 19:
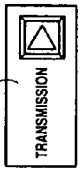
FIG. 19 shows an embodiment of a display picture of a sponsorship condition registration form.

FIG. 19 shows an example of the sponsorship condition registration form picture. By writing the information in such registration form, prioritized distribution may be guaranteed insofar as the sponsorship request conditions are met. The items of the registration form are desirably matched to those of the sponsorship request for use for verifying the coincidence to the input form of the sponsorship request. The use of such registration enables effective registration not only in case of sponsorship transaction between operators but in case of sponsorship transaction between operators and individuals and between individuals.

The registration form 42 of FIG. 19 includes, as its input entries, names of the sponsor 42A, commodities or services that can be offered for sponsorship 42B, sponsorship condition 42C to 42E, amount requested 42F and input entries 42G associated with the respective input items. A transmission button 42H is also indicated on the display picture.

These entries are recorded as the conditions under which to accept the sponsorship request 21T in the membership database 21 (FIG. 13). Meanwhile, if the keyboard is used as inputting means, examples of input entries indicated in the respective input items may be selectively input in the respective input columns 42G associated with the respective input items. If, when the transmission button 42H is operated (clicked), all entries or the basic information have been input, the information recorded in the input data recording unit 39E is sent to the terminal in charge of the membership database 21.

If the registration form of the same sort is used for registration of the desired conditions for distribution 21A, the registered information is recorded as the desired conditions for distribution 21A in the membership database 21 (FIG. 13).

(b-4) Processing Operations

When commanded to register the general information for registration by an operator, the controller 39F causes a registration form 40 held in the general item registration form recording unit 39B to be read out and sent to the display controller 39A for demonstration on the display picture of the display means 39J. The operator then inputs the rudimentary information relevant to the sponsor business operator in accordance with the input items displayed on the display picture. The input information is transiently stored in the input data recording unit 39E. When the input is finally determined by the operation on the transmission button 40L, the input information is sent to the membership database 21 through the communication unit 39G.

The processing of pre-registration of the sponsorship condition and the processing for registration of the desired conditions for distribution are similar to the processing of registration of the general registration information, with the sole difference being that the registration form displayed on the display picture is changed to the sponsorship condition registration form 42.

(B-4) Summary

By constructing the sponsorship transaction support system, described above, it is possible to realize effective registration not only in case of sponsorship transaction between operators but in case of sponsorship transaction between operators and individuals and between individuals. In particular, since the area of distribution of the sponsorship request may be freely changed in keeping with the intentions entertained by the client, brokerage business operator and the sponsor business operator, there may be provided a system convenient to use for any of the participants in the sponsorship transaction. Moreover, the results of the sponsor, that is the access trends of the consumers to the sponsorship transaction or the number of the concluded sponsorship agreements may be reflected, thus enabling the conclusion of projects of high sponsorship effect and efficient furnishment of opportunities for publicity or advertisements.

Additionally, the information stored in the sponsorship transaction may be secondarily exploited in the subsidiary information data creating system or in the digital picture program receiving and reproducing system, as later explained, to eliminate the deficiency of inputting the redundant information in the respective systems. In particular, it may be expected to improve the creation efficiency because plentiful data ancillary to the program is essential in realizing data broadcast attractive to ultimate users.

(C) Subsidiary Information Data Creating System

As the subsidiary information data creating system, there may be envisioned a system for primary inputting, which may be exclusively used on the site of creation of content material, and a system for secondary inputting, which may be used on the site of finishing the content material to the content on editing and processing.

Meanwhile, the former is used exclusively in a specialized terminal work site, such as site of material collection, site of imaging or the site of performance, where there is relatively little time allowance left for data inputting. On the other hand, the latter is used on a site where there is relatively sufficient time allowance for data inputting, such as a work site for affording secondary value to the created content material, such as broadcasting stations or video creating companies. This classification is, however, for the sake of convenience only and is not to be construed in a limiting sense.

The picture program creating system which, through effective utilization of the information created in the aforementioned sponsorship transaction support system, that is the sponsorship transaction related information registered in the membership database 21, allows for construction of a more efficient subsidiary information data creating system, is hereinafter explained.

(C-1) Subsidiary Information Data (1) Basic Structure

Figure 20:
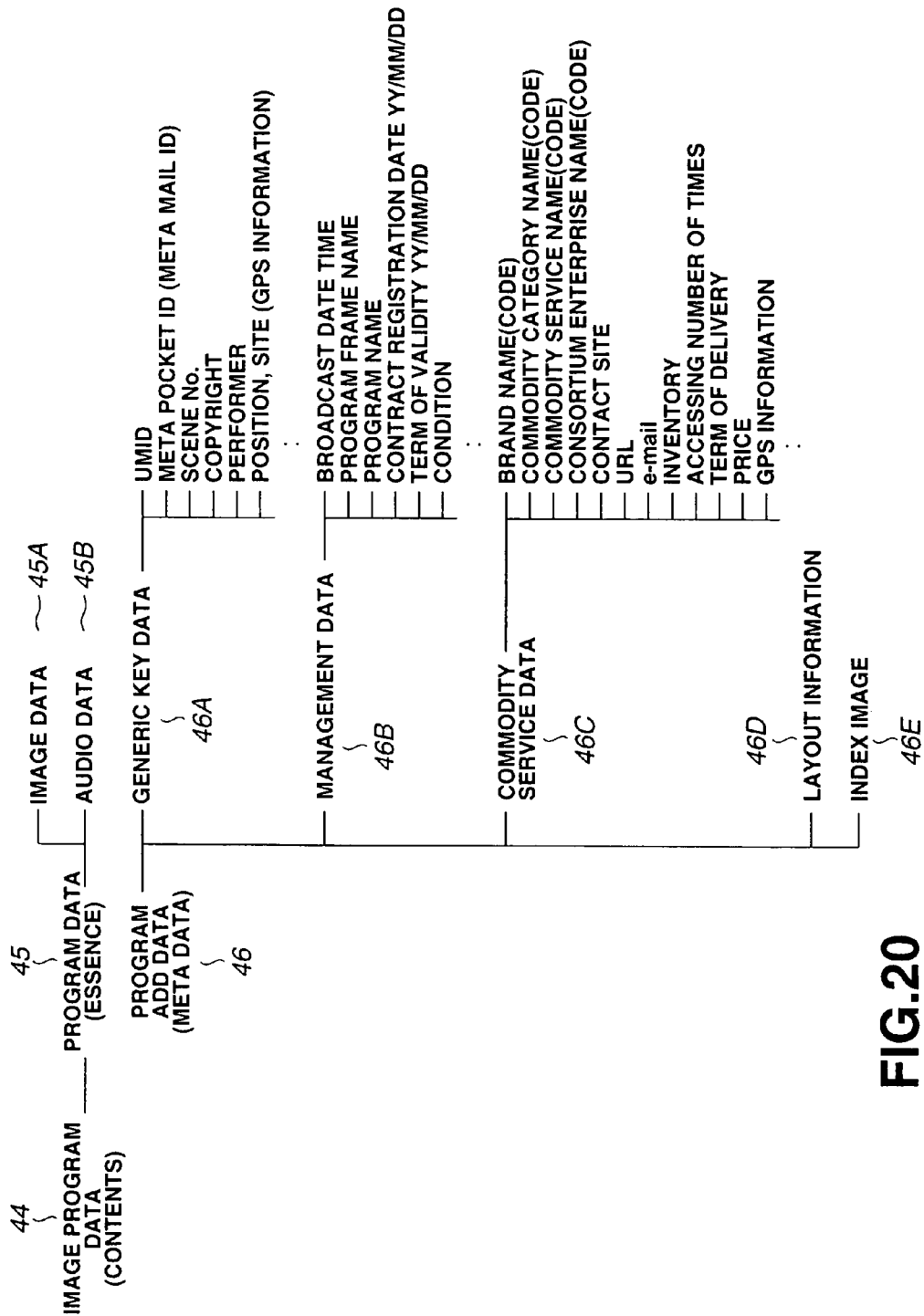
FIG. 20 shows an illustrative structure of ancillary information data.

FIG. 20 shows an example of the subsidiary information data. Specifically, FIG. 20 shows the relationship between the picture program data 44 (content) and the subsidiary information data. The picture program data 44 is comprised of program data (essence) 45, as main data, and data ancillary to the program (metadata) 46.

The program data 45 in the picture program is made up by video data 45A and acoustic data 45B. In the case of a radio program, the program data 45 is made up only of acoustic data. The data ancillary to the program 46 is made up by general key data 46A, management data 46B, data for goods and services 46C, layout information 46D and an index picture 46E. It is noted that the layout information 46D or the index picture 46E is not essential but only optional.

The general key data 46A is a data area where the basic information relevant to program data itself is recorded. For example, UMID, meta-pocket ID (meta-mall ID), scene numbers, copyright, performers, positions and sites, inclusive of the GPS information, are recorded.

The UMID is an example of the code information that is able to uniquely identify the image material on the global range, for example, on the station basis, on the keiretu basis and on the nation basis. Meanwhile, the information specifying the site may be exemplified by scene numbers, shot numbers, taking numbers and reel numbers. The meta-pocket ID gives an identification number of the meta-pocket corresponding to the scene. This information is generally accorded at the editing stage. The meta-mall ID gives the identification number of the meta-mall corresponding to the scene. This information is also accorded at the editing stage. Meanwhile, the information mainly specifying the photopolymerization site is input.

The management data 46B is a data area where e.g., a broadcasting station records the information necessary for managing video resources, such as date and time of real broadcast, program frame name, program name, contract registration date, term of validity, conditions and so forth. Among the conditions, there is a condition of use as 'commercial'.

The data for goods and services 46C is a data area in which to record the information relevant to commodities or services appearing in a corresponding scene, such as brand name, name of commodity category, name of commodities or services, name of sponsor business operator, contact site, URL, mail addresses, number of inventories, number of times of access events, term of delivery, price or the GPS information.

The above information is recorded as the necessity arises, such that not all items are always recorded. Basically, a series of the information pertinent to each of the commodities or services is recorded. The data for goods and services 46C are not necessarily limited to the subject-matter of the sponsorship or to program furnishment. That is, the information can be recorded for all commodities and services. It is noted that mainly the information for specifying the store where the goods can be purchased or the store where the services can be furnished is input as the GPS information.

The layout information 46D is the information for presenting the content of the data ancillary to the program 46 to the audience, and is provided especially for representation of meta-pocket or meta-mall. This layout information 46D is sometimes as one with and inseparable from the data for goods and services 46C. Here, the layout information is represented as being separable from the data for goods and services.

The index picture 46E is a picture for conveniently ascertaining the content of a corresponding scene of the data ancillary to the program. Usually, a representative frame picture (still picture) of a corresponding scene is recorded. It is noted that the index information does not have to be the recorded video data but may be the link information to the video data for a corresponding scene. In the data area, there may be recorded the link information for reproducing the moving picture data or acoustic data.

(2) Specified Example of Commodity or Service Data

FIG. 21 shows specified examples of the information recorded as the data for goods and services. FIG. 21 shows only the goods and services felt to appear frequently. Of course, these goods and services are not limitative.

In the picture programs for motion pictures, dramas or varieties (FIG. 21A), the apparel, accessories, makes, hair styles, fittings, small articles etc., worn by the performer, are recorded. In a sports program (FIG. 21B), logos or other commercial marks for business entities, represented on sports equipment or advertisement plate or tower, sports goods etc. are recorded. In addition, as the information pertinent to music and video (FIG. 21C), the information pertinent to music numbers, such as theme songs, sound tracks or BGM, or the information relevant to video files cited in the programs, are recorded.

By recording the above information, as the data ancillary to the program, in association with the program data, expectations may be entertained of improving the commercial value of the program data itself. That is, not only the picture program aimed to sell certain specified goods (single goods or a set of goods) or services, or so-called television, but all other sorts of picture programs, can be deemed as a platform that can be linked to the sale of the commodities or services.

Although this may be realized by an operation of inputting and overseeing a large quantity of the information in a short time, marked reduction in the required labor and economic system management become possible by effective utilization of the information stored in the aforementioned sponsorship transaction support system. An illustrative structure of a supplementary information data creating system, which takes into account the effective utilization of the information accumulated in the sponsorship transaction support system, is hereinafter explained.

(C-2) System for Primary Inputting

First, the primary inputting system, which assumes the work site of creating a video material and the initial inputting operation of the data ancillary to the program, is explained. It is noted that the primary and secondary systems are assumed only for convenience, that is, the primary system now explained may be used as the secondary system, or the secondary system may be used as the primary system. Specifically, no limitations are imposed as to the purposes of use of the respective systems.

(a) Terminal Structure

Figure 22:
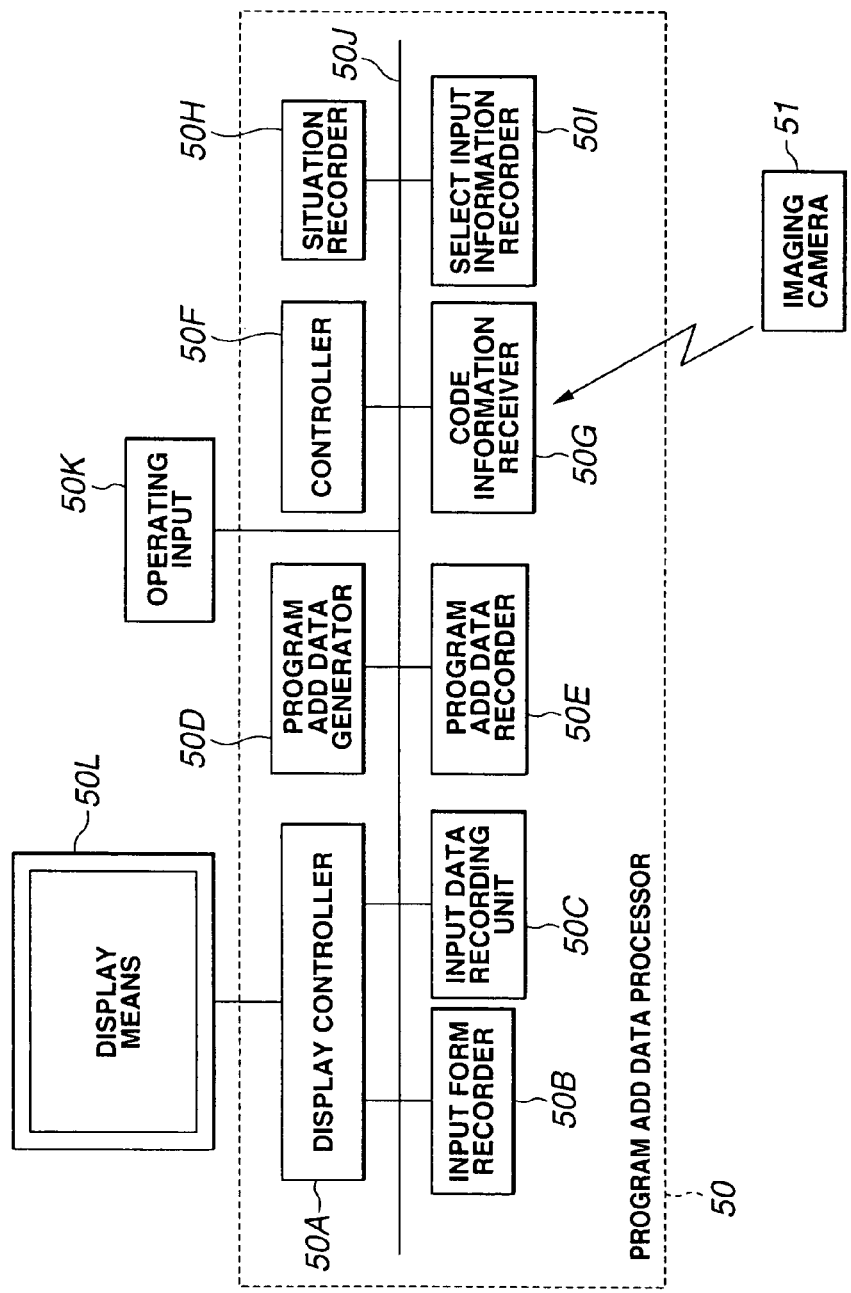
FIG. 22 is a functional block diagram showing an embodiment of a device for the preparation of data ancillary to a program (first embodiment).
Figure 23:
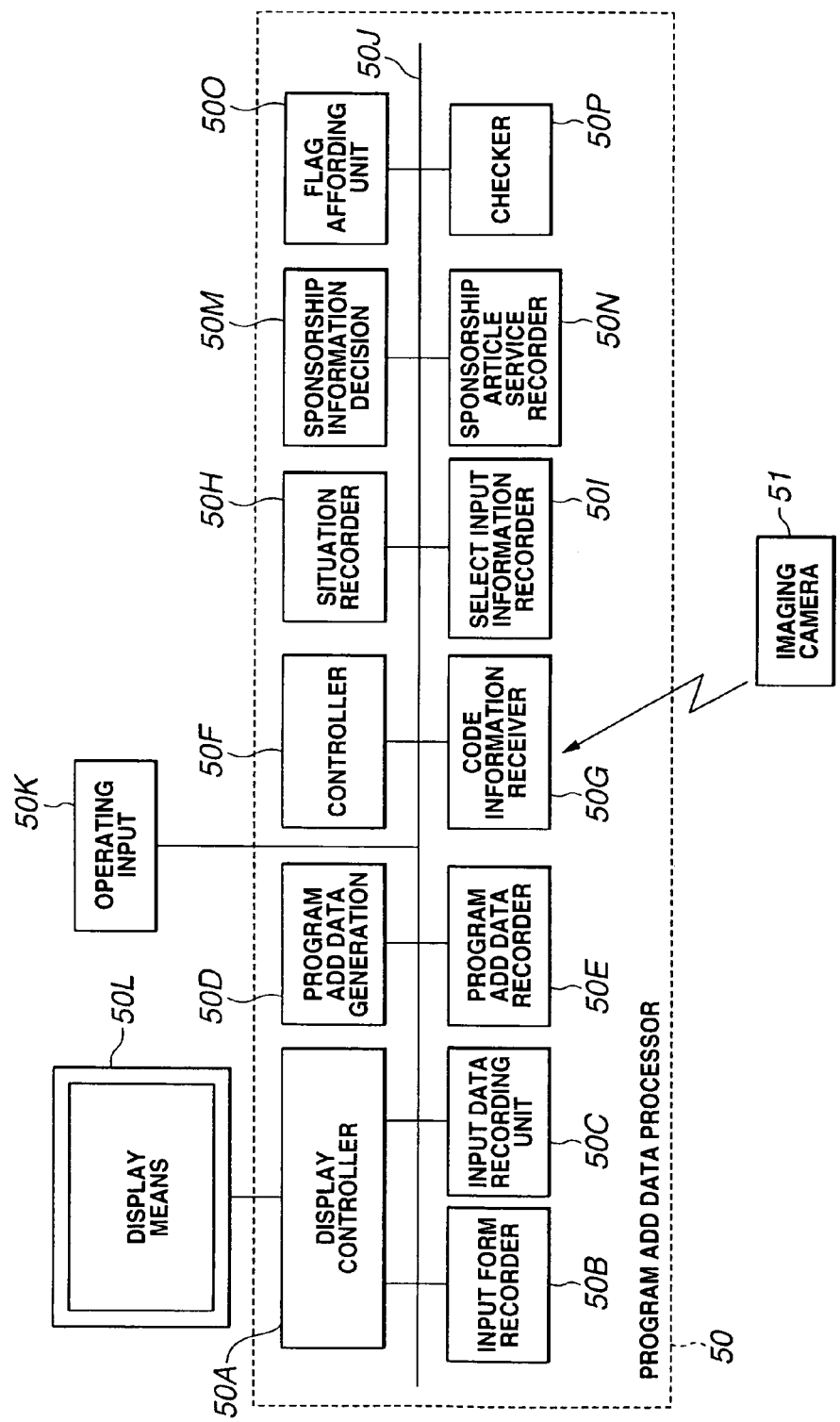
FIG. 23 is a functional block diagram showing an embodiment of a device for the preparation of data ancillary to a program (second embodiment).
Figure 24:
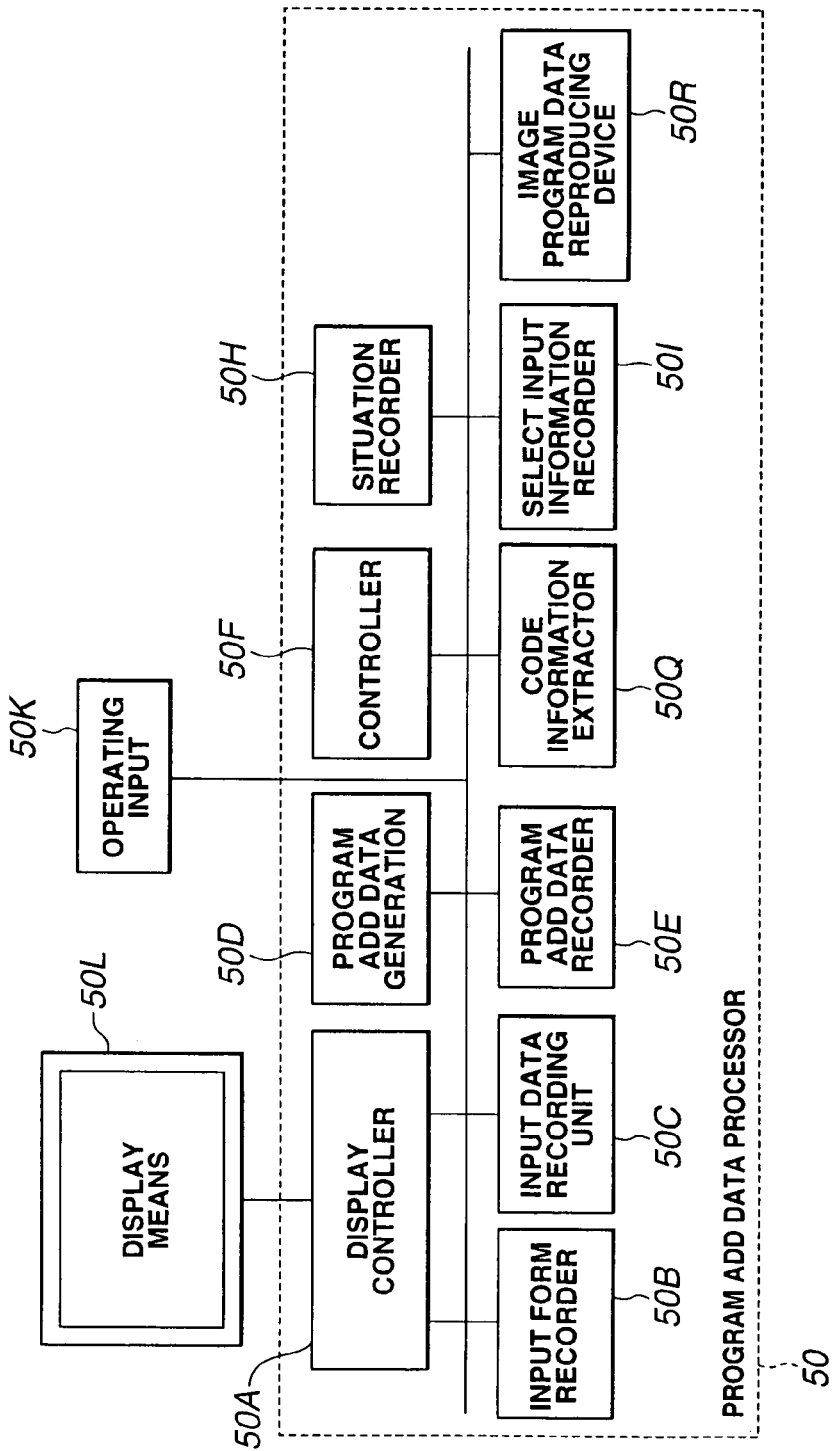
FIG. 24 is a functional block diagram showing an embodiment of a device for the preparation of data ancillary to a program (third embodiment)

FIGS. 22 and 23 mainly show an embodiment used for a portable program ancillary data creating device. FIG. 24 mainly shows an embodiment used for a standstill type program ancillary data creating device. Meanwhile, the difference between the program ancillary data creating device shown in FIGS. 22 and 23 and that shown in FIG. 24 is that the former captures the scene determining data directly from an imaging camera during the image pickup operation, while the latter captures it from the reproduced picture.

FIG. 22 showing the basic functional structure of the program ancillary data creating device is first explained. A program ancillary data creating device 50 includes a display controller 50A, an inputting form recording unit 50B, an input data recording unit 20C, a generating unit for generating data ancillary to the program 50D, a recording unit for recording data ancillary to the program 50E, a controller 50F, a code information receiving unit 50G, a scene recording unit 50H, a selection input information recording unit 50I, a bus 50J, an operating input unit 50K and display means 50L.

In FIG. 22, the operating input unit 50K and the display means 50L are shown connected to outside the main body unit of the device. Alternatively, the operating input unit and the display means may be unified with the main body unit of the device, as in the case of the notebook personal computer, PDA or a portable telephone set. Additionally, the recording and code communication units, shown enclosed in the main body unit, may be connected externally of the main body unit. For external connection, cable connection or radio connection may be used. For cable connection, serial connection or parallel connection may be used, while coaxial cables, twisted pair cables or optical fibers may be used. For radio connection, there is no particular limitation to the radio frequency range, while the spread spectrum system, such as Bluetooth, may or may not be used.

The display controller 50A is means for reproducing and outputting video data in signal forms (data forms) conforming to the display means 50L. Output signals may, for example, be a video output (NTSC video, composite video and S-video) or RGB output. The display controller 50A includes a data decoding function, such as one provided by MPEG (Moving Picture Experts Group), depending on the purposes of use.

The inputting form recording unit 50B is a recording or storage medium for storing an input form for data ancillary to the program. It is noted that the medium does not have to be used solely for storage of the input form of the data ancillary to the program, but may be used for recording or storing other information in combination. The medium may, for example, be a CD-ROM, a magnetic recording type medium, such as tape, floppy disc, hard disc or a magnetic card, an optical recording medium, such as write-once CD, DVD or optical card, magneto-optical recording type medium, such as DVD, MD or MO, and semiconductor memory, such as non-volatile memory or RAM.

The inputting form recorded will be explained later in detail. The registration form may be pre-fixed on the medium, duplicated from other recording mediums or downloaded over a communication network, such as Internet. The registration form may be expanded on a video RAM provided in e.g., the display controller 50A.

The input data recording unit 50C is a recording or storage medium for recording data input via operating input unit 50K. By and large, a RAM is used as this medium. However, there is no limitation to the sort of the medium provided that the medium used is one on which it is possible to write input data. On the other hand, it is not mandatory for this input data recording unit 50C to be a recording unit dedicated to recording the input data. For example, the input data recording unit 50C may be realized by a medium which is the same medium as the inputting form recording unit 50B, with the recording area then being a distinct area. The inputting form recording unit 50B or the input data recording unit 50C may be provided within the inside of the display controller 50A.

The generating unit 50D for generating data ancillary to the program is means for linking the input data recorded in the input data recording unit 50C and the code information recorded in the scene recording unit 50H, such as UMID or time codes as the scene information recorded in the scene recording unit 50H, to generate data ancillary to the program.

It is however possible to cause the program ancillary data generating unit 50D to generate data ancillary to the program 46 shown in FIG. 20. It may however be presumed that the generating unit 50D for generating data ancillary to the program for a site of imaging placed under temporal constraint or a similar creating site has as an object of creation to create the program ancillary data consisting only of the limited information such as the information specifying the scene or the company furnishing commodities or services.

The recording unit 50E for recording data ancillary to the program is a recording or storage medium for recording the created program ancillary data. The medium may be exemplified by a CD-ROM, a magnetic recording type medium, such as tape, floppy disc, hard disc or a magnetic card, an optical recording medium, such as write-once CD, DVD or an optical card, a magneto-optical recording type medium, such as DVD, MD or MO, and a semiconductor memory, such as non-volatile memory or RAM.

If the program ancillary data recorded is to be transmitted to other devices, such as, for example, a device for processing or editing the data ancillary to the program, over a communication system, which may be wired or wireless, it is sufficient if communication means having the communication function for the program ancillary data is provided in the program ancillary data generating unit. It is noted that the communication function complying with the transmission medium is required of this communication means. When a medium separable from the main body unit of the device is used for a recording medium or a storage medium, such as DVD or non-volatile memory, the medium can be taken out from the main body unit of the device and transferred to another device.

The controller 50F is means for executing variegated control or signal processing of various component parts making up the generating device 50 for data ancillary to the program, and is routinely of the micro-computer configuration. The functions of the controller 50F is usually prescribed by an operation system program and by an application program.

The code information receiving unit 50G is means for receiving the scene specifying information, such as UMID or time codes, of program data notified in real-time from an imaging camera 51 in the course of the imaging operation. The functions required of the code information receiving unit 50G are those conforming to the transmission system between the imaging camera 51 and the main body unit of the device. Although the communication system shown in FIG. 22 is a wireless system, it is of course not contemplated to exclude the wired communication system. It should be noted that the wireless system is more convenient since there is imposed no constraint as to inputting positions, and also since there is no necessity of providing a wired cable.

It is also possible to provide means for detecting a scene change point (a scene change extraction unit) in the code information receiving unit so that the new code information will be automatically recorded in the scene recording unit 50H every time a scene change point is detected. Meanwhile, if the scene specifying information is UMID, one code is associated with one scene, so that the scene change point may be detected by monitoring the scene change point of the code information.

The scene recording unit 50H is a recording or storage medium for writing the code information, being captured by the code information receiving unit 50G, based on the scene information capturing signal accorded by the operating input unit 50K at the time of inputting the signal. The medium may be exemplified by a CD-ROM, a magnetic recording type medium, such as tape, floppy disc, hard disc or a magnetic card, an optical recording medium, such as write-once CD, DVD or optical card, magneto-optical recording type medium, such as DVD, MD or MO, and semiconductor memory, such as non-volatile memory or RAM. It is of course possible to use the physically same medium as the other recording unit, with only the recording area being then different from that used by the other recording unit.

The selection input information recording unit 50I represents the function provided when a selective input function is readied for inputting the data ancillary to the program. So, this recording unit is unnecessary when all the inputting operations are executed manually. The information recorded in the recording unit may be the information recorded in advance by an operator of the generating device 50 for data ancillary to the program, or the information pertinent to the commodities or services procured from the aforementioned sponsorship transaction support system or the database system. As methods for procuring the information from the sponsorship transaction support system or the database system, a method of having the data furnished by communication and a method of having the data furnished by a medium can be used. If the communication is used, it may be wired or wireless.

The information at issue may be the totality of the information registered in connection with the commodities or services. When the number of the items of selection is excessive, the operating efficiency may occasionally be lowered. Consequently, when the use on the site is presupposed, it is possibly desirable to limit the information to the name of the company furnishing the commodities or services or to the common names of the commodities or services furnished. It is noted that, except in case the information is input in parallel with the imaging operations, selection may be made up to more detailed information, by making contrivances in retrieving characteristics of the selection items, so that, in such case, such information may be recorded which is in meeting with the purposes of use in question.

The medium may be exemplified by a CD-ROM, a magnetic recording type medium, such as tape, floppy disc, hard disc or a magnetic card, an optical recording medium, such as write-once CD, DVD or optical card, a magneto-optical recording type medium, such as DVD, MD or MO, and a semiconductor memory, such as non-volatile memory or RAM. It is of course possible to use the physically same medium as the other recording unit with only the recording area being then different from that used by the other recording unit. If the information is furnished in the form of a medium, it may be contemplated to use a CD-ROM or a non-volatile memory.

The bus 50J is a data input/output bus, which may, for example, be an ISA bus, an EISA bus or a PCI bus. The operating input unit 50K may, for example, be a keyboard, a mouse, a pointing device, such as pad, pen or pointer, a dial, having or not having a click function, and a pushbutton key.

The display means 50L is a device used for demonstrating a picture, such as an input screens for data ancillary to the program. In the case of a portable device, a small-sized lightweight display device, such as a liquid crystal device, may be used. When the display means 50L is used as a standstill type device, a monitor device or a television receiver may, of course, be used.

The imaging camera 51 may be made up by a camera by itself, or a camera fitted with a recorder (so-called camera built-in type recorder). It may also be an electronic camera for photographing a still picture. Meanwhile, the generic key data pertinent to imaging is recorded on a preset recording medium along with program data.

Reference is now made to FIG. 23 showing a further input assisting function to the program ancillary data generating device in FIG. 23. Since the parts corresponding to those shown in FIG. 22 are indicated with the same reference numerals as in FIG. 22, only different functional portions are explained. The added portions are four units, that is a sponsor information decision unit 50M, a recording unit for sponsorship commodities or services 50N, a flag imparting unit 50O and a check imparting unit 50P.

The sponsor information decision unit 50M is means for verifying whether or not there is any portion in the information recorded in the recording unit for sponsorship commodities or services 50N which coincides with the input information on the commodities or services. This function is particularly effective when the information on specified commodities or services is input. Meanwhile, the function of the decision unit is routinely implemented as one of application programs executed by the controller 50F.

The recording unit for sponsorship commodities or services 50N is a recording or storage medium which includes the recording information for decision by the sponsor information decision unit 50M. This medium may be exemplified by CD-ROM, a magnetic recording type medium, such as tape, floppy disc, hard disc or a magnetic card, an optical recording medium, such as write-once CD, DVD or an optical card, a magneto-optical recording type medium, such as DVD, MD or MO, and a semiconductor memory, such as non-volatile memory or RAM. It is of course possible to use the physically same medium as the other recording unit with only the recording area being then different from that used by the other recording unit. Consequently, the same medium may be used for this recording unit for sponsorship commodities or services and for e.g., the selection input information recording unit 50I. Since this information is the information on the sponsorship-related commodities or services, agreed to as to the creation of a picture program, the relevant information accumulated in the above-mentioned sponsorship transaction support system, if any, may be used for realizing effective information utilization. However, when the sponsorship transaction support system is not used, the information separately input may be used.

The flag imparting unit 50O is means for imparting to the program ancillary data flag data indicating that the input information has been found by the sponsor information decision unit 50M to be the sponsorship-related commodities or services. Specifically, the flag imparting unit is means for setting the data portion, procured for displaying whether or not the commodities or services in question are those pertinent to the accepted sponsorship, to a significant level (imparting a flag). By recording the information in question in the data ancillary to the program, signal processing of preparing a picture consisting only of a collection of the sponsorship-related information becomes feasible.

The check imparting unit 50P is means for causing the same information as the flag imparting unit 50O to be reflected in the display picture. That is, the check imparting unit 50P is means for automatically imparting check marks to check item columns on the display picture if, as a result of the decision by the sponsor information decision unit 50M, the input information corresponds to the sponsorship-related commodities or services. It is of course presupposed that there is a display column in the input item that is used for indicating whether or not the information in question is pertinent to the sponsorship. It is however also possible that the information is manually input by no other than the operator. This function, if provided, is helpful to improve the inputting efficiency and to evade mistaken inputs.

Meanwhile, the flag imparting unit 50O and the check imparting unit 50P are each implemented as one of the application programs executed by the controller 50F. These functions are loaded as one set in conjunction with the sponsor information decision unit 50M. While these functions are usually loaded on both units, it may also be loaded on one of the units.

Reference is made to FIG. 24 showing an illustrative structure of a generating device for data ancillary to the program, adapted for acquiring the scene information, for which the data ancillary to the program is to be prepared, from the general key data reproduced from the recording medium. Similarly to FIG. 22, FIG. 24 shows only the basic functional portions. It is therefore possible to load the sponsor information decision unit 50M, a recording unit for sponsorship commodities or services 50N, a flag imparting unit 50O and a check imparting unit 50P shown in FIG. 23.

The points of difference of the program ancillary data generating device of FIG. 24 from the device shown in FIG. 22 reside in the substitution of a code information extraction unit 50Q for the code information receiving unit 50G, and in a picture program data reproducing device 50R being shown in the drawing.

The code information extraction unit 50Q is means for perpetually monitoring replay signals of the picture program data reproducing device 50R for extracting the scene specifying information, such as UMID or time codes. Meanwhile, in the case of the generating device for generating the data ancillary to the program, shown in FIG. 24, a replay picture needs to be displayed on the picture of the display means 50 or on the picture of other monitor devices. An operator who intends to prepare data ancillary to the program executes the operation of scene selection at such a scene as is suited to the creation of the program ancillary data pertinent to the commodities or services as the operator confirms the picture being reproduced on a display picture in question occasionally with speech or other sound. It is possible to provide a scene change extraction unit in the code information extraction unit 50Q so that the new code information can be automatically recorded in the scene recording unit 50H each time a scene change point is detected.

The picture program data reproducing device 50R is a device for reproducing picture program data recorded on a medium exemplified by a CD-ROM, a magnetic recording type medium, such as tape, floppy disc, hard disc or a magnetic card, an optical recording medium, such as write-once CD, DVD or optical card, magneto-optical recording type medium, such as DVD, MD or MO, and a semiconductor memory, such as non-volatile memory or RAM, and includes a variable reproducing signal system loaded thereon, depending on the types of the mediums or on the recording formats.

It is noted that the picture program data reproducing device 50R need not be a replay-only device but may have loaded thereon a recording system adapted for recording picture program data supplied from the imaging camera 51 on a preset medium in accordance with a preset format. Although the picture program data reproducing device 50R is shown in FIG. 24 to be provided within the casing of the generating device 50 for program ancillary data, it may, of course, be mounted outside of the main body unit of the device. In this case, the main body unit of the device needs to be provided with a function of communication with the picture program data reproducing device 50R. Meanwhile, if the picture program data reproducing device 50R is provided outside of the main body unit of the device, the generating device for program ancillary data 50 may readily be designed as a portable device.

The generating device 50 for program ancillary data, shown in FIGS. 22 to 24, may be formed by computer terminals, such as notebook or desktop personal computers, PDA, portable telephone sets, game machines, set top boxes, PC cards, domestic electrical utensils, VTR, television receivers, car navigation systems, wrist watches having the information processing functions, distribution terminals for music or games, financial terminals (ATM) etc., in addition to the so-called dedicated terminals.

(b) Input Form Picture

Figure 25:
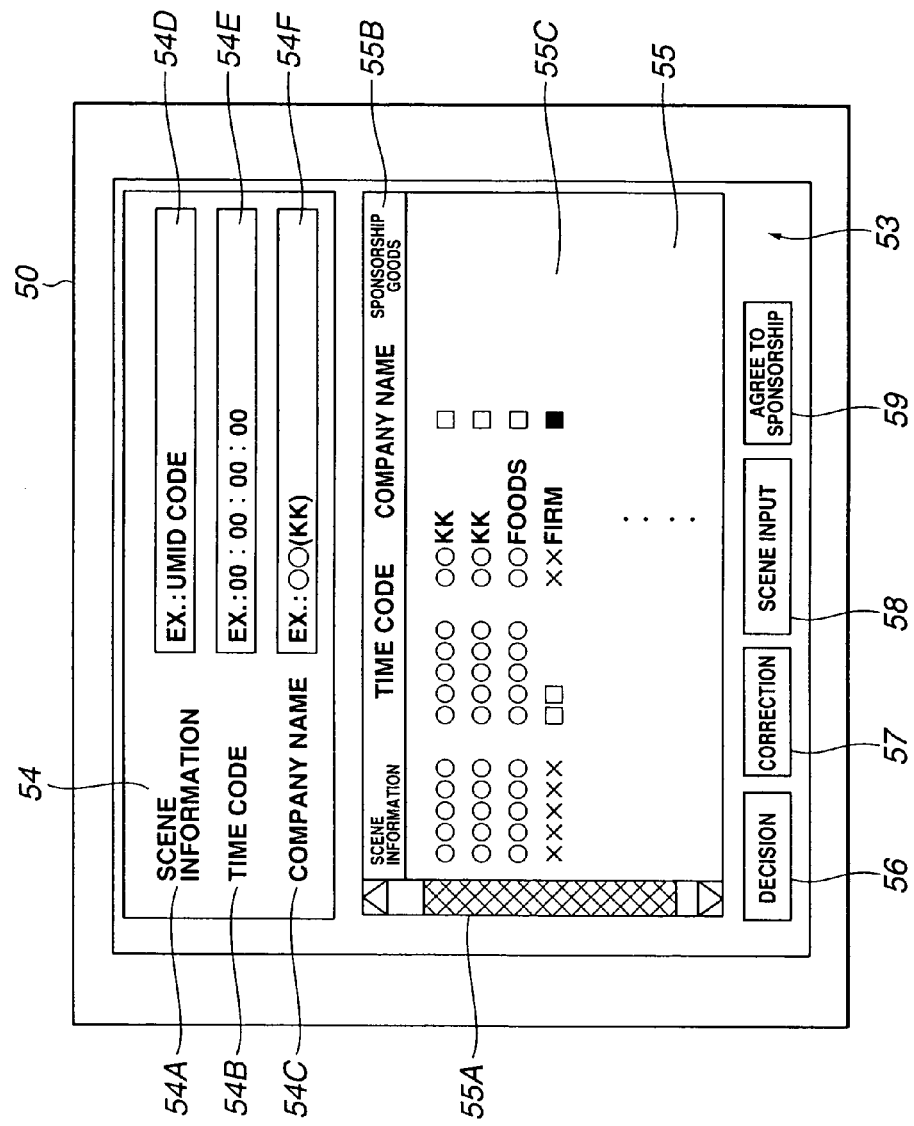
FIG. 25 shows an embodiment of a display picture of a form for inputting data ancillary to a program (first embodiment).
Figure 26:
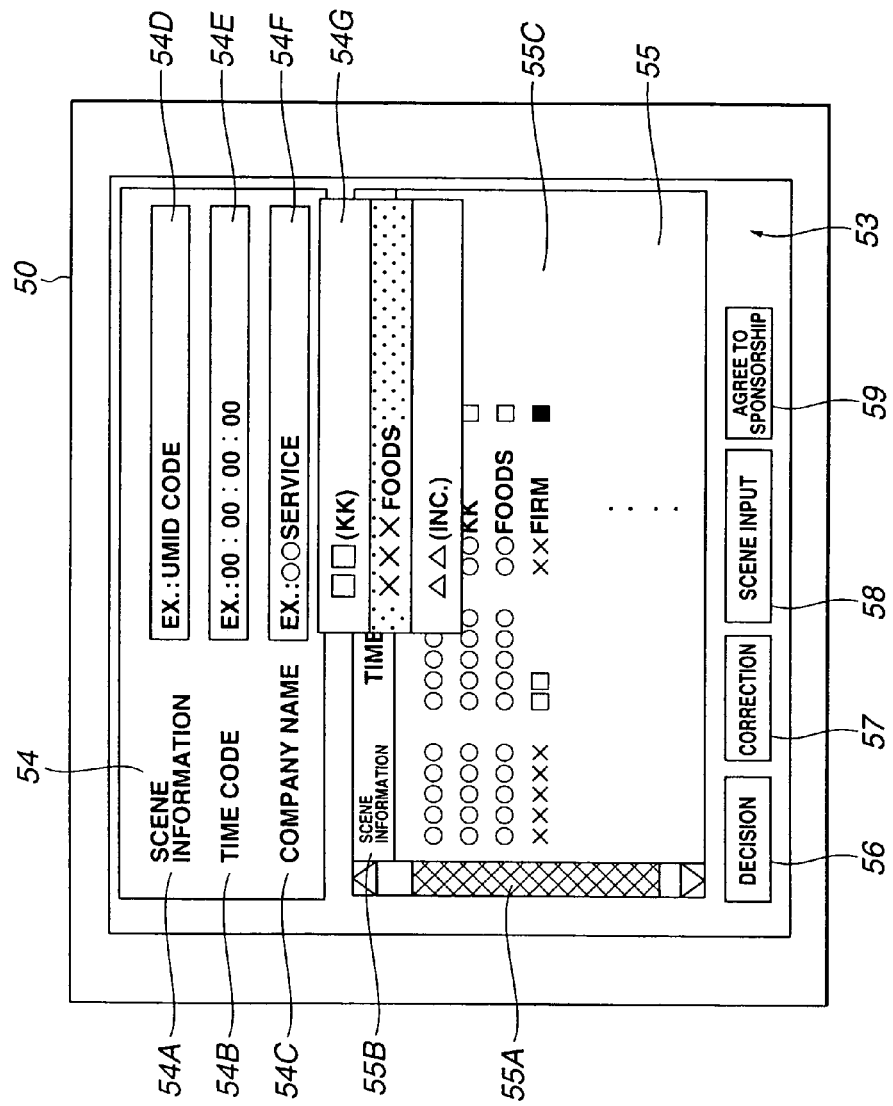
FIG. 26 shows an embodiment of a display picture of a form for inputting data ancillary to a program (second embodiment).
Figure 27:
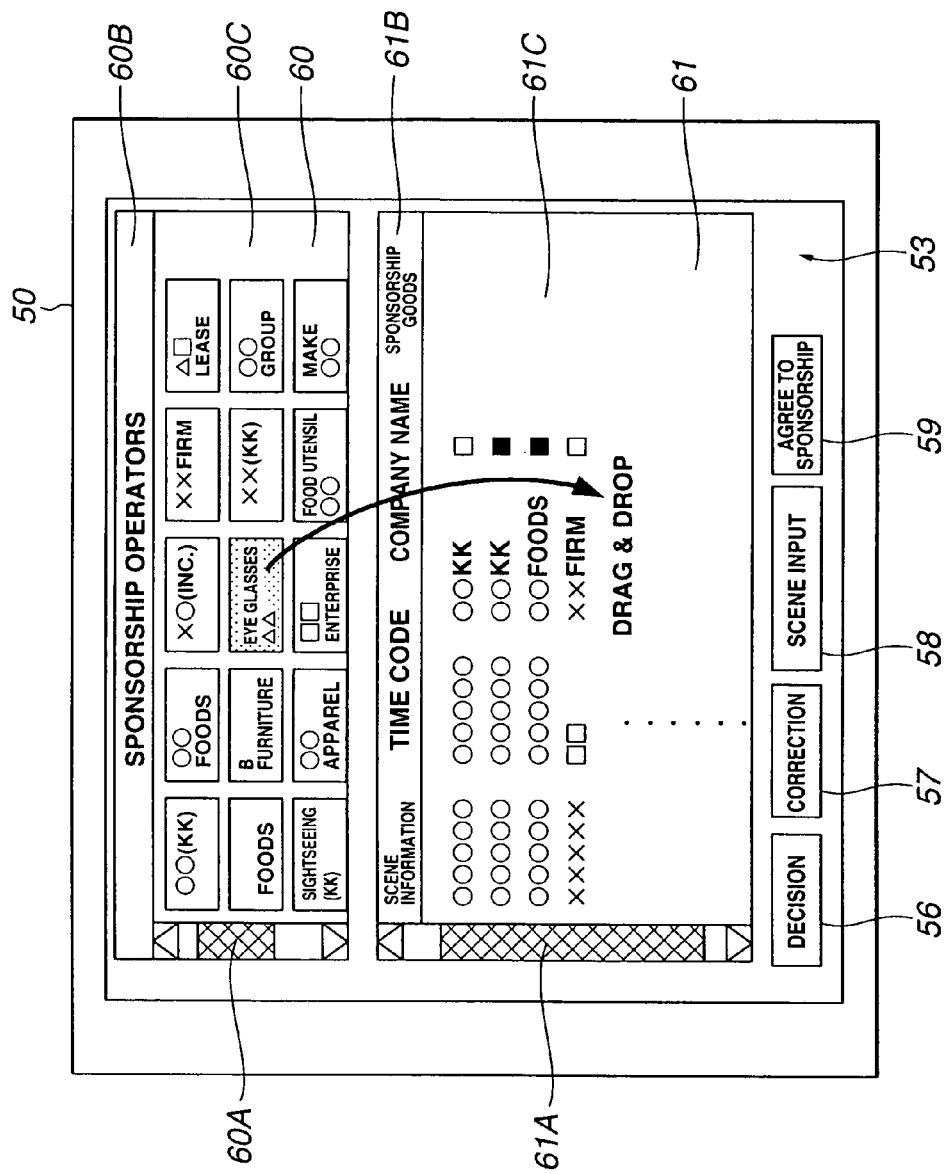
FIG. 27 shows an embodiment of a display picture of a form for inputting data ancillary to a program (third embodiment).

FIGS. 25 to 27 show examples of input form pictures. These input forms are suited to a work site where especially the inputting time available is limited. By employing these input forms, input items can be unified no matter who is performing the inputting operations. In particular, since a large number of staff members and program creating companies are involved in the creation of a picture program, there is a significant merit of unification of input items in overseeing picture resources. By positively exploiting these properties, it is possible to distribute the inputting operations among plural operators to realize efficient inputting.

FIG. 25 shows a first instance of the input picture. In the case of FIG. 25, an information inputting column 54 and an already input information display column 55 are displayed in an upper row and in a mid row of a display picture 53, respectively, while a decision button 56, a correction button 57, a scene inputting button 58 and a sponsor button 59 are displayed in a lower row. Since a manual operation of inputting the scene is here presupposed, the scene inputting button 58 is indicated. Additionally, since here a manual operation of inputting the tenor that the goods or services are those pertinent to the sponsorship as furnished by the sponsor business operator is presupposed, there is also provided the sponsor button 59.

In the information inputting column 54, there are displayed input items 54A to 54C and associated input columns 54D to 54F. In the case of FIG. 25, the input items are a scene information 54A, a time code 54B and a company name 54C. Meanwhile, the company name is that of a company which manufactured or supplied the commodities or services appearing in the pictures of respective scenes.

In the input columns 54D and 54E, among the input columns 54D to 54F, which are associated with the scene information 54A and the time code 54B, respectively, the code information which is valid at the time point of operation of the scene inputting button 58 is automatically displayed. It is noted that, in automatically inputting the scene information or the time code, the code information is displayed automatically. Consequently, the item in need of manual inputting by an operator in the present exemplary picture is solely the company name 54C. Meanwhile, the information as to whether or not the information is the information concerning the commodities or services pertinent to the sponsor is input by acting on the sponsor button 59. Although the setting of FIG. 25 is made so that the information indicating whether or not the input object is the commodities or services pertinent to the sponsor is not displayed in the information inputting column 54, this information may, if desired, be displayed.

As means for manually inputting the information in the information inputting column 54, an input key, not shown, with a letter allocated thereto, a dial key or a keyboard etc., is used. A pen inputting function may also be used. For finally determining the contents entered into the information inputting column 54, the decision button 56 is used. The information, input finally, is displayed in the already input information display column 55.

In the already input information display column 55, a scroll bar 55A and a title bar 55B are demonstrated in addition to the already input information. In the title bar 55B, items associated with input items of the information inputting column 54 are normally displayed. In the case of FIG. 25, an item not indicated in the information inputting column 54, that is the 'sponsorship-related goods', is displayed in the title bar 55B, for the sake of confirmation of the information input by operation of the sponsor button 59. Alternatively, the information as to whether or not the goods (or services) are the sponsorship-related commodities or services can be adapted to be entered on the display picture of the already input information display column 55. For inputting the information, such methods may be contemplated which consist in operating the sponsor button 59 as the check column is designated, or which consist in touching the check column with an input pen, for example, a method consisting in detecting the position of a pen point by position detection means comprised of a transparent electrode which covers up the display picture. The items checked are changed in display so that the items so checked can be discriminated from other unchecked items. In FIG. 25, the check column is displayed as if it is painted as indicated at 55C.

The correction button 57 is used for correcting the input information. For example, the correction button 57 is operated as an input letter string desired to be corrected is designated. By acting on the correction button 57, the information to be corrected is again demonstrated in the information inputting column 54 in readiness for correction.

If desired to register plural company names for one scene, the decision button 56 may be depressed, as a button having an allocated function of inputting plural company names, in order to save the scene information 54D and a time code 54E. Alternatively, there may be provided duplication buttons for the scene specifying information (scene information and time code in the case of FIG. 25) for duplicating the scene specifying information of the input information selected on the display picture of the already input information display column 55 in the input columns 54D and 54E. If there is provided a function of automatically updating the scene specifying information of the input column, it is possible not to update the information of the input columns 54D, 54E until such time when an operator performs a specified operation.

FIG. 26 shows a second exemplary input picture. The exemplary display, shown in FIG. 26, shows a case wherein the selection input information recording unit 50I is loaded in the device 50 for generating program ancillary data. In FIG. 26, the function of selective inputting is allocated to the input column 54F for the input item 'company name'. In FIG. 26, there is shown the state in which a selective candidate picture 54G for the input column 54F is shown deployed. In the case of such input picture, it is sufficient if the inputting operator selects one of the items shown in a list in a selection candidate picture 54G.

In FIG. 27, show in a third exemplary input picture, a drag-and-drop system is used for inputting the information, in distinction from the aforementioned two exemplary input pictures. So, in this third exemplary picture, there is adopted a system of displaying input candidates in a list in a selection item display column 60. In the case of FIG. 27, a candidate button 60C, having the input candidate information allocated thereto, is displayed. The present exemplary input picture is the same as the aforementioned exemplary input picture in that a scroll bar 61A and a title bar 61B are displayed in the information inputting column 60. The present exemplary input picture is also the same as the aforementioned exemplary input picture in that the scroll bar 60A and the title bar 60B are demonstrated in the information inputting item 60.

Moreover, in this third exemplary input picture, the already input information display column 61, operating not only as a column for confirming the already input information but also as a column for inputting the novel information, is indicated below the information inputting column 60. It is noted that the scroll bar 61A and the title bar 61B are displayed in the already input information display column 61 as in the above-described exemplary input picture. The display of items of the check column of the goods pertinent to sponsor (or services pertinent to sponsor) are changed as indicated at 61C, as in the above-described exemplary input picture.

In the case of FIG. 27, the inputting of the company names of the commodities or services is by drag-and drop of the selected candidate button 60C at a display position of the scene specifying information (scene information and time code) as captured by the operation on the scene inputting button 58 or by the automatic scene change detection. Instead of by drag-and drop, the information may be input by acting on the decision button 56 as e.g., a certain one of buttons of the candidate buttons 60C remains selected.

In the aforementioned three exemplary input pictures, it is presupposed that the site information, such as UMID, or the time code, such as hour: minute: second: frame number, are automatically input. Alternatively, these information may also be input manually. Still alternatively, one of the scene information and the time code may be input. The same may be said of display.

(c) Processing Operations at the Time of Inputting Operations

Figure 28:
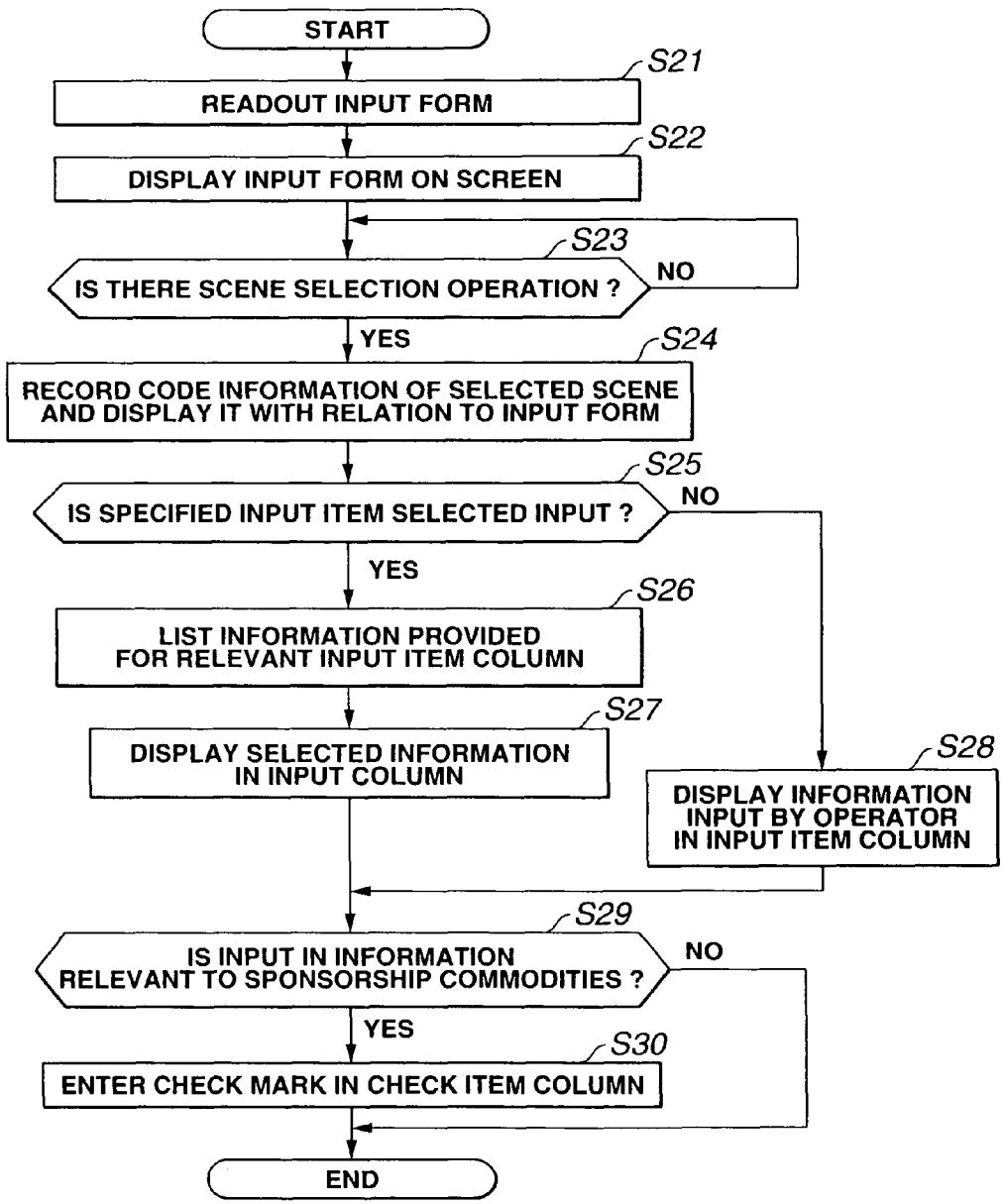
FIG. 28 is a flowchart showing an embodiment of a processing sequence in inputting data ancillary to a program (first embodiment).
Figure 29:
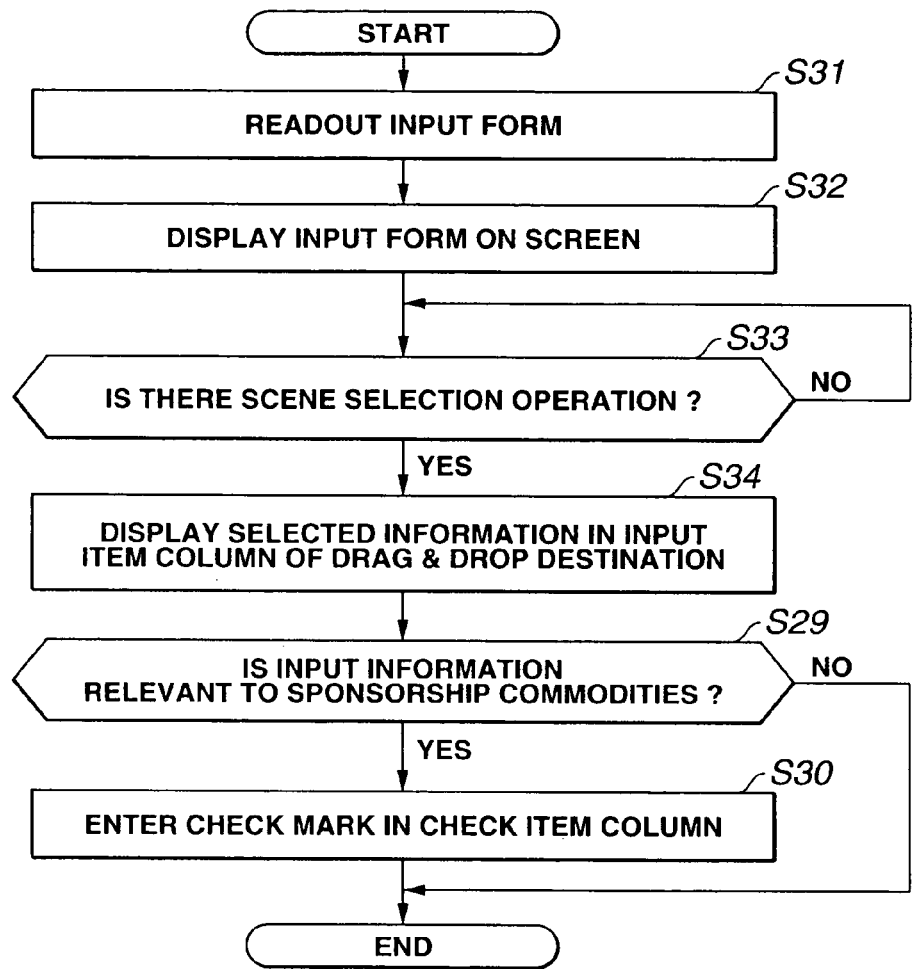
FIG. 29 is a flowchart showing an embodiment of a processing sequence in inputting data ancillary to a program (second embodiment).

FIGS. 28 and 29 show an exemplary processing sequence at the time of inputting by the generating device 50 for program ancillary data. FIG. 28 is relevant to the generating device 50 for program ancillary data having the selective inputting function, while FIG. 29 is relevant to the generating device 50 for program ancillary data having the drag-and-drip function. It should be noted that, in both FIGS. 28 and 29, there is loaded the function of automatically affording check marks in the check item columns of the display picture in case the input information corresponds to the sponsorship-related commodities or services.

Referring first to FIG. 28, when commanded to execute the application program for executing the function in question, the controller 50F reads out an inputting form from the inputting form recording unit 50B (step S21). The controller 50F deploys the input form, thus read out, on the display controller 50A, to output the input form in a preset signal form (data format) to the display means 50L. This demonstrates the input form shown for example in FIG. 26 (step S22).

At this display picture, the controller 50F verifies whether or not the operation of selecting an input scene has been carried out (step S23). This selective operation is carried out through the scene inputting button 58. If the selection of the scene through the operation of the scene inputting button 58 has been confirmed, that is if the result at step S23 is affirmative, the controller 50F records the code information, captured at the time point in question, in the scene recording unit 50H. For example, the code information capturing path may be through the code information receiving unit 50G (FIGS. 22 and 23) or through the code information extraction unit 50Q (FIG. 24). The controller 50F then imparts the captured information to the display controller 50A to display the information in relation to the input form being displayed.

The controller 50F then verifies whether or not the input item as specified is an item that can be selectively input. A negative result and an affirmative result are obtained when an item directly input by an operator (an item where an optional letter string is input), such as 'company name' of FIG. 25, is specified, and when an item directly entered by the operator, such as [company's name] of FIG. 26, is specified, respectively.

In case the affirmative result is obtained, the controller 50F reads out the information previously provided as to a relevant item, that is the information recorded in the selection input information recording unit 50I, to impart the information so read out to the display controller 50A to make a list display of input candidates, as shown in FIG. 26 (step S26). If a candidate is selected in this state, that is when an item is selected by a cursor shifting key, not shown, and the decision button 56 is depressed, the controller 50F displays the information so decided on in the input column 54F (step S27). If the negative result is obtained, the controller 50F causes the information input by the operator as to the relevant item to be displayed in the input column 54F.

When the input item is finally determined in this manner, the controller 50F causes the sponsor information decision unit 50M to check whether or not the input information is relevant to the commodities or services pertinent to the sponsor (step S29). If the input information is verified to be the commodities or services pertinent to the sponsor, that is if the affirmative result is obtained at step S29, the check imparting unit 50P issues a command to the display controller 50A to impart a check mark. Thus, the check mark, such as 55C, is displayed in the check item column to complete the input processing for one commodity or service (step S30).

When a decision is given that the input information is not the sponsorship-related commodities or services, that is if the negative result is obtained at step S29, no command is issued from the check imparting unit 50P to the display controller 50A, or a command is issued from the check imparting unit to the display controller that no check mark is to be displayed. As a result, the inputting processing for one commodity or service is completed, there being no change made in the display picture.

For finally determining the termination of the input processing, an operation by the decision button 56 may be made a necessary step. In FIG. 28, it is assumed that the generating device for data ancillary to the program has the function of automatically verifying the commodities or services relevant to the sponsorship and the function of automatically imparting the check mark. However, since the automatic check as to whether or not the commodities or services in question are those relevant to the sponsorship has no significant meaning if the input is on the company level, it may be contemplated to make the check of the check columns of the items of the sponsor goods by manual operations.

Referring to FIG. 29, when commanded to execute the application program for function execution, the inputting form recording unit 50B of the controller 50F deploys the read-out input form on the display controller 50A to output the input form in a preset signal or data format to the display means 50L. So, the input form shown for example in FIG. 27 is displayed (step S32).

In this display picture, the controller 50F checks to see whether or not the input picture selecting operation has been carried out (step S33). This selecting operation is carried out through the scene inputting button 58. When the scene selection through the operation of the scene inputting button 58 is recognized, that is if the affirmative result is obtained at step S33, the controller 50F causes the code information, captured at the time point in question, to be recorded in the scene recording unit 50H. The code information capturing route is the same as that explained in FIG. 28. The controller 50F then sends the captured information to the display controller 50A to display the information in association with the input form being demonstrated.

The controller 50F monitors which of the items demonstrated on the selection item display column 60 has been selected by the operator and which area is the destination of drag-and-drop of the selected information. If the destination of drag-and-drop is a preset position in the already input information display column 61, the controller causes the selected information to be demonstrated at such position. The drop destination may be limited to a display string in which the scene specifying information of the information currently being input is displayed, or may simply be any arbitrary position in the already input information display column.

The ensuing processing is the same as that of FIG. 28, as may be seen from the same reference numerals used as those in FIG. 28, and hence is not explained specifically.

(C-3) Secondary Inputting System

The secondary inputting system, which presupposes the post-inputting operation of the data ancillary to the program or the editing work site of the picture material, is hereinafter explained. As aforesaid, the division into the primary and the secondary is for convenience only such that the secondary inputting system may also be used as the primary inputting system. Meanwhile, it is not mandatory that the system is provided on the picture creating business operator, such that it may be provided on the brokerage business operator acting as an intermediary in the commercial transaction between the audience and the sponsor business operator.

(a) Terminal Structure

Figure 30:
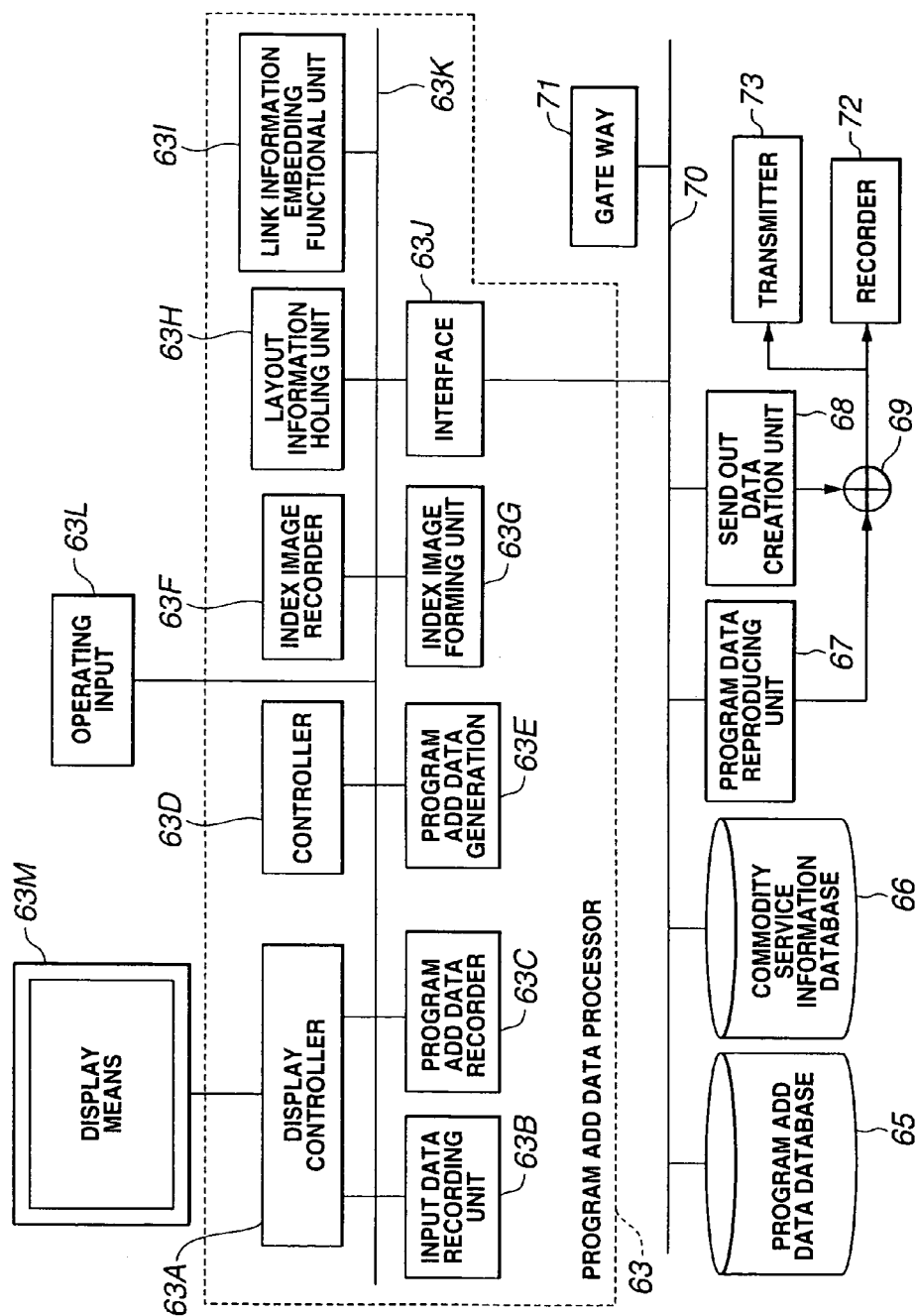
FIG. 30 is a functional block diagram showing an embodiment of a device for the preparation of data ancillary to a program.
Figure 31:
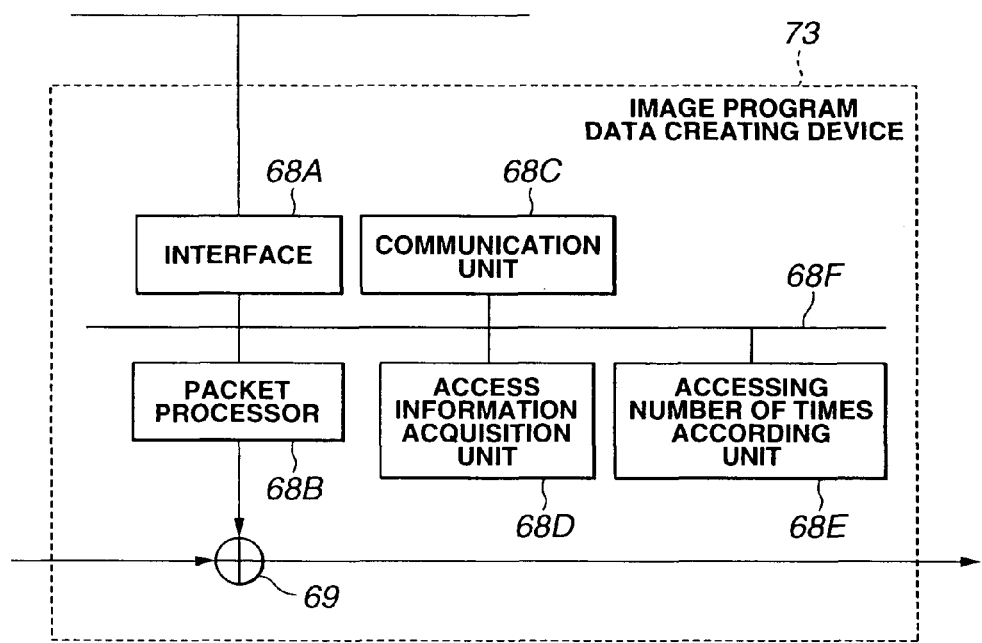
FIG. 31 is a functional block diagram showing an embodiment of a device for the preparation of picture program data.
Figure 32:
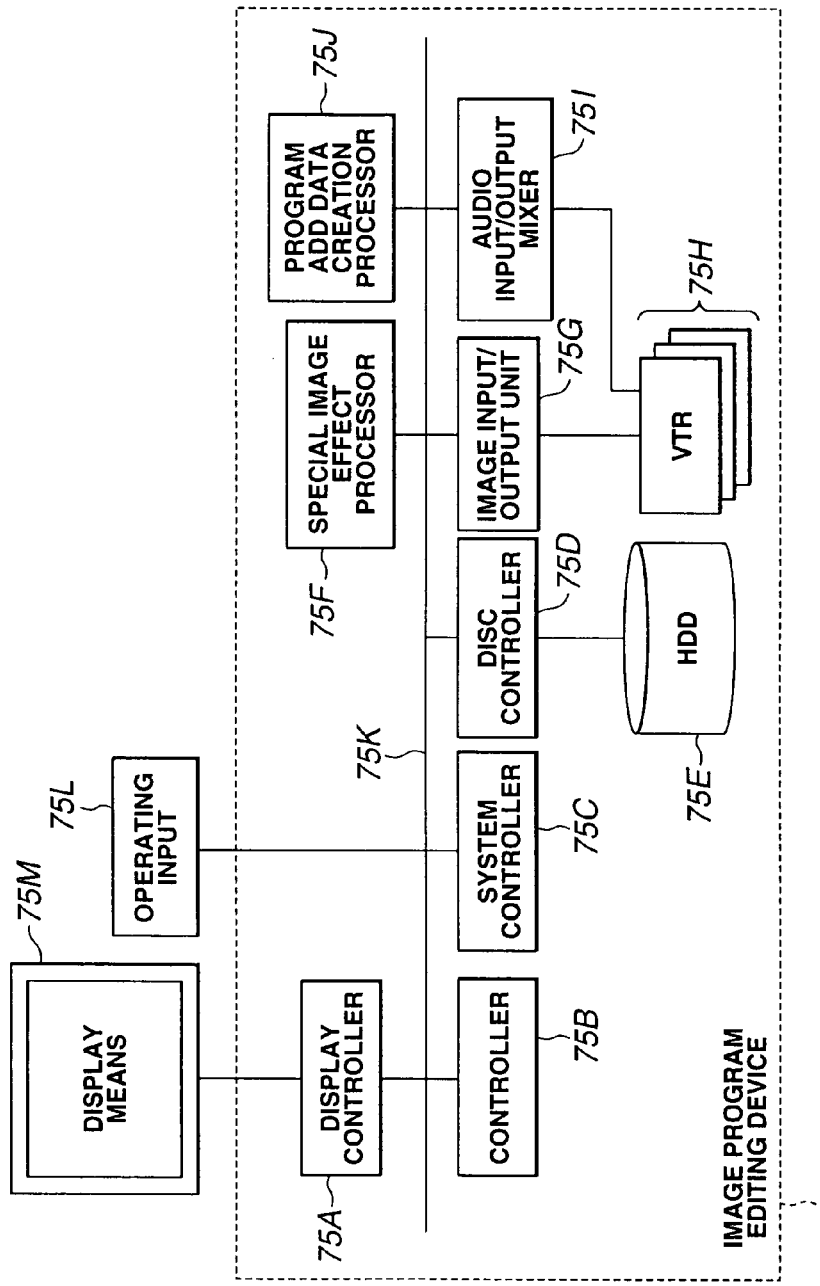
FIG. 32 is a functional block diagram showing an embodiment of a video program editing device.

FIGS. 30 and 31 show an embodiment of the program ancillary data creating device and FIG. 32 shows an embodiment of a picture program editing device provided with the program ancillary data creating device. The ultimate outputting of the program ancillary data creating device is classified into the transmission path output type and the recording output type. These respective cases are hereinafter explained.

Reference is first made to FIGS. 30 and 31. A creating device for program ancillary data 63, shown in FIG. 30, includes a display controller 63A, an input data recording unit 63B, a recording unit for program ancillary data 63C, a controller 63D, a data creating unit for program ancillary data 63E, an index picture recording unit 63F, an index picture creating unit 63G, a layout information holding unit 63H, a link information embedding functional unit 63I, an interface 63J, a bus 63K, an operating input unit 63L and display means 63M.

Although the operating input unit 63L and the display means 63M are shown in FIG. 30 to be connected externally to the main body unit of the device, the operating inputting unit and the display means may also be connected as one to the main body unit of the device, as in the case of a notebook personal computer, a PDA and a portable telephone set. Although the recording unit and the various functional units are shown enclosed in the main body unit, these may also be connected to outside the main body unit. For external connection, cable connection or radio connection may be used. In the case of the cable connection, serial or parallel connection may be used, while coaxial cables, twisted pair cables or optical fibers may also be used. As for radio connection, there is no particular limitation to the radio frequency range used, while the spread spectrum system, such as Bluetooth, may or may not be used.

The display controller 63A is means for reproducing and outputting picture data in signals forms (data forms) conforming to the display means 63M. Output signals may, for example, be a video output (NTSC video, composite video and S-video) or an RGB output. The display controller includes a data decoding function, such as one provided by MPEG (Moving Picture Experts Group), depending on the purposes of use.

The input data recording unit 63B is a recording or storage medium for recording data input through the operating input unit 63L. While the medium routinely employed is a RAM, there is no limitation to the type of the recording medium provided that it permits writing of input data. There is no necessity for the input data recording unit 63B to be a recording unit dedicated to the recording of the input data. It is of course possible to use the physically same medium for the input data recording unit 63B as the recording unit for program ancillary data 63C, if only the recording area is different from that used by the other recording unit. Meanwhile, the input data recording unit 63B and the recording unit for program ancillary data 63C may be provided within the display controller 63A.

The picture program data recording device 63C is a device for recording program ancillary data created and may be exemplified by a magnetic recording type medium, such as tape, floppy disc, hard disc or a magnetic card, an optical recording medium, such as write-once CD, DVD or an optical card, a magneto-optical recording type medium, such as DVD, MD or MO, and a semiconductor memory, such as non-volatile memory or RAM The controller 63D is means for executing variegated control or signal processing of various component parts making up the generating device 63 for program ancillary data. This controller is routinely of the micro-computer configuration. The functions of the controller 63D are usually prescribed by an operation system program and by an application program.

The data creating unit for program ancillary data 63E is means for linking input data recorded in the input data recording unit 50C and the layout information recorded in the layout information holding unit 63H (layout information used in presentation for the audience) and other information to generate program ancillary data. In this data creating unit 63E for program ancillary data, the program ancillary data 46, shown in FIG. 20, is produced.

The index data recording unit 63F is a recording or storage medium for recording an index picture used in confirming a picture program scene associated with the program ancillary data. While the medium routinely employed is a RAM, there is no limitation to the type of the recording medium provided that it permits writing of input data. There is no necessity for the index data recording unit 63F to be a recording unit dedicated to the recording of the index data. It is of course possible to use the physically same medium for the index data recording unit 63F as the program ancillary data recording unit 63C, with only the recording area being then different from that used by the program ancillary data.

The index picture creating unit 63G is means for extracting a typical frame picture of a scene corresponding to the program ancillary data as an index picture. Since the index picture is used for confirming the corresponding scene, the picture information reduced in picture quality as compared to the picture used in the actual broadcast is produced. It is, however, not mandatory to degrade the picture quality, such that the same information may be included in the index picture as that of the actual broadcast.

For the index picture, such a frame picture representative of the content of each scene is used. For example, a leading frame of a corresponding scene, a frame which allows for facilitated confirmation of the commodities or services pertinent to the sponsorship, as selected by the operator, or a trailing end frame of the corresponding scene, may be used as the index frame. If the rule for selecting the frame picture is set in this manner, it is possible for the index picture creating unit 63G to create the index picture automatically. However, depending on the selection by the operator, a frame picture of the time code as commanded by the operating input unit 63K may be used. The index picture may also be represented by computer graphics.

The layout information holding unit 63H is a recording or storage medium for holding the layout information used for prescribing the modifying information or the display position for the program ancillary data for facilitating the confirmation by the audience of the program ancillary data. These mediums may be exemplified by a magnetic recording type medium, such as tape, floppy disc, hard disc or a magnetic card, an optical recording medium, such as write-once CD, DVD or an optical card, a magneto-optical recording type medium, such as DVD, MD or MO, and a semiconductor memory, such as non-volatile memory or RAM. It is of course possible to use the physically same medium as the other recording unit, with only the recording area being then different from that used by the other recording unit.

The layout information may be exemplified by e.g., a style sheet of an XML (Extensible Markup language) file. In universality is taken into account, such layout information that can be handled independently of e.g., the detailed information pertinent to commodities or services is desirable. Of course, the demonstration of the program ancillary data by the HTML (Hypertext Markup Language) is not excluded. Which language is to be used for indicating the program ancillary data is determined on the basis of a route through which the information is furnished.

As for the layout information, which will be explained in detail subsequently, it may be contemplated to provide solely the information pertinent to one commodity or service with a sole information furnishing picture, to enable the presentation of the information pertinent to plural commodities or services appearing in a sole scene by the sole information furnishing picture (as in the case of the aforementioned meta-pocket), or to enable the presentation of the information pertinent to plural commodities or services appearing in plural scenes, each of which is associated with the information pertinent to the plural commodities or services, by the sole information furnishing picture (as in the case of the aforementioned meta-mall).

The link information embedding functional unit 63I is means for embedding the link information used for linking the moving picture reproducing function of picture data or the reproducing function of acoustic data of a scene associated with the index picture in case the index picture is embedded in the program ancillary data. For example, there is recorded the link information to the file information of program data (picture data or acoustic data) having the scene specifying information of the corresponding scene, such as UMID or time code, or the link information to the file information separately provided for the reproducing function of the moving picture or that of the acoustic data. Meanwhile, the data separately provided for the functions of reproducing the moving picture or the acoustic data may be data edited for simplified presentation or data for a partial scene period.

The interface 63J is interfacing means with respect to a local area network (LAN) 70. Although a bus type LAN is used in FIG. 30, several methods for connection may be envisaged, such as ring connection or star connection.

The bus 63K is a data input/output bus, exemplified by an ISA bus, EISA bus or PCI bus. The operating input unit 63L may be exemplified by a keyboard, a mouse, a pointing device, such as pad, pen or pointer, a dial, having or not having a click function, and a pushbutton key.

The display means 63M is a device used for demonstrating a picture, such as an input picture for the program ancillary data. A monitor device is routinely employed. For household use, a picture of a television receiver is used. In the case of a portable device, a small-sized lightweight type display device, such as a liquid crystal display device, is used.

The program ancillary data generating device 63, shown in FIG. 30, may be formed by computer terminals, such as notebook or desktop personal computers, PDA, portable telephone sets, game machines, set top boxes, PC cards, domestic electrical utensils, VTR, television receivers, car navigation systems, wrist watches having the information processing functions, distribution terminals for music or games, financial terminals (ATM) etc., in addition to the so-called dedicated terminals.

When the data creating device for program ancillary data 63 is used in a broadcasting station or a picture creating company, a database for program ancillary data 65, a database for commodities or services 66, a program data reproducing device 67, a device for creating data for transmission 68 and a multiplexing processing device 69 are connected to the data creating device for program ancillary data 63 over LAN 70.

The database for program ancillary data 65 is used not only for capturing and storing the program ancillary data created in the primary inputting system, but also for storing the program ancillary data created anew in the aforementioned data creating device for program ancillary data 63. For capturing data from the primary inputting system, an interfacing equipment, not shown, is used. The program ancillary data is captured in the form of data transmission or of a recording medium. There is no limitation to the transmission system or to the recording medium configuration.

The database for commodities or services 66 is used for storing the detailed information pertinent to the commodities or services necessary for creating the program ancillary data. The information stored may be input separately by the secondary inputting system or acquired from the aforementioned sponsorship transaction support system. If acquired from the sponsorship transaction support system, the sequence of the information is captured in the configuration of transmission or the recording medium. There is no limitation to the transmission system or to the recording medium configuration.

The program data reproducing device 67 is means for reproducing the edited program data. As this reproducing means, such device that is in keeping with the medium having recorded the program data is used. If, for example, the program data is recorded on a magnetic tape, a video tape recorder (VTR) is used, whereas, if the program data is recorded on a hard disc, a hard disc driving device is used. Of course, when the program data is recorded on an optical medium, an optical reproducing device is used. Meanwhile, the program data reproduced by the program data reproducing device 67, such as picture data or audio data, is used not only in the data creating device for program ancillary data 63 but also for actual broadcast to the audience.

The device for creating data for transmission 68 is means for converting the program ancillary data into the data format matched to the outputting configuration for outputting the program ancillary data along with the picture data. An illustrative structure of the device for creating data for transmission 68 is shown in FIG. 31. In the case of FIG. 31, the device for creating data for transmission 68 is made up by a LAN interface 68A, a packet processing unit 68B for converting the program ancillary data into packet data, a communication unit 68C for control with outside, an access information acquisition unit 68D, a number of times of access imparting unit 68E and a bus 68F.

In FIG. 31, the program ancillary data is converted into packets of a data structure which is in meeting with the transmission format, using the packet processing unit 68B. Alternatively, the program ancillary data can be transmitted in the file transmission system. The access information acquisition unit 68D is means for acquiring the access information, as an index for the interest the audience has in the commodities or services pertinent to each program ancillary data, from the database of the transaction brokerage business operator. For acquiring the information, the communication unit 68C is used. A communication unit which is in keeping with the communication network, used for connection to the external database, is used for the communication unit 68C. The communication may be made over a wired path or over a wireless path, without any limitations.

The number of times of access imparting unit 68E is means for according the results of sum of the number of times of access, on the commodity or service basis or on the scene basis, to the program ancillary data. By providing such function in the device for creating data for transmission 68, the program ancillary data having the latest access information appended thereto may at all times be distributed in the broadcast or communication configuration. The processing of summing the number of times of access events can be executed within the device for creating data for transmission 68 or may be directly received from the external database.

This device for creating data for transmission 68 forms a picture program data creating device 73 in conjunction with a multiplexing device 69, as later explained. Meanwhile, the multiplexing device 69 is means for multiplexing the program ancillary data, packetized in the device for creating data for transmission 68, into program data (packetized program data) supplied from the program data reproducing device 67. By this multiplexing processing, picture program data of the ultimate output configuration is generated.

Meanwhile, a gateway 71 is hardware or software means for interconnecting the Internet or the wireless communication network with the LAN 70. The system of FIG. 30 is used solely for transmitting the picture program data (output of the multiplexing device 69 or the program data for transmitting only the program ancillary data. By and large, the transmission occurs in the transmission or communication configuration.

A recording device 72 is means for recording picture program data on a recording medium for distribution to the consumer. Such a recording device which is in keeping with the recording medium is used as the recording device 72. The recording device of a large capacity is routinely used. However, a recording device of a small capacity suffices for recording only the program ancillary data.

The recording medium may be exemplified by a CD-ROM, a magnetic recording type medium, such as tape, floppy disc, hard disc or a magnetic card, an optical recording medium, such as write-once CD, DVD or optical card, magneto-optical recording type medium, such as DVD, MD or MO, and a semiconductor memory, such as non-volatile memory. For recording, an electrical method of changing the magnetism or the light volume depending on data for recording on a recording medium, or a method exploiting the semiconductor producing technique, that is a method consisting in creating a master disc and a stamper, may be used.

A transmitter 73 is means for transmitting or distributing to the audience the picture program data or the program ancillary data, over a wired route, such as optical cable, a power supply line or a telephone line, or a radio path, such as by surface waves or satellite waves, in either the broadcast configuration or in the communication configuration.

FIG. 30 shows am illustrative structure of a system in a routine system within a broadcasting station or within the picture creation business operator. Meanwhile, the functions of the creation device for program ancillary data may be enclosed within the existing picture program editing device. FIG. 32 shows an illustrative structure of apicture program editing device fitted with a program ancillary data creating function.

A picture program editing device 75, shown in FIG. 32, includes a display controller 75A, a controller 75B, a system controller 75C, a disc controller 75D, a hard disc device 75E, a special effect picture processing unit 75F, a picture input/output unit 75G, a video tape recorder (VTR) 75H, a speech input/output/mixer unit 75I, a program ancillary data processing unit 75J, an operating input unit 75K and a display device 75L.

In FIG. 32, the are shown connected outside the main body unit of the device. However, the operating inputting unit 75K and the display means 75M may also be connected as one to the main body unit of the device, as in the case of a notebook personal computer, a PDA and a portable telephone set. Although the hard disc device 75E and the video tape recorder 75H are shown enclosed in the main body unit, these may also be connected to outside the main body unit. For external connection, wired connection, either serial or parallel, may be used, in which case a coaxial cable, a twisted pair cable or an optical fiber may be used without any limitations. Alternatively, wireless connection may also be used without regard to the bandwidth. The spread spectrum system, such as Bluetooth, may also be used.

The display controller 75A is means for reproducing and outputting picture data in signal forms (data forms) conforming to the display means 75M. Output signals may, for example, be a video output (NTSC video, composite video and S-video) and an RGB output. The display controller 75A includes a data decoding function, such as one provided by MPEG (Moving picture Experts Group), depending on the purposes of use.

The controller 75B is means for controlling respective parts or commanding signal processing responsive to commands input through the operating input unit 75L, and is routinely configured as a micro-processor. The system controller 75C is means for controlling the write/readout control or signal processing for the video tape recorder 75H and, similarly to the controller 75B, is configured as a microprocessor. The functions of these controllers are prescribed by an operating program or by an application program.

The disc controller 75D is means for controlling write/readout of the hard disc device 75E. In the hard disc device 75E, there is stored picture data or acoustic data being edited. The picture special effect processing unit 75F is means for applying optional special effects, as specified by an editor, to picture data read out through the picture input/output unit 75G. For example, two-dimensional effect processing, such as wiping, superimposing, key synthesis, enlarging or contracting, or the three-dimensional effect processing, is carried out. The picture special effect processing unit 75F is routinely constructed in conjunction with a switcher.

The picture input/output unit 75G is means for effecting picture data write/readout between it and plural video tape recorders 75H. Each video tape recorder 75H has recorded therein picture program data as the picture material or the pre-edited picture program data.

The speech input/output/mixer unit 75I is means for reading/writing acoustic data between it and the plural video tape recorders 75H and for mixing the acoustic data. Although a video tape is used in FIG. 32 as storage means for picture program data as editing material or pre-edited picture program data, an optical disc device or the like large capacity medium may also be used.

The processing unit 75J for program ancillary data is means for implementing the functions of the aforementioned creating device 63 for program ancillary data. That is, the program ancillary data generating function or the index picture creating function etc. is carried out. The bus 75K is a data input/output bus and may, for example, be an ISA bus, an EISA bus or a PCI bus.

The operating input unit 75L may be exemplified by a keyboard, a mouse, a pointing device, such as pad, pen or pointer, a dial, having or not having a click function, and a pushbutton key. The display device 75M is a device used for displaying an input picture for program ancillary data and other pictures. A monitor device is routinely employed. For household use, a picture of a television receiver is used. In the case of a portable device, a small-sized lightweight type display device, such as a liquid crystal display device, is used.

A picture program editing device 75 may be formed by computer terminals, such as notebook or desktop personal computers, PDA, portable telephone sets, game machines, set top boxes, PC card, domestic electrical utensils, VTR, television receivers, car navigation systems, wrist watches having the information processing functions, distribution terminals for music or games, financial terminals (ATM) etc., in addition to the so-called dedicated terminals.

(b) Data Creating Picture

A typical display of a creating picture, demonstrated on the display means 63M during creation of the program ancillary data, is hereinafter explained.

(b-1) Typical Display 1

Figure 33:
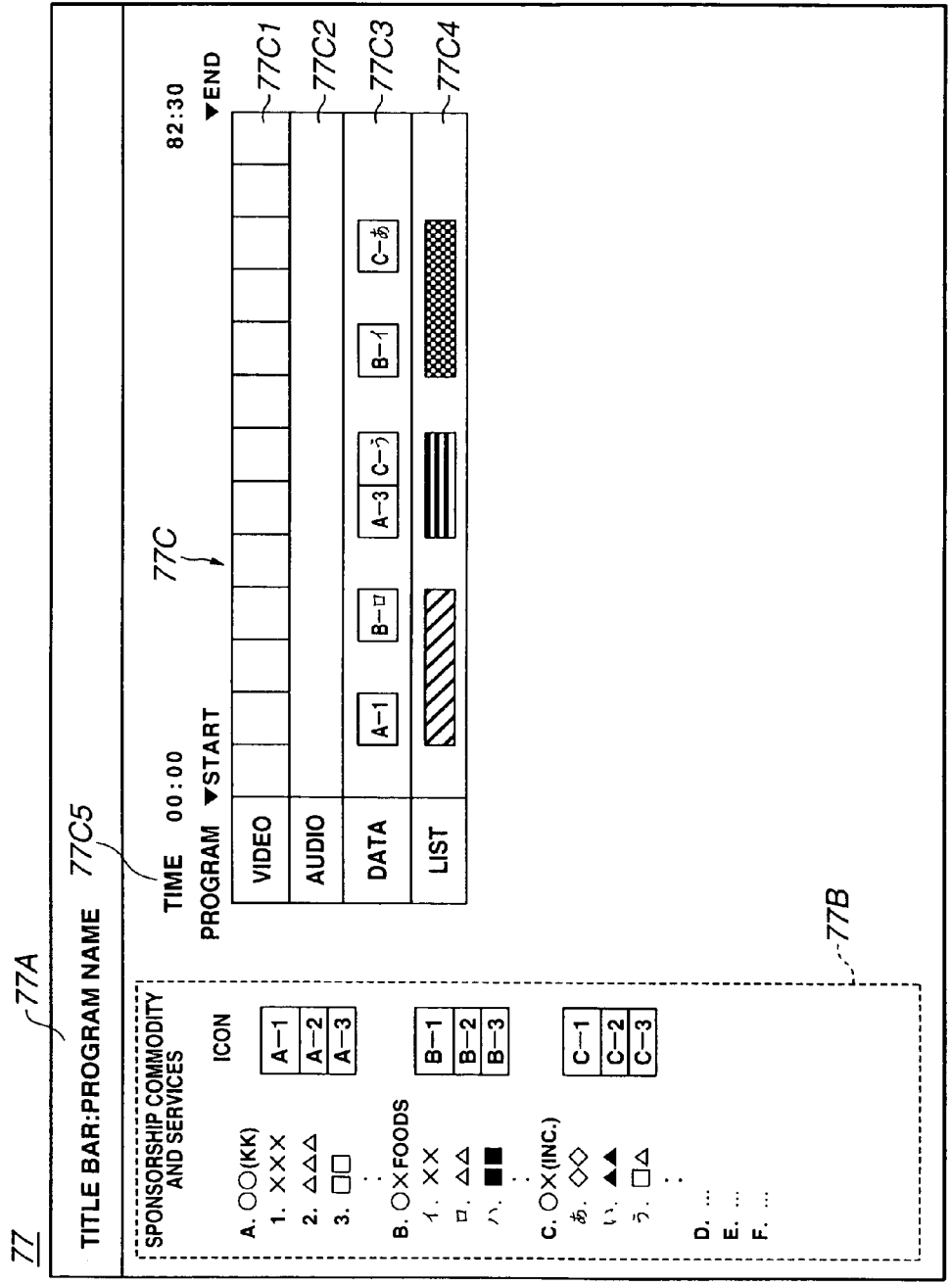
FIG. 33 shows an embodiment of a display image in preparing or editing data ancillary to a program (first embodiment).

A first display picture 77 of FIG. 33 is explained. A display picture 77 of FIG. 33 is made up of a title bar 77A, an input item display area 77B, in which the information relevant to the commodities or services to be input as the information pertinent to a scene to be created, and an already input information display area 77C for demonstrating the state of correlation of the commodity or service data with each scene along the time axis.

Meanwhile, FIG. 33 is used for creating the program ancillary data concerning the commodities or services pertinent to the sponsorship. So, only a list of the commodities or services relevant to the sponsor is shown in the input item display area 77B. However, the information pertinent to commodities or services not included in the sponsors may also be displayed.

In the input item display area 77B, there is demonstrated the specified information pertinent to the parties furnishing the commodities or services included in the sponsor and to the commodities or services furnished. The information pertinent to the commodities or services are provided with icons for facilitating the confirmation on the picture. These icons are adapted to enable discrimination of the corresponding commodities or services from the display configuration or color and from the letter information. In FIG. 33, a symbol comprised of the combination of Roman letters representing the sponsor and numerical figures representing the commodities or services furnished by the sponsor is allocated to each icon.

The already input information display area 77C is made up by a time code column 77C5, as time axis, a picture column 77C1, representing the content of each scene, an acoustic column 77C2, representing the effect sound used in each scene or the content of the BGM, a data column 77C3, representing the information pertinent to the commodities or services input as program ancillary data, and a list column 77C4, providing a range of plural scenes displayed in a list in the same picture. In the display areas of these picture columns, the index pictures of the respective scenes, icons (picturesque symbols) representing the content of the sound used in each scene, icons (picturesque symbols) representing the content of the commodities or services associated with each scene and the scope of the scenes of interest, represented by e.g., bar graphs, are displayed.

It is noted that the index pictures represented in the picture column 77C1 may be created within the program ancillary data creating device 63, that is within the index picture creating unit 63G, or the index picture used in the picture editing device 75 may be used.

There are several methods of allocating the information pertinent to the commodities or services to the data column 77C3. One such method is to drag and drop the icon selected in an input item display area 77B. In this case, the operator may drop the selected icon on an index picture of a corresponding scene, or in a data column of the corresponding scene. Without regard to the input method used, the picturesque symbols, indicating the content of the commodities or services input, are displayed in the relevant positions of the data column 77C3.

Meanwhile, if the information on the level of the name of the sponsor has already been finished in the primary input system (the inputting of the Roman letters [A] or [B] has already been finished in the case of FIG. 33), the display on the picture is replaced by the dropped content by the aforementioned drag and drop operation. For example, the display of [A] is replaced by display [A-1].

The inputting method is not limited to the drag and drop system. For example, the inputting to the data column 77C3 may be made in such a manner that selection of an icon comprised only of the name of the sponsor displayed in the data column 77C3, such as by clicking, causes the display of the candidate for selection in the input item display area 77B to be changed, for example, to flicker or be changed in color, with the inputting in the data column 77C3 being finished by the operator specifying one of the candidates for selection.

Since there is a limit to the area that can be displayed, there are a number of occasions where only one commodity or service is displayed, even although the information pertinent to plural commodities or services is associated with one scene, as in the case of the display shown in FIG. 33. Of course, there may be occasions where registration of the information pertinent to plural commodities or services may be noticed from the display methods. For example, the display content may be confirmed by parallel display of plural icons or overlapped display.

(b-2) Typical Display 2

Figure 34:
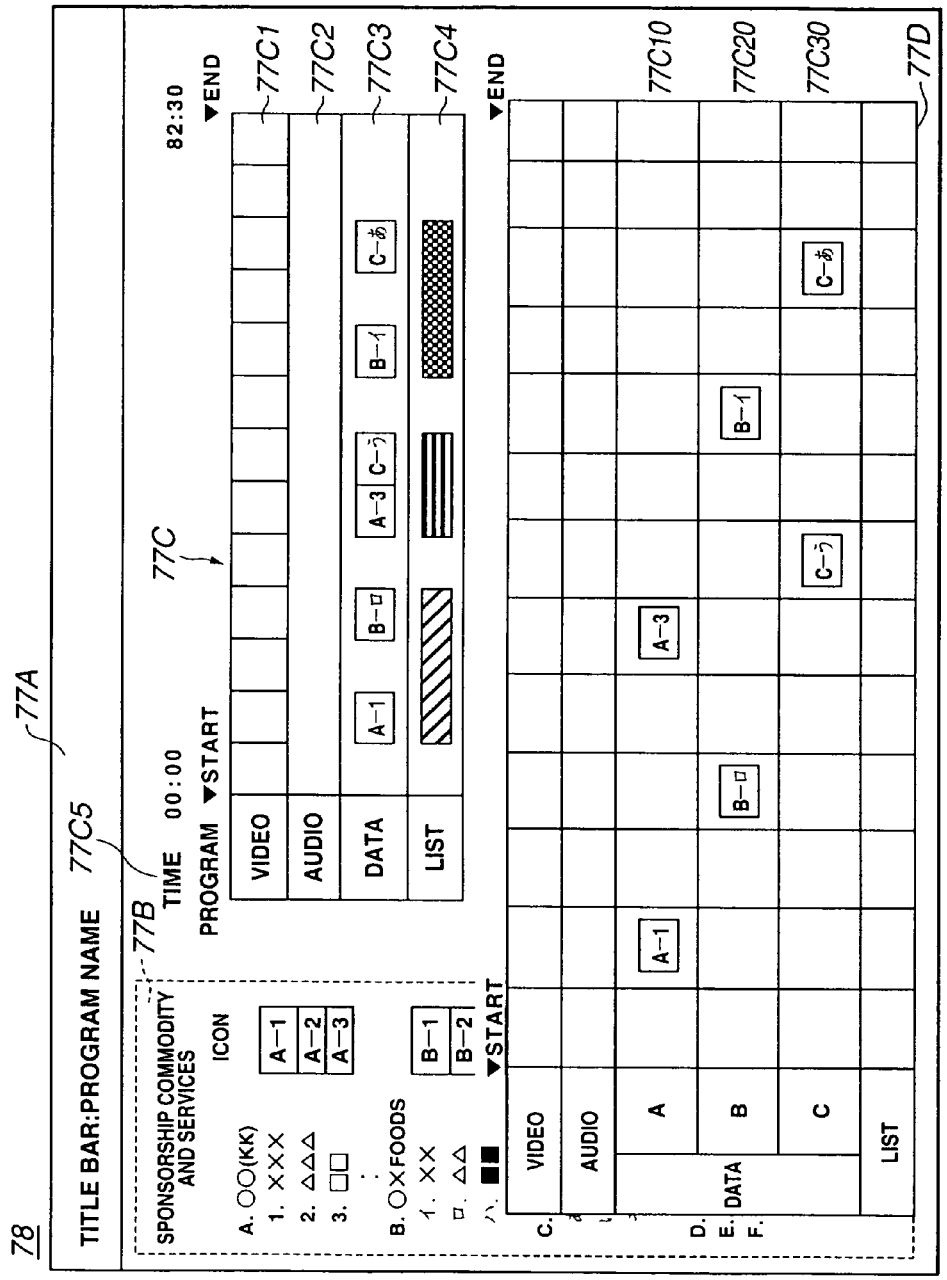
FIG. 34 shows an embodiment of a display image in preparing or editing data ancillary to a program (second embodiment).

However, if the icons are arrayed in parallel, or if the display area is shifted for overlapped display, it is unavoidable that the content become difficult to confirm. So, a second display picture 78 shown in FIG. 34 is provided. In the display picture 78 shown in FIG. 34, an enlarged display window 77D of the data column 77C3 is indicated overlapped on the aforementioned first display picture 77.

FIG. 34 shows an instance where the number of the commodities or services associated with a sole scene is approximately three (data columns in the drawing being 77C10, 77C20 and 77C30). Of course, there are cases where three or more commodities or services are associated with each scene, in which case the portions not displayed in the display area may be adapted to be confirmed through the operation of a scroll bar provided on a picture, or the information displayed on the enlarged display window 77D may be limited to the content of the data column 77C3 to enable more information to be displayed.

Meanwhile, there are also occasions where it is desirable to confirm, at one glance, the information concerning the same commodities or services appearing at plural scenes in actual editing operations. If, in this case, the controller 63D is caused to execute such a function in which, when an operator performs an operation of specifying the commodities or services of the input item display area 77B as he or she depresses an operating key associated with the function in question, display of the relevant information in the data column 77C3 is changed, for example, the display flickers or is changed in color, the editing operation can be improved in efficiency. As the method of implementing a similar function, it may be envisaged to reverse the operating sequence, for example, to initially specify certain commodities or services of the input item display area 77B and to then depress an operating key to which the function in question is allocated. This function can be exploited even on the first display picture 77.

(b-3) Typical Display 3

By providing the above-described two display pictures, the operator engaged in an editing operation is able to confirm which information pertinent to commodities or services is associated with which scene. Meanwhile, it should be possible how such information is presented to the audience, otherwise the system would be practically unusable.

Figure 35:
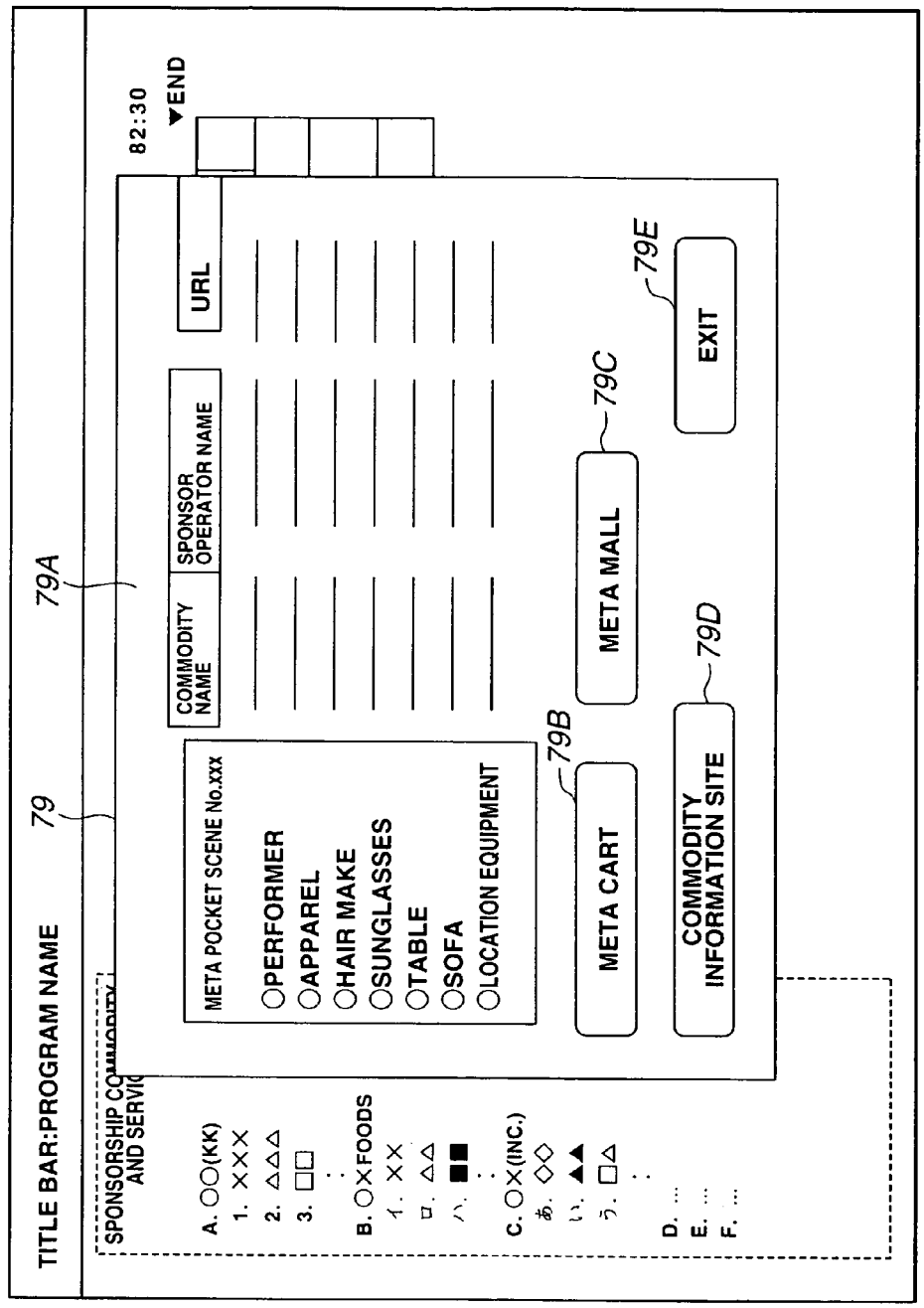
FIG. 35 shows an embodiment of a display image in preparing or editing data ancillary to a program (third embodiment).

So, a third display picture 79, shown in FIG. 35, is provided. This picture indicates how the information pertinent to plural commodities or services associated with a given scene is to be demonstrated. That is, this picture is a display example for a meta-pocket in the present specification. This picture will be explained in detail later in connection with the explanation of the audience side system. In FIG. 35, only schematics are explained.

In the display picture 79, there are displayed an information display column 79A indicating the identification code information of the program ancillary data and the detailed information on the commodities or services, jump buttons 79B to 79D in which is embedded the link information to other display pictures associated with the display picture 79, and an exit button 79E to which is associated the operation of closing the display picture.

The display content of the information display column 79A are operatively linked with the input results in the first and second display pictures. In case the display on the information display column 79A is inappropriate, the display position on the picture is corrected. The information in question is ultimately output as the program ancillary data. The so generated program ancillary data is recorded in the program ancillary data recording unit 63C.

Meanwhile, a meta-cart 79B, among the jump buttons, is a button used for jumping to a picture for confirming the information pertinent to the commodity the audience desires to purchase and which has not been definitely transmitted to the brokerage business operator. Since there is no other picture in the editing stage than a template picture provided from the outset, no explanation is given on an exemplary picture.

(b-4) Typical Display 4

Figure 36:
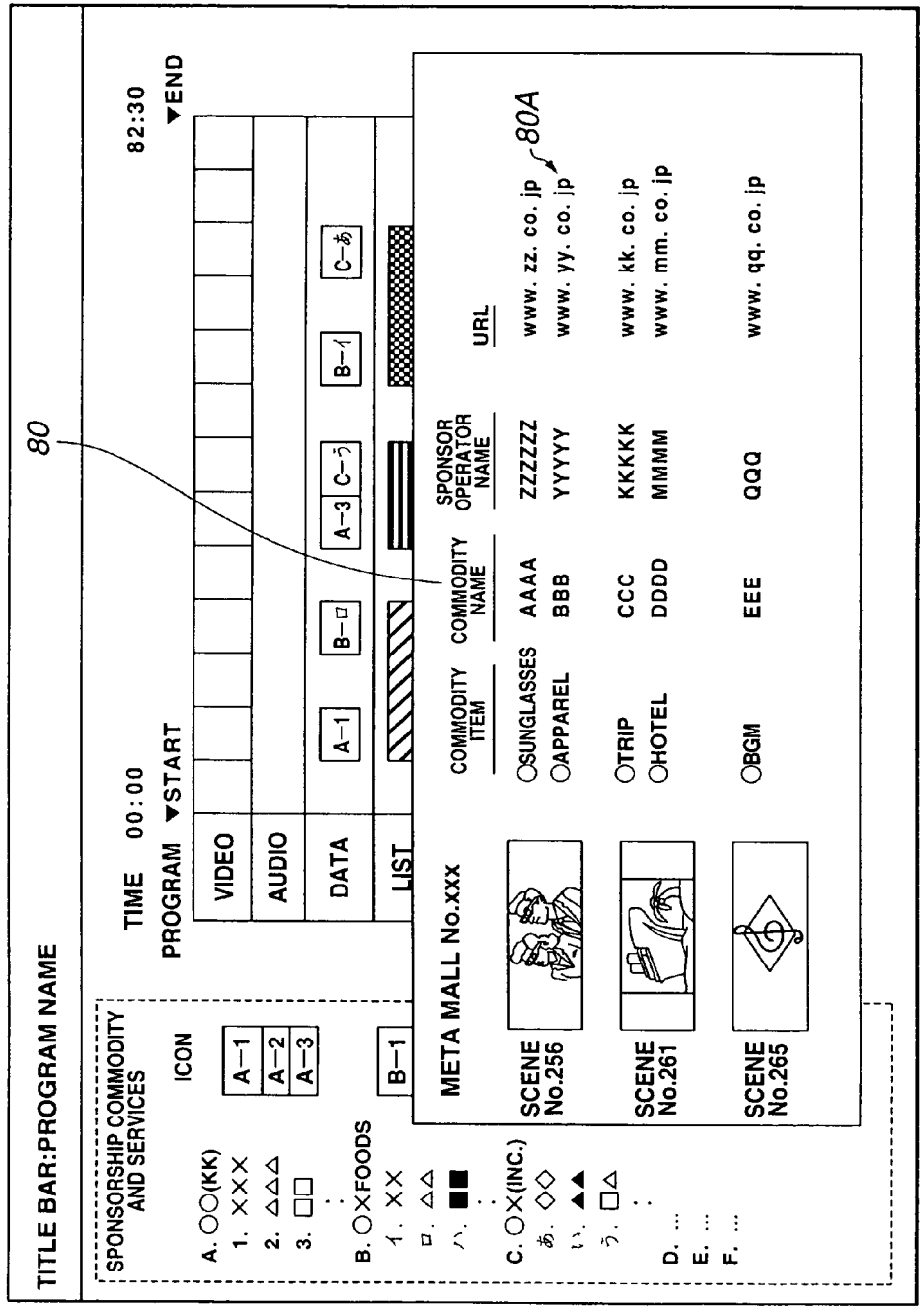
FIG. 36 shows an embodiment of a display image in preparing or editing data ancillary to a program (fourth embodiment).

FIG. 36 shows a fourth display picture 80. This display picture 80, which is a display example of a picture demonstrated in case a meta-mall 79C as one of the jump buttons shown in FIG. 35 is depressed, corresponds to the content of the list column 77C4 of FIG. 33.

FIG. 36 shows a typical picture 80 in case meta-pockets of three different scenes are to be recognizable on a sole picture. In FIG. 36, index pictures are displayed in association with each scene to permit facilitated recognition of each scene. In the display picture, since the display area 80A that can be allocated to one scene becomes narrower than with the meta-pocket, only several information of each meta-pocket are selectively demonstrated. As a method for selective display, it may be contemplated to demonstrate a preset number of information from the leading end of each meta-pocket.

(b-5) Typical Display 5

Figure 37:
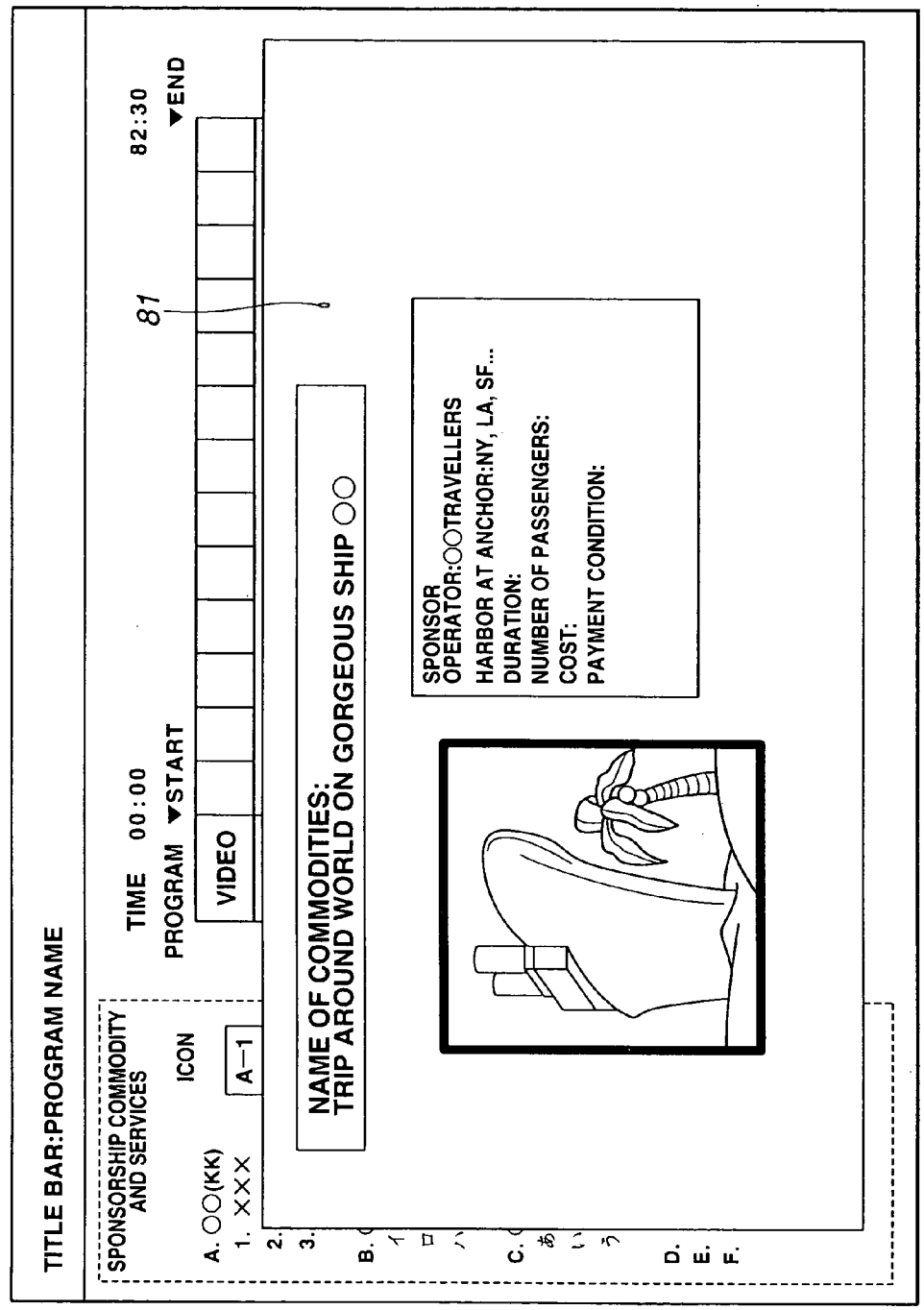
FIG. 37 shows an embodiment of a display image in preparing or editing data ancillary to a program (fifth embodiment).

FIG. 37 shows a fifth display picture 81. This display picture is a display example of a picture demonstrated when a commodity information site 79D, among the jump buttons shown in FIG. 35, is depressed. This display picture is used for confirmation for such a case where a display picture of the information concerning the individual commodities or services is provided at the data creating device for program ancillary data.

However, in case the information is on a home page of the sponsor business operator or on a home page of a brokerage business operator, it is generally unnecessary to confirm the content of the information, and hence the function in question is unneeded, although the home page in question may be optionally accessed to confirm its content.

(c) Processing Operations

Finally, the processing operations in the editing operation employing the program ancillary data creating device 63 are explained.

Figure 38:
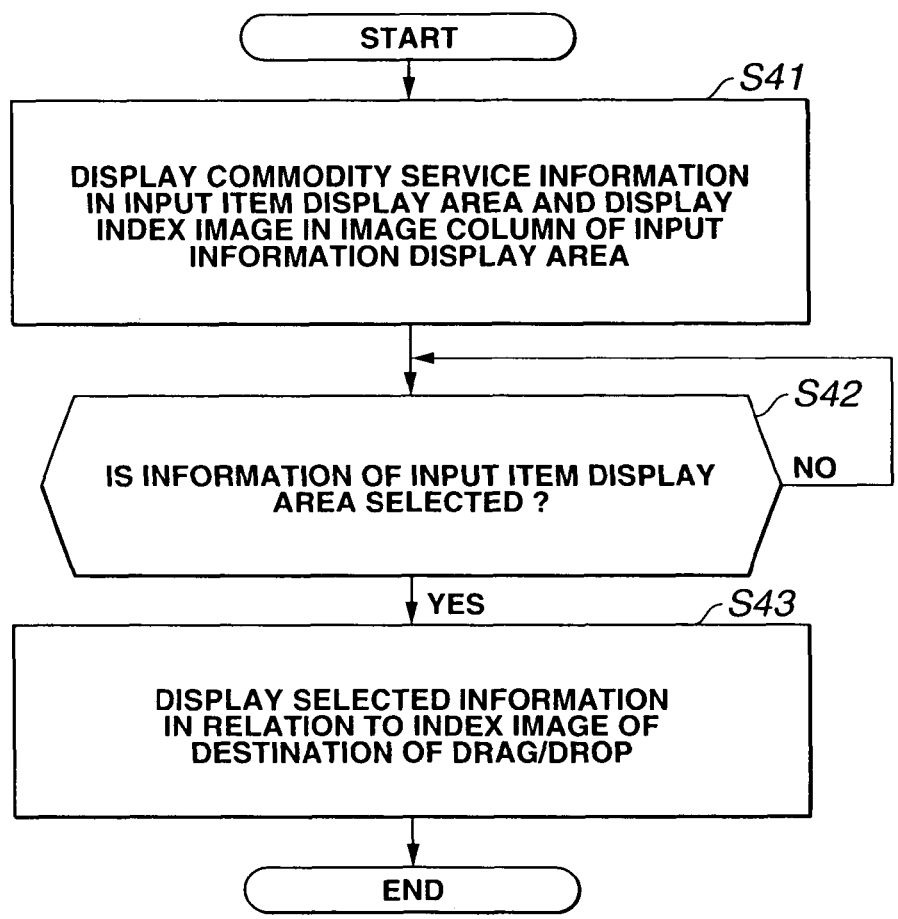
FIG. 38 is a flowchart showing an embodiment of a processing sequence in preparing data ancillary to a program (first embodiment).

FIG. 38 shows an operating sequence under a condition in which no information has been registered in the data column 77C3 in the already input information display area 77C of FIG. 33. The controller 63D reads out the layout information corresponding to the display example 1 (FIG. 35) from the layout information holding unit 63H. The controller 63D then causes the information concerning the sponsorship-related goods or services, pertinent to the picture program in question, as read out from the database for commodities or services 66, to be displayed in the input item display area 77B. Simultaneously, the controller 63D demonstrates the index picture, as read out from the picture editing device or the index picture creating unit 63G, in association with the corresponding scene (step S41).

In this state, the controller 63D verifies whether or not an icon representing the commodities or services demonstrated in the input item display area 77B has been selected (step S42). This decision operation is repeated as long as negative results persist. When the operator makes selection and affirmative results are obtained, the controller 63D causes the corresponding information to be displayed in the data column 77C3 corresponding to the index picture to which the selected icon has been dragged and dropped (picture column 77C1). Although the icon drop destination is the index picture display column, it may also be the data column 77C3.

Figure 39:
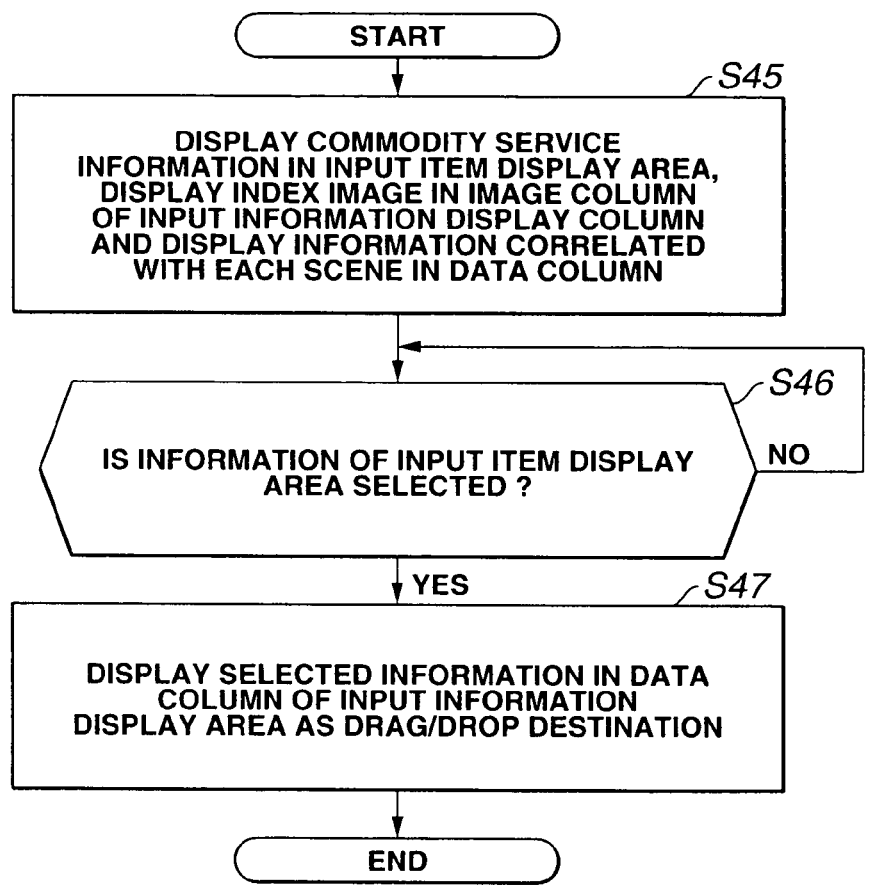
FIG. 39 is a flowchart showing an embodiment of a processing sequence in preparing data ancillary to a program (second embodiment).

The next operation is carried out in accordance with FIG. 39. The controller 63D reads out the layout information corresponding to the display example 1 (FIG. 35) from the layout information holding unit 63H, while displaying on the input item display area 77B the information concerning the sponsorship-related commodities or services pertinent to the picture program as read out from the database for commodities or services 66. The controller 63D also displays the index picture, read out from the picture editing device or the index picture creating unit 63G, in association with the corresponding scene, while reading out the previously input information concerning the commodities or services from the input data recording unit 63B to display the so read out information in the data column 77C3 (step S45).

In this state, the controller 63D verifies whether or not the icon representing the commodities or services displayed in the input item display area 77B has been selected (step S46). This decision operation is repeated as long as negative results prevail. When the operator makes selection and affirmative results are obtained, the controller 63D causes the corresponding information to be displayed in the data column 77C3 corresponding to the index picture to which the selected icon has been dragged and dropped. Although the icon drop destination is the data column 77C3, it may also be the index column (picture column 77C1), as in the example of FIG. 38.

By repeating the operation of FIG. 39, the information concerning the commodities or services making up the program ancillary data is input.

(C-4) Summary

By constructing the above-described creating system for program ancillary data, the inputting and the editing of the voluminous information on the commodities or services indispensable for the realization of data broadcast or distribution attractive to the audience can be realized efficiently. In particular, since this enables effective utilization of the information concerning the commodities or services accumulated in arriving at the sponsorship tie up for commodities or services for picture programs, the operating efficiency is improved not only on the working site for program creation but also on the working site for editing.

(D) Digital Picture Program Receiving Reproducing System

The digital picture program receiving system may be roughly divided into an audience side system receiving or reproducing the digital picture program and an brokerage business operator side system which links the interest on the part of the audience concerning the commodities or services as imaged objects to the information furnishment and commercial transactions. These respective systems are hereinafter explained.

(D-1) Program Ancillary Data Processing Device (a) Terminal Structure

The program ancillary data processing device, forming the audience side system, is classified into a device directly receiving or reproducing a digital picture program, referred to below as a primary terminal, and a device receiving the necessary information transferred from the primary terminal, referred to below as a secondary terminal. Meanwhile, the method for acquiring the digital picture program includes a method for receiving the digital picture program through ground or satellite waves, that is over a radio path, a method for receiving the digital picture program through a cabled network, such as telephone line, inclusive of ISDN, an optical fiber network or a cable television network, and a method for reproducing the digital picture program from a recording medium.

Meanwhile, the program ancillary data processing device may also be a hybrid device, also having the function of demodulating or decoding program data and the outputting function, instead of being dedicated to the processing of the program ancillary data.

(a-1) Primary Terminal

FIGS. 40 to 43 show four embodiments of the primary terminal. In any of these cases, a reproducing device 85M, an operating input device 85N and display means 85O are shown connected outside of the main body unit of the device, these may also be formed as one with or enclosed within the main body unit. Conversely, respective functional units or recording units may also be connected outside of the main body unit of the device. Needless to say, the connection between the main body unit and the external device may be wired or wireless. As for the method for communication or transmission between the devices, specified connection systems may be used.

Figure 40:
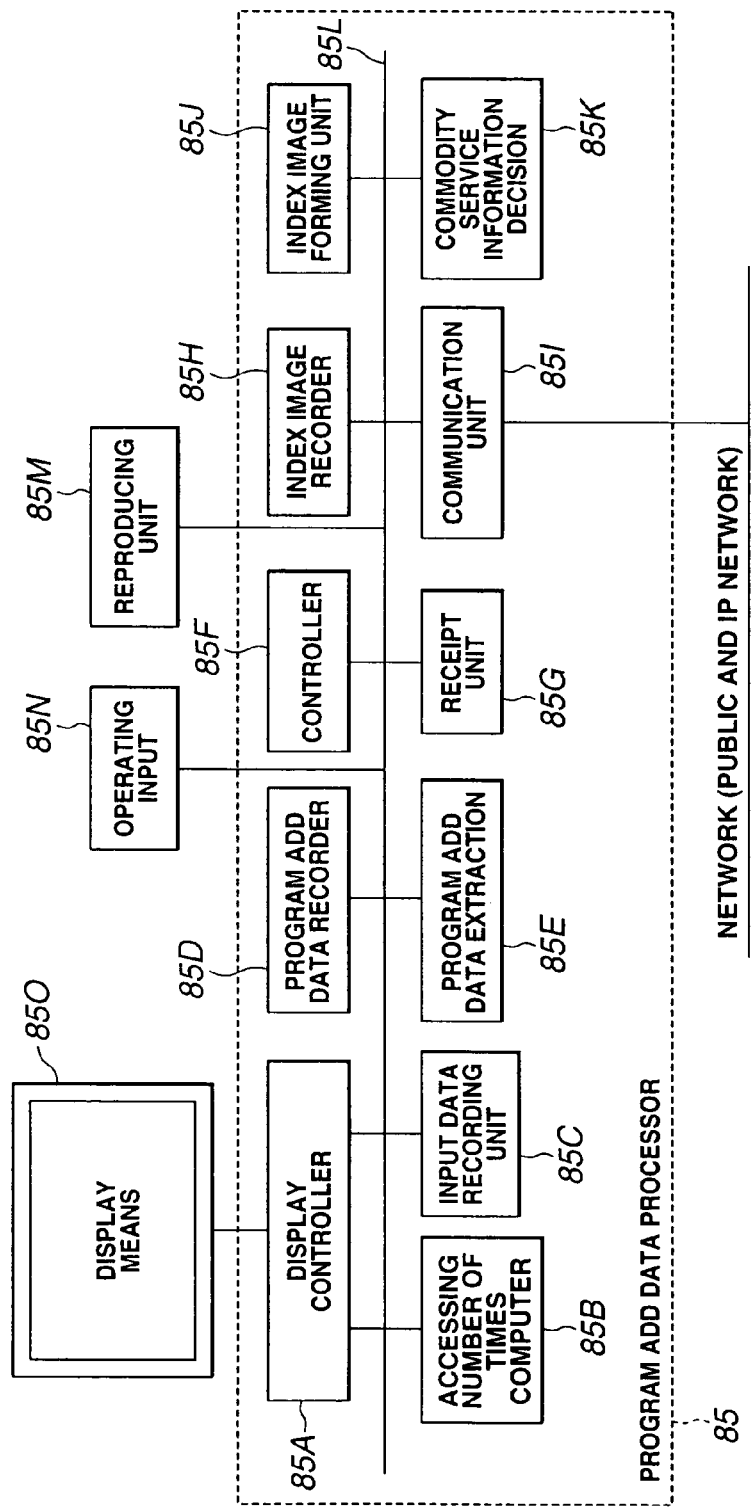
FIG. 40 is a functional block diagram showing an embodiment of a device for processing data ancillary to a program (first embodiment).

Referring first to FIG. 40, a processing device 85 for program ancillary data includes a display controller 85A, an number of times of access calculating unit 85B, an input data recording unit 85C, a program ancillary data recording unit 85D, an extraction unit for program ancillary data 85E, a controller 85F, a receiving unit 85G, an index picture recording unit 85H, a communication unit 85I, an index picture creation unit 85J, a commodity/service information presence/absence decision unit 85K, a bus 85L, a reproducing device 85M, an operating input unit 85N and display means 85O.

The display controller 85A is means for reproducing and outputting received or reproduced picture data in signal forms (data forms) conforming to the display means 85O. Output signals may, for example, be a video output (NTSC video, composite video and S-video) and an RGB output. The display controller 85A includes a data decoding function, such as one provided by MPEG (Moving Picture Experts Group), depending on the usage and application.

The received wave may be in the broadcast form or in the communication form. In any of the transmission configurations, the propagation path of the received wave includes a radio path, such as ground or satellite waves, and a cabled path, such as a telephone line, a data line and an optical fiber.

The number of access times calculating unit 85B is means for calculating the number of times of access events on the scene basis, based on the number of times of access events on the commodity or service basis. This unit is unnecessary for a terminal not having or not in need of the function of displaying the number of times of access events on the scene basis. The unit is similarly unnecessary for such a case where the number of times of scene-based access events can be acquired as reproduced data or as received data inclusive of data received independently of the digital picture program.

The number of access times calculating unit 85B calculates the sum of the number of times of access events to the commodities or services appearing as imaged objects in each scene, usually only the commodities or services appearing in the program ancillary data, in terms of the number of times of the access events to the scene in question, without regard to the route of acquisition of the information on the number of individual access events pertinent to the commodities or services. The calculated results are used when displaying the content of the program ancillary data on the picture such as when displaying meta-pockets or meta-malls. That is, even when the information on the scene-based access events is not included in the program ancillary data received or reproduced, the number of times of access events representing the scene-based interest entertained by the audience can be correlatively displayed.

As for the acquisition route, the information may be acquired as picture program data, that is as program ancillary data along with the program data, as program ancillary data by itself or as the number of times of access events by itself. The transmission medium may be wired or wireless. The information may also be acquired as replay data from the recording medium.

The input data recording unit 85C is a recording or storage medium used for recording data input through the operating input unit 85N for communication purposes. These mediums may be exemplified by a CD-ROM, a magnetic recording type medium, such as tape, floppy disc, hard disc or a magnetic card, an optical recording medium, such as write-once CD, DVD or optical card, magneto-optical recording type medium, such as DVD, MD or MO, and a semiconductor memory, such as non-volatile memory or RAM. Of these, a RAM is felt to be routinely used.

It is unnecessary for the input data recording unit 85C to be a recording unit dedicated to recording the input data. For example, it is naturally possible to use the physically same medium for the input data recording unit 85C as the recording unit 85D for program ancillary data, if only the recording area used is a different area. Meanwhile, the input data recording unit 85B may be provided within the display controller 85A.

The recording unit 85D for program ancillary data is a recording or storage medium for recording the program ancillary data acquired as received or reproduced data. The medium used is routinely a RAM, however, as in the case of the input data recording unit 85C, there is no particular limitation to the sort of the medium provided that it allows for writing program ancillary data. There is also no necessity for the recording unit 85D for program ancillary data to be a recorder dedicated to recording the program ancillary data. For example, the medium which is physically the same as the aforementioned input data recording unit 85C may be commonly used.

The extraction unit for program ancillary data 85E is means for separating and extracting the program ancillary data from the received or reproduced picture program data. FIG. 20 shows typical program ancillary data. This function may be implemented in dedicated hardware or as software.

The controller 85F is means for controlling various components of the processing device for program ancillary data 85 and for executing signal processing, and is generally configured as a micro-computer. The function of the controller 20F is routinely prescribed by the operation program and by the application program.

The receiving unit 85G is a unit for receiving picture program data or program ancillary data transmitted over a wired or wireless path, and executes preset demodulation and decoding.

The index picture recording unit 85H is a recording or storage medium for recording an index picture extracted from the program ancillary data, an index picture received from outside over a communication path, for example, from a brokerage database acting as an intermediary for commercial transactions, or a picture for recording an index picture created in the program ancillary data processing device 85.

These mediums may be exemplified by a CD-ROM, a magnetic recording type medium, such as tape, floppy disc, hard disc or a magnetic card, an optical recording medium, such as write-once CD, DVD or optical card, magneto-optical recording type medium, such as DVD, MD or MO, and semiconductor memory, such as non-volatile memory or RAM. However, a RAM is felt to be routinely used.

The communication unit 85I is means for communication with an external terminal over a network, which may be wired or wireless. In case a bidirectional path is used for receiving program ancillary data or picture program data, the receiving unit 85G and the communication unit 85I may be used in common.

The communication unit 85I is used in case the audience feels that the content of the program ancillary data displayed on the display picture is insufficient and accesses an external database, that is downloads the more detailed information concerning the commodities or services as imaged objects, or in case the intention to purchase the commodities or services as imaged objects is to be transmitted. It is also used for individually downloading the program ancillary data.

The index picture creation unit 85J is means for creating an index picture based on a representative frame picture used for confirming the content of the program ancillary data. Since the index picture is used for confirming a corresponding scene, it is generated as a picture the picture information of which is reduced in picture quality as compared to the picture used for real broadcast. It is, however, not mandatory to lower the picture quality such that the index picture may be of the same information as that of the actual broadcast.

Usually, a frame picture representative of the content of each scene is used as an index picture. Examples of the index picture include a leading frame of a corresponding scene, a frame which permits facilitated recognition of the sponsorship-related commodities or services, as selected by the audience, and a trailing end frame of the corresponding scene. If the rule for selecting the frame picture in this manner is set, the index picture creation unit 85J is able to create the index picture automatically. However, if the selection by the audience is resorted to, the frame picture at the time point (time code) as specified by the operating input unit 85N is used. Additionally, the index picture may be represented with computer graphics.

Meanwhile, in case the index picture can be acquired by itself or as a part of the program ancillary data, there is no necessity for the index picture creation unit 85J to be provided in the device. However, if a time point scene used by the audience as an index picture is to be arbitrarily selectable, there is meaning in providing the index picture creation unit 85J.

The commodity/service information presence/absence decision unit 85K is means which, in case there is embedded the identification information specifying whether or not the information on the commodities or services is contained in the program ancillary data, renders it possible to discriminate, without the necessity of analyzing the data content, whether or not the program ancillary data being processed has to do with commodities or services.

If this decision unit is used, the program ancillary data containing the information pertinent to commodities or services can be distinguished from other program ancillary data with only a small signal processing volume. Moreover, only the program ancillary data containing the information pertinent to the commodities or services can be selectively sent to the display controller 85A for display on the display picture or storage in a recording medium.

Moreover, if, in case of creating an index picture within a program ancillary data creating device, there is not contained the information pertinent to commodities or services, there is no necessity for confirming the commodities or services on the index picture, so that the creation of the index picture may be dispensed with. However, this applies only for a case where the index picture is used exclusively for confirming the commodities or services, such that, if the index picture is used for other purposes, creation of the index picture may be necessary.

Meanwhile, should the information pertinent to the subject-matter of the sponsorship be included in the program ancillary data, a sponsor information presence/absence decision unit, similar to the commodity/service information presence/absence decision unit 85K, may be provided for verifying, from the relevant information in the program ancillary data, whether or not there is contained the information concerning the subject-matter of the sponsorship.

These decision units are particularly effective when a display picture (meta-pocket in the present specification) used for collecting the information pertinent to the commodities or services appearing as an imaged object in each scene in the aforementioned supplementary information data creating system into one is not prepared.

For example, such a use becomes possible in which, if the component units of the program ancillary data contained in the received or reproduced signal are commodities or services, the program ancillary data relevant to the same scene is first extracted, using the information specifying each scene, such as UMID or time code, as a retrieving key, and in which the data pertinent to commodities or services or the data pertinent to the sponsorship is then sorted and extracted, using the aforementioned decision units, with the meta-pocket being then created from the sorted information pertinent to the commodities or services.

The bus 85L is a data input/output bus, which may, for example, be an ISA, EISA pr PCI bus. The reproducing device 85M is means for reproducing the picture program data or program ancillary data distributed as recording medium. For the reproducing device 85M, such a device which is in keeping with the recording medium having picture program data or the program ancillary data, recorded thereon, is preferably used. Since a large capacity medium is required for program data, DVD or MO is presupposed as medium. For program ancillary data, a data volume smaller than that for picture program data suffices, and hence a non-volatile memory or a CD-ROM etc. is presupposed in addition to the above mediums. However, the possible storage capacity is changed appreciably with the progress in technology and the debut of a new medium needs to be taken into account. Consequently, there is no limitation as to the name or the compatibility relationships of the storage mediums used. The same holds for other mediums.

The operating input unit 85N may be enumerated by, for example, a keyboard, a mouse, a pointing device, such as pad, pen or pointer, a dial, having or not having a click function, and a pushbutton key. A remote controller may also be used.

The display means 85O is a device used for confirming the content of the program ancillary data. In general, such display means which is also capable of displaying a picture program is used. In general, a display picture of a television receiver or a monitor device may also be used. In the case of a portable device, a liquid crystal device or the like small-sized lightweight display device is used.

The terminal operating as 'program ancillary data processing device' shown in FIG. 40 includes, in addition to dedicated devices for processing program ancillary data, computer terminals, such as notebook or desktop personal computers, portable information terminals (PDA), portable telephone sets, game machines, set top box, PC card, domestic electrical utensils, VTR, television receivers, car navigation systems, wrist watches having the information processing functions, and remote controllers. The same holds for the program ancillary data processing devices hereinafter explained.

Figure 41:
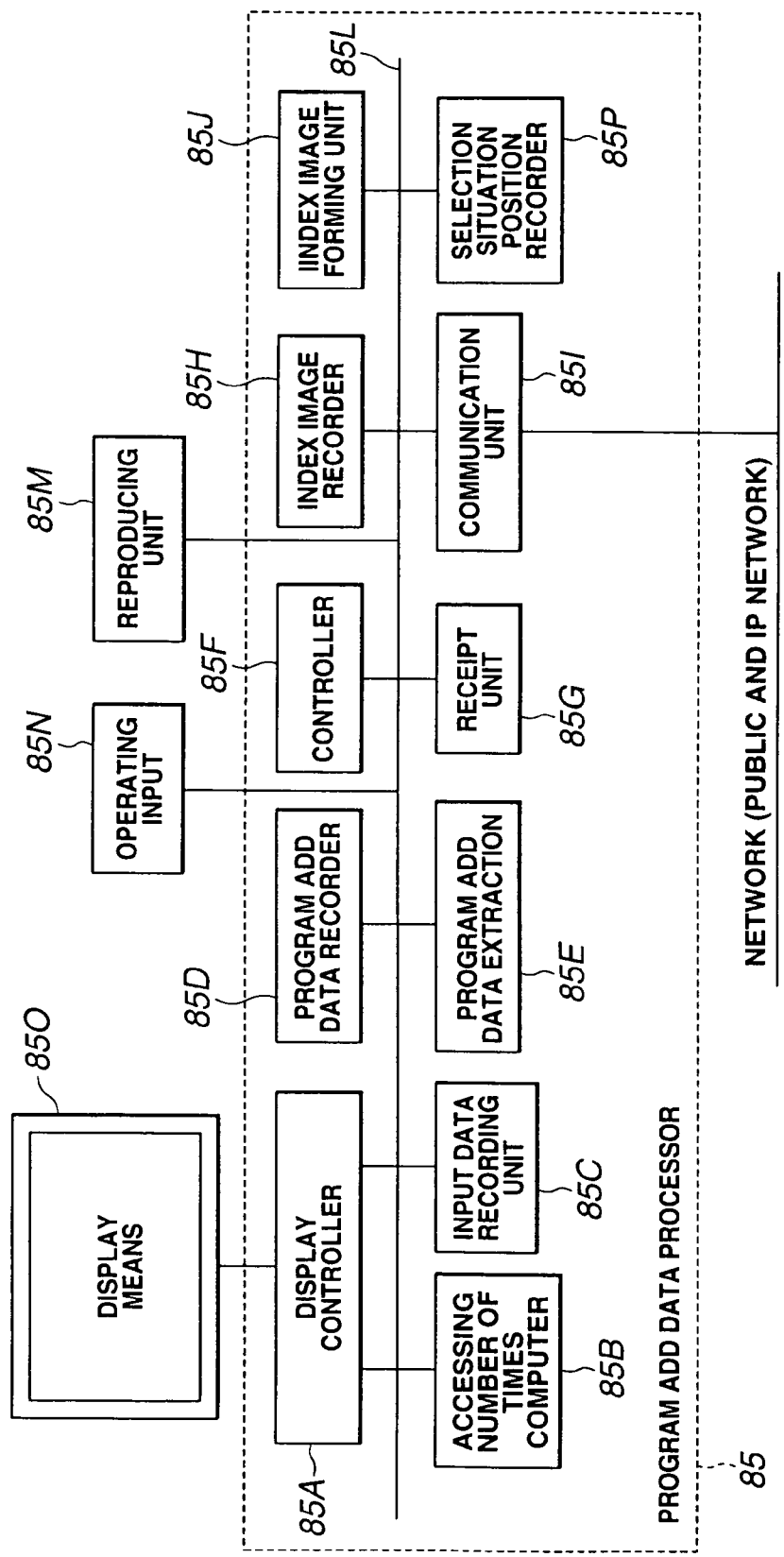
FIG. 41 is a functional block diagram showing an embodiment of a device for processing data ancillary to a program (second embodiment).

Reference is now made to FIG. 41 in which the parts or components same as those of FIG. 40 are indicated by the same reference numerals. FIG. 41 differs from FIG. 40 in that a selection scene position recording unit 85P is substituted for the commodity/service information presence/absence decision unit 85K. The selection scene position recording unit 85P is a recording or storage medium for the audience to record the information of the scene position selected as the display position of the program ancillary data. Usually, a RAM is used for this recording unit. However, other mediums may also be used.

By providing the function in question, selection of the scene position displayed as an index picture may be up to the discretion of the audience. In particular, since the audience may be interested in a wide variety of commodities or services, the index picture provided by the picture producer is not necessarily suitable to the commodities or services in which the audience is interested. By providing the above function, the scene position that can be readily recognized by the audience may be adopted as the index picture. In case the selecting function on the part of the audience is to be displayed in creating the index picture, the selection scene position recording unit 85P needs to be provided in the case of FIG. 40.

Figure 42:
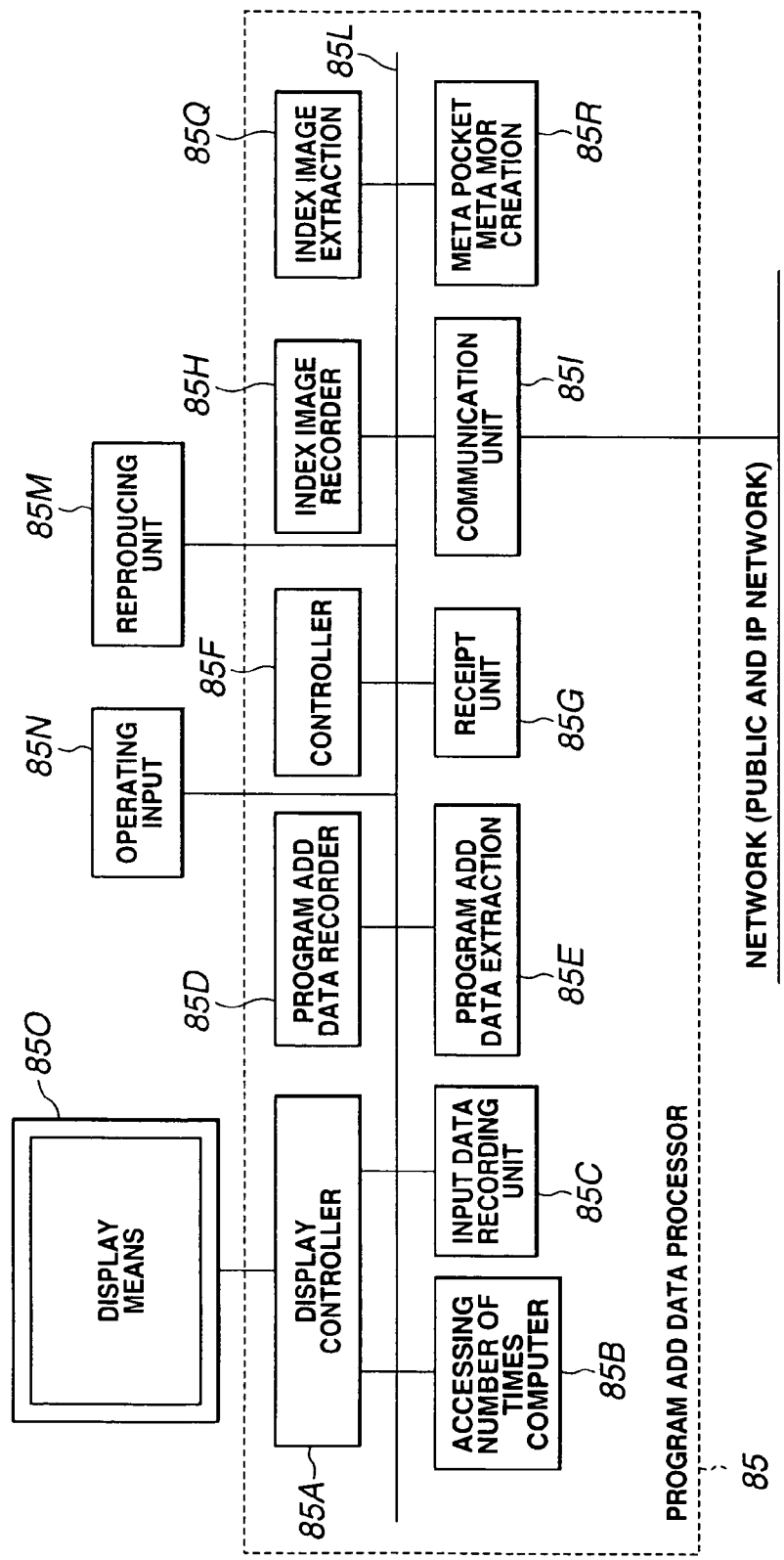
FIG. 42 is a functional block diagram showing an embodiment of a device for processing data ancillary to a program (third embodiment).

Reference is now made to FIG. 42 in which the parts or components same as those of FIG. 40 are indicated by the same reference numerals. FIG. 42 differs from FIG. 40 in that an index picture extraction unit 85Q is substituted for the index picture creation unit 85J and in that a meta-pocket/meta-mall creation unit 85R is substituted for the commodity/service information presence/absence decision unit 85K.

The index picture extraction unit 85Q extracts an index picture when one is contained in the received data or reproduced data, without regard to whether the index picture is contained as a part of the program ancillary data or is contained by itself.

The meta-pocket/meta-mall creation unit 85R is means for creating, in case the meta-pocket or the meta-mall is not included in the program ancillary data, the corresponding information, based on the program ancillary data received or reproduced. The meta-pocket is the program ancillary data which corresponds to the information pertinent to commodities or services appearing in a specified scene and which routinely includes the layout information, whereas the meta-mall is the program ancillary data which is adapted for enabling plural meta-pockets associated with respective plural scenes to be viewed at a glance in one picture, and which routinely includes the layout information.

Meanwhile, the meta-mall can be created from the metadata concerning plural scenes, as determined under a specifying rule or subject to designation by the audience, or can be created from the information pertinent to individual commodities or services.

Figure 43:
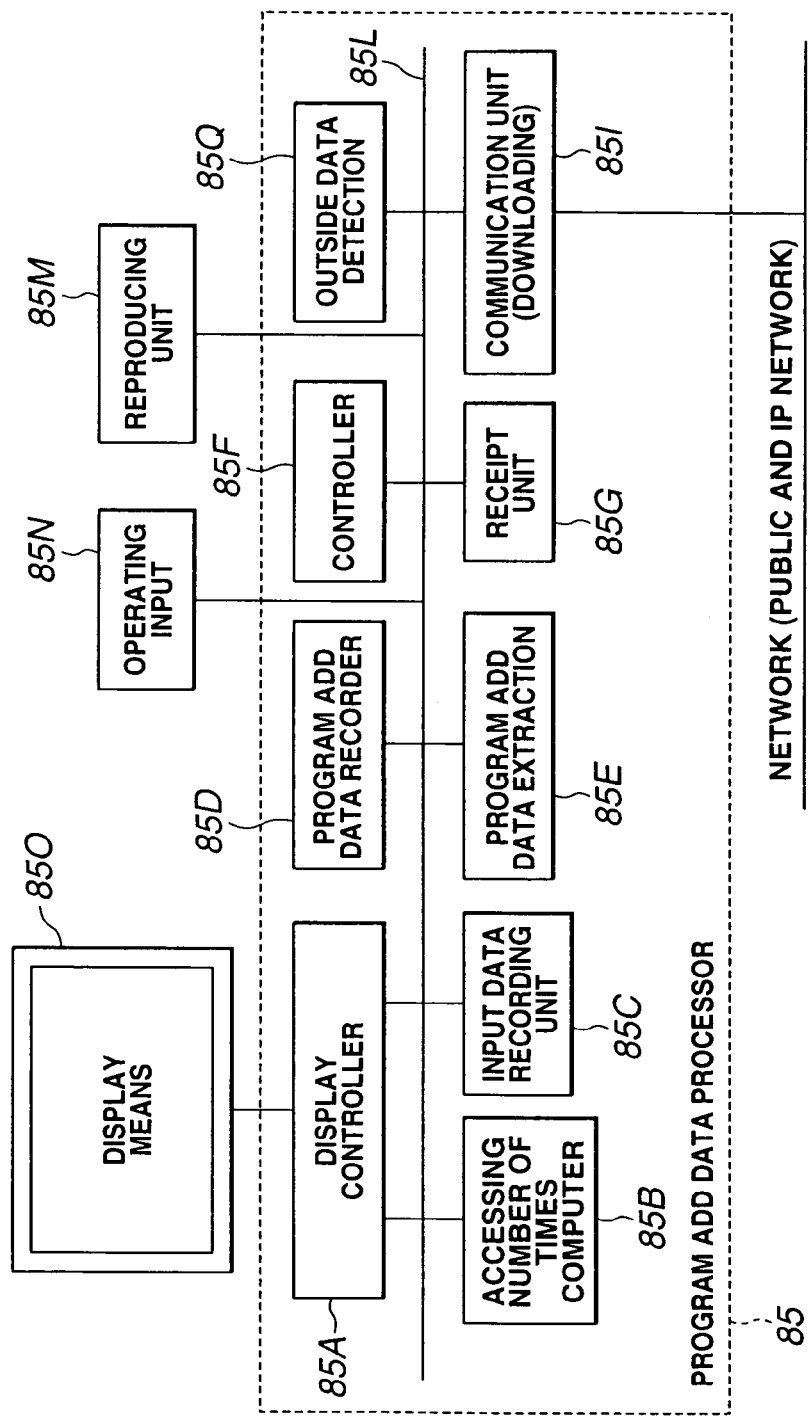
FIG. 43 is a functional block diagram showing an embodiment of a device for processing data ancillary to a program (fourth embodiment).

Reference is now made to FIG. 43 in which the parts or components same as those of FIG. 40 are indicated by the same reference numerals. FIG. 43 differs from FIG. 40 in that an external data presence/absence detection unit 85Q is substituted for three units, namely the index picture recording unit 85H, index picture creation unit 85J and the commodity/service information presence/absence decision unit 85K.

The external data presence/absence detection unit 85Q is means effective when data (flags) indicating the external presence of the information pertinent to the corresponding scene in the program ancillary data are used. This is effective when the data volume of the program ancillary data is to be reduced in data volume or when services are to be rendered to members. That is, since the information on the commodities or services significant for the audience is not contained in the program ancillary data received or reproduced, the data volume is appreciably reduced, while the information may be adapted for not being furnished to the audience except specified members.

If the presence of the external data is detected in the external data presence/absence detection unit 85Q, the external database etc. is accessed through the communication unit 85I to download the necessary information. Meanwhile, the information concerning the accessed site may be pre-registered, or recorded in the program ancillary data. If services are rendered to specified members, authentication means, not shown, are used.

(a-2) Secondary Terminal

Figure 44:
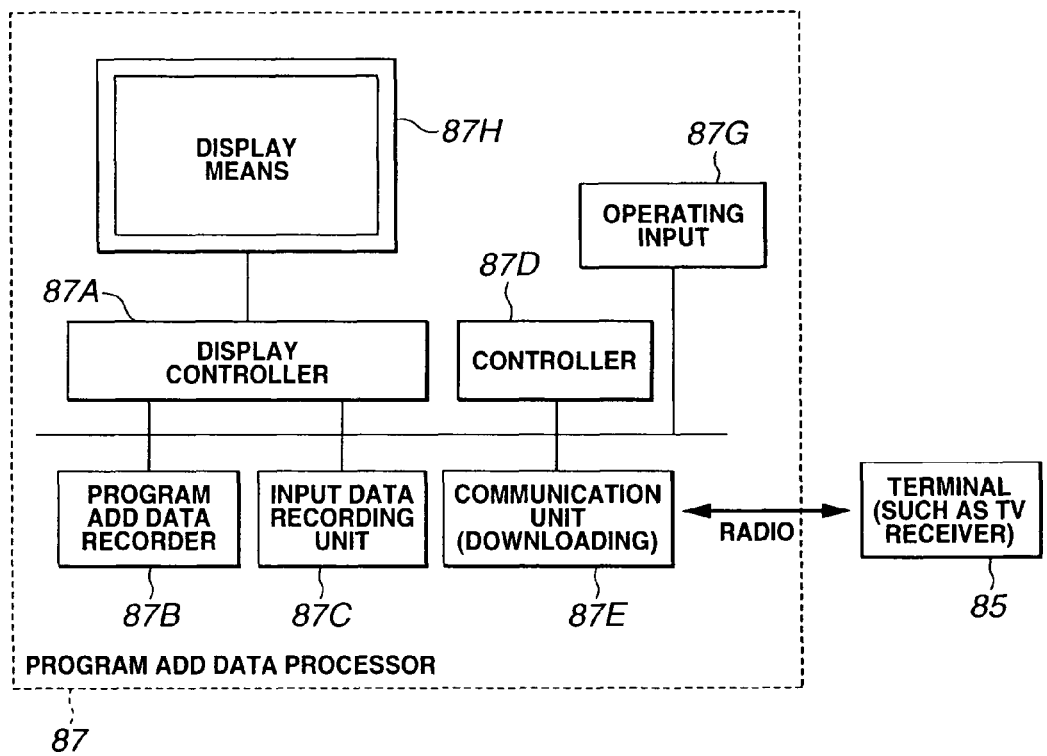
FIG. 44 is a functional block diagram showing an embodiment of a device for processing data ancillary to a program (fifth embodiment).

FIG. 44 shows an embodiment of the secondary terminal. Although FIG. 44 shows a case where any functional units are enclosed or unified in a main body unit of the device, these may be externally connected to the main body unit. The connection between the main body unit and the external device may be wired or wireless. As for the method for communication or transmission between the devices, specified connection systems may be used.

Meanwhile, a typical structure of the secondary terminal is shown as in FIG. 44 because a portable type terminal is presupposed as a secondary terminal. The secondary terminal may, of course, be a standstill device. The typical structure is convenient when the primary and secondary terminals are differentially used, as when the primary terminal is used in the user's premises and the secondary terminal is used outdoors. In this consideration, FIG. 44 shows an example of acquiring the necessary information by wireless communication with the primary terminal (program ancillary data processing device) 85, such as television receiver. Of course, wired connection may be used as the connection between the secondary and primary terminals.

FIG. 44 shows a program ancillary data processing device 87 including a display controller 87A, a program ancillary data recording unit 87B, an input data recording unit 87C, a controller 87D, a communication unit (downloading unit) 87E, a bus 87F, an operating input unit 87G and display means 87H. Although not shown in FIG. 44, data used in the secondary terminal may be acquired from the primary terminal in the form of a recording medium. In this case, a reproducing device is required.

The display controller 87A is means for reproducing and outputting received or reproduced picture data in signal forms (data forms) conforming to the display means 87H. Output signals may, for example, be a video output (NTSC video, composite video and S-video) and an RGB output. The display controller 87A includes a data decoding function, such as one provided by MPEG (Moving Picture Experts Group), depending on the usage and application.

The program ancillary data recording unit 87B is a recording or storage medium for recording the program ancillary data received and reproduced. These recording mediums include a CD-ROM, a magnetic recording type medium, such as tape, floppy disc, hard disc or a magnetic card, an optical recording medium, such as write-once CD, DVD or optical card, magneto-optical recording type medium, such as DVD, MD or MO, and a semiconductor memory, such as nonvolatile memory or RAM. Of these, the RAM is felt to be routinely used.

It is unnecessary for the program ancillary data recording unit 87B to be a recording unit dedicated to recording the input data. For example, it is naturally possible to use the physically same medium for the input data recording unit 87C as the data recording unit for program ancillary data 87D if only the recording area used is a different area.

The input data recording unit 87C is a recording or storage medium for recording data input through the operating input unit 87G for communication purposes. The medium used is routinely a RAM. However, as in the case of the program ancillary data recording unit 87B, there is no particular limitation to the sort of the medium provided that it allows for writing input data. It is unnecessary for the input data recording unit 87C to be a recording unit dedicated to the recording of the input data. On the other hand, the input data recording unit 87C may be provided within the display controller 87A.

The controller 87D is means for controlling various components making up the program ancillary data processing device 87 and for carrying out signal processing, and is configured as a micro-computer. Usually, the function of the controller 87D is prescribed by the operation system and by the application program.

The communication unit 87E is means for communication with outside, especially with the primary terminal 85, to acquire the necessary information. The communication path may be wired or wireless, as aforesaid. The same holds for the case of communication with an external equipment other than the primary terminal.

The bus 87E is an input/output bus for data, such as an ISA bus, an EISA bus or a PCI bus. The operating input unit 87G may, for example, be a keyboard, a mouse, a pointing device, such as pad, pen or pointer, a dial, having or not having a click function, and a pushbutton key. A remote controller may also be used.

The display means 87H is a device used for confirming the content of the program ancillary data. In the case of a portable device, a small-sized lightweight display device, such as a liquid crystal device, may be used. In the case of a standstill type device, a monitor device or a television receiver may be used.

The terminal operating as the 'program ancillary data processing device' shown in FIG. 44 includes, in addition to dedicated devices for processing program ancillary data, computer terminals, such as notebook or desktop personal computers, portable information terminals (PDA), portable telephone sets, game machines, set top boxes, PC cards, domestic electrical utensils, VTR, television receivers, car navigation systems, wrist watches having the information processing functions, and remote controllers 15.

(b) Display Picture Example

Next, display picture examples of the program ancillary data processing devices 85, 87 are explained.

(b-1) Presence Notice Picture of Program Ancillary Data

Figure 45:
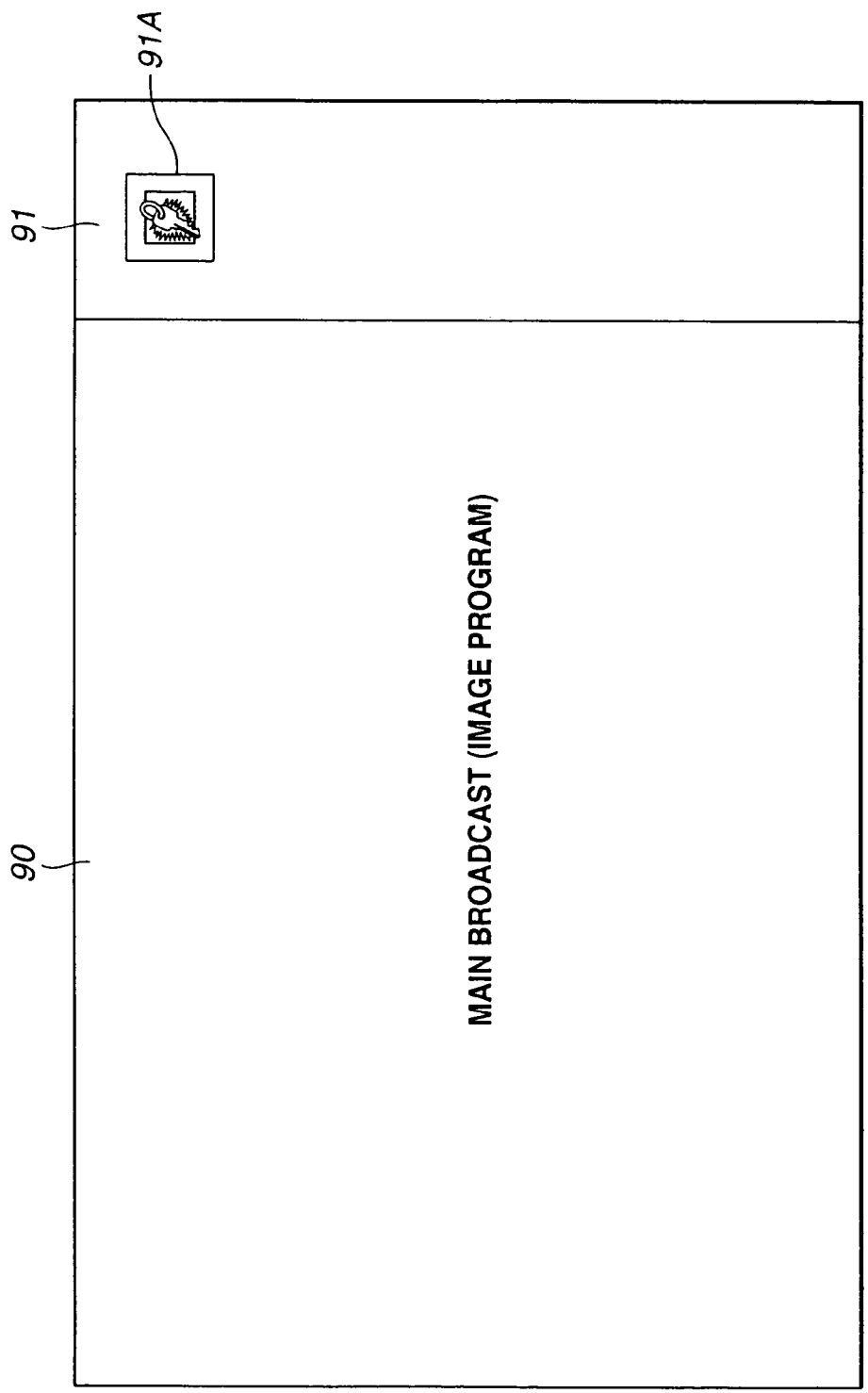
FIG. 45 shows an embodiment of a display picture of a video program provided with data ancillary to a program (first embodiment).
Figure 46:
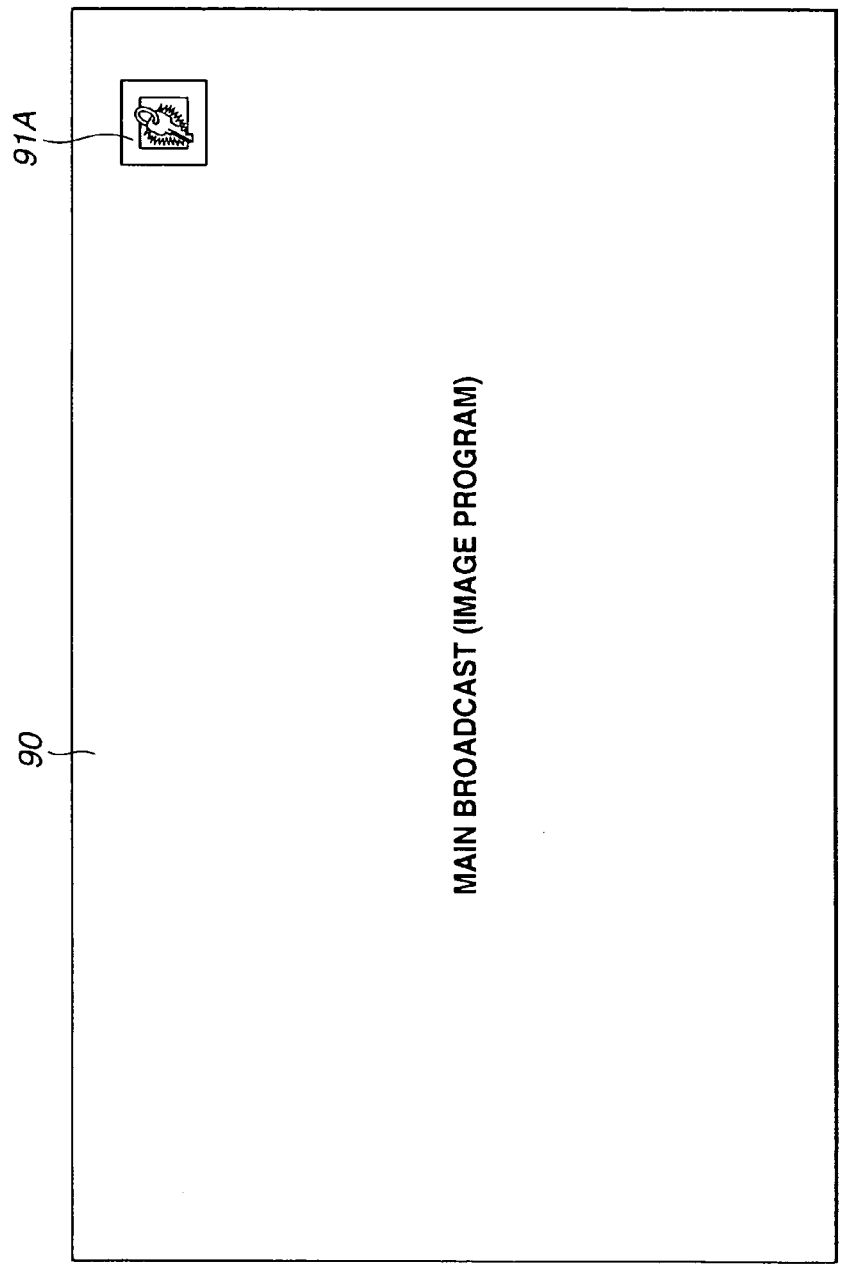
FIG. 46 shows another embodiment of a display picture of a video program provided with data ancillary to a program (second embodiment).

FIGS. 45 and 46 show a picture display example in a scene where the program ancillary data pertinent to the commodities or services, such as meta-mall or meta-pocket (list file), are associated with the picture program (real broadcast). It is noted that this picture display is made when the display function notifying to the audience that the program ancillary data pertinent to the commodities or services is so associated is set to the [ON state] by the audience. If conversely the audience sets the function to the [OFF state], display of FIGS. 45 and 46 is not made.

FIG. 45 shows a display example in case of divisionally demonstrating the display area into a real broadcast area 90 and an auxiliary information area 91. In the case of FIG. 45, a notice symbol 91A of a scene, with which the program ancillary data pertinent to the commodities or services is associated, is demonstrated in the auxiliary information area 91. On the other hand, FIG. 46 shows a display example in case of using the entire display area for the real broadcast area 90. In FIG. 46, the notice symbol 91A for the scene with which the program ancillary data is associated is displayed superimposed on the real broadcast picture. It is similarly possible in the case of FIG. 45 to display the symbol in superimposition on the real broadcast picture.

There may also be envisaged a method of changing the display of an indicator provided on a front panel of an electronic equipment, such as a remote controller or a television receiver, such as by lighting, flicker or change of display color, or by producing an alarm sound.

(b-2) Display Example of Meta-Pocket (1) Meta-Pocket Display Example

FIGS. 47 to 50 show a display picture example of the information pertinent to the commodities or services appearing in each scene, that is a display example of a meta-pocket, as is so termed in the present specification. It is noted that the meta-pocket may be received or reproduced as program ancillary data or may be created by signal processing in the program ancillary data processing device.

Figure 47:
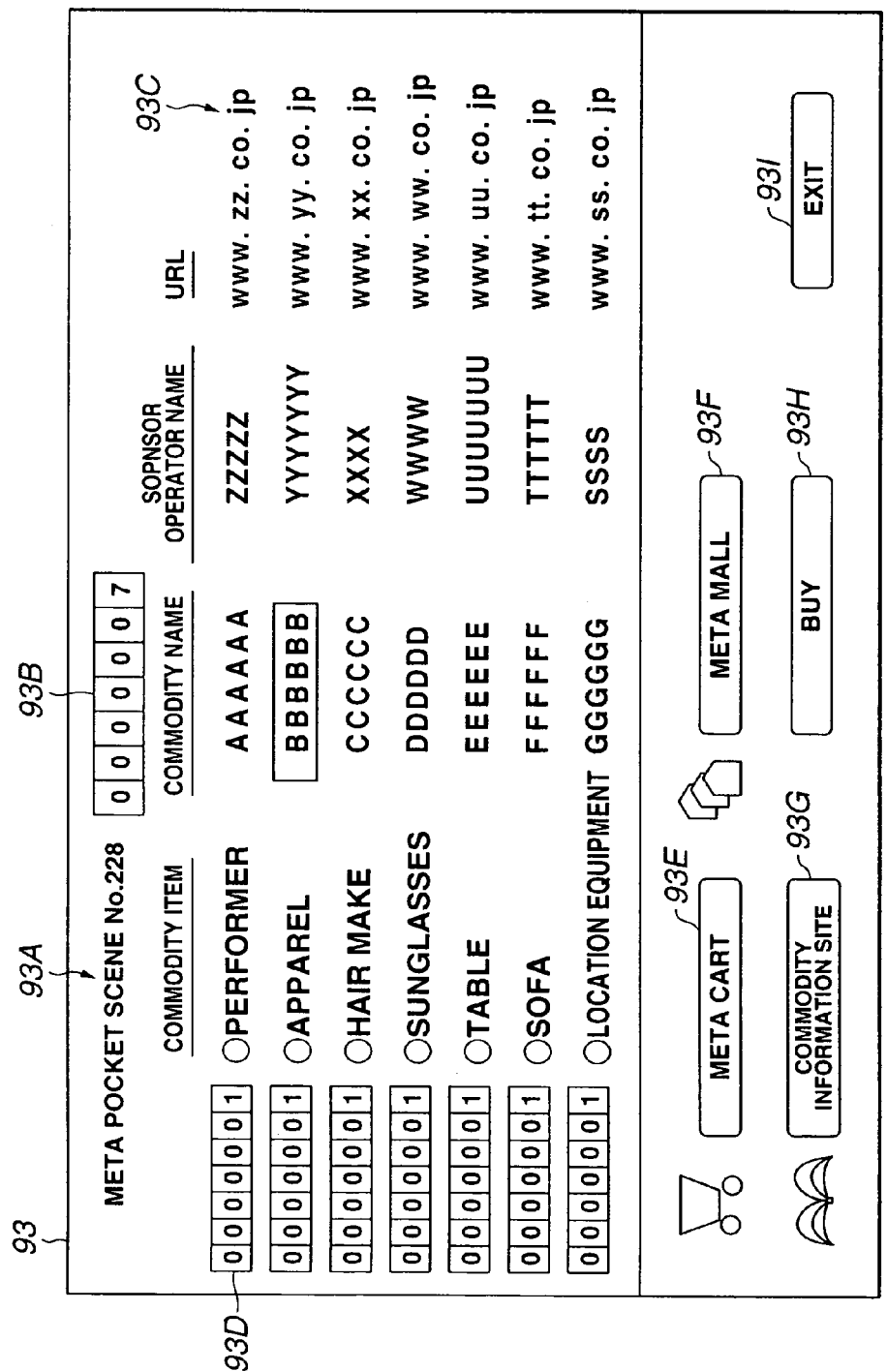
FIG. 47 shows an embodiment of a display picture of a meta-pocket picture (first embodiment).
Figure 48:
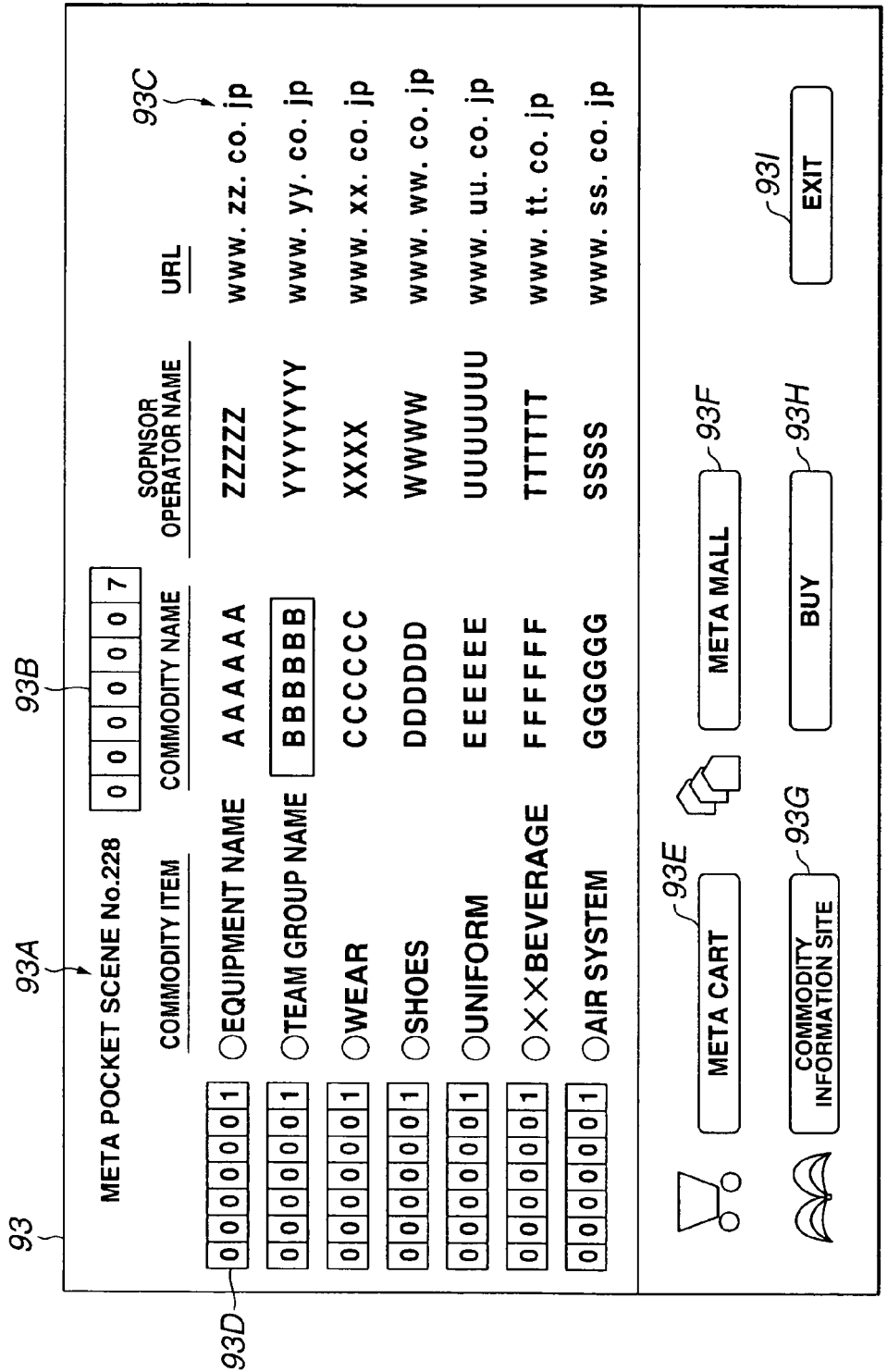
FIG. 48 shows an embodiment of a display picture of a meta-pocket picture (second embodiment).
Figure 49:
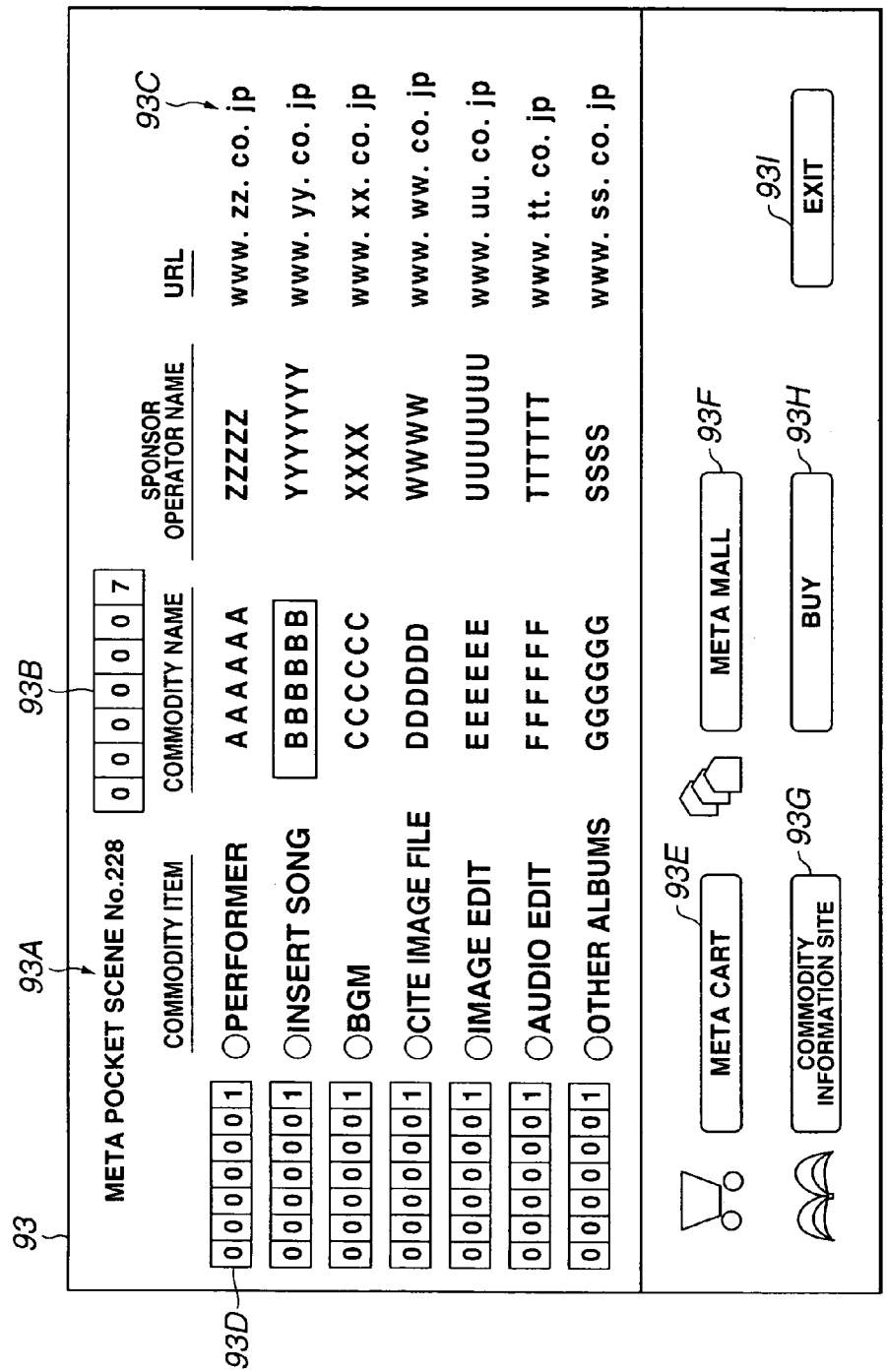
FIG. 49 shows an embodiment of a display picture of a meta-pocket picture (third embodiment).

FIGS. 47 to 49 shows examples of display pictures having the same layout structure. Meanwhile, FIG. 47 is directed to a display example of a motion picture, drama or a variety program, FIG. 48 is directed to a display example of a sports program and FIG. 49 is directed to a display example of the information pertinent to the music or pictures used in the picture program. In these figures, the content conforming to the object is displayed as the information on the commodities or services.

First, the layout structure common to these display pictures 93 is explained with reference to FIG. 47. These display pictures each include an identification number display column 93A, as meta-pocket management information, a scene-based access information display column 93B, a display column for the information pertinent to commodities or services 93C, an access information display column on the commodity or service basis 93D, a meta-cart button jump button 93E embedding the link information to the meta-cart, a meta-mall jump button 93F, embedding the link information to the meta-mall, a commodity information site jump button 93G, embedding the link information to the detailed information pertinent to commodities or services as selected on the picture, a purchase button 93H used for inputting the intention to purchase and an end button 93I for finishing the meta-pocket display. The scene-based access information display column 93B sums the access states from the audience to the commodities or services appearing in the meta-pocket, on the scene basis. The access information display column on the commodity or service basis 93D shows the accessing information from the audience to the commodities or services appearing in the meta-pocket in question.

In the case of FIG. 47, the audience is able to acquire, at a time, the information pertinent to plural objects appearing in an associated scene, for example, the information pertinent to the commodities or services, such as performer's apparel, hair making, sunglasses, tables, sofas, location equipment etc. These information are relevant to the apparel or small articles, worn by the performers, or the fitting used in e.g., a studio, in distinction from the information pertinent to the commodities or services for so-called television shopping, and hence have not so far been taken into account in connection with information furnishment.

Since these information are displayed, the business operator which furnished the commodities or services are given the opportunity of new advertisement and hence the opportunity for latent business transactions. On the other hand, the audience is given the information pertinent to the commodities or services in which the audience is interested, rather than the information of insipid uniformity.

In the case of FIG. 47, only the classification of the commodity items, names of commodity, name of the sponsor business operator and the URL, are indicated in the display column for the information pertinent to commodities or services 93C, to display in front the function as a platform for acquiring the information pertinent to the commodities or services. Alternatively, the information pertinent to the prices of the commodities or services or the information pertinent to the selling store can be confirmed on the picture.

Meanwhile, the number of times of access events, displayed in the scene-based access information display column 93B or in the access information display column on the commodity or service basis 93D of FIG. 47, may be the number of times the information is acquired by the audience first selecting the commodities or services and subsequently acting on the commodity information site jump button 93G, or the sum total of the number of times until the purchase of the commodities or services.

It may be contemplated that the information pertinent to the number of times of access events may be obtained not only from the information furnishing server connected to the premises of the audience over a communication network, but also from the latest information directly broadcasted or distributed from the broadcasting or distributing station or acquired from a recording medium which has recorded the information at a certain time point.

Examples of display pictures, demonstrated on actuating the meta-cart button jump button 93E, meta-mall jump button 93F and the commodity information site jump button 93G, will be explained later in detail.

In the case of FIG. 48, the information on the uniforms or shoes of a player appearing in an imaged object in a sports program, as well as the institution information concerning an arena or gymnasium, is obtainable. In the case of FIG. 49, the information concerning the performer of the musical sound used in the picture program, the information on BGM, or the information concerning the editing technique or the special effect technique used in a picture program, is also obtainable.

Figure 50:
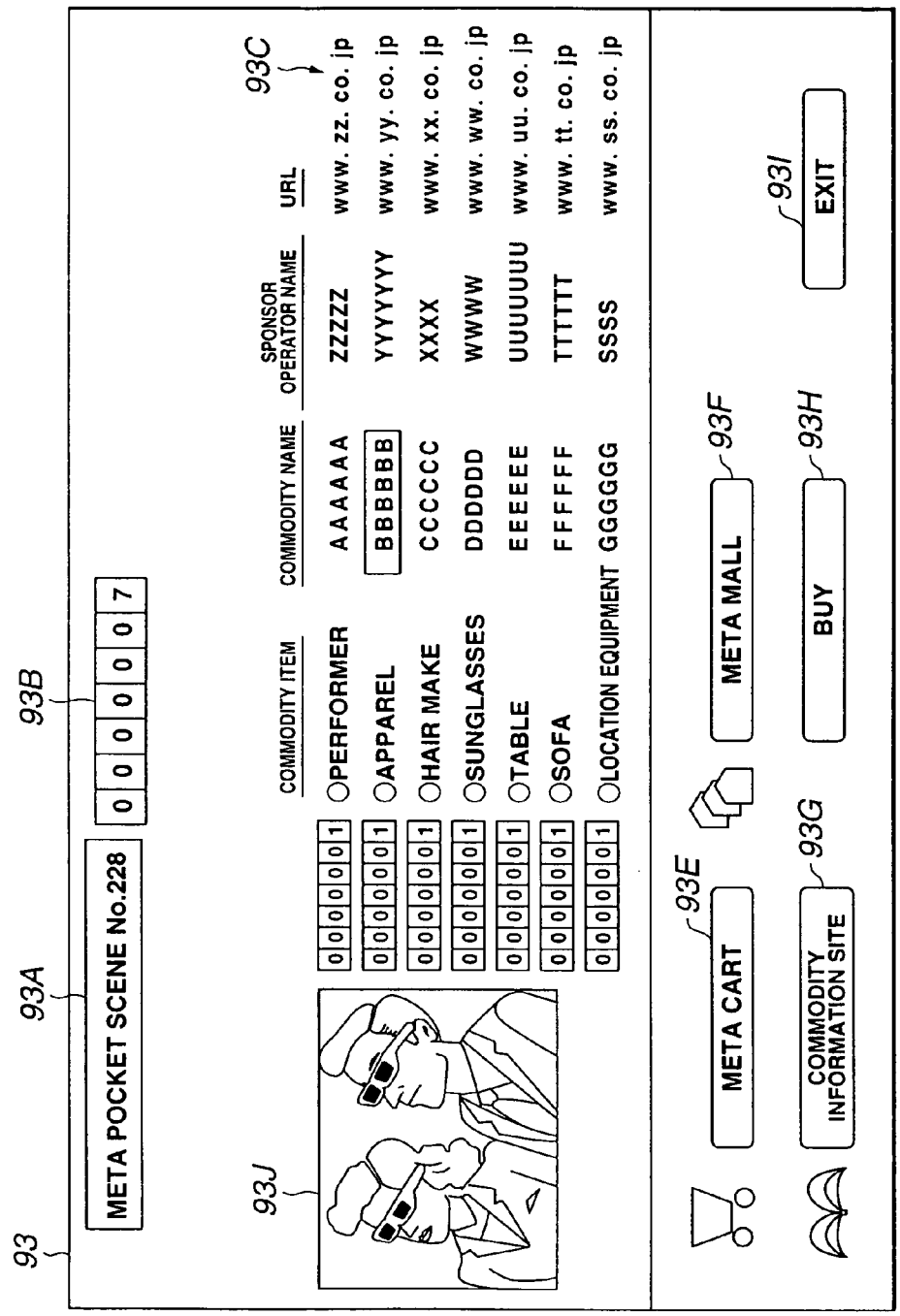
FIG. 50 shows an embodiment of a display picture of a meta-pocket picture (fourth embodiment).

Reference is now made to FIG. 50, which differs from FIGS. 47 to 49 in that an index picture 93J is included among the objects for display. If a meta-pocket is displayed along with the real broadcast, the content of the meta-pocket can be confirmed in the real broadcast, however, the picture of the real broadcast is usually changed. Thus, commodity items can be deliberately selected by having the index picture 93J displayed, even when the meta-pocket is displayed along with the real broadcast.

If the meta-pocket content is confirmed later, but the index picture 93J for a scene in question is displayed on the same picture along with the information pertinent to commodities or services, the necessary information can be accessed without the audience having to resort to his or her recollections, with the consequence that the meta-pocket confirmation may be made a separate event from the viewing of the real broadcast. This testifies to the increased practical value of the meta-pocket. If the viewer is usually busy, he or she may transfer the meta-pocket equivalent portion of the program ancillary data (metadata) of the picture program recorded on the household equipment to a portable terminal to confirm the content outdoors or to offer to purchase the commodities or services he or she is interested in. The index picture 93I, if displayed, is convenient in such case because the scene content can then be comprehended reliably.

(2) Meta-Mall Display Example

Figure 51:
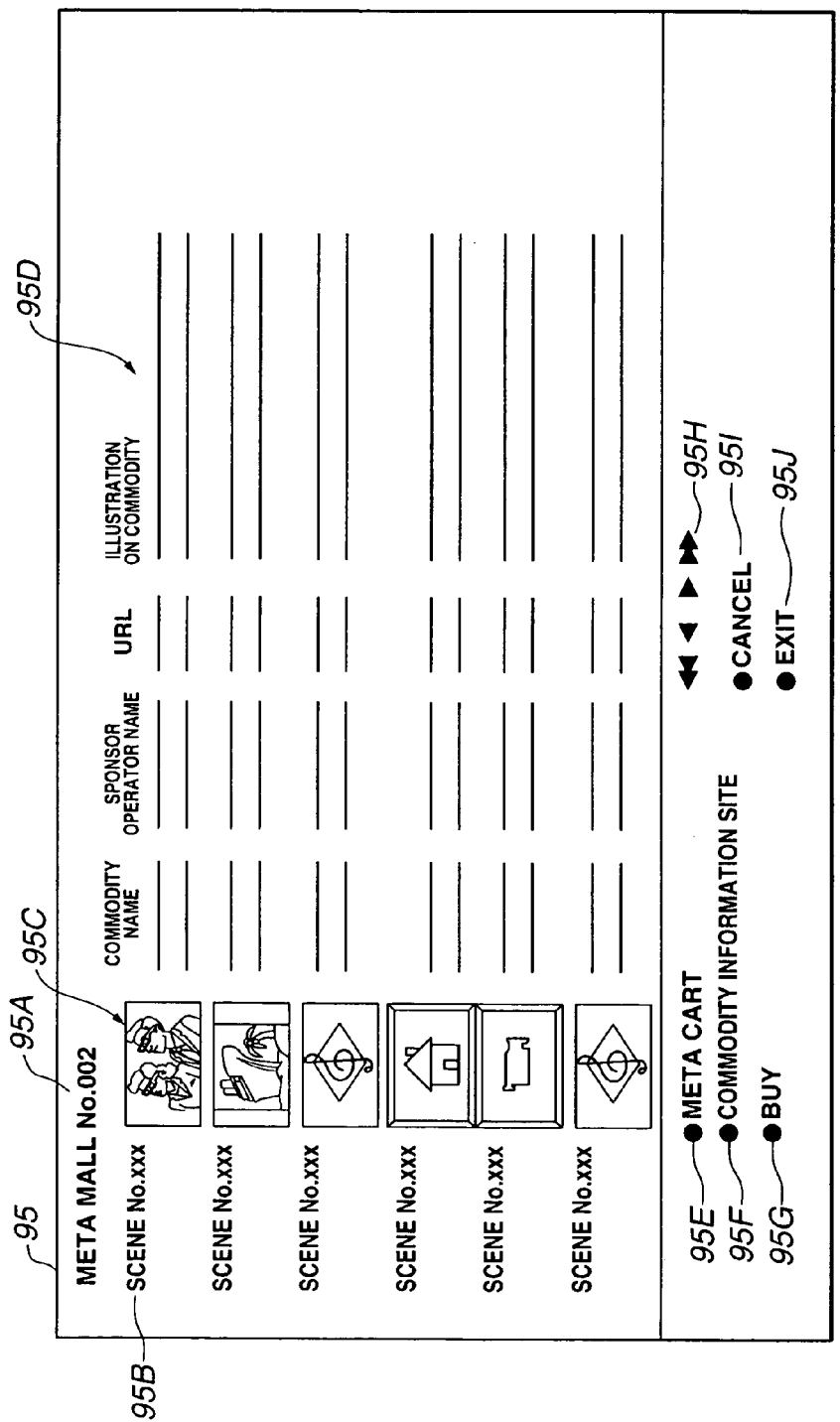
FIG. 51 shows an embodiment of a display picture of a meta-mall picture (first embodiment).
Figure 52:
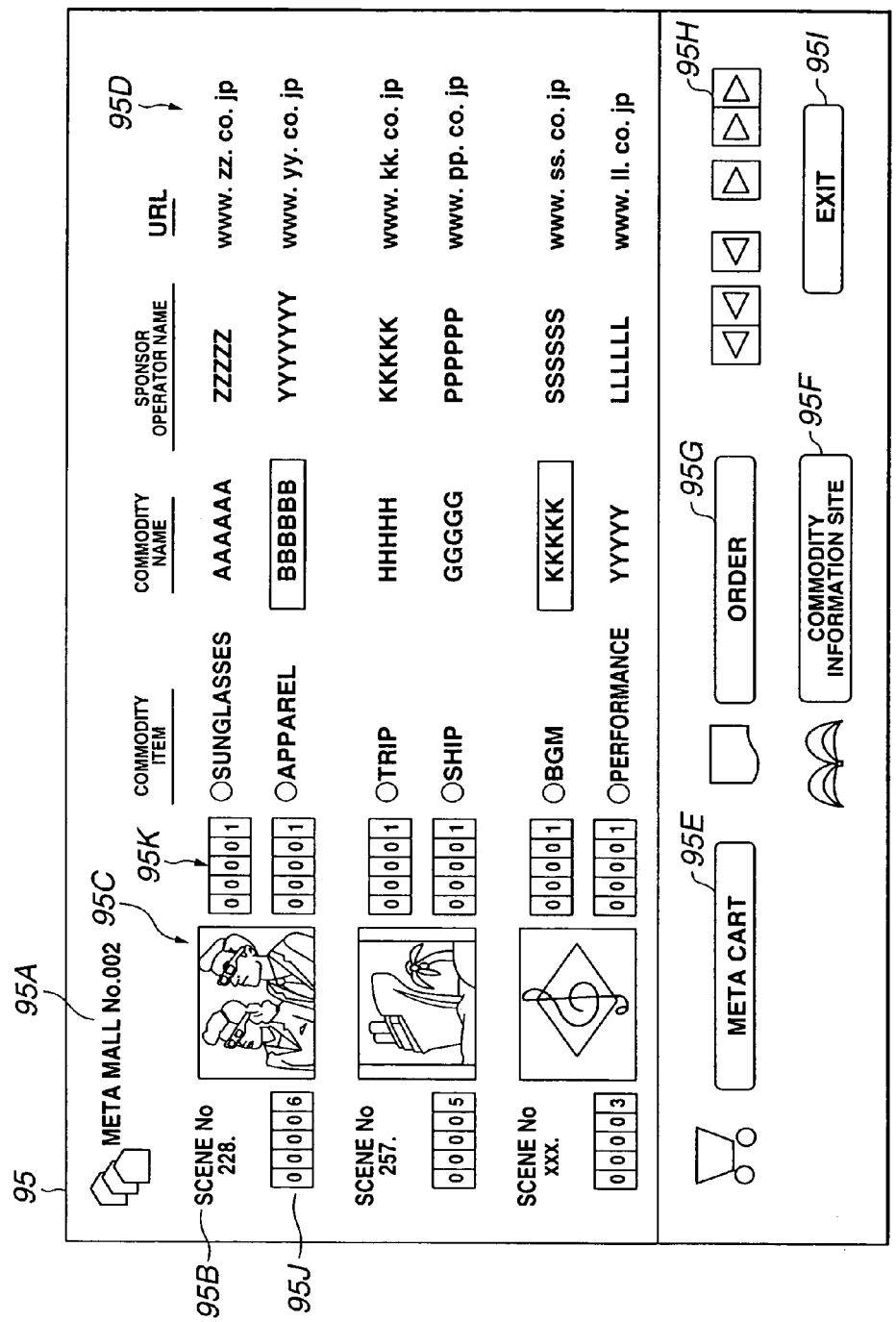
FIG. 52 shows an embodiment of a display picture of a meta-mall picture (second embodiment).

Referring to FIGS. 51 and 52, examples of display pictures for displaying a list of the information on the commodities or services for plural scenes on the same picture, that is display examples of meta-malls, so termed in the present specification, are explained. The meta-mall in question may not only be received or reproduced as program ancillary data, but also may be created in the signal processing in the processing device for program ancillary data.

First, the layout structure of FIG. 51 is explained. A display picture 95 includes a meta-mall discrimination number display column 95A, as meta-mall management information, a meta-pocket discrimination number display column 95B, as management information for meta-pockets, envisaged by the meta-mall to be displayed in a list, an index picture 95C, representing the scene content of each meta-pocket, a display column 95D for the information on commodities or services, a meta-cart jump button 95E, embedding the link information to the meta-cart, a commodity information site jump button 95F, embedding the link information to the detailed information pertinent to the commodities or services as selected on the picture, a purchase button 95G used for inputting the will to purchase, a scroll button 95H, a purchase will cancel button 95I and a meta-mall display end button 95J.

Since plural scene information are displayed, as shown in FIG. 51, the display area for one scene, that is meta-pocket, is limited, as a result of which the number of items displayed per scene is also limited. Although a column for illustration of the commodities is provided in the display example of FIG. 51 as display content of the information pertinent to commodities or services, the column for illustration of the commodities may also be omitted, as in the aforementioned display examples for meta-pockets. Conversely, the column for explanation of the commodities may also be provided in the display picture examples of the meta-pockets as display content of the information pertinent to commodities or services.

In the case of FIG. 51, an index picture 95C is demonstrated in association with each meta-pocket. This facilitates scene confirmation by the audience. The index picture may not be provided, in which case a target scene must be identified based solely on the text information.

One or plural meta-malls 95 may exist for one picture program. In any case, if all scenes making up the meta-mall cannot be demonstrated at a time, the scroll button 95H on the picture may be used to confirm the target scene.

FIG. 52 shows a second display example of a meta-mall 95. FIG. 52 differs from FIG. 51 in that the meta-mall display end button 95J is displayed in each scene, and in that a commodity- or service-based access information display column 95K is displayed for each of the commodities or services.

The information on the sub-total of the numbers of times of access events, thus displayed from scene to scene, can be used as an index as to which is the scene where favorite commodities exist and also as an index as to which are favorite commodities or services in each scene, as shown in FIG. 52.

(3) Meta-Cart Display Examples

Figure 53:
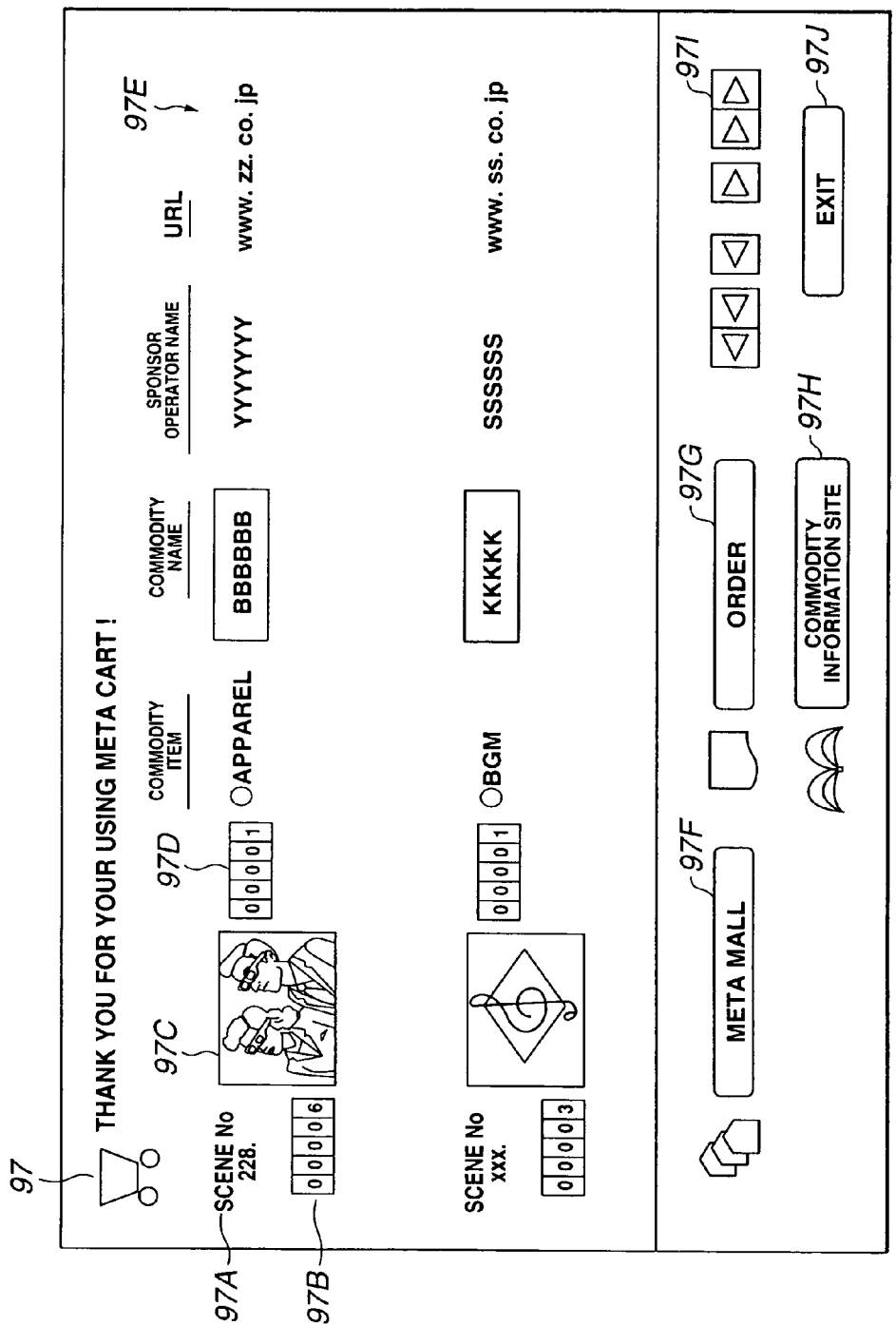
FIG. 53 shows an embodiment of a display picture of a meta-cart picture.

FIG. 53 shows a display example of a meta-cart picture displayed on actuation of a meta-cart jump button on a meta-pocket picture or on a meta-mall picture. The meta-cart is a picture used for the viewer to re-confirm the content of the commodities or services to be purchased before the viewer finally decides on the commercial transaction on the commodities or services he or she has expressed the will to purchase.

Such a display picture 97 includes a meta-pocket discrimination number display column 97A, for specifying a scene to which belongs the commodity desired to be purchased, a scene-based access information display column 97B, demonstrating the number of times of access events to a corresponding particular scene, an index picture 97C representing the content of each scene, an commodity- or service-based access information display column 97D, a commodity or service information display column 97E, a meta-mall jump button 97F embedding the link information to the meta-mall, a purchase button 97G used for inputting the will to purchase, a commodity information site jump button 97H, embedding the link information to the detailed information pertinent to commodities or services selected on the picture, a scroll button 97I and a meta-cart display end button 97J.

Since the index picture 97C is displayed in this manner in the meta-cart as a basket picture, the content of the commodities or services to be purchased can be confirmed as a picture. Thus, in case the content of the commodities or services is desired to be confirmed, it is unnecessary to revert to the picture in which the purchase has been entered, thus saving laborious inputting operations. Moreover, since this means saving in time needed until final decision of the will to purchase, the commercial transaction may be concluded in a shorter time, which is a merit for the business operator acting as an intermediary for commercial transactions.

Since the scene-based or commodity- or service-based access information is displayed, it is possible to check for popularity of the commodities or services among other viewers. So, when the viewer desirous to confirm the popularity for given commodities or services, he or she is not in need to revert to the picture in which he or she offered a purchase, thus saving laborious inputting operations. Meanwhile, there is no necessity for displaying the scene-based access information.

Although only the meta-mall jump button 97F is displayed, the meta-pocket jump button embedding the link information to the meta-pocket may also be displayed, while both the meta-mall jump button 97F and the meta-pocket jump button may be displayed.

(4) Commodity Information Site Display Example

Figure 54:
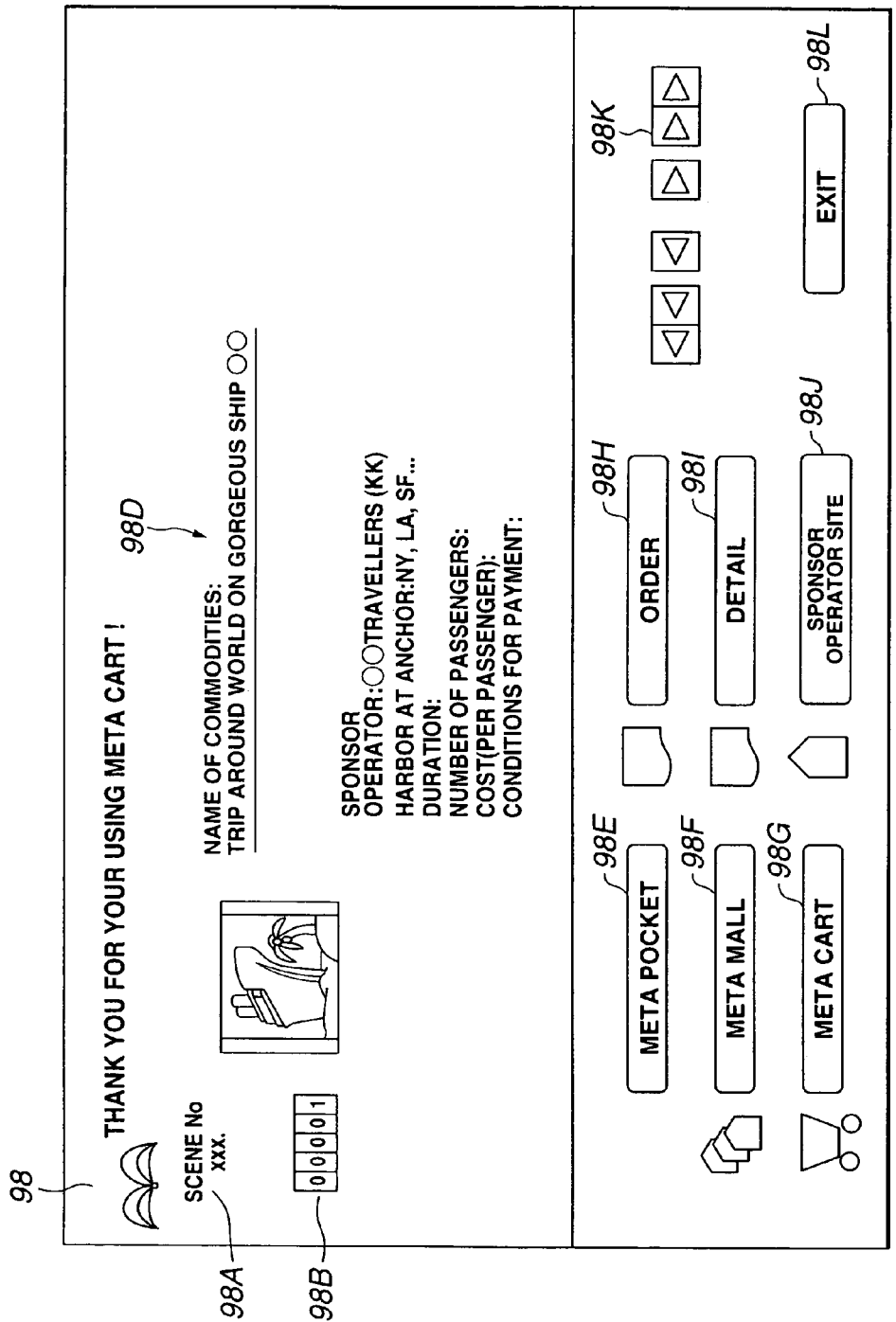
FIG. 54 shows an embodiment of a commodity information site picture.

FIG. 54 shows a display picture example of a commodity information site. This display picture is used for allowing to confirm the detailed information in case the information displayed in the meta-pocket or in the meta-mall falls short. The information in the scene in question may be stored in a server for which each business operator furnishing the commodities or services has a home page, or in a server of the brokerage business operator acting as an intermediary for the commercial transactions between the audience and the business operator.

A display picture 98 includes a scene information display column 98A, pertinent to the commodities or services in question (as link source), a commodity- or service-based access information display column 98B, displaying the access state for each commodity, a picture display column 98C, demonstrating an image picture of each commodity and an index picture of a corresponding scene, a commodity/service display column 98D demonstrating the content of the commodities or services, a meta-pocket jump button 98E, embedding the link information to the meta-pocket, a meta-mall jump button 98F, embedding the link information to the meta-mall, a meta-cart jump button 98G, embedding the link information to the meta-cart, a purchase button 98H used for inputting the will to purchase, a detailed information display button 98I for displaying the further information, if any, a sponsor business operator site jump button 98J embedding the link information to a sponsor business operator site, a scroll button 98K, and an end button 98L used for commanding the end of display of the commodity information site.

In the commodity- or service-based access information display column, there may be displayed the cumulative access information managed by a business operator furnishing the commodities or services, or the information owned by a brokerage business operator.

Although FIG. 54 shows only one picture showing the content of commodities or services in the picture display column 98C, plural pictures may, of course, be displayed.

(5) Other Display Examples

Figure 55:
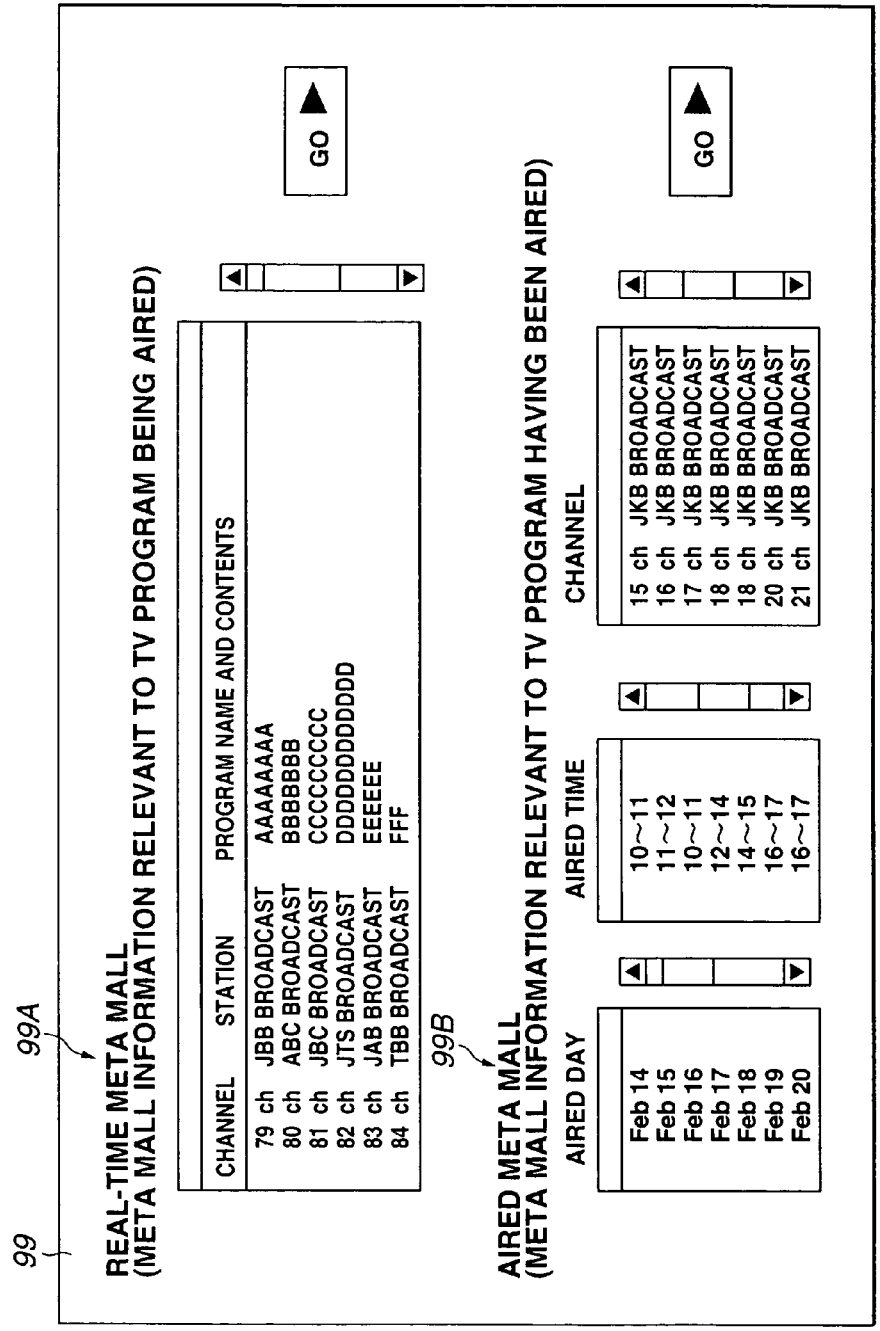
FIG. 55 shows an embodiment of another display picture (first embodiment).
Figure 56:
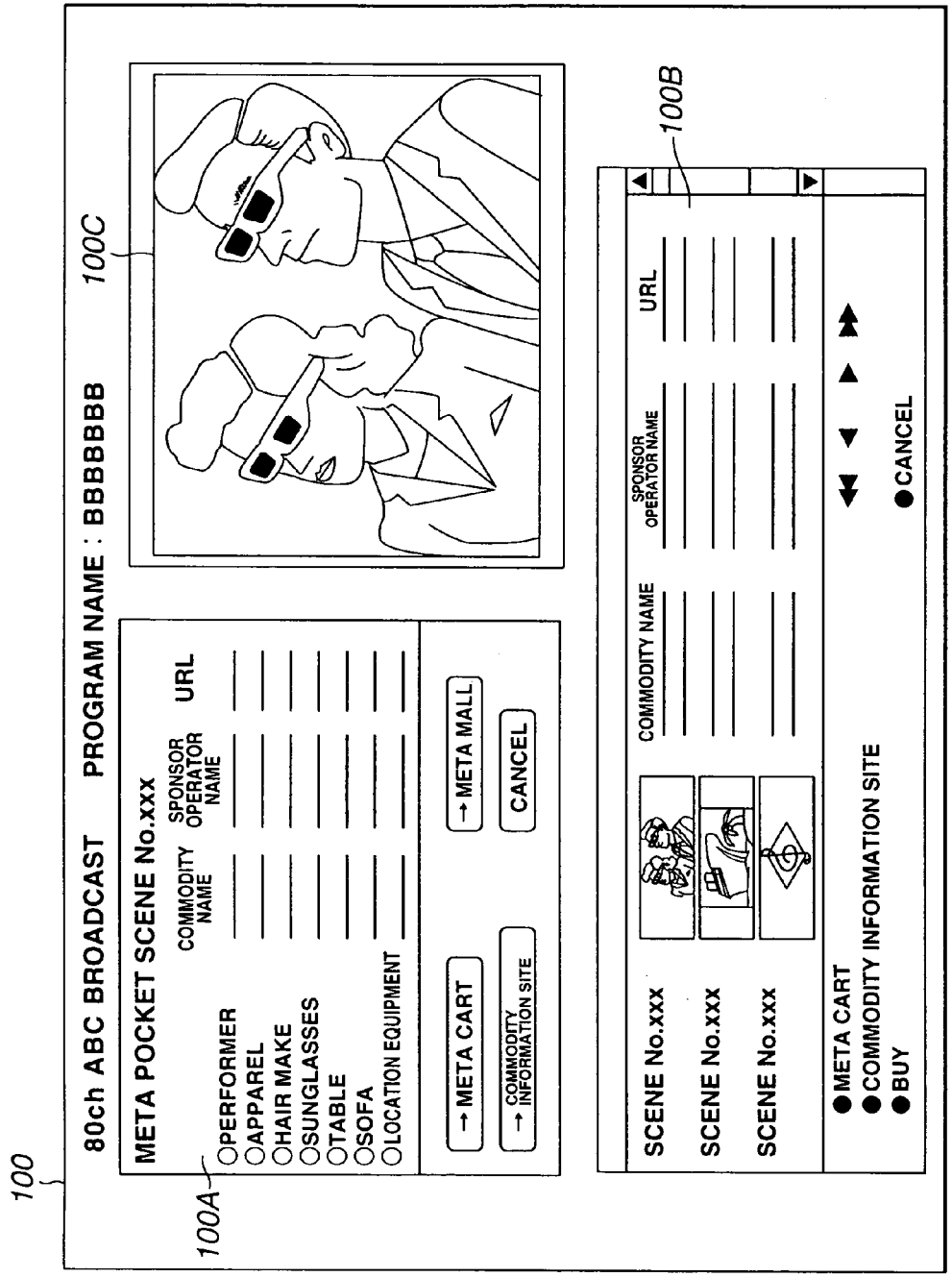
FIG. 56 shows an embodiment of still another display picture (second embodiment).

FIGS. 55, 56 show other examples of display pictures. FIG. 55 shows a picture example for facilitating the access of the audience to a meta-mall picture. A display picture 99 includes a real-time meta-mall column 99A, for displaying the meta-mall pertinent to a television program, being broadcasted, and an already aired meta-mall column 99B, for retrieving and displaying the already aired meta-mall picture.

The information displayed in the real-time meta-mall column 99A may be inserted at a preset interval in the received data, or distributed from the terminal of the brokerage business operator on request from the audience. On the other hand, the information displayed in the already aired meta-mall column 99B may be the information received by the audience in the past and stored on a recording medium, or the information distributed from the terminal of the brokerage business operator on request from the audience. In the case of FIG. 55, each of the airing date, time zone and the channel is given as an item of selection, and the necessary information is read out and displayed at a time point of finally determined selection.

A display picture 100, shown in FIG. 56, represents a display example when the meta-pocket 100A, a meta-mall 100B and a real broadcast picture 100C are arrayed on one display picture. Since the above information can be confirmed simultaneously on the display picture, the viewer is able to acquire or purchase the detailed information concerning his or her favorite commodities or services as he or she enjoys the real broadcast. Meanwhile, there are displayed, in the real broadcast picture 100C, an index picture of a scene corresponding to a meta-pocket, an image picture provided for commodities or services selected on the meta-pocket or on the meta-mall, and so forth, in addition to the pictures of the real broadcast.

(c) Processing Operations

Figure 57:
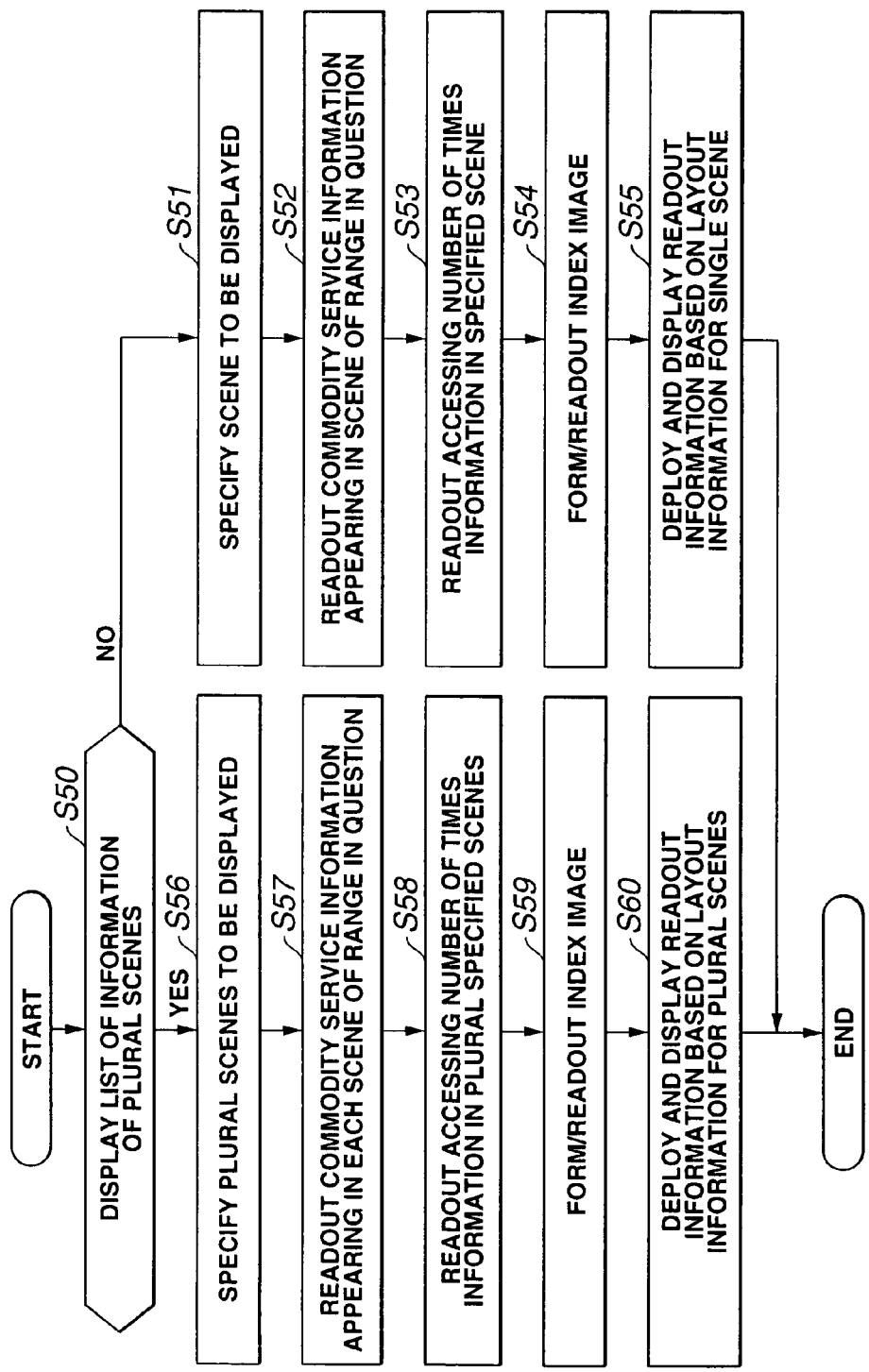
FIG. 57 is a flowchart showing an example of a processing sequence in displaying data ancillary to a program.

FIG. 57 shows an example of a processing operation at the time of confirming the content of the program ancillary data in the processing device 85 for program ancillary data, as an audience side terminal, specifically, at the time of demonstration of the meta-pocket or the meta-mall.

On accepting an operating input by the audience, the controller 85F verifies whether or not the command contents are requesting a list display of the information on the plural pictures, that is requesting display of a meta-mall (step S50). If the negative result is obtained in the check, that is if it is verified that the display of a meta-pocket is requested, the controller 85F executes the processing of specifying a scene to be displayed (step S51). For example, the controller 85F captures the scene specifying information accorded to the picture program being displayed at the time point of the operation (UMID or time code information) to specify a scene to be displayed.

When the scene to be displayed is final, the controller 85F at step S52 reads out program ancillary data which has the same scene specifying information as the specified scene specifying information (UMID or time code information) and which is relevant to the commodities or services, or the program ancillary data which has the scene specifying information contained in the specified scene specifying information and which is relevant to the commodities or services (step S52).

The controller 85F then reads out the information on the number of times of access events pertinent to the specified scene (step S53). The so read-out information is used not only for display but also for various signal processing operations. For example, the read-out information is used for calculating the number of times of scene-based access events to display the calculated results. For the calculations, the access information annexed to each of the commodities or services is used. The information is also used for displaying the information on the number of times of access events on a meta-cart or the like picture.

Moreover, the controller 85F executes the processing of creating an index picture for confirming a specified picture or of reading out the index picture from the program ancillary data (step S54). If the audience has the rights for selection of the index picture or if no index picture is contained in the program ancillary data, as received or reproduced, the processing of creating the index picture is executed.

Following these operations, the controller 85F arrays the read-out information based on the layout information for displaying the information for one scene (layout information for meta-pocket) to display the so arrayed information on the display picture (step S55). Meanwhile, in case the index picture or the number of times of access events is already contained in the program ancillary data as received or reproduced, and can directly be displayed, the display picture is first specified and subsequently the corresponding data is displayed.

In case the positive results are obtained in the verification operation of step S50, that is in case it is found that the display of a meta-mall is requested, the controller 85F executes the processing of specifying plural scenes to be displayed (step S56). For example, plural past pictures, beginning from the time point of actuation, are decided to be displayed, or the scene information specified by the audience for display is read out and displayed. If the information of the scene to be displayed is contained in the program ancillary data, the information is used.

When the scene to be displayed is final, the controller 85F at step S57 reads out program ancillary data bearing the same scene specifying information as the specified scene specifying information (UMID or time code information) and which is relevant to the commodities or services, or the program ancillary data having the scene specifying information contained in the specified scene specifying information and which is relevant to the commodities or services. It is noted that the information on the commodities or services is read out for each of the plural scenes.

The controller 58F then reads out the relevant information on the number of times of access events for each of the specified scenes (step S58). The so read-out information is used not only for display but also for variegated signal processing operations. For example, the information is used for calculating the scene-based number of times of access events within a terminal for display. For the calculations, the access information annexed to each of the commodities or services is used. The information is also used for displaying the information on the number of times of access events on a meta-cart or the like picture.

The controller 85F executes the processing of creating an index picture within a terminal for reading out the index picture from the program ancillary data (step S59) for confirming a specified scene. If the audience has the rights for selection of the index picture or if no index picture is contained in the program ancillary data as received or reproduced, the processing of creating the index picture is executed.

Following these operations, the controller 85F arrays the read-out information based on the layout information for displaying the information for plural scenes (layout information for meta-mall) to display the so arrayed information on the display picture (step S60). Meanwhile, in case the index picture or the number of times of access events is already contained in the program ancillary data as received or reproduced, and can directly be displayed, the display picture is first specified and subsequently the corresponding data is displayed.

(D-2) Server Side Terminal (a) Terminal Structure

The structure of a server device, provided between the audience and the picture producer or between the audience and the sponsor business operator and which furnishes the information to the audience or prosecutes brokerage of the commercial transactions to form a brokerage business operator side system, is hereinafter explained.

Figure 58:
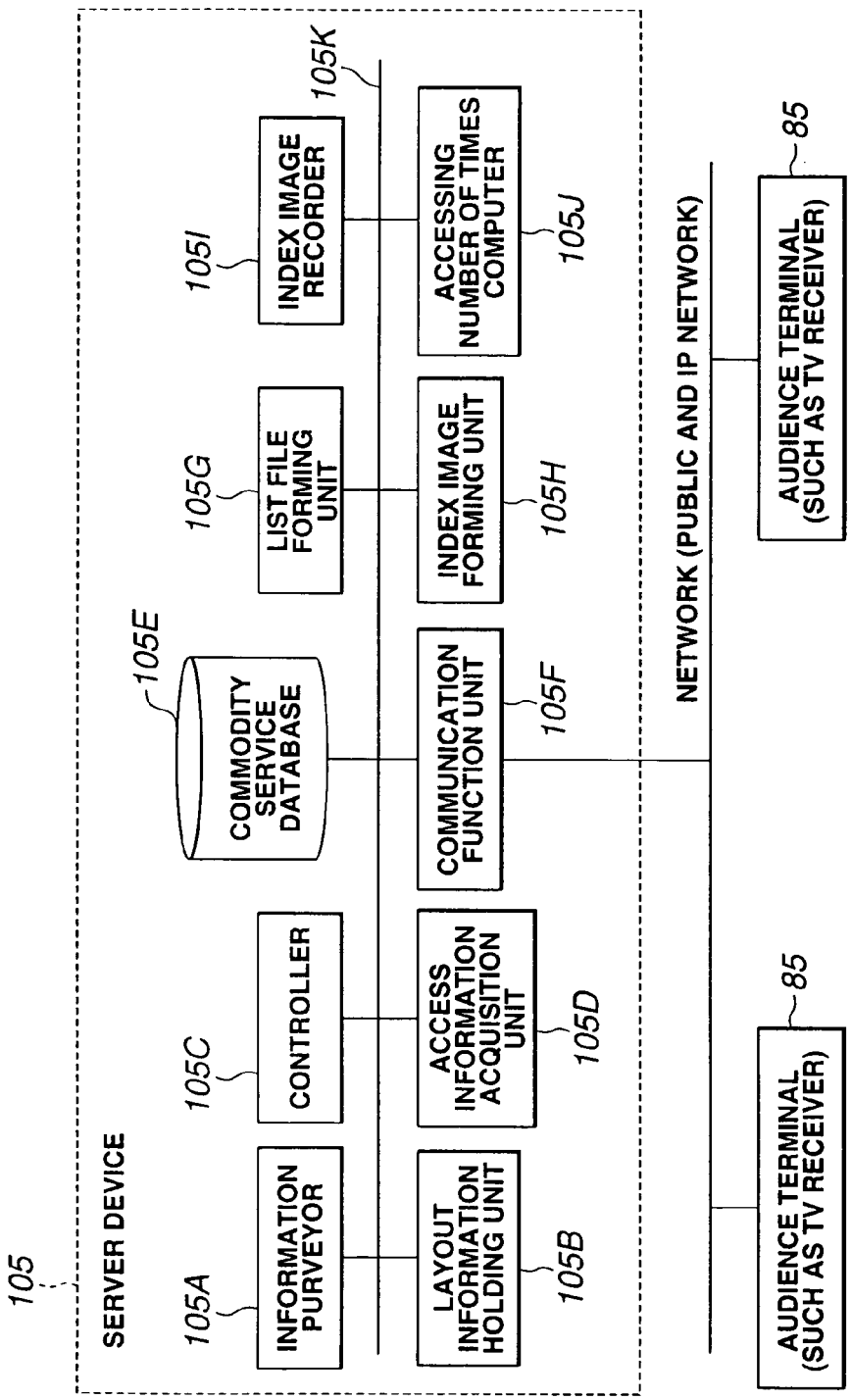
FIG. 58 is a functional block diagram showing an embodiment of a server device (first embodiment).
Figure 59:
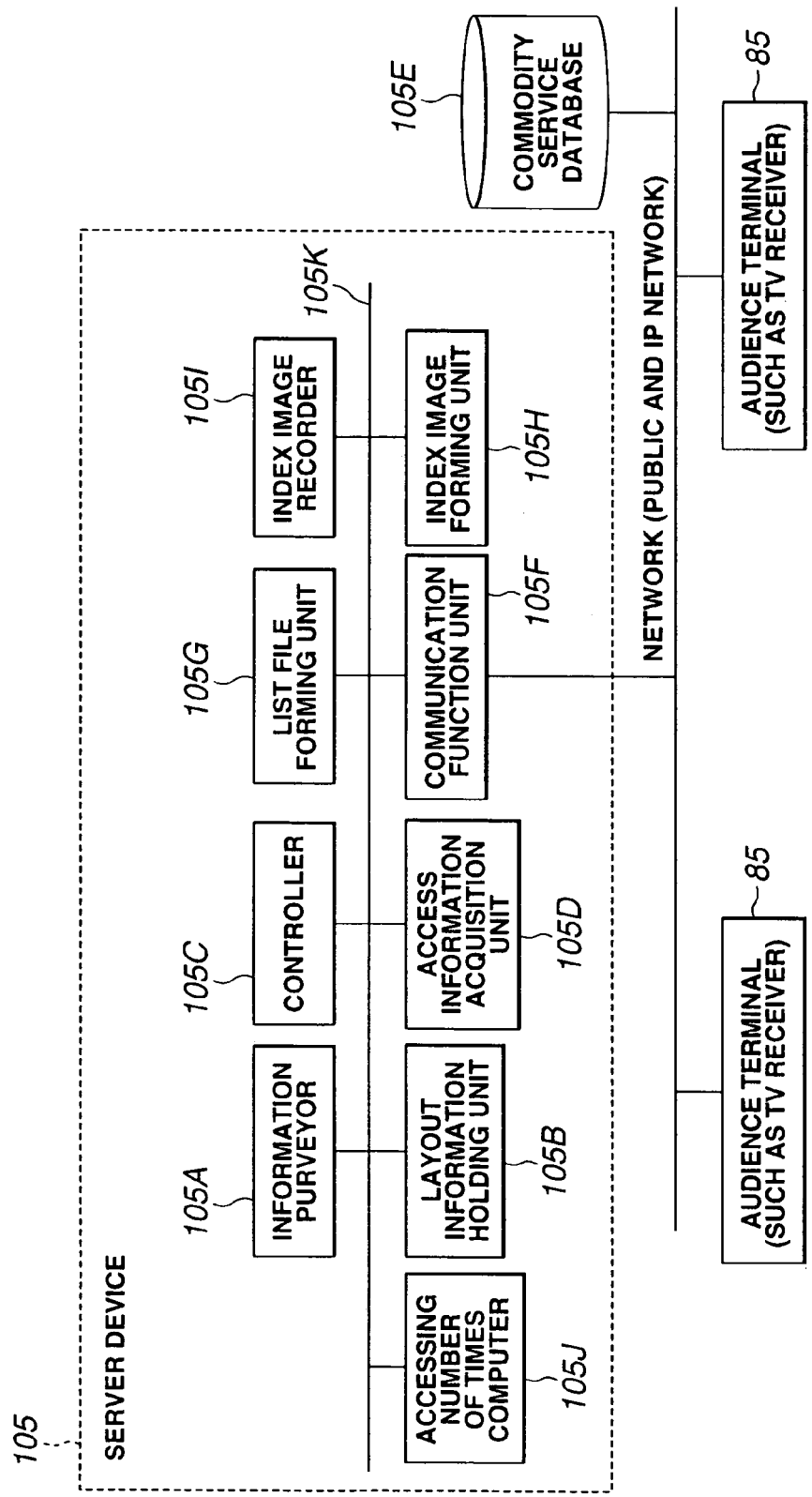
FIG. 59 is a functional block diagram showing an embodiment of a server device (second embodiment).

FIGS. 58 and 59 show two embodiments of the server device, using the same reference numerals for common parts or components. Meanwhile, the difference between FIGS. 58 and 59 is whether a commodity/server database 105E is provided in the server device or on the network.

A server device 105 includes an information furnishing unit 105A, a layout information holding unit 105B, a controller 105C, an access information acquisition unit 105D, a commodity/service database 105E, a communication function unit 105F, a list file creation unit 105G, an index picture creation unit 105H, an index picture recording unit 105I, a access event number of times calculating unit 105J and a bus 105K.

Although display means or an operating input unit is not shown in FIG. 58 or 59, these are provided in actuality for information inputting or management. Although FIG. 58 shows that the totality of the functional units are provided in the main body unit of the server device, part of the functional units may be provided externally. The connection configuration may be wired or wireless.

The information furnishing unit 105A is a function used when a data file equivalent to the aforementioned meta-mall is to be furnished from the side server device. The information furnishing unit 105A is means responsive to the audience' request to read out from the commodity/service database 105E the file data pertinent to a corresponding scene of a picture program specified by the audience so as to furnish the so read-out file data. The file data is an information file provided for each picture program for presenting the information pertinent to plural scenes to the audience in a list form. Meanwhile, the file data may be furnished from the picture producer for storage in the database, or may be created and stored in the list file creation unit 105G.

The layout information holding unit 105B is a recording or storage medium used for creating a data file corresponding to the aforementioned meta-pocket or meta-mall on the side server device for recording the layout information furnished to the audience. The layout information so held may be used only for the meta-pocket or only for the meta-mall. The medium may be used for recording or storing other information than the layout information, without being dedicated to the holding of the layout information.

These recording mediums include a CD-ROM, a magnetic recording type medium, such as tape, floppy disc, hard disc or a magnetic card, an optical recording medium, such as write-once CD, DVD or optical card, magneto-optical recording type medium, such as DVD, MD or MO, and a semiconductor memory, such as non-volatile memory or RAM.

The controller 105C is means for controlling various parts or components making up the server device, and is routinely configured as a micro-computer. Usually, the function of the controller 105C is prescribed by an operation system program and an application program.

The access information acquisition unit 105D is means for inputting the latest values of the access information pertinent to the commodities or services as requested by the audience from the commodity/service database 105E. The information as acquired is sent through the communication function unit 105F to the requesting audience. The information furnished may be the accessing information by itself or the accessing information plus the detailed information pertinent to the commodities or services as requested by the audience. When the picture displayed on the audience' picture is to be created on the side server device, the access information is pasted at a preset position which is in keeping with the layout information.

The commodity/service database 105E is a database in which there is recorded the detailed information pertinent to the commodities or services appearing on an imaged object of a picture program. The commodity/service data base may be used in common with the database used in the aforementioned database used in turn in the aforementioned sponsorship transaction support system. The information in question may be acquired from the sponsorship transaction support system or from the business operator who furnished the commodities or services to the picture program. Although the information may, of course, be input by a supervisor of the server device, the pre-existing information may be used to enable efficient database management.

In the commodity/service database 105E, there may be recorded the program ancillary data (equivalent to a meta-pocket) associated with each scene of the picture program. Alternatively, the data may be held in a medium distinct from that of the commodity/service database 105E.

The communication function unit 105F is means for communication with outside over a network. As the communication function unit 105F, such a communication equipment which is in keeping with the network is used. The network may be a telephone network, an IP network, a dedicated line network or an ATM network. The communication system may be network connection system or a packet connection system. The network may be of an analog or a digital configuration. The communication function unit 105F may be externally mounted, instead of being enclosed, as shown in FIG. 58. The access information, meta-mall picture or the index information is transmitted through this communication function unit 105F.

The list file creation unit 105G is means for creating a datafile equivalent to the meta-mall in the present specification. The picture forming the meta-mall may be determined by an operator of the server device, or specified from the audience side. There is also such a method in which, when the information specifying the time point of request of display of the list file from the audience side, that is the information specifying the picture program and the scene, is obtained, the scene of use is determined based on the rule of preparation held by the list file creating unit 10. There is also a method in which plural forward pictures are specified from the notifying scene as being a meta-mall forming scene, or a method in which plural forward and backward scenes are specified as being the meta-mall forming scene.

The list file creation unit 105G arrays the meta-pocket data of a specified scene in accordance with the layout information for the meta-mall, in order to complete picture data which is used as a list file. Alternatively, the list file creation unit 105G groups meta-pocket data (file) as found on retrieving meta-pocket data and the layout information for a meta-pocket of the specified scene into one file to form a list file.

The index picture creation unit 105H is means used for the brokerage server device to create a meta-pocket or a meta-mall provide with an index picture. However, solely the index picture may be used by itself for furnishing to the audience. The picture or the picture material used as an index picture is routinely supplied from the picture producer. In case of embedding a moving picture reproducing function or the audio reproducing function in the index picture, the link information for a moving picture file or an audio file may also be prepared.

The index picture recording unit 105I is a recording or storage medium for recording an index picture created by the index picture creation unit 105H or an index picture furnished from the picture producer. However, the medium may be used for recording or storing other information than the layout information, without being dedicated to the holding of the index picture. These recording mediums include a CD-ROM, a magnetic recording type medium, such as tape, floppy disc, hard disc or a magnetic card, an optical recording medium, such as write-once CD, DVD or optical card, magneto-optical recording type medium, such as DVD, MD or MO, and a semiconductor memory, such as non-volatile memory or RAM.

The access event number of times calculating unit 105J is means for monitoring the readout request (access) of the information on the commodities or services to the commodity/service database 105E by the audience or the state of conclusion of agreements to update the number of access events held by the commodity/service database 105E or to calculate the number of times of scene-based access events. For example, in case the detailed information concerning the commodities or services is furnished over the Internet, the unit is implemented by an application such as CGI (common gateway interface). The operational sequence in case of utilizing the CGI is carried out as follows:

For example, if it is verified that a viewer has requested furnishment of the detailed information on the commodities or services, the access event number of times calculating unit 105J is started (access counter CG1 is started), based on the statement of the access counter contained in the furnished information, before execution of transmission of the relevant information to the audience. So, the access counter CG1, thus started, increments the count value of the information furnished, here the detailed information on commodities or services. It is the access event number of times calculating unit 105J that executes this processing.

The number of times of access operations, thus calculated, is used not only as a list file or as the detailed information on the commodities or services, but may by itself be furnished to the audience. If the audience reproduces and uses the program ancillary data recorded on a recording medium, it is useful to separately calculate the number of access events for furnishment to the audience. That is, the viewer is able to use the latest information as a reference for purchase.

The bus 105K is a data input/output bus, such as, for example, an ISA-, an EISA- or a PCI bus.

The server device 105, shown in FIG. 58, may be formed by computer terminals, such as notebook or desktop personal computers, PDA, portable telephone sets, game machines, set top boxes, PC cards, domestic electrical utensils, VTR, television receivers, car navigation systems, or wrist watches having the information processing functions, in addition to the so-called dedicated terminal.

The server device 105, shown in FIG. 59, is explained. In the case of the server device 105, the commodity/service database 105E is connected over a network to the server device 105. This configuration is used in general for a case wherein the business operator executing the services of furnishing the information to the audience or the services of acting as an intermediary for commercial transactions differs from the business operator managing the commodity/service database 105E. However, the connection configuration shown in FIG. 59 may be used even if the two business operators are the same.

(D-3) Processing Operations between Terminals

Figure 60:
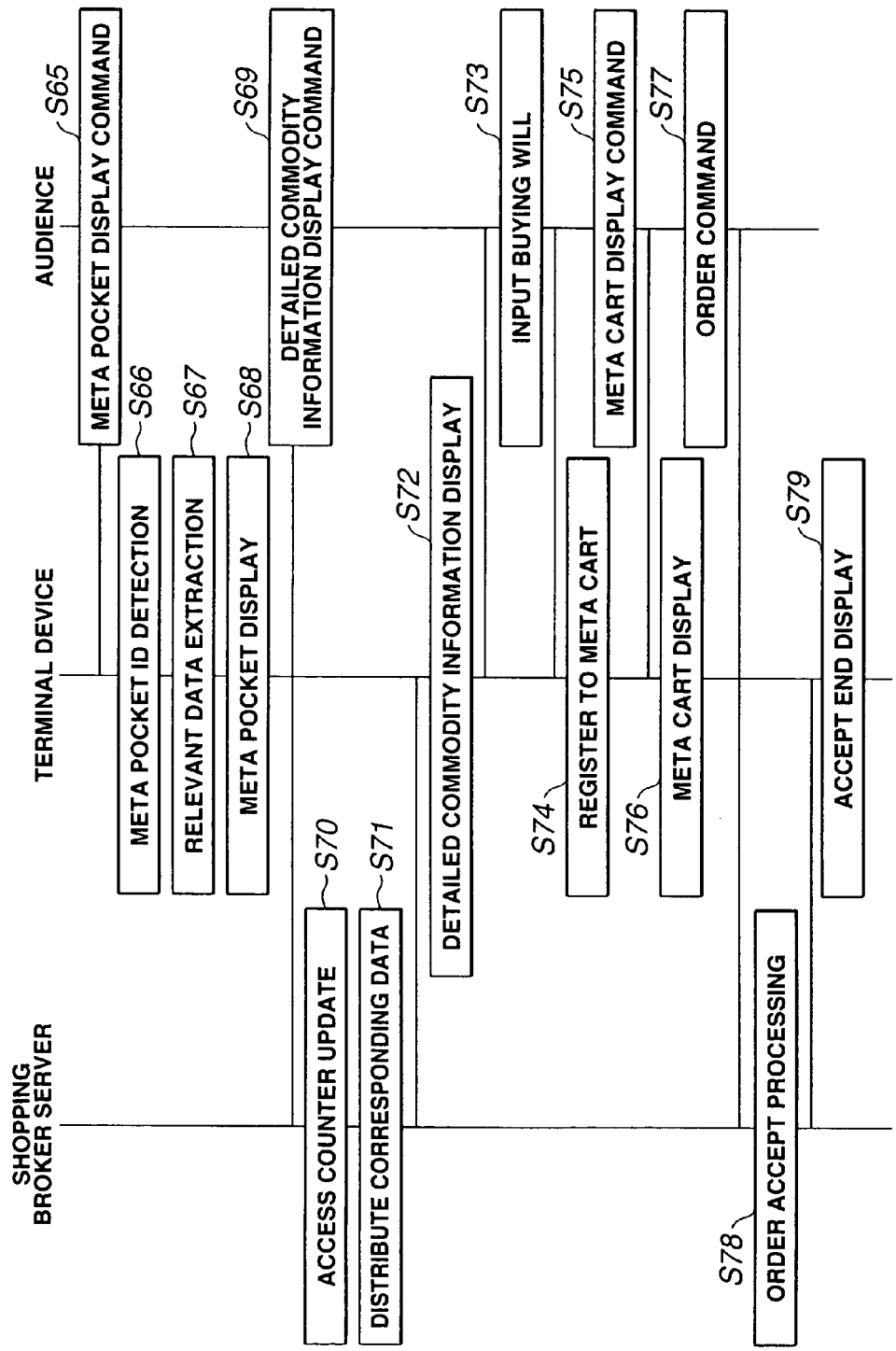
FIG. 60 is a flowchart showing an example of a processing sequence in displaying a meta-pocket.

FIGS. 60 and 61 show how processing proceeds between the audience side primary or secondary terminal and the server device when the meta-pocket or meta-mall pictures are displayed.

FIG. 60 shows meta-pocket display and an exemplary processing sequence until the end of commercial transaction. First, the audience perceives the information as to the presence of the program ancillary data concerning commodities or services appearing in the picture program being viewed and commands a meta-pocket picture to be displayed through e.g., a remote controller (step S65). The display command is notified to an audience side terminal device (program ancillary data processing device).

On receipt of the display command, the terminal device detects an identification number (ID) of the meta-pocket picture to be displayed, based on the scene information of the picture program (step S66). On detection of the meta-pocket ID, the terminal device reads out relevant data, based on the detected meta-pocket ID (step S67). In the absence of the corresponding relevant data, the terminal device requests the external database (which is not necessarily a shopping brokerage server) to download the information. At any rate, when the data relevant to the meta-pocket ID is obtained, a meta-pocket picture, correlated to the scene commanded by the audience, appears on a display picture of the terminal device (step S68).

In the meta-pocket picture, the information concerning plural imaged objects, presented on a scene of a picture program, is displayed on one picture. On the meta-pocket picture, an index picture indicating the content of a scene, the accessing information concerning each imaged object and the scene-based access information, are displayed.

If now the audience specifies some commodities or services on the picture and commands further detailed information to be displayed (step S69), the command is transmitted to a shopping brokerage server through the terminal device over the network. On receipt of the request, the shopping brokerage server updates the value of the access counter, representing the level of the interest the audience has in the relevant information (step S70), and transmits the requested commodity data to the terminal device who is the source of request (step S71). The terminal device demonstrates the information of the notification on the picture (step S72).

When subsequently the viewer on reviewing the display content is inclined to purchase and depresses the purchase button (step S75), the actuation of the purchase button is notified to the terminal device so that the information on the commodities or services being purchased is registered in the meta-cart (step S74). When the meta-cart information is to be imparted to the shopping brokerage server, the actuation and the information on the object of purchase are notified to the shopping brokerage server. At this stage, the commercial transaction between the viewer and the shopping brokerage business operator has not as yet been finally determined.

If then the viewer requests confirming the information on the commodities or services, registered in the meta-cart (step S75), the command operation is notified to the terminal device, so that the information registered in the meta-cart is displayed on the picture (step S76). Meanwhile, in case the meta-cart information is held on the shopping brokerage server, the recorded information is notified from the shopping brokerage server and displayed. At this time, the index picture representing the scene of the picture program, which gave a clue to the purchase of the commodities or services registered on the meta-cart picture, the commodity- or service-based access information and the scene-based access information are displayed.

If then the viewer confirms the content of the commodities or services registered in the meta-cart and re-confirms the will to purchase, that is if the viewer acts on the purchase button (step S77), the information on the operation is notified through the terminal device to the shopping brokerage server.

The shopping brokerage server, who has received the notice, executes the processing of ultimately accepting the information on the purchaser and the information on the commodities or services being purchased (Step S78).

The registered information is subsequently used as a reference material for subsequent sponsorship transaction or as automatic setting parameters for the distribution area. On registration of the acceptance of the offer for purchase (consent to purchase) by the shopping brokerage server, the notice of the end of the registration of the acceptance is returned to the terminal device in question. This information is displayed on the display picture of the terminal device (step S79).

FIG. 61 shows the display of a meta-pocket and an illustrative processing sequence until the end of the commercial transaction. Meanwhile, FIG. 61A shows a case where the display content of the meta-mall are already determined at the time of the operation and FIG. 61B shows a case where the display content of the meta-pocket picture is determined subject to command.

In FIG. 61A, the audience perceives the information as to the presence of the program ancillary data concerning commodities or services appearing in the picture program being viewed and commands a meta-mall picture to be displayed through e.g., a remote controller (step S80). The display command is notified to a audience side terminal device (program ancillary data processing device).

On receipt of the display command, the terminal device detects an identification number (ID) of the meta-mall picture to be displayed, based on the scene information of the picture program (step S81). On detection of the meta-mall ID, the terminal device reads out relevant data, based on the detected meta-mall ID (step S82). In the absence of the corresponding relevant data, the terminal device requests the external database (which is not necessarily a shopping brokerage server) to download the information. At any rate, when the data relevant to the meta-mall ID is obtained, a meta-mall picture, correlated to the scene commanded by the audience, appears on a display picture of the terminal device (step S83).

In the meta-mall picture, the information concerning plural scenes is displayed on one picture such as to permit confirmation. Of course, the information on plural commodities or services appearing in one scene is displayed in the information on the commodities or services corresponding to each scene. In each scene, the index information representing the content, the access information for each imaged object and the scene-based access information are displayed. The ensuing operation is similar to that explained in connection with FIG. 60 and hence is not explained specifically.

In the case of FIG. 61B, the viewer perceives the information as to the presence of the program ancillary data concerning commodities or services appearing in the picture program being viewed and commands a meta-mall picture to be displayed through e.g., a remote controller (step S80). The display command is notified to a audience side terminal device (program ancillary data processing device).

On receipt of the notice on the display command, the terminal device specifies a scene position at the time point of the command input and, based on the so specified scene position as a reference, reads out the range information of the scene forming the meta-mall picture (step S84). In the case of live broadcast, a preset number of pictures present on the time axis previous to the time pint when the command for displaying the meta-mall picture was made are set as the scene range forming the meta-mall picture. In the case of the replay broadcast, a preset number of scenes present ahead and at back of a time point of the display command for the meta-m all picture as the center are set as the scene range forming the meta-mall picture. Meanwhile, if the viewer has previously entered the scenes, desired to be displayed as the meta-mall picture, the scenes forming the meta-mall picture are set from among the previously entered scenes.

When the scenes forming the meta-mall picture have been specified, the terminal device, for example, detects an identification number (ID) of the meta-pocket pictures corresponding to the scenes (step S85). On detection of the meta-pocket ID, the terminal device reads out the relevant data based on the meta-pocket ID (step S86). In the absence of the corresponding relevant data, the terminal device requests the external database (which is not necessarily a shopping brokerage server) to download the information. At any rate, when the data relevant to the meta-mall ID is obtained, the terminal device creates a meta-mall picture, based on the relevant data (step S87).

On completion of creation of the meta-mall picture, the terminal device displays the so-created meta-mall picture on the display picture (step S88). The ensuing operations are similar to those of FIG. 60 and hence are not explained specifically. The layout or the display content of the meta-mall picture is similar to those shown in FIG. 61A.

The processing sequence of FIGS. 60 and 61 are given only by way of illustration, such that it may be possible to perform the processing operations conforming to the service furnishing configurations.

(D-4) Summary

By constructing the digital picture program reproducing system, as described above, it is possible to construct an equipment structure and a man-machine interface which are convenient to use for the audience. In particular, since the audience is able to acquire the information pertinent to plural commodities or services, appearing as imaged objects in the respective scenes, on a program ancillary data picture associated with one scene (meta-pocket picture or meta-mall picture), the totality of the picture programs other than the television shopping programs can be used as a platform for the commodity/service information.

Moreover, since not only is the information pertinent to a scene displayed as program ancillary data on a picture, but also the information on plural scenes can be confirmed on the same picture (meta-mall picture), the target scene can be accessed with a lesser amount of operations. This means that a picture may be provided which is convenient to use for a broad range of age groups.

Since not only is the information on the commodities or services appearing in each scene furnished, but also the access states from the audience to these commodities or services are furnished as count values, the audience can be afforded with the information beneficial in purchasing the commodities or services. Meanwhile, the number of times of access events, collected on the scene basis, is the information beneficial in grossly selecting the scene.

By causing the index picture of a corresponding scene to be displayed in displaying the information on the commodities or services appearing in each scene, the viewing of the picture program can be isolated from the time point of recognition of the program ancillary data, thus improving the convenience in use for the audience. In particular, for worker's family units and youngsters, for whom the living time in households is limited, such use modes of transferring the program ancillary data, acquired in the primary terminal, to the secondary terminal for confirmation outdoors may be welcomed, in which case the presence of the index picture is helpful for the viewer to arrive at the target scene more promptly, while the content of the commodities or services targeted may be confirmed visually. The result is that the number of cases reaching the stage of commercial transactions is appreciably larger than if the scheme of the present invention is not used.

INDUSTRIAL APPLICABILITY

With the program ancillary data processing device, according to the present invention, in which the degree of interest the audience at large feels in the commodities or services appearing in a picture program can be checked on the scene basis, it can be confirmed readily whether or not commodities or services that are in vogue are contained in a given scene.

With the program ancillary data processing device, according to the present invention, in which the degree of interest the viewers at large feels in the commodities or services appearing in a picture program can be checked from one commodity or service appearing in a given scene to another, it can be readily checked whether or not specified commodities or services are also accepted by other viewers.

With the program ancillary data processing device, according to the present invention, in which the target information relevant to the number of times of access events is obtained from the program ancillary data received or reproduced with the picture program, any device not carrying communication means may conveniently be used. With the program ancillary data processing device, according to the present invention, in which the information relevant to the number of times of access events can be acquired over a communication network independently of picture program data, the latest information on the number of times of access events can be provided for the viewer not only when the contents of the program ancillary data are checked as the picture program progresses but also when the transiently stored picture program data is reproduced or when the picture program data distributed as a recording medium is reproduced.

With the program ancillary data processing device, according to the present invention, the viewer is able to confirm the contents of the respective scenes making up a picture program, in particular the commodities or services afforded by the program ancillary data, as he or she compares the contents to the display in the index picture.

With the program ancillary data processing device, according to the present invention, in which there is no necessity of providing the index picture in the device itself, the processing resources necessary for executing the processing may be allocated to other processings.

With the program ancillary data processing device, according to the present invention, in which an index picture is prepared in the device itself, it is sufficient if only an index picture as required is prepared, thus evading the wasting of many memory areas by the index pictures of the major portion of the program ancillary data which do not have to be confirmed.

With the program ancillary data processing device, according to the present invention, in which not the index picture in which commodities or services relevant to program ancillary data appear in an averaged out fashion, but a picture which permits easy recognition of the commodities or services the viewer is desirous to view, can be selected as the index picture, the viewer is able to select an optimum picture.

With the program ancillary data processing device, according to the present invention, in which the information pertinent to plural scenes can be accessed on one picture, it is possible to evade the laborious operation of confirming the contents from scene to scene. Moreover, since the information on the plural scenes can be compared on one picture, the target information can be accessed extremely readily.

With the program ancillary data processing device, according to the present invention, in which the viewer is able to confirm the contents of the respective scenes making up the picture program, anyone can find a scene in which he or she is interested in, from the plural scenes displayed in a list form. In addition, since the contents of the commodities or services appearing in a specified scene can be checked on the same display picture as the viewer compares the contents, the viewer feel easy when using the device.

With the program ancillary data processing device, according to the present invention, in which the scenes displayed in the list form are only those contiguous to one another, anyone can access the target scene extremely readily.

With the program ancillary data processing device, according to the present invention, only those scenes the viewer has selected with the intention to make a check may be displayed.

With the program ancillary data processing device, according to the present invention, such a picture may be provided to the viewer which enables accessing to the information concerning plural scenes on one display picture, when the information pertinent to commodities or services appearing in each scene is not contained in the program ancillary data, but data indicating whether or not the information pertinent to commodities or services appearing in each scene is available through an external database is contained in the program ancillary data, and the data indicates availability of the information from the external database.

With the program ancillary data processing device, according to the present invention, the program ancillary data received or reproduced in another terminal device and stored on a recording medium can be separately taken out and reused.

With the program ancillary data processing device, according to the present invention, in which the information concerning plural scenes can be checked at a time on the display picture, the necessity for processing for displaying the information of other scenes on the display picture may be eliminated, even when the target information is not contained in the information concerning a given scene. Thus, it is possible to realize retrieval which is more efficient than if each scene is accessed independently.

With the program ancillary data processing device, according to the present invention, it is possible to check what are the commodities or services scheduled to be purchased, on an index picture, when these commodities or services are re-checked on the basket picture. Consequently, the viewer is freed of the labor of exiting the basket picture to check the contents of the commodities or services to move to the other picture. In particular, when the commodities being checked on the basket picture affect plural scenes, the operation of reverting to the respective scenes may be eliminated. This gives a picture for check that can be easy to operate and use for anyone.

With the server device according to the present invention, even when the information on the access state from the viewer to the detailed information relevant to the commodities or services is not included in the picture program data received or reproduced by the viewer, it is possible to render services employing the information.

With the server device of the present invention, the latest value of the access state from the viewer to the detailed information pertinent to the commodities or services appearing as an imaged object in the picture program can be incidentally furnished responsive to a request from the viewer.

With the server device of the present invention, even when the information file is not included in the picture program data received or reproduced by the viewer, the services employing the file may be provided to the viewer.

With the server of the present invention, it is possible to provide a list file in which an index picture is added to each scene. Since the index picture is affixed to each of plural scenes making up the list file, scene retrieval by the viewer may be expectantly facilitated.

With the program information display method of the present invention, the viewer is able to judge easily, without regard to the route of acquisition of the number of times of access events, whether or not popular commodities or services are contained in the scene on the display picture he or she is interested in. The program information display method of the present invention is useful in particular in giving a decision, when browsing the information on the commodities or services appearing in the imaged object in many scenes, as to in which scene the information is to be browsed.

With the program information display method of the present invention, the viewer is able to judge easily, without regard to the route of acquisition of the index picture, which specified commodities or services appearing in a picture program are popular among other viewers With the program information display method of the present invention, the viewer is able to judge easily, without regard to the route of acquisition of the index picture, which commodities or services appear in each scene. When the information pertinent to commodities or services is to be checked, the contents can be checked easily because the index picture, usually given as a still picture, is displayed.

With the program information display method of the present invention, in which the information pertinent to plural scenes can be checked at a time on the display picture, the operation of causing the information of another scene to be displayed on the display picture may be dispensed with even when the target information is not included in the information pertinent to a given scene. Thus, more efficient retrieval can be realized than if the respective scenes are accessed independently.

With the program information display method of the present invention, in which the target scene can be selected as the contents of the respective scenes are checked on the index picture, the operational efficiency can be improved. In checking the information concerning the commodities or services, their contents can be visually checked visually on the index picture.

With the recording medium of the present invention, any pre-existing terminal can be used as a program ancillary data processing device, by simply installing a program recorded on the recording medium in the pre-existing terminal, even in the absence of a dedicated program ancillary data processing device.

With the recording medium of the present invention, any pre-existing terminal can be used as a program ancillary data processing device, by simply installing a program recorded on the recording medium in the pre-existing terminal, even in the absence of a dedicated program ancillary data processing device.

With the recording medium of the present invention, any pre-existing terminal can be used as a program ancillary data processing device, by simply installing a program recorded on the recording medium in the pre-existing terminal, even in the absence of a dedicated program ancillary data processing device.

With the recording medium of the present invention, any pre-existing terminal can be used as a program ancillary data processing device, by simply installing a program recorded on the recording medium in the pre-existing terminal, even in the absence of a dedicated program ancillary data processing device.

With the recording medium of the present invention, any pre-existing terminal can be used as a program ancillary data processing device, by simply installing a program recorded on the recording medium in the pre-existing terminal, even in the absence of a dedicated program ancillary data processing device.

With the recording medium of the present invention, any pre-existing terminal can be used as a program ancillary data processing device, by simply installing a program recorded on the recording medium in the pre-existing terminal, even in the absence of a dedicated program ancillary data processing device.

With the recording medium of the present invention, any pre-existing terminal can be used as a program ancillary data processing device, by simply installing a program recorded on the recording medium in the pre-existing terminal, even in the absence of a dedicated program ancillary data processing device.

With the recording medium of the present invention, any pre-existing terminal can be used as a program ancillary data processing device, by simply installing a program recorded on the recording medium in the pre-existing terminal, even in the absence of a dedicated program ancillary data processing device.

With the recording medium of the present invention, any pre-existing terminal can be used as a program ancillary data processing device, by simply installing a program recorded on the recording medium in the pre-existing terminal, even in the absence of a dedicated program ancillary data processing device.

The invention claimed is:

1. A program ancillary data processing apparatus comprising:
    A program ancillary data extraction unit for extracting, from picture program data, program ancillary data relevant to commodities or services appearing in each scene;
    A display control unit, displaying to the commodities/services shopping audience on a display picture (a) information relevant to the commodities or services appearing in each scene, and (b) a sum total of a number of times of scene-based access events and commodity or service based access events by the commodities/services shopping audience prior to purchase of the commodities or services from to a database, which supervises the detailed information relevant to said commodities or services, based on preset layout information; and
    An index picture creation unit operable to create an index picture used for confirming the scene having the extracted program ancillary data relevant to the commodities or services, wherein the index picture is selectable according to:
    A preset rule corresponding to a frame of the scene; or
    A frame corresponding to a time code.

2. The program ancillary data processing apparatus according to claim 1 wherein
    the results of the summation of the number of times of scene-based access events, the summation of the number of times of commodity-based access events and the summation of the service-based access events by the commodities/services shopping audience to the database, supervising the detailed information on the commodities or services, are acquired as program ancillary data of the picture program data.

3. The program ancillary data processing apparatus according to claim 1 wherein
the results of the scene-based summation, commodity-based summation or the service-based summation of the numbers of times of access events by the commodities/services shopping audience to the database, supervising the detailed information pertinent to the commodities or services, are acquired, apart from the picture program data, from the database which is connected to the apparatus over a communication network and which supervises the detailed information on the commodities or services.

4. A server apparatus comprising:
An access information acquisition unit for acquiring information, pertinent to an access state from a commodities/services shopping audience from a database supervising the detailed information pertinent to commodities or services appearing as an imaged object in a picture program, in accordance with a request from a commodities/services shopping viewer connected to the acquisition unit over a communication network;
A communication functional unit for notifying, the commodities/services shopping viewer in the commodities/services shopping audience, a latest value of a number of times of scene-based access and commodity or service based access by all commodities/services shopping viewers in the commodities/services shopping audience prior to purchase of the commodities or services, as acquired by said access information acquisition unit, and as requested by the commodities/services shopping viewer; and
A list file creation unit operative to create a data file corresponding to plural scene information each comprising a scene index picture and corresponding commodities or services associated with the scene index picture, wherein the scene index picture includes an embedded moving picture reproduction function or an audio reproduction function within the scene index picture.

5. A server apparatus comprising:
an access information acquisition unit for acquiring information, pertinent to an
access state from a commodities/services shopping viewer from a database supervising the detailed information pertinent to commodities or services appearing as an imaged object in a picture program, in accordance with a request from the commodities/services shopping viewer connected to the acquisition unit over a communication network;
a communication functional unit for notifying, commodities/services shopping
viewer, a latest value of a number of times of commodity-based and or scene-based access by all commodities/services shopping viewers prior to purchase of the commodities or services, as acquired by said access information acquisition unit, and as requested by the commodities/services shopping viewer; and
a picture index creation unit operable to provide an index picture associated with
the imaged object in a picture program, wherein link information to a moving picture or an audio file is embedded in the index picture.

6. A picture information displaying method for displaying, on a display picture, information pertinent to commodities or services appearing in each scene of a picture program, responsive to a request from a commodities/services shopping viewer, said method comprising:

A processing step of reading out results of summation of a number of times of scene-based access events and commodities or service based access events by a commodities/services shopping audience of all commodities/services shopping viewers prior to purchase of the commodities or services from a database supervising the detailed information relevant to commodities or services appearing in a scene to be displayed; and
A processing step of displaying to the commodities/services shopping viewer, the read-out results in association with a scene in question,
Wherein the commodities/services shopping viewer is able to judge, regardless of a route of acquisition corresponding to the number of times of scene-based access events, popularity among all commodities/services shopping viewers of the commodities or services appearing in the scene to be displayed.

7. A non-transitory computer-readable recording medium having a program recorded thereon, said program being usable for a computer to implement
A program ancillary data extraction function of extracting, from picture program data, program ancillary data relevant to commodities or services appearing in each scene; and
A display control function, of displaying to the commodities/services shopping audience (a) information relevant to the commodities or services appearing in each scene, and (b) a sum total of a number of times of scene-based access events and commodity or service based access events by the commodities/services shopping audience prior to purchase of the commodities or services from to a database supervising the detailed information relevant to said commodities or services on a display picture, based on preset layout information,
Wherein the commodities/services shopping audience is able to judge, regardless of a route of acquisition corresponding to the number of times of scene-based access events, popularity among the commodities/services shopping audience of the display information relevant to the commodities or services appearing in each scene.

8. A non-transitory computer-readable recording medium having recorded thereon a program usable for a computer to implement
An access information acquiring function of acquiring, responsive to a request from a commodities/services shopping viewer connected to the computer over a communication network, information pertinent to access states from a commodities/services shopping audience from a database supervising the detailed information pertinent to commodities or services appearing as an imaged object in a picture program;
A communication function for notifying, the commodities/services shopping viewer, a latest value of a number of times of scene-based access events and commodity or service based access events by all commodities/services shopping viewers in the commodities/service shopping audience as acquired by said access information acquiring function and as requested by the commodities/services shopping viewer; and
A picture index creation unit operable to provide an index picture associated with the imaged object in a picture program, wherein link information to a moving picture or an audio file is embedded in the index picture.

* * * * *